United States Patent [19]

Miller

[11] Patent Number: 4,519,071
[45] Date of Patent: May 21, 1985

[54] PHASE-LOCKED LOOP AND CLOCK CIRCUIT FOR A LINE SWITCH

[75] Inventor: Robert L. Miller, Westerville, Ohio

[73] Assignee: International Telephone and Telegraph Corporation, New York, N.Y.

[21] Appl. No.: 370,602

[22] Filed: Apr. 22, 1982

[51] Int. Cl.³ .............................................. H04J 3/06
[52] U.S. Cl. ...................................... 370/100; 370/84
[58] Field of Search ......................... 370/100; 375/120

[56] References Cited

U.S. PATENT DOCUMENTS

| | | | |
|---|---|---|---|
| 3,825,683 | 7/1974 | Pitroda et al. | 370/100 |
| 3,936,603 | 2/1976 | Guppy et al. | 370/100 |
| 3,980,820 | 9/1976 | Niemi et al. | 370/100 |
| 4,059,805 | 11/1977 | de Laage de Meux et al. | 375/120 |
| 4,129,748 | 12/1978 | Saylor | 375/120 |
| 4,321,483 | 3/1982 | Dugan | 375/120 |

OTHER PUBLICATIONS

W. Waggener, "Designer's Guide To: Digital Synchronization Circuits, Part III", EDN Magazine, vol. 21, No. 16, Sep. 1976, pp. 99–105.

J. Snyder, "Digital Phase-Locked Loop Finds Clock Signal in Bit Stream", Electronics, Aug. 30, 1979, vol. 52, No. 18, pp. 126–130.

Primary Examiner—Douglas W. Olms
Assistant Examiner—Wellington Chin

Attorney, Agent, or Firm—John T. O'Halloran; Jeffrey P. Morris

[57] ABSTRACT

A line switch for a digital telephone switching system utilizes distributed processing. The line switch comprises one or more switch modules. Each switch module is coupled to a central office switching system via one or more PCM lines which utilize common channel signaling. Each switch module comprises groups of line circuits, each line circuit being coupled to a subscriber line. Three separate distributed processor functions are provided in each line switch module. First one processor is utilized to communicate with the central office switching system and to coordinate the operations within the line switch module. A second processor is provided to control clock generation and rate conversion circuits. Each group of line circuits includes a third processor to control the operations of the line circuits and to gather information from the line circuit.

The second processor is used to select which of a plurality of sources may be used to provide clock signals within the line switch module.

A phase-locked loop permits clock signals which are generated in a line switch module to be in phase synchronism with any one of the PCM lines. When two or more lines switch modules are connected together to form a line switch, the phase-locked loop circuits of each module will utilize the same PCM line for phase-locking.

21 Claims, 79 Drawing Figures

| LINE SWITCH CONFIGURATION | TRAFFIC | |
|---|---|---|
| | 24 CHANNEL | 32 CHANNEL |
| 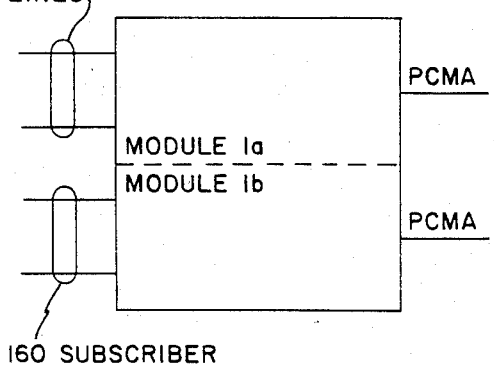 160 SUBSCRIBER LINES — MODULE 1a / MODULE 1b — PCMA, PCMA — 160 SUBSCRIBER LINES | 32.2E TOTAL .1E./LINE | 42.3E TOTAL .132 E/LINE |
| 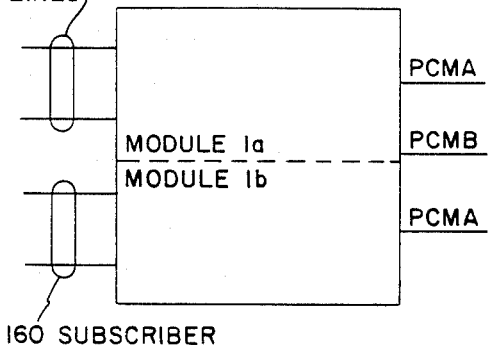 160 SUBSCRIBER LINES — MODULE 1a / MODULE 1b — PCMA, PCMB, PCMA — 160 SUBSCRIBER LINES | 52.7E TOTAL .164.E./LINE | 68.6E TOTAL .214 E./LINE |
| 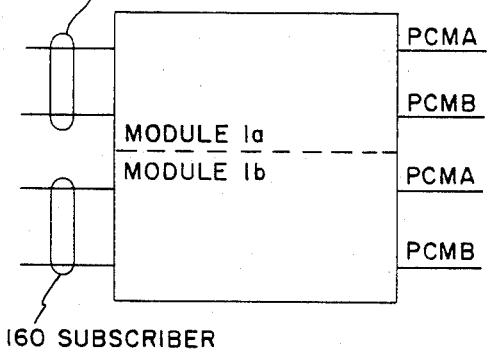 160 SUBSCRIBER LINES — MODULE 1a / MODULE 1b — PCMA, PCMB, PCMA, PCMB — 160 SUBSCRIBER LINES | 73.9E TOTAL .23.E./LINE | 95.5E TOTAL .298E./LINE |
FIG. 3

| LINE SWITCH CONFIGURATION | TRAFFIC | |
|---|---|---|
| | 24 CHANNEL | 32 CHANNEL |
| 160 SUBSCRIBER LINES / 192 SUBSCRIBER LINES — MODULE 1a (PCMA), MODULE 1c, MODULE 1b (PCMA) — 160 SUBSCRIBER LINES | 32.2E TOTAL .063E/LINE | 42.3E TOTAL 0.83E/LINE |
| 160 SUBSCRIBER LINES / 192 SUBSCRIBER LINES — MODULE 1a (PCMA, PCMB), MODULE 1c, MODULE 1b (PCMA) — 160 SUBSCRIBER LINES | 52.7E TOTAL .103E/LINE | 68.6E TOTAL |
| 160 SUBSCRIBER LINES / 192 SUBSCRIBER LINES — MODULE 1a (PCMA, PCMB), MODULE 1c, MODULE 1b (PCMA, PCMB) — 160 SUBSCRIBER LINES | 73.9E TOTAL .144E/LINE | 95.5E TOTAL .186E/LINE |

FIG. 3A

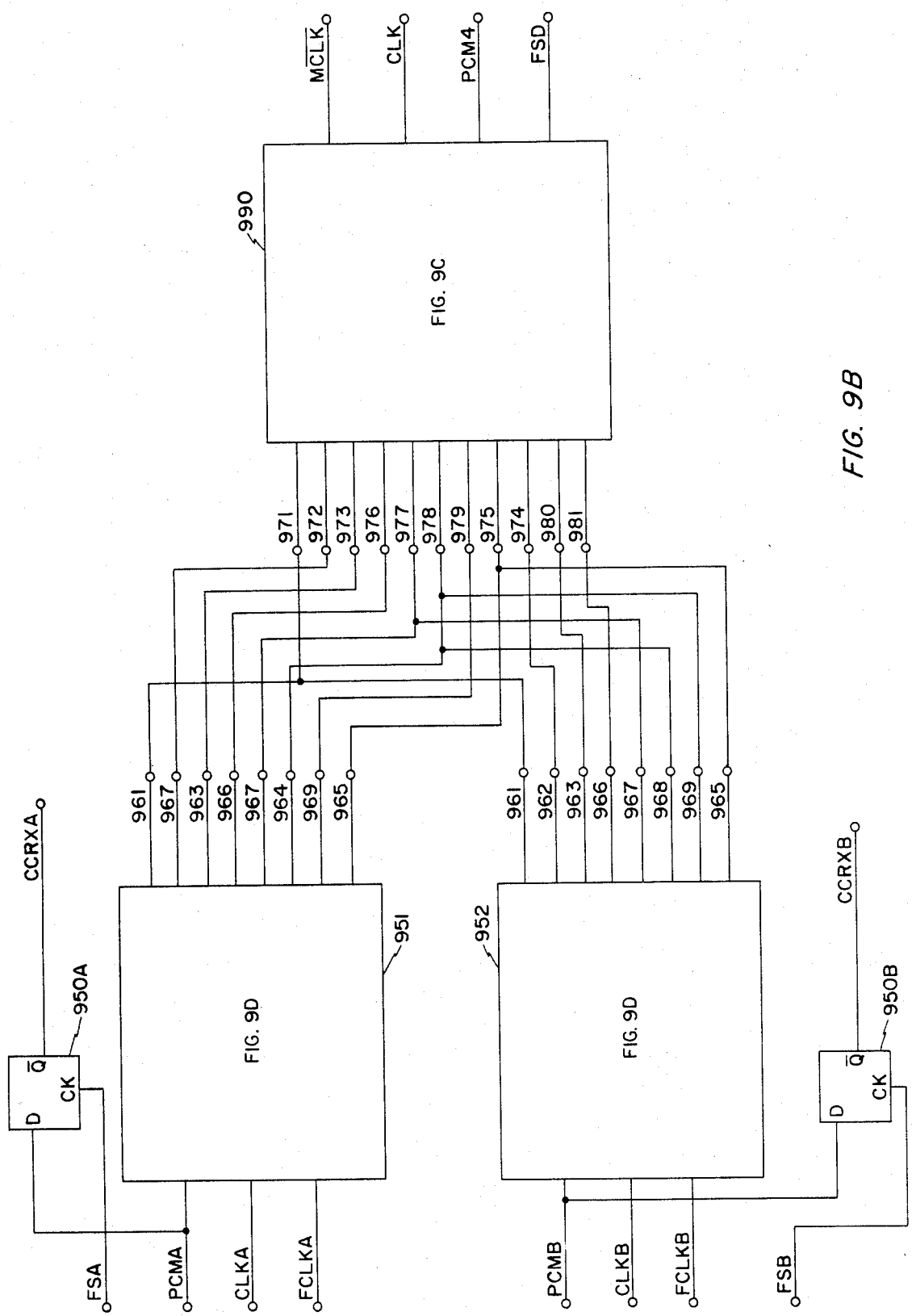

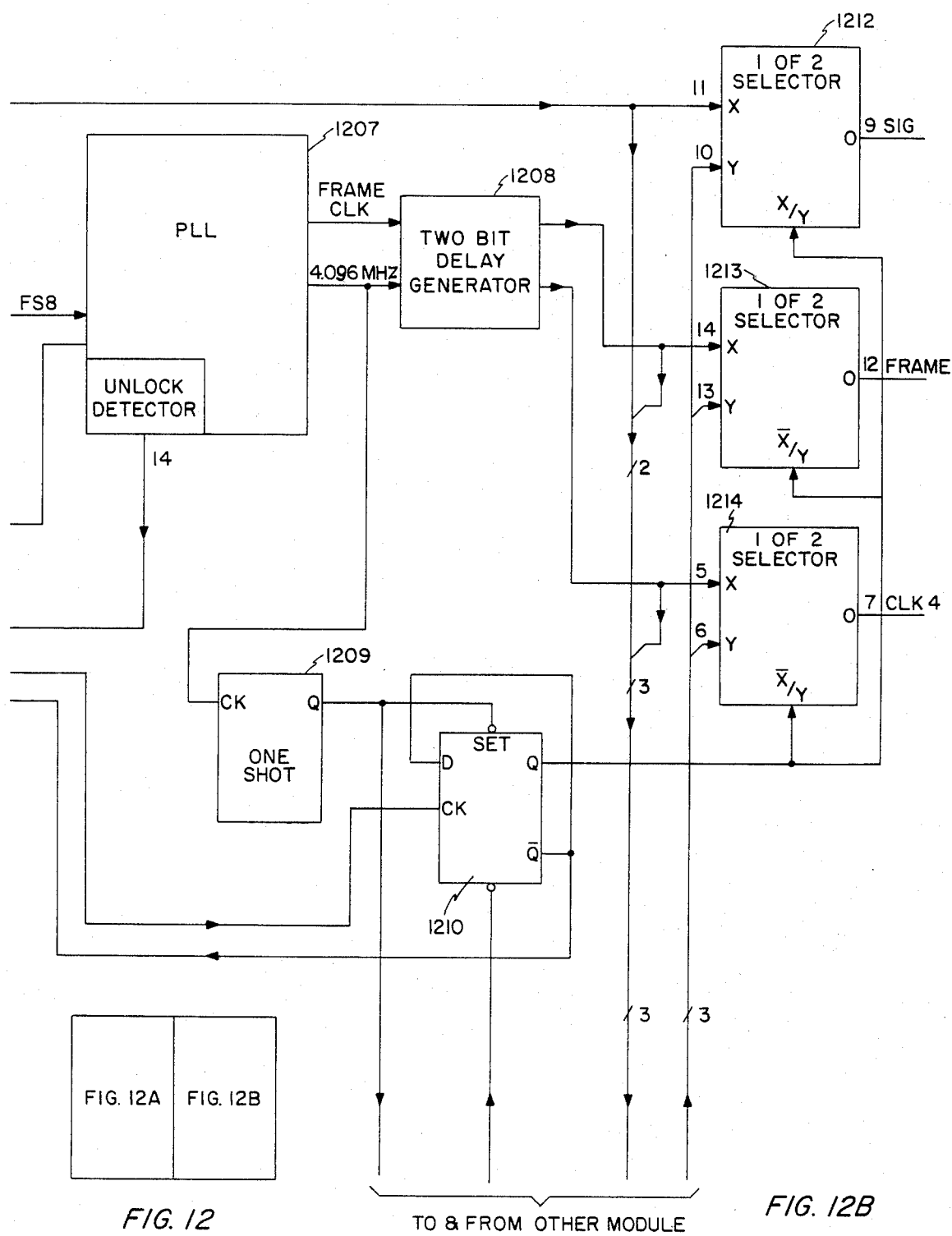

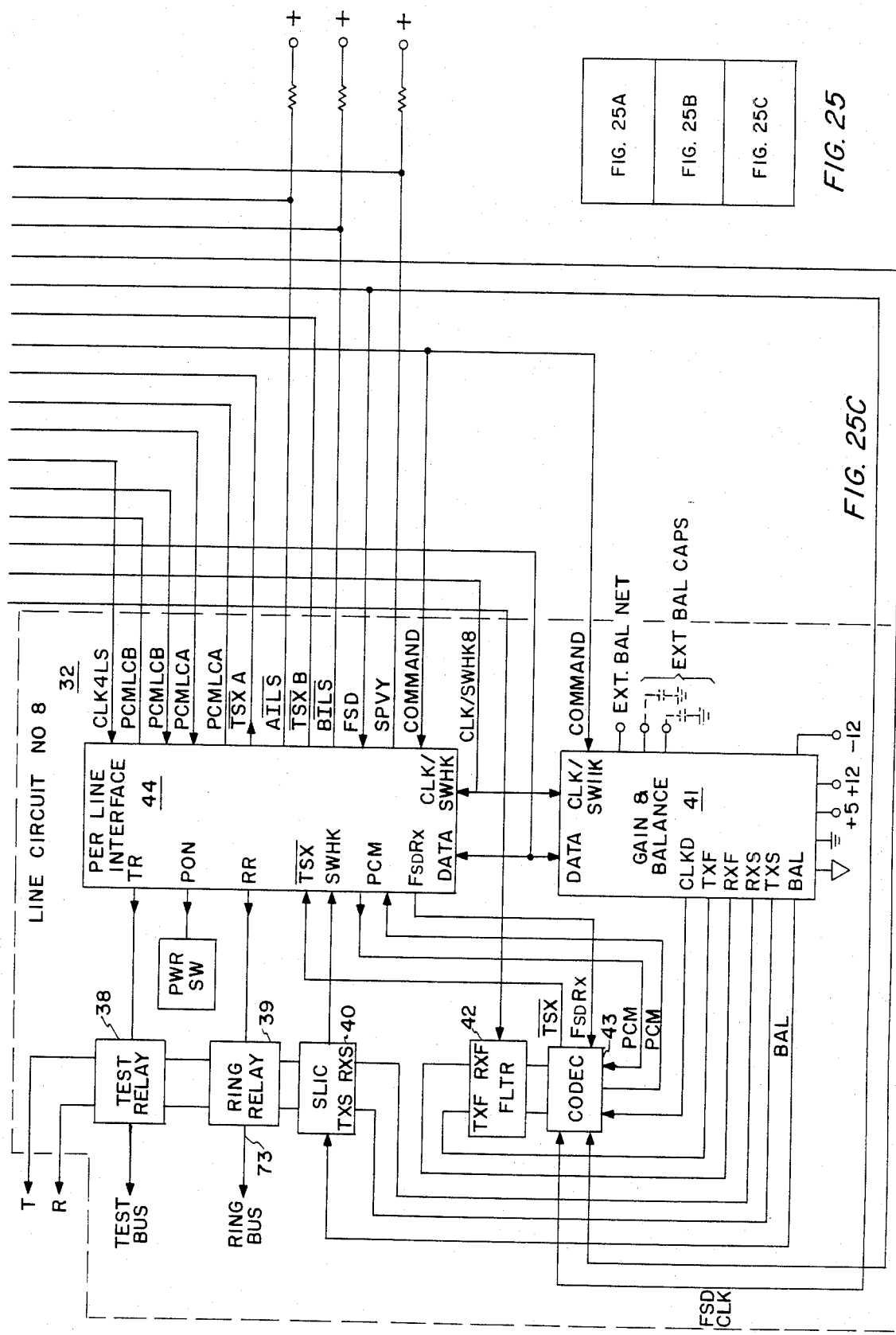

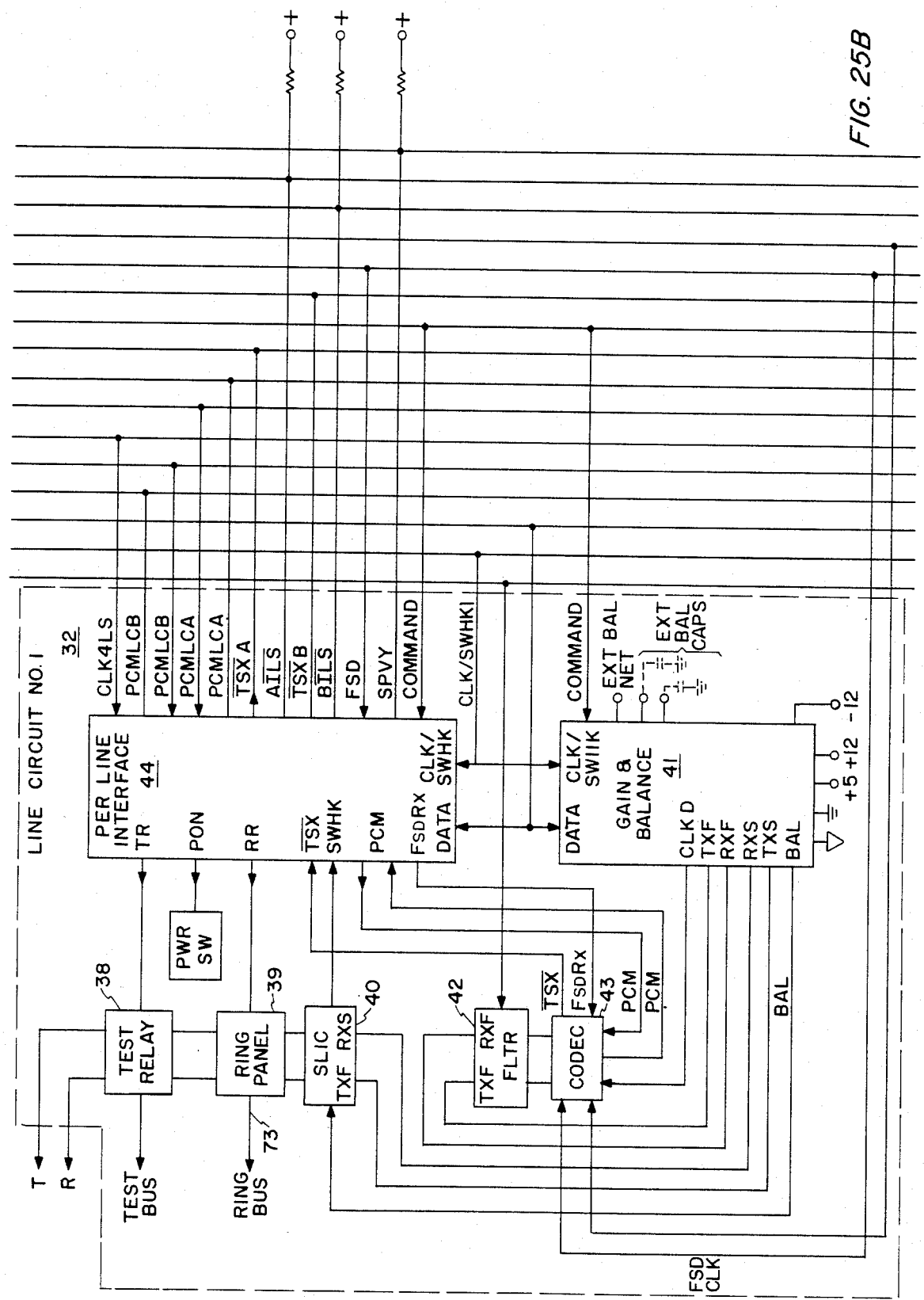

PER-LINE INTERFACE CONTROL FORMAT

| BIT 0 | 1 | 2 | 3 | 4 | 5 | 6 | 7 | 8 | 9 | 10 | 11 |
|---|---|---|---|---|---|---|---|---|---|---|---|
| R/W | ADDRESS | | | N/A | EURO. SEL. | POWER | TR | RR | LC ENA. | ILS | Ā/B SEL. |

(12 BITS)

FIG. 26

GAIN-BALANCE CONTROL FORMAT

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| R/W | ADDRESS | | | CLK +/- | ✗ | ✗ | ✗ | LINE BALANCE | | | | Rx GAIN SETTING | | | | | | | | Tx GAIN SETTING | | | | | | | |

← 4 BITS → ← 8 BITS → ← 8 BITS →

FIG. 28

CODEC CONTROL FORMAT

| 0 | 1 | 2 | 3 | 4 | 5 | 6 | 7 | 8 | 9 | 10 | 11 |
|---|---|---|---|---|---|---|---|---|---|---|---|
| R/W | ADDRESS | | | CODEC MODE | | CHANNEL ASSIGNMENT | | | | | |

| BIT | | MODE |
|---|---|---|
| 1 | 2 | |
| 0 | 0 | Tx & Rx CHANNEL |
| 0 | 1 | Tx CHANNEL |
| 1 | 0 | Rx CHANNEL |
| 1 | 1 | STANDBY |

FIG. 29

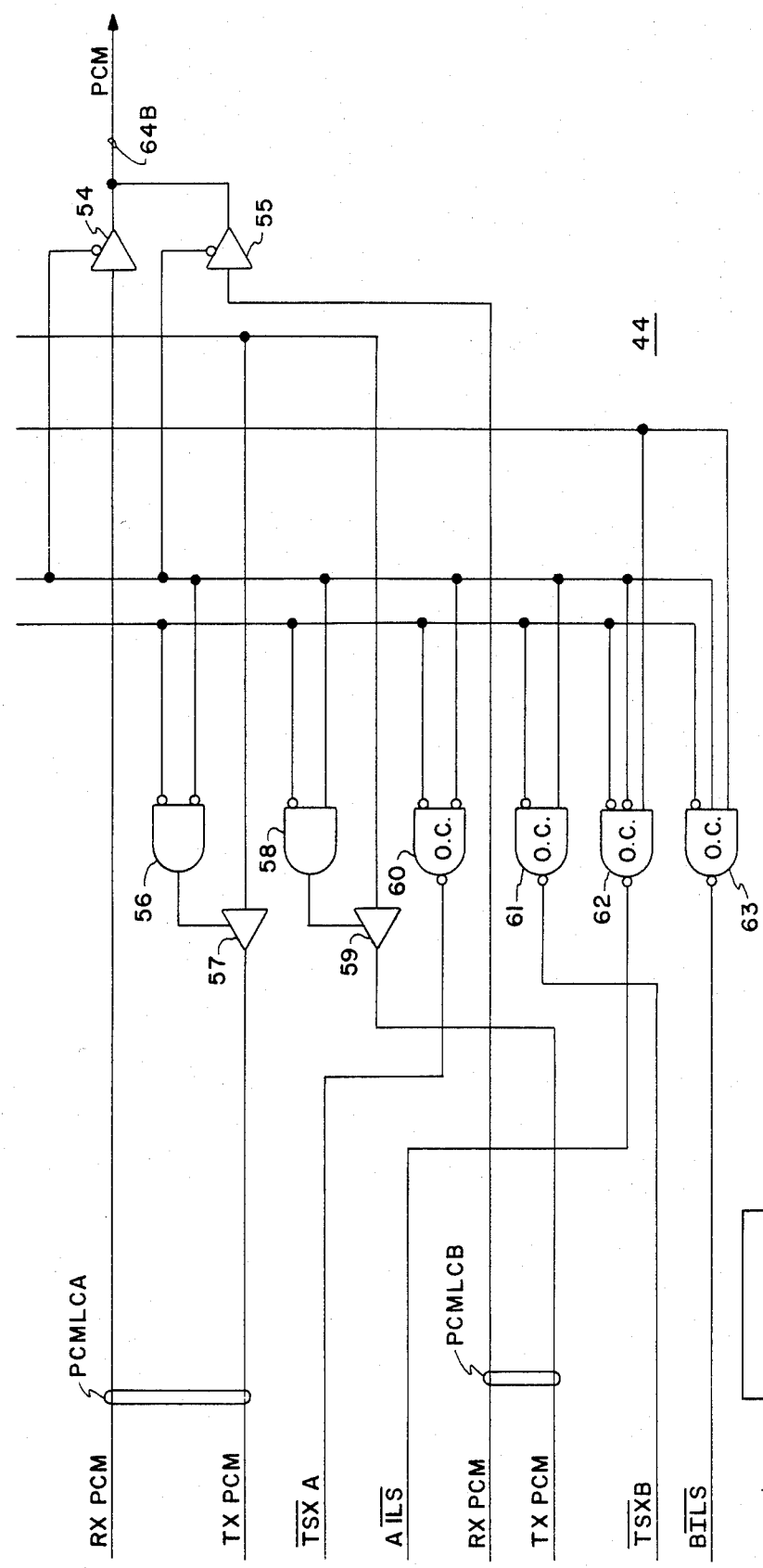

| FRAMES AFTER START OF TEST | 'A' CONTROL WORD REGISTER CONTENTS (HEX) | | | | 'B' CONTROL WORD REGISTER CONTENTS (HEX) | | | |
|---|---|---|---|---|---|---|---|---|
| | BYTE 1 | BYTE 2 | BYTE 3 | BYTE 4 | BYTE 1 | BYTE 2 | BYTE 3 | BYTE 4 |
| 0 | 63 | C1 | F8 | 0F | XX | XX | XX | XX |
| 1 | 07 | E0 | 3D | 8F | 07 | E0 | 3D | 8F |
| 2 | 80 | F6 | 3C | 1F | 80 | F6 | 3C | 1F |
| 3 | D8 | F0 | 7E | 03 | D8 | F0 | 7E | 03 |
| 4 | C1 | F8 | 0F | 63 | C1 | F8 | 0F | 63 |
| 5 | E0 | 3D | 8F | 07 | E0 | 3D | 8F | 07 |
| 6 | F6 | 3C | 1F | 80 | F6 | 3C | 1F | 80 |
| 7 | F0 | 7E | 03 | D8 | F0 | 7E | 03 | D8 |
| 8 (FINAL DATA) | F8 | 0F | 63 | C1 | F8 | 0F | 63 | C1 |

MATCHES DATA LOADED INTO FIXED ADDRESS REGISTER AT START OF TEST

FIG. 33

```
         VERIFIES SHIFT OPERATION OF 'A' & 'B' CONTROL WORD REGISTERS
         USING THE TEST DATA FEEDBACK FEATURE OF THE PIC.

INITIALIZE MODE REGISTER (PIC INTERNAL REG. LOCATION ODH)
         MOV    R0,#0DH
         MOV    R,#8BH
         MOVX   CR0,A    ; WRITE 8BH INTO MODE REG.

LOAD 'A' CONTROL WORD REG. WITH TEST DATA
         MOV    R0,#0EH
         CLR    A
         MOVX   CR0,A    ; WRITE 0 INTO PIC CONTROL REG. POINTER (CRP)
         INC    R0       ; R0 POINTS TO CCRP (PIC INTERNAL REG. LOCATION 0FH)
         MOV    R5,#63H  ; C/R TEST DATA BYTE 1 (R5)
         MOV    R4,#0C1H ; C/R TEST DATA BYTE 2 (R4)
         MOV    R3,#0F8H ; C/R TEST DATA BYTE 3 (R3)
         MOV    R2,#0FH  ; C/R TEST DATA BYTE 4 (R2)

MOV    R1,#5    ; INITIALIZE TEST DATA BYTE POINTER (R1)
         MOV    R7,#4    ; INITIALIZE TEST DATA BYTE COUNTER (R7)

LOOP 1: MOV    A,CR1    ; FETCH NEXT BYTE OF TEST DATA
         MOVX   CR0,A    ;   AND WRITE IT INTO NEXT BYTE OF 'A' C/R
         DEC    R1       ; ADJUST TEST DATA POINTER
         DJNZ   R7,LOOP1 ; REPEAT LOOP 1 FOR ALL 4 TEST DATA BYTES

LOAD FIXED ADDRESS REGISTER WITH C/R BYTE 3 TEST DATA
         MOV    R0,#08H  ; PIC FIXED ADDRESS REG. INTERNAL ADDR.
         MOV    A,R3
         MOVX   CR0,A

INITIALIZE FRAME COUNTER AND START DYNAMIC TEST
         STOP   TCNT
         MOV    A,0F6H   ; -10 IN 2'S COMPLEMENT
         MOV    T,A
         JTF    $+2      ; RESET TIMER FLAG
         STRT   CNT

LOOP 2: MOV    A,T
         ADD    A,#8
         JNZ    LOOP 2   ; REPEAT LOOP 2 UNTIL FRAME COUNT REACHES 0F8H (-8)

MOV    R0,#0DH
         MOV    A,#8FH   ; WRITE 8FH INTO MODE REGISTER (SET CONTROL SHIFT ENR)
         MOVX   CR0,A    ; ENABLE SELF-TEST CONTROL SHIFTING
```

*FIG. 34*

```
WAIT FOR 8 FRAMES TO PASS (TF=1), I.E. LET C/R CYCLE THRU 8 TIMES
                                        42 CLOCK PULSES PER FRAME
LOOP 3: JTF    $+4      ; SKIP NEXT INSTRUCTION WHEN TIMER FLAG (TF) = 1
        JMP    LOOP 3

DISABLE CONTROL REGISTER SHIFTING
        CLR    A
        MOVX   CR0,A    ; WRITE 0 INTO MODE REGISTER

VERIFY THAT BOTH 'A' & 'B' CARD ADDRESS COMPARATORS INDICATE
   AN ADDRESS MATCH OCCURRED AFTER 8 FRAMES
        MOV    R0,#0CH  ; PIC INTERNAL REG. ADDRESS OF STATUS REGISTER
        MOV    A,CR0    ; FETCH STATUS BYTE
        CPL    A
        JB0    CFAIL    ; JUMP TO ERROR ROUTINE (CFAIL) IF ADDRESS MATCH
        JB1    CFAIL    ;   IS NOT INDICATED BY EITHER CARD ADDRESS COMPARATOR

VERIFY CONTENTS OF 'A' & 'B' CONTROL WORD REGS. MATCH EXPECTED CONTENTS
        MOV    A,R5
        XCH    A,R3     ; 63H EXPECTED IN C/R BYTE 3 (R3)
        XCH    A,R5     ; F8H EXPECTED IN C/R BYTE 1 (R5)
        MOV    A,R4
        XCH    A,R2     ; C1H EXPECTED IN C/R BYTE 4 (R2)
        XCH    A,R4     ; 0FH EXPECTED IN C/R BYTE 2 (R4)

MOV    R0,#0FH  ; PIC INTERNAL ADDR. OF CCRP

MOV    R6,#2
LOOP 4: MOV    R1,#5    ; INITIALIZE TEST DATA BYTE POINTER
        MOV    R7,#4    ; INITIALIZE TEST DATA BYTE COUNTER

LOOP 5: MOVX   A,CR0    ; FETCH NEXT C/R DATA BYTE
        XRL    A,CR1    ;    & COMPARE WITH EXPECTED DATA
        JNZ    CFAIL    ; JUMP TO ERROR ROUTINE (CFAIL) IF ANY DATA MIS-MATCH
                                IS DETECTED
        DEC    R1       ; ADJUST TEST DATA POINTER
        DJNZ   R7,LOOP5 ; REPEAT LOOP 5 FOR ALL 4 BYTES OF C/R

DJNZ   R6,LOOP4 ; REPEAT LOOP 4 FOR BOTH 'B' & 'A' C/R'S

END OF PIC DYNAMIC OPERATION TEST
```

FIG. 35

PHASE-LOCKED LOOP AND CLOCK CIRCUIT FOR A LINE SWITCH

BACKGROUND OF THE INVENTION

This invention pertains to telephone switching systems in general, and to a phase-locked loop for use in distributed control digital telephone switching systems in particular.

The ITT 1210 is an advanced digital switching system manufactured in the United States by International Telephone and Telegraph Corporation. The ITT 1210, which was priorly identified as DSS-1, is described by C. G. Svala, "DSS-1, A Digital Local Switching System With Remote Line Switches", National Telecommunications Conference, 1977, pp. 39: 5-1 to 39: 5-7. As described by C. G. Svala, the ITT 1210 comprises three basic elements, i.e., line switches, a switching network, and a system control. A line switch interfaces with subscriber lines and to one or more PCM (pulse code modulation) lines. A line switch may be co-located with the switching network or may be located remoted therefrom. The switching network coupled to the line switches by the PCM lines comprises a number of digital switching modules called switch groups each of which includes a time-space-time network. The system control includes a pair of processors with associated program and data memories. The system control directs the operation of the switching network and the line switches. Communication of control information between the system control and a line switch is via a common channel superimposed on each PCM line. This common channel approach is described in U.S. Pat. No. 4,125,743, issued Nov. 14, 1978 to R. E. Steidl and assigned to a common assignee.

A large percentage of the equipment costs in a digital switching system is attributable to the line switches. Also the line switch design determines the transmission performance per subscriber line, traffic handling and line signaling functions of the switching system.

It is therefore desirable to provide an improved line switch having a low cost per subscriber line and improved transmission performance.

SUMMARY OF THE INVENTION

In accordance with the principles of the invention, a line switch is provided which has a low cost per subscriber line and improved transmission performance.

In an embodiment of the invention, a line switch comprises one or more line switch modules. Each module can terminate one or more PCM lines and each module interlaces PCM data from the PCM lines onto an internal PCM bus structure that operates at a higher data rate and has a greater number of channels per frame. Each line circuit of a module has access to all the channels of the internal PCM bus structure. Further, in accordance with the invention, a distributed processing control arrangement is provided wherein subscriber lines are arranged in groups and the line circuits associated with a group are controlled by a line group controller. A line switch processor contained in each line switch module is provided for communicating with the system control and for directing the operation of the line group controllers.

In accordance with one aspect of the invention, the internal PCM bus structure serves the dual functions of distributing time multiplexed PCM voice channels data and control data throughout the line switch. All control data exchanged between the line switch controller and the line group controller or any other circuit module is transmitted over the internal PCM bus structure. Thus, expansion of a module is easily accomplished by adding additional line circuit groups or other circuit modules and extending the PCM bus thereto.

Further, in accordance with the invention each line switch controller and line group controller includes a multifunctional interface circuit which provides an interface between a microcomputer and the internal PCM bus structure.

An illustrative embodiment of the invention is a line switch having one or more line switch modules each terminating one of more PCM lines which are connected to the system network. Each line switch module includes a line switch controller which communicates with the system controller via a common channel signaling arrangement over the PCM lines. The line switch controller directs the operation of the various circuits within the line switch module. Each PCM line carries frame organized PCM voice channels with "X" channels per frame. The internal PCM bus structure is arranged such that 2X channels are provided per frame. A rate converter circuit is provided for interlacing PCM channels from two lines onto the PCM bus structure and for demultiplexing PCM channels on the PCM bus structure to the PCM lines.

More specifically, a receive rate converter comprises memory into which PCM data from the PCM lines are stored at the PCM line rate. The memory is read at the PCM bus structure rate in such a fashion that PCM voice channels data from the two PCM lines is alternately applied to the PCM bus Structure, i.e. first the PCM data for one channel from one PCM line is read and then the PCM data for one channel of the other PCM lines is read. A transmit rate converter likewise comprises memory into which PCM voice channel data from the internal PCM bus structure is stored at the PCM bus structure rate. The stored PCM voice channel data is read from the memory at the rate of the PCM line such that the stored PCM voice channels are read and alternately applied to the two PCM lines.

Additionally, the rate converter includes clock generator and phase-locked loop circuitry. The phase-locked loop permits clock signals which are generated in a line switch module to be in phase-locked synchronization with either of the PCM lines. When two or more lines switch modules are connected together to form a line switch, the phase-locked loop circuits of each module will utilize the same PCM line for phase-locking.

Buffer and distributor circuits are interposed in the PCM bus structure. One function the buffer and distributor circuits provide is that of connecting the PCM bus structure of the various line switch modules in a line switch. The buffer and distributor circuits include gates which permit intra-line switch calls to be connected within the line switch without utilizing the system switching network.

Further, in accordance with the principles of this invention, an arrangement is provided for automatic setting of the line circuits gain.

A further aspect of the invention is the provision of another interface circuit for interfacing each line circuit to its respective line group controller and to the PCM buses.

BRIEF DESCRIPTION OF THE DRAWINGS

Above-mentioned and other features and objects of this invention will become more apparent by reference to the following description taken in conjunction with the accompanying drawing, in which:

FIGS. 3 and 3A illustrate the traffic handling capability of the line switch of FIGS. 2 and 2A, respectively;

FIGS. 9B, 9C and 9D illustrate in block diagram form the RX rate converter 20 of FIG. 8;

FIGS. 9F–9N are flow charts illustrating the operation of the line switch controller 7 of FIG. 9E;

FIGS. 12A and 12B when arranged as shown in FIG. 12 illustrate in block diagram form the PLL and conrol circuit 18 of FIG. 8;

FIGS. 25A, 25B and 25C when arranged as shown in FIG. 25 illustrate in block diagram form a line circuit group in accordance with the principles of the present invention;

FIG. 26 illustrates a command word format;

FIGS. 27A and 27B when arrnged as shown in FIG. 27 illustrate in block diagram form the per line control interface 44 of FIG. 25;

FIG. 28 illustrates the format of a control word directed to the per line control interface 44;

FIG. 29 illustrates the format of a control word directed to a CODEC 43 of FIG. 25;

FIG. 33 illustrates the register status of interface 23 during a self-test operation FIGS. 34 and 35 are flow charts of the self-test operation of interface 33;

DETAILED DESCRIPTION

1. General (FIGS. 1 and 2)

Figure 1:
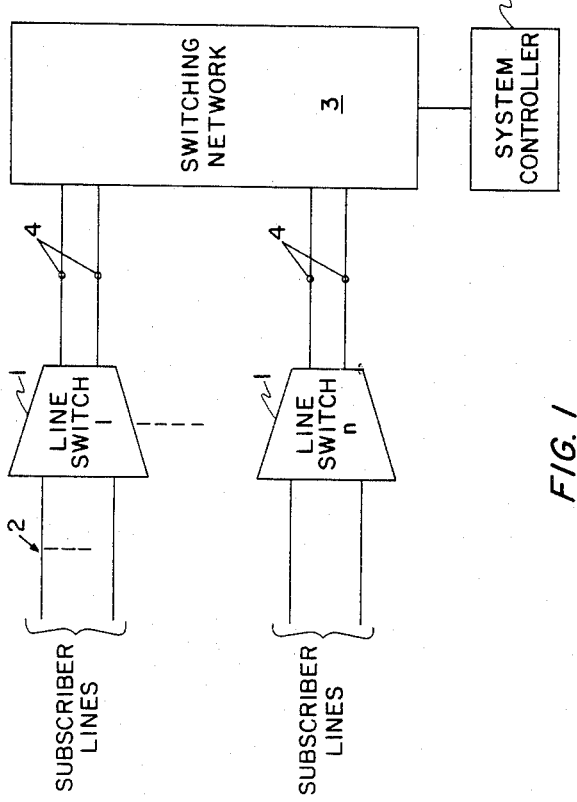
FIG. 1 illustrates in block diagram form a digital switching system in accordance with the principles of the present invention.
Figure 2:
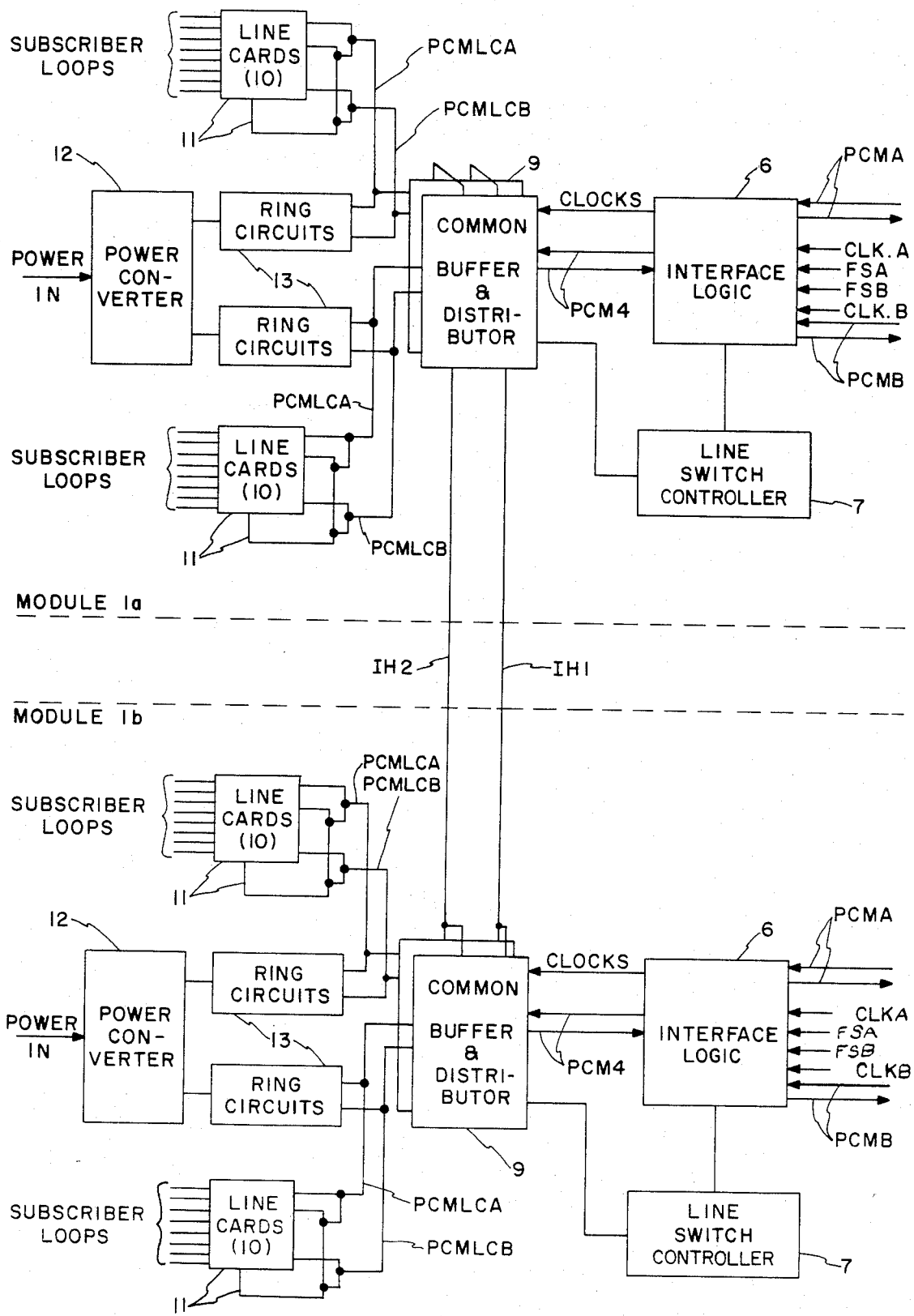
FIGS. 2 and 2A illustrate in block diagram form two embodiments of a line switch comprising two line modules that can be employed in the system of FIG. 1.
Figure 2A:
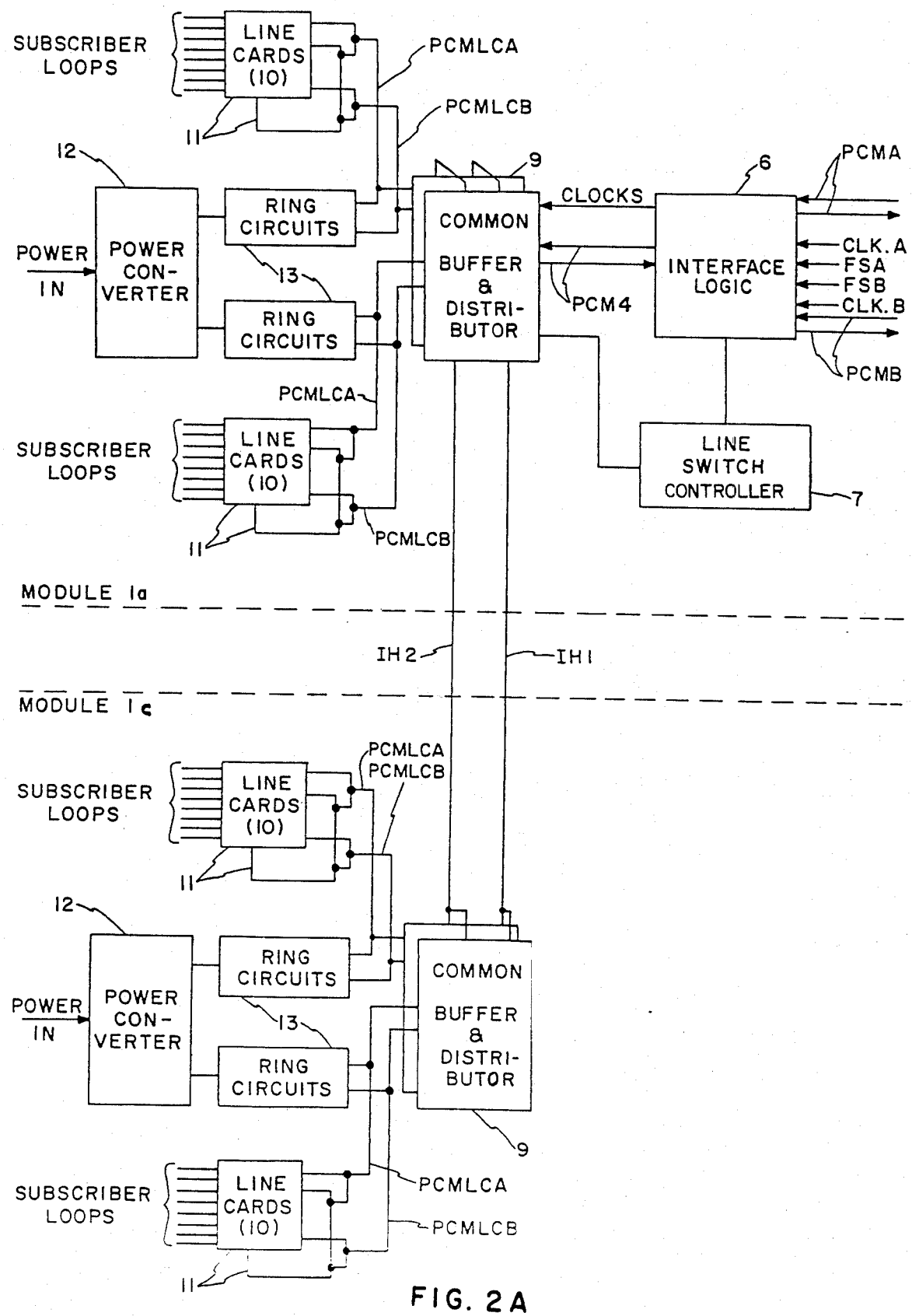

The stored program controlled switching system of FIG. 1 is a PCM-TDM digital switching system which includes a switching network 3 controlled by a system controller 5. A more detailed description of the system controller 5 and the switching network 3 is provided in the aforementioned C. G. Svala reference. The system further includes "n" line switches 1 each serving a number of subscriber lines 2. Each line switch is coupled to the switching network 3 via one or more PCM lines 4. PCM transmission between the line switches 1 and the switching network 3 takes place over the PCM lines 4. Each PCM line 4 includes, as is well understood, a path for PCM transmission from the switching network 3 to a line switch 1 and a second path for PCM transmission from a line switch 1 to the switching network 3. Each PCM line 4 carries frame-organized data or speech at any conventional rate. Operation of the line switches 1 are controlled by the system controller 5. In one illustrative embodiment of the invention, a common channel signaling arrangement such as that taught in U.S. Pat. No. 4,125,743 issued Nov. 14, 1978 to R. E. Steidl is utilized such that control information between th system controller 5 and the lines switches 1 is transmitted over the PCM lines 4. Typical information is sent by a line switch to the system controller 5 including the following:

1. Report of line seizures which the line switch has detected; and
2. Report of a fault detected in the line switch.

Typical commands sent by the system control 5 to a line switch include the following:

1. Request for assignment of subscriber line to a channel or release of a line from a channel;
2. Request for ringing to a line;
3. Request for maintenance functions to be performed; and
4. Request for party test to identify the party on the line.

FIG. 2 illustrates one of the line switches in greater detail.

Reliability of operation and flexibility in expansion is provided by organizing the circuits of each line switch in clusters or "security blocks" of circuits that function as a unit. For any single fault, only the group of circuits within the security block containing the fault may be lost to service. Thus, a single fault will not cause a loss of service to the entire line switch. As will be evident to those skilled in the art, the various circuits in the illustrative line switch described herein may be organized without the security block arrangement shown or the size of the various security blocks may be changed.

In accordance with the security block organization of the line switch, the illustrative line switch is organized as two identical line switch modules. Each line switch module is self contained to the extent that it can operate as a line switch for a number of subscriber lines.

A further aspect of the novel line switch is that distributed processing is advantageously utilized. Three separate distributed processor functions are provided in each line switch module. First, one processor is utilized to communicate with the system controller 5 of FIG. 1 and to coordinate the operations within the line switch module. A second processor is provided within a line switch module to control clock generation and rate conversion circuits. A third processor is provided for a group of line circuits to control the operations of the line circuits and to gather information from the line circuits.

A further aspect of the line switch architecture is that an internal busing arrangement is provided wherein both conrol and PCM data are routed throughout the line switch. With this arrangement, a standardized interface between each processor and the PCM bus may be provided.

In addition to having the capability for estabishing connections between subscriber lines connected to the line switch and the switching network 3, the present line switch has the capability of establishing intra-line switch connections without the switching network 3.

In accordance with the aforementioned security block organization the line switch 1 is organized as two identical line switch modules 1a, 1b. Each of the line switch modules 1a, 1b is self-contained to the extent that it can operate as a line switch and is connectable to up to 160 suscriber lines or loops. The 160 lines associated with a module are arranged as two clusters of lines. Each cluster is in turn divided into 10 groups of lines, each group includes 8 lines and in the illustrative embodiment each group of 8 lines has its associated line circuits arranged on one circuit card. It should be noted, that in other embodiments, a group may contain more or less lines and the lines may be arranged in one or more clusters.

Each line switch module 1a, 1b is coupled to the switching network 3 of FIG. 1 via two PCM lines PCMA, PCMB; bit clock lines CLKA, CLKB; and frame clock lines FSA, FSB. The PCM lines PCMA, PCMB operate at a 1.544 mbs. rate carrying 24 voice channels in a frame in the North American network or at a 2.048 mbs. rate carrying 30 voice channels in a frame in European and many foreign networks. Although two PCM lines are shown, the line switch module may be connected to only one PCM line.

The frame clock lines FSA, FSB each provide a 4 KHz signal from the switching network 3 of FIG. 1 and each is used to identify which incoming bit is a common channel signaling bit. The common channel signaling bits occur in the 193rd bit position of every other frame. The intermediate 193rd bits are synchronization bits and are used to determine the A and B signaling frames.

The bit clock lines CLKA, CLKB each provide a 1.544 mHz clock.

The interface logic 6 operates to derive various clocking signals for use in the line switch module. More significantly, interface logic 6 multiplexes and interlaces the PCM channels from the two PCM lines PCMA, PCMB onto bus PCM4 and demultiplexes and separates PCM channels from bus PCM4 to the PCM lines PCMA, PCMB. More specifically, the bus PCM4 operates at a 4.096 mbs. rate. Data transmitted over bus PCM4 is arranged in frames of 512 1 bits, 480 of which are used for PCM. If the lines PCMA, PCMB operate at a 1.544 mbs. rate with 24 channels per frame, the channels on the lines PCMA, PCMB will be interlaced and rate converted to provide 48 channels each 10 bits wide at a 4.096 mbs rate on bus PCM4. If the lines PCMA, PCMB operate at a 2.048 mbs rate with 30 channels per frame, they will be interlaced and rate converted to provide 60 channels each 8 bits wide at a 4.096 mbs. rate on bus PCM4. The remaining thirty two bits of each 512 bit frame on PCM4 are used for internal control of the line switch module.

The line switch controller 7 receives common channel commands from the system controller 5 of FIG. 1 over the PCM lines PCMA, PCMB and via the interface logic 6. The line switch controller 7 communicates with and controls the various circuits of the line switch module via bus PCM4 by utilizing the aforementioned 32 bits.

Buffer and distributor circuits 9 are connected to the bus PCM4 and serve to buffer PCM signals between the bus PCM4 and the line cards 11, ring circuits 13, and other circuits. Two buffer and distributor circuits 9 in each line switch module are provided to partition the PCM buses into segments, i.e., security blocks, which are isolated from each other to prevent propagation of faults in the line switch and the impact of faults in a group of lines upon all other lines in the line switch. Both buffer and distributor circuits in a line switch module contain identical circuitry for buffering and distributing PCM signals and each is connected to one of two clusters of line circuits. Additionally, the buffer and distributor circuits 9 provide buffering to the PCM buses in the other line switch module of the line switch. Thus, each line switch controller 7 has access to all the line ciruits in both line switch modules of a line switch and PCM signals may be coupled to all circuits in a line switch. The buffer and distributor circuits 9 includes gating circuits which provide for intra-line switch calls between any two line circuits within the line switch without the need to route the calls through the switching network 3 of FIG. 1. Additionally, one of the buffer and distributors 9 of a line switch module includes circuitry for deriving various clocking signals from the various clock lines CLKA, CLKB, FSA and FSB.

Each buffer and distributor 9 is coupled to all th line and other circuits in a cluster by two PCM buses PCMLCA, PCMLCB each of which runs at a 4.096 mHz rate. One of the PCM buses, e.g. PCMLCA of line switch module 1a, is derived directly from the bus PCM4 in the same line switch module. The other of the PCM buses, e.g. PCMLCB of line switch module 1b, is derived from the bus PCM4 of the other module. In the North American Network each bus PCMLCA, PCMLCB will have 48 PCM channels at a 4.096 mHz rate. Thus each line circuit will have access to 96 PCM channels in the line switch.

As pointed out hereinabove, each group of 8 line circuits is arranged on a single circuit card. Each of group circuits is controlled by a microprocessor which is in turn controlled by the line switch controller 7 via the 32 control bits available during each frame. By providing a microprocessor on each line card the work load on the line switch controller 7 is reduced, flexibility of application is obtained, and maintenance functions may be more easily provided.

Ring cards or circuits 13 are provided in the line modules. The ring cards 13 also include microprocessors which reside on the ring cards. The ring cards contain their own ring frequency generator and a ring card is controlled by the line switch controller 7 via the 32 control bits available during each frame. Timing of the ringing is done via the microprocesors which reside on each line card and on each ring card.

Each line module also includes a power converter 12.

2.0 Traffic Handling Capacity (FIG. 3)

The line switch shown in FIG. 2 can as noted above be configured such that each line switch module 1a, 1b is connected to the switching network 3 of FIG. 1 by one or more PCM lines PCMA, PCMB. Also, the line switch may be operated as either a 24 or 32 channel system. FIG. 3 illustrates the traffic handling capability of the line switch of FIG. 2 for different numbers of PCM lines in 24 or 34 channel systems.

3.0 PCM Buses (FIGS. 4, 5, 6 and 7)

Figure 4:
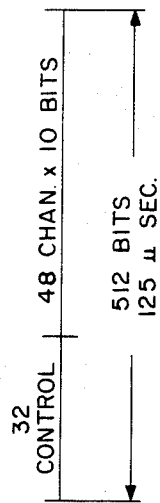
FIG. 4 illustrates the format of PCM frames that can be employed in the system of FIG. 1.
Figure 5:
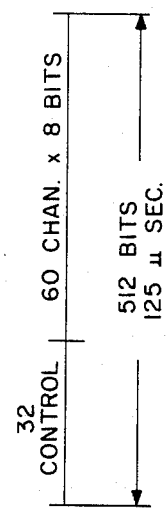
FIG. 5 illustrates an alternate PCM frame format that can be employed in the system of FIG. 1.

Each of the PCM buses PCMLCA, PCMLCB and PCM4 in the line switch of FIG. 2 carries information in frames of 125 microsec. in duration. One frame comprises 512 bits. Two alternate arrangements for formatting the 512 bit frame are shown in FIGS. 4 and 5 which may be found on the same sheet as FIG. 1. If the line switch is to be used in a 24 channel system, the frames will be arranged as shown in FIG. 4. Forty-eight channels of 10 bits each and 32 additional bits which are utilized as control bits for control of internal line switch functions are provided. By providing 10 bit channels, the line switch may be readily utilized in integrated digital switches proposed for the future wherein each channel will be arranged as shown in FIG. 5. FIG. 5 shows each frame arranged as sixty 8-bit channels and 32 control bits. Other formats may easily be utilized for use in other systems.

Figure 6:
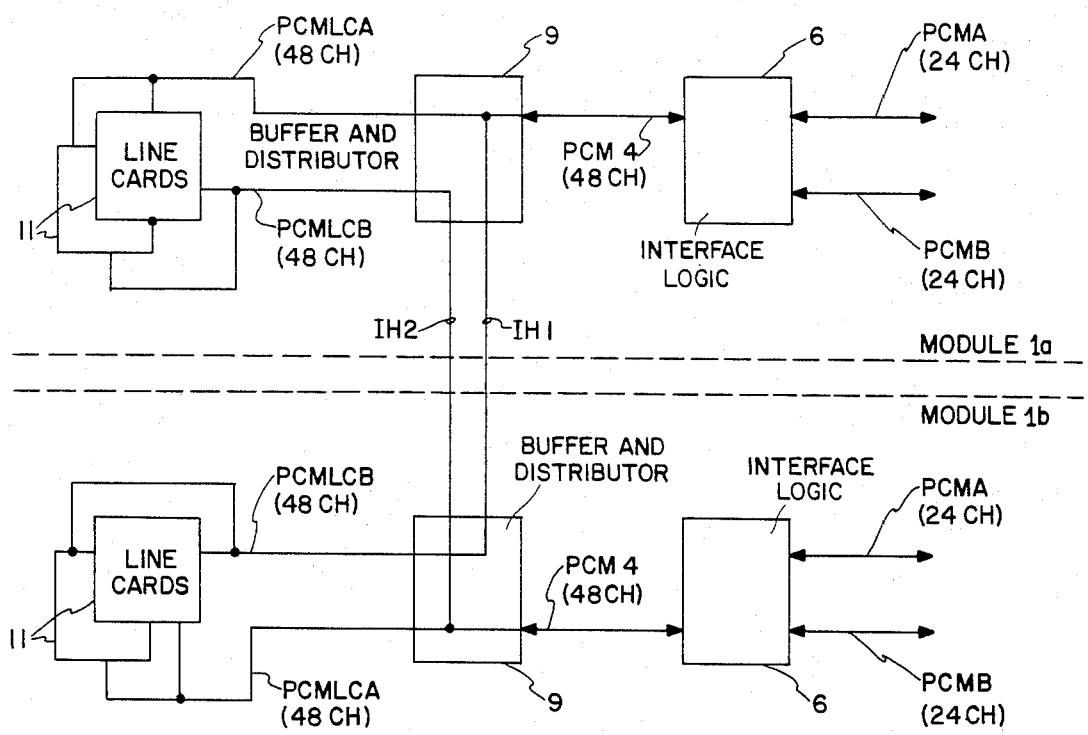
FIG. 6 illustrates in a general form the distribution of PCM channels within the two line modules of FIGS. 2 and 2A.

FIG. 6 illustrates the distribution of PCM channels in the line switch of FIG. 2 when used in a 24 channel system. To further simplify an understanding of the PCM channel distribution, only one cluster of line groups 11 and only one buffer and distributor 9 is shown for each line switch module 1a, 1b. The format of FIG. 4 is utilized. In each line switch module 1a, 1b two 24 channel, 1.544 mHz PCM lines PCMA, PCMB are connected to the interface logic 6. The interface logic 6 provides rate conversion and interlacing between th PCM lines PCMA, PCMB and the 48 channel, 4.096 mHz bus PCM4. The buffer and distributor 9 of each line module connects bus PCM4 to a 48 channel 4.096 mHz bus PCMLCA within the same module and via an inter highway bus 1H1 or 1H2 to a 48 channel, 4.096 mHz bus PCMLCB in the other module.

Therefore, each line circuit has access to a total of ninety-six 10 bit channels since PCMLCA and PCMLCB are each 48 channel buses. Further, with this configuration each line circuit has access to the two 24 channel PCM lines PCMA, PCMB in the same module and also to the two 24 channel PCM lines PCMA, PCMB in the other module.

Figure 7:
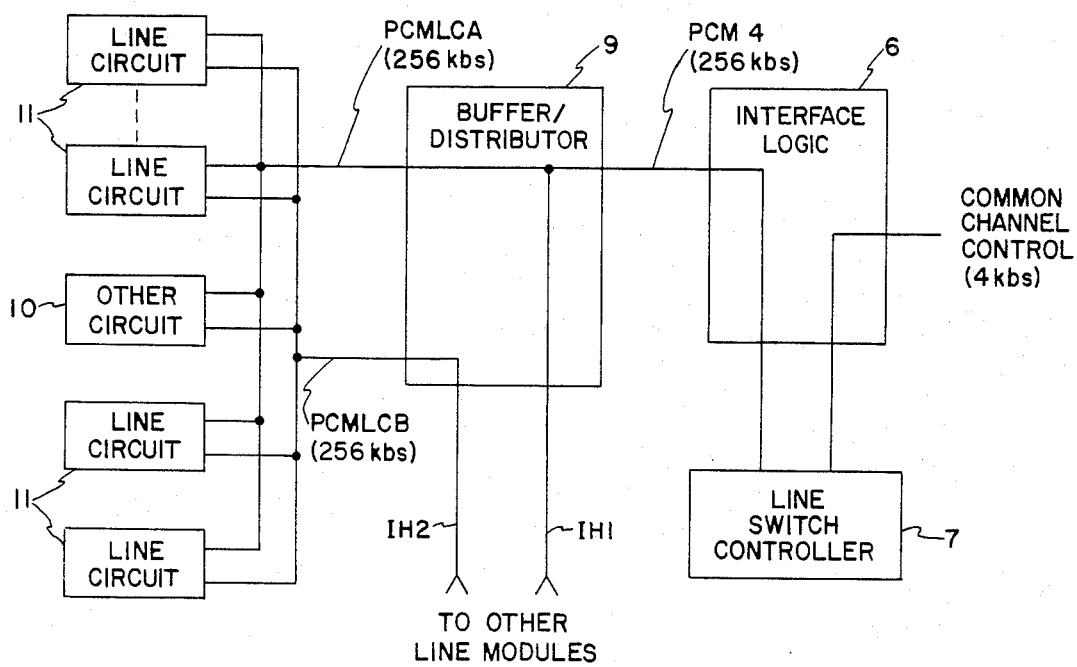
FIG. 7 illustrates in a general form the control communication paths within the line switch of FIG. 2.

As pointed out hereinabove, th line switches 1 are controlled by the system controller 5 of FIG. 1. The line switch controller 6, in turn control the operation of the line circuits 11 and other circuits within a line switch. Turning now to FIG. 7, the line switch controller 7 communicates with the system controller 5 via a common channel signaling arrangement over the PCM lines PCMA, PCMB as described in the aforementioned R. E. Steidl patent. If it is assumed that the PCM lines operate at a 1.544 mHz rate and one common channel signaling bit is provided in every other frame, then the common signaling channel operates at a 4 kbs rate, i.e. 1 bit/2 frames×8000 frame/sec=4 kbs. The buses PCM4, PCMLCA, PCMLCB are used to transmit 32 bits of control data per frame, each frame being 125 microsec. in duration. The buses PCM4, PCMLCA, PCMLCB operate as 256 kbs control data channels, i.e., 32 bits/frame×8000 frames/sec=256 kbs. A line switch controller 7 thus provides a common 256 kbs control channel to each line circuit 11 or other circuit (which may be the ring circuit 13 or power converter circuit 12 of FIG. 2) via buses PCM4 and PCMLCA in a line switch module and additionally provides via bus 1H1 or 1H2 the same 256 kbs control data channel to other line switch modules in a line switch. Furthermore, bus 1H2 or 1H1 via bus PCMLCB provides a 256 kbs control channel from the other line switch modules in a line switch to the line circuits of the line switch module shown in FIG. 7.

Figure 8:
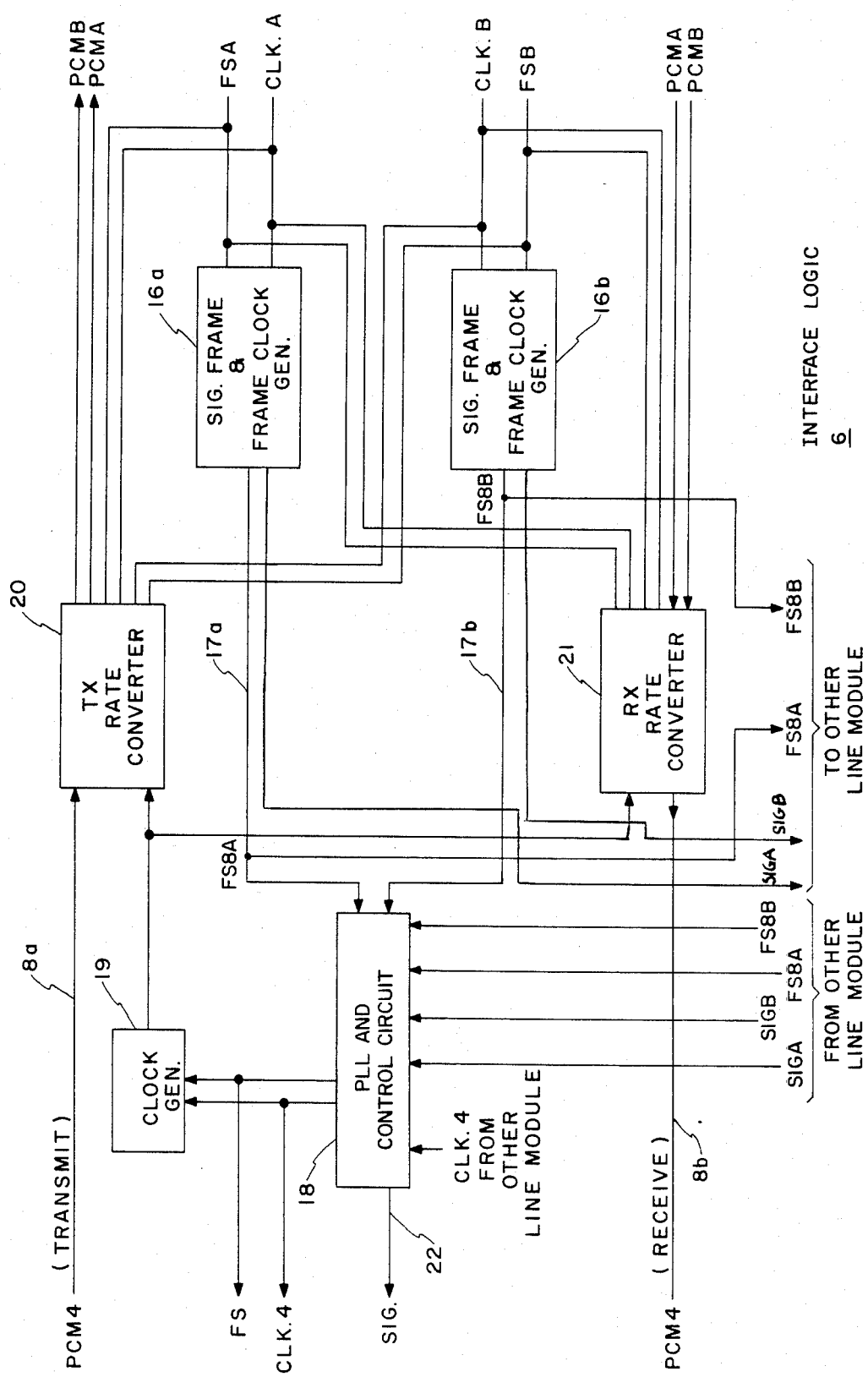
FIG. 8 illustrates in block diagram form the interface logic 6 of FIG. 2.

4.0 Interface Logic 6 (FIG. 8)

4.1 General

The interface logic 6 shown in block diagram form of FIG. 8 provides rate conversion and interlacing/demultiplexing of data between the two PCM lines PCMA, PCMB and the bus PCM4. Bus PCM4 and other PCM buses in the line switch are clocked at a 4.096 mHz bit rate. These buses must interface to the PCM lines PCMA, PCMB which clock PCM at a 1.544 mHz bit rate (or a 2.048 mHz bit rate in other applications). The interface logic 6 provides for the line switch internal clocks to be synchronized to the PCM line clocks CLKA, CLKB at frame boundaries such that no PCM bits are lost during rate conversion. This is accomplished by phase locking the internal clock to a PCM line clock by means of phase-locked loop (PLL) circuitry.

The rate converter portion of interface logic 6 includes memory elements for the PCM bit streams. The PCM data from bus PCM4 are written into a memory in the rate converter as the data for PCM lines PCMA, PCMB are read from the memory. Likewise, PCM data from lines PCMA, PCMB are written into a memory as the data for bus PCM4 is read from the memory.

Each of the two PCM lines PCMA, PCMB is connected to one of two corresponding identical signaling frame and frame clock generator circuits 16a, 16b. Each generator 16a, 16b derives an 8 khz clock signal on leads 17a, 117b, respectively, from the bit clock signal received via the respective bit clock leads CLKA and CLKB and determines the presence of a signaling frame, and generates a signaling frame signal. The 8 kHz clock is applied to a phase-locked loop and control circuit 18 and is supplied to a corresponding phase-locked loop and control circuit 18 in another interface logic 6 via leads FS8A or FS8B. The phase-locked loop and control circuit 18 generates a 4.096 mHz clock which is phase-locked to a selected 8 kHz clock on leads 17a, 17b or on the leads FS8A, FS8B which come from an interface logic circuit 6 of another line switch module. Thus, the phase-locked loop 18 of a line switch module may be locked to any one of four b 8 kHz clocks. The 4.096 mHz clock is provided on lead CLK4 and also to a clock generator circuit 19. The generator 19 provides a framing signal at an 8 kHz rate and clock signals at a 4.096 mHz rate for the transmit (TX) and receive (RX) rate converter circuits 20 and 21 respectively.

The PLL and Control Circuit 18 selects which one of the four 8 kHz clocks on lead 17a, 17b, FS8A and FS8B is to be used as a master clock of the line switch. The phase-locked loop and control circuit 18 contains failure detection circuitry for all the 8 kHz clocks. When the absence of a clock pulse occurs the failure detector will insert a pulse to maintain the oscillation frequency of PLL, and another one of the remaining working 8 kHz clocks will be selected as a master.

Additionally, there is cooperation between the PLL and control circuits 18 in the modules of a line switch such that all will operate to select the same 8 kHz derived clock as a master. This assures that the PLL's of all line switch modules are synchronized to the same clock source.

Each PLL further includes self-check circuitry such that, if a PLL fails, the PLL will automatically disconnect itself from the 4.096 mHz line CLK4 and connect the line CLK4 to the output of the PLL in the other line switch module.

4.2 RX Rate Converter (FIGS. 8, A–D)

Rate conversion and interlacing/demultiplexing are provided primarily by the TX rate converter 20 and the RX rate converter 21. The bus PCM4 includes a transmit path 8a and a receive path 8b. Likewise, the PCM lines PCMA, PCMB have both transmit and receive paths.

Incoming PCM signals from the switching network 3 over lines PCMA, PCMB are applied to the RX rate converter 21. The RX rate converter 21 operates as a FIFO type memory. Information received over the PCM lines PCMA, PCMB is stored at the rate of the PCM lines, i.e. 1.544 mHz for the North American Network or 2.048 mHz for the other systems. More specifically for the North American Network data from PCM line PCMA is clocked into RX rate converter 21 at a 1.544 mbs rate as determined by the 1.544 mHz clock line CLKA of PCM line PCMA. Likewise, data from PCM line PCMB is clocked into the RX rate converter 21 as determined by CLKB. The data stored in the RX rate converter 21 is read at a 4.096 mbs rate as determined by the 4.096 mHz output of clock generator 19. The 1.544 mHz clocks signals received over CLKA, CLKB are not necessarily synchronized. However, the 4.096 mHz clock signals are phase locked to the clock signals of one of the PCM lines connected to a line switch.

Figure 9A:
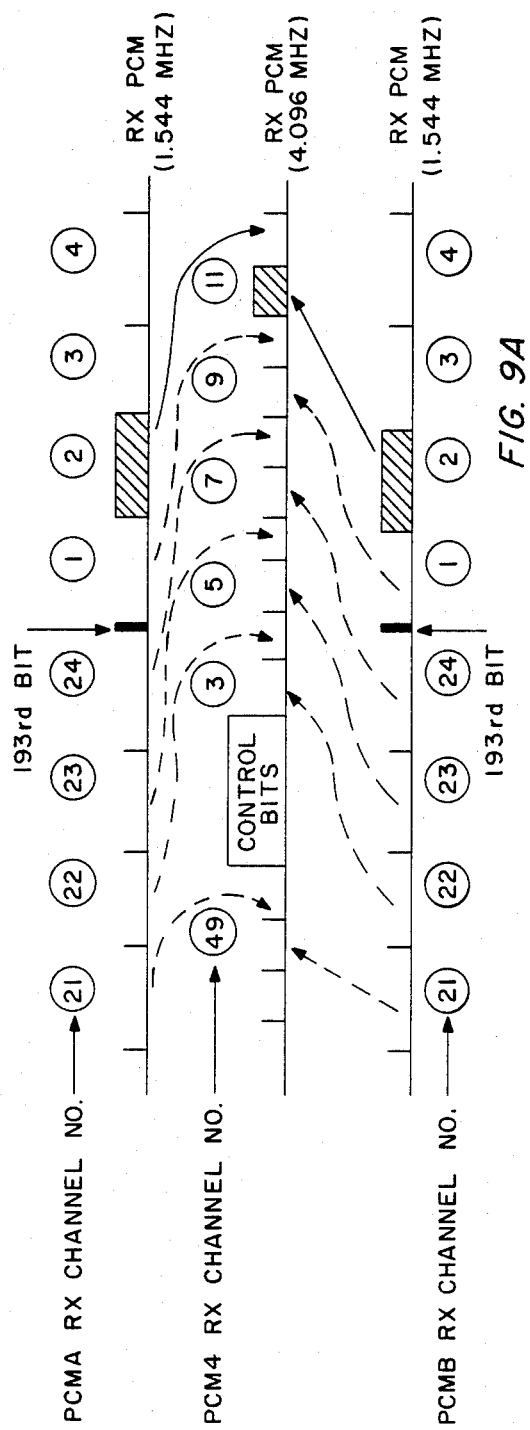
FIG. 9A illustrates the interleaving operation of the RX rate converter portion of interface logic 6 of FIG. 8.

Data from the two PCM lines PCMA, PCMB is alternately read from the RX rate converter and applied to the receive portion of bus PCM4, i.e., path 8b. FIG. 9a illustrates the interleaving of channels from the PCM lines PCMA, PCMB onto the bus PCM4.

Figure 9C:
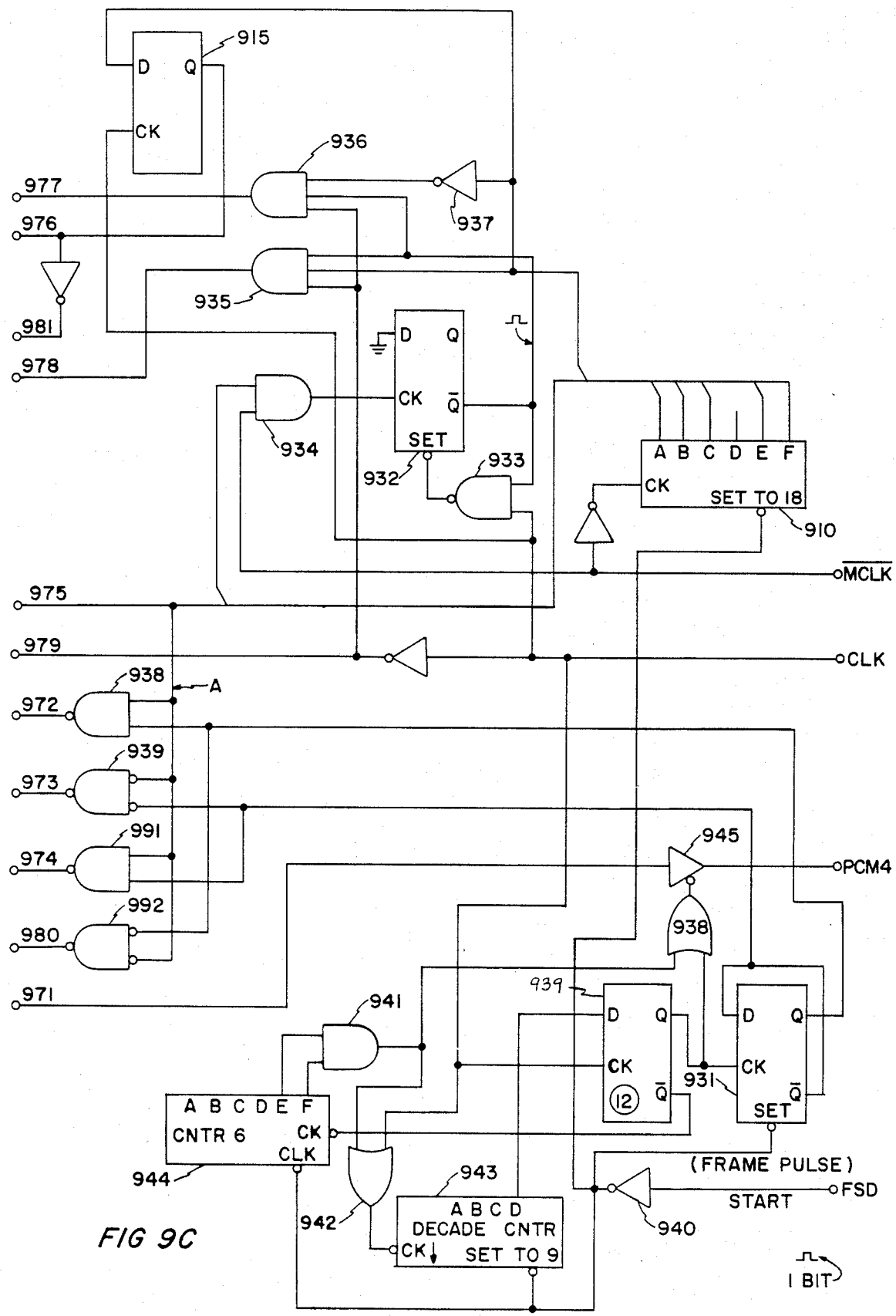
Figure 9D:
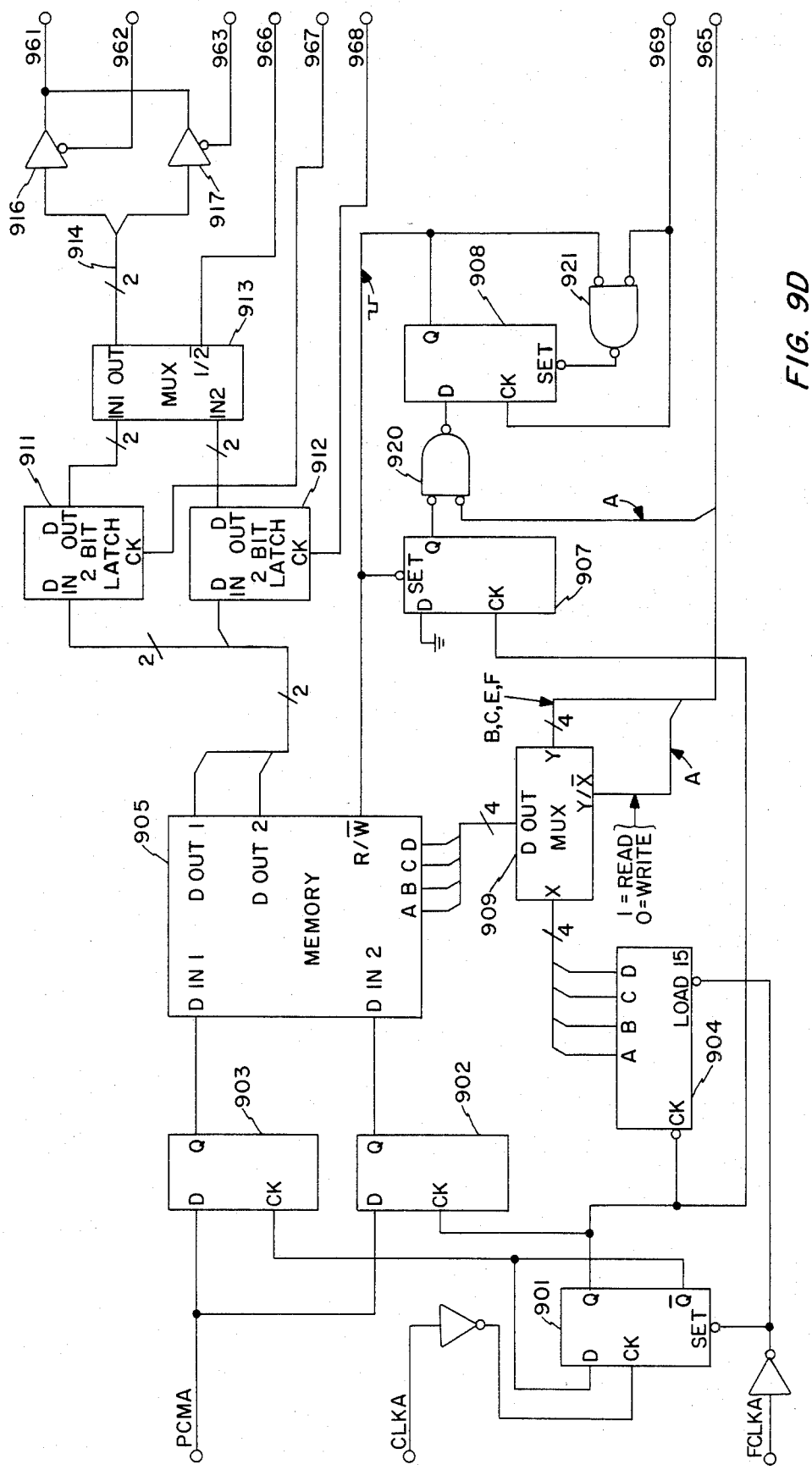

The RX rate converter 20 is shown in greater detail in FIG. 9B, 9C and 9D. FIG. 9B illustrates the interconnection of the cirucits of FIGS. 9C and 9D. The circuitry of box 951 for PCM line PCMA is duplicated in box 952 for PCM line PCMB and is shown in detail in FIG. 9D. FIG. 9C shows box 990 in detail. Turning now to FIGS. 9C and 9D, serial PCM data is received from PCM line PCMA. Alternately received bits are stored in buffer flip-flops 902 and 903 by flip-flop 901. After every other bit is stored in the flip-flops 902, 903, the write address counter 904 is advanced by one count and the two bits stored in flip-flops 902, 903 are stored in the memory 905. The flip flops 902, 903 act as a two bit serial to parallel converter and thus form two bit words for storing in the memory 905. Memory 905 is organized as sixteen 2 bit words and is a random access memory. Memory 905 includes four addresss bit inputs and read/write input. A read write control circuit comprising flip-flops 907, 908 and gates 920, 921 determines whether a read or write operation is to occur. An address selector 909 is used to select either a write address from counter 904 or a read address from counter 910.

When the data stored in flip-flops 902, 903 is to be stored in memory 905, the selector 909 selects the counter 904 as the source for the memory address and flip-flop 908 applies a write signal to the memory 905. When data is to be read from memory 905, selector 909 selects counter 910 as the source for the memory address and flip-flop 908 provides a read control signal to the memory 905. Data read from memory 905 is read as two bit words which are alternately stored in the two bit latches 911, 912. The flip flop 932 and gates 933, 934, 935, 936 and 937 control the loading of data read from memory 905 into the latches 911, 912. A selector 913 under control of flip-flop 915 alternately gates the outputs of the latches 911, 912 onto the two bit lines 914. Tri-state buffer gates 916, 917 controlld by gates 938, 939 alternately connect one of the lines 914 to the single line 961. The flip-flop 931 is used to select either the outputs from box 951 or 952 to be applied to the line 961. Flip-flop 931 changes its output state once for each voice channel on PCM4.

In effect, latches 911, 912; selector 913 and gates 916, 917 operate as a parallel to serial converter and flip-flop 931 operates to select either PCMA or PCMB as the source of data on PCM4. The read address counter 910 is driven by signal $\overline{MCLK}$ which as will be described below defines the format of PCM4. Pulses are provided by $\overline{MCLK}$ which correspond to the PCM voice bits on the bus PCM4.

The gates 938, 940, 941, 942, flip-flops 939, decade counter 943 and 6 bit counter 944 operate to control the tri-state buffer gate 945. Gate 945 is enabled when PCM data from either PCM line PCMA or PCMB is to be transmitted over PCM4. In accordance with the format for PCM4 shown in FIG. 4, gate 945 is enabled for the 8 PCM sample bit positions of each 10 bit channel and is disabled for the remaining two bits. Also, gate 945 is disabled for the 32 control bit positions in each frame.

Figure 10A:
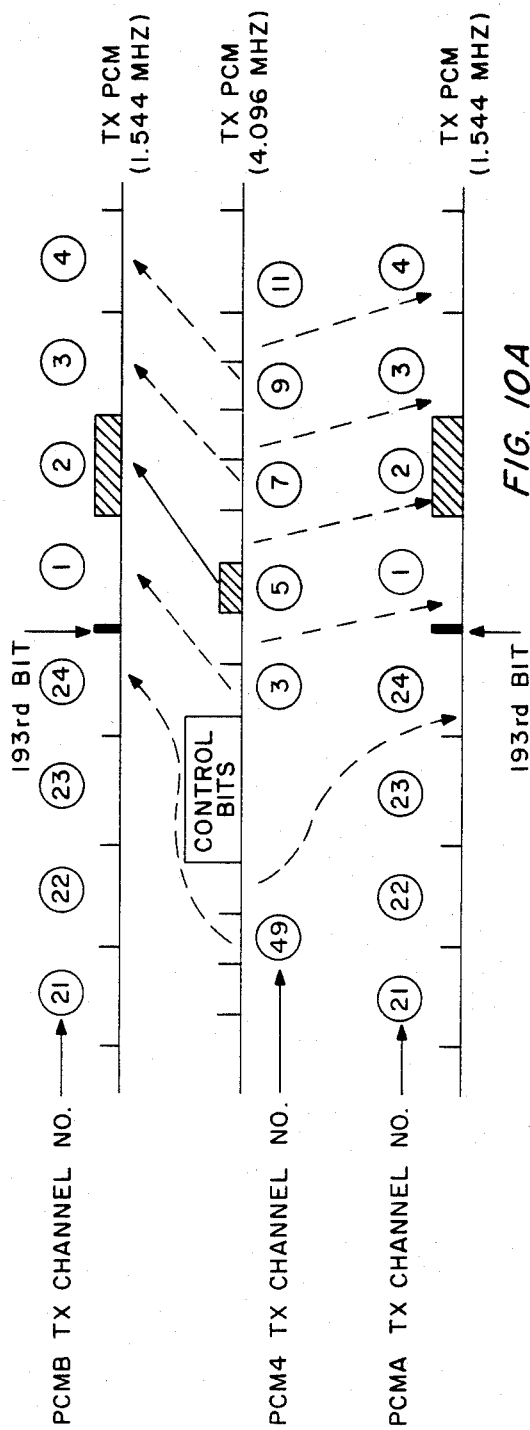
FIG. 10A illustrates the demultiplexing operation of the TX rate converter of FIG. 8.

4.3 TX RATE CONVERTER (FIGS. 8, 10A, B and C)

The TX rate converter 20 of FIG. 8 mirrors the operation of the RX rate converter 21. Specifically, the channels of data on the transmit portion 8a of bus PCM4 are stored in a FIFO memory of the TX rate converter 20. Information is received at a 4.096 mbs rate and stored under control of the 4.096 mHz clock signals of clock generator 19. Alternate channels of data stored by the TX rate converter are forwarded to the PCM lines PCMA, PCMB at a 1.544 mbs rate as determined by the respective clock signals CLKA, CLKB or the PCM lines. This demultiplexing operation is shown in FIG. A.

Figure 10B:
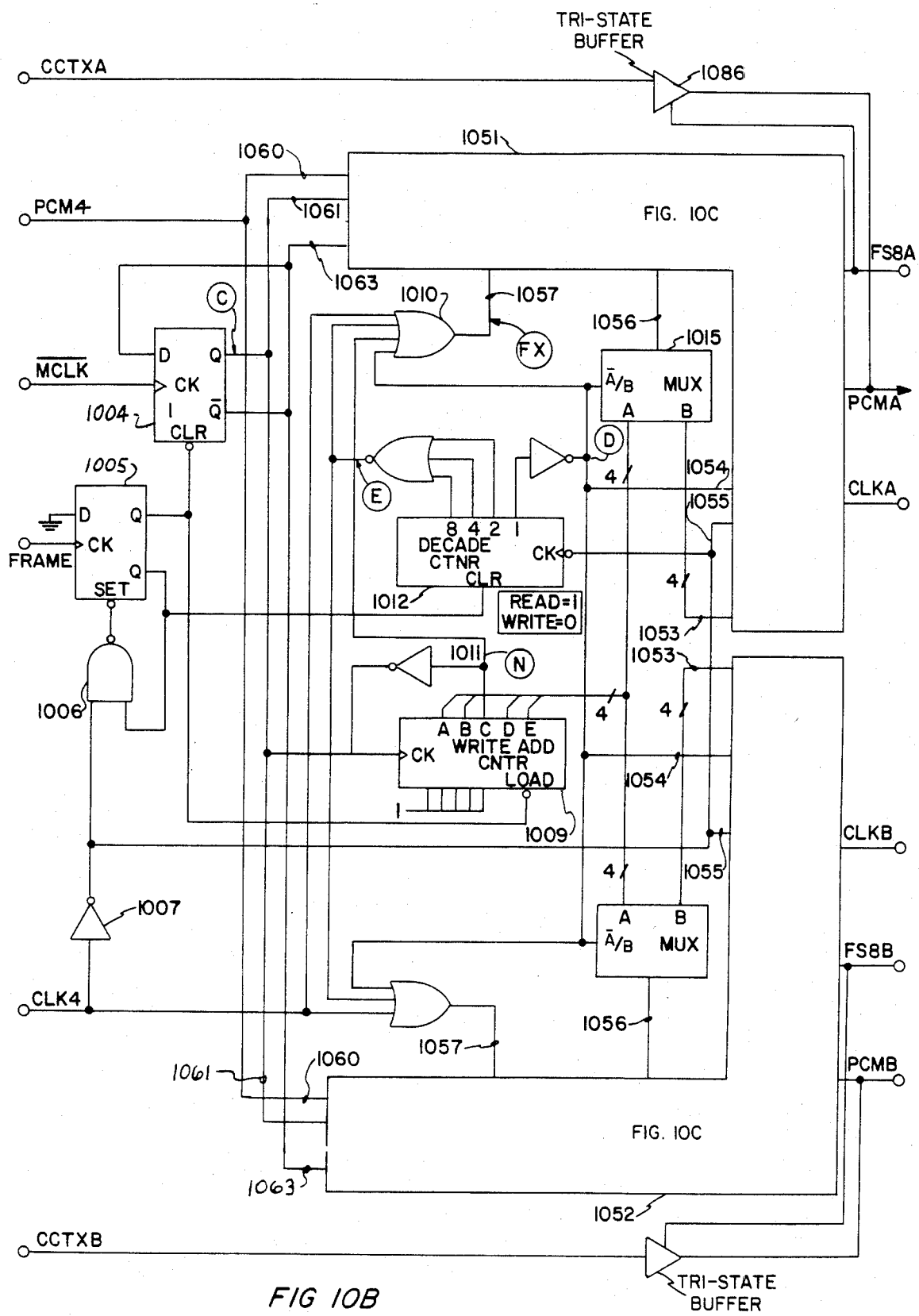
FIGS. 10B and 10C illustrate in block diagram form the TX rate converter 21 of FIG. 8.
Figure 10C:
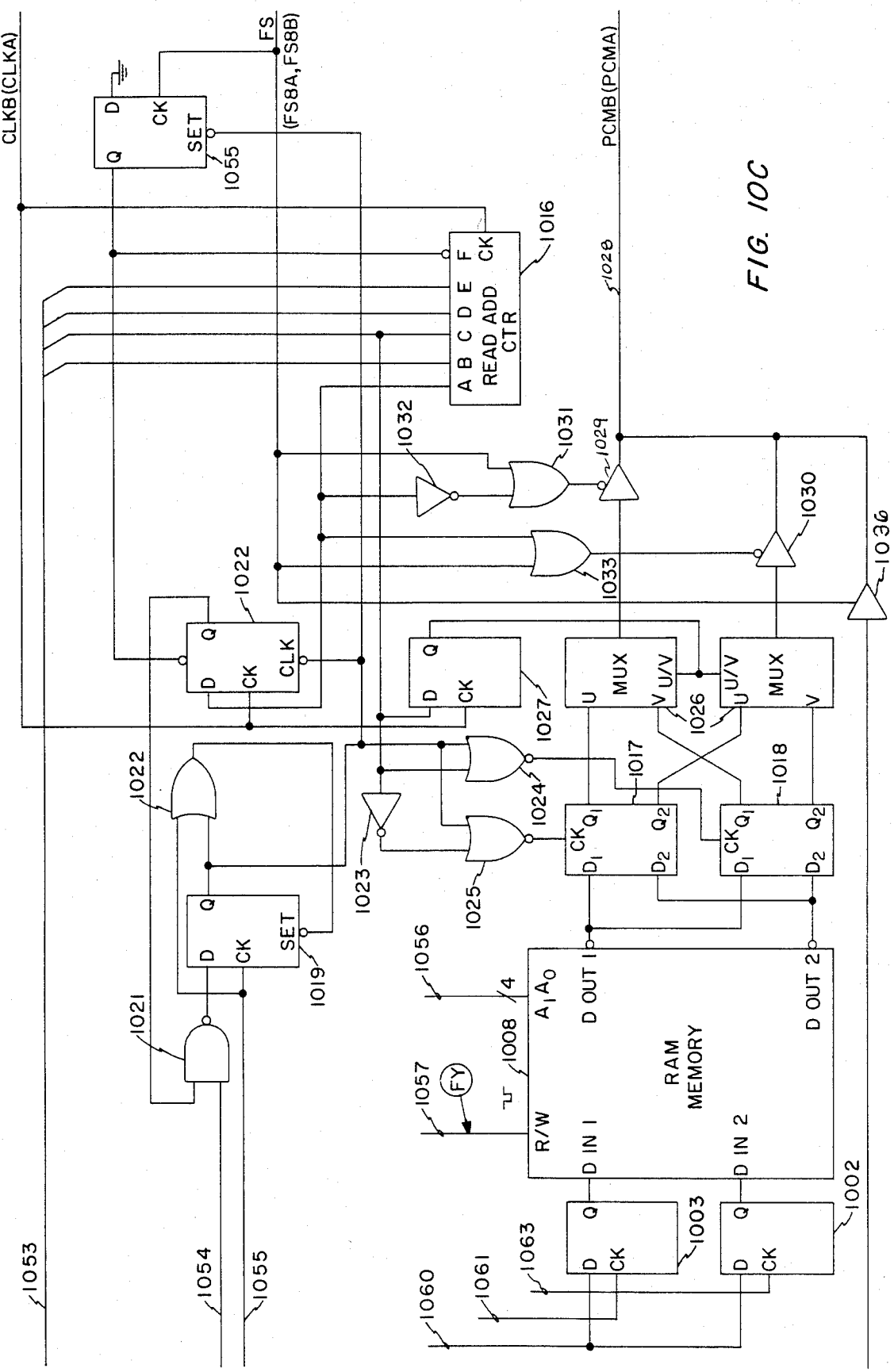
Figure 11:
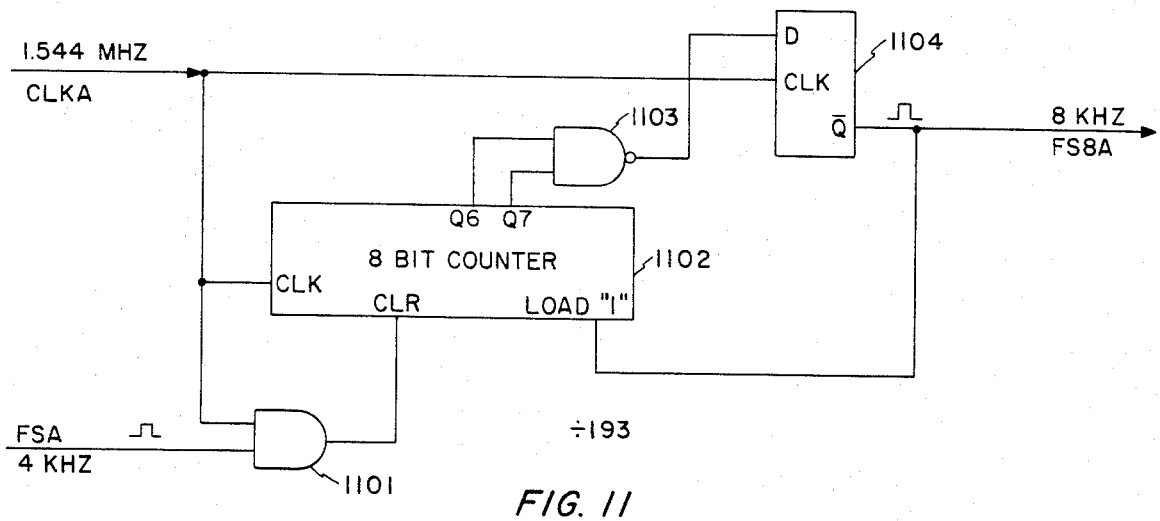
FIG. 11 illustrates in block diagram form a portion of generator 16a of FIG. 8.

The TX rate converter 21 of FIG. 8 is shown in detail in FIGS. 10B and 10C. The circuitry in box 1051 for PCM line PCMA is duplicated in box 1052 for PCM line PCMB. Boxes 1051 and 1052 are shown in detail in FIG. 10C.

Serial PCM data is received over bus PCM4. Alternately received PCM sample bits are stored in the two buffer flip-flops 1002, 1003. Flip-flop 1004 which is clocked by the signal $\overline{MCLK}$ selects which of the flip-flops 1002 or 1003 into which a PCM bit is to be stored. The flip-flop 1005, and gates 1006, 1007 are used to synchronize the operation of flip-flop 1004 each frame. After every other bit is stored in the flip-flops 1002, 1003, the two stored bits are written into memory 1008. Memory 1008 is a random access memory organized as 16 words of two bits each. Memory write addresses are generated by the counter 1009. Counter 1009 is a 5 bit binary counter which is clocked at one half the rate of the $\overline{MCLK}$ signals by flip-flop 1004. The C output of the counter 1009 is used to control gate 1010 and through an inverter 1011 controls if the corresponding memory on box 1052 is to be written or read. Decode counter 1012 and gates 1013, 1014 control whether data is to be stored in or read from memory 1008 and also counts the number of bits (10) in each channel on bus PCM4.

When counter 1012 contains a count of 0 or 1, a memory write operation is inhibited. Address selector 1015 is used to select the address input to memory 1008. Specifically, the selector 1015 selects output from counter 1009 for memory write address and counter 1016 for a memory read address. Counter 1016 is a 5 bit binary counter and is clocked by the PCM line clock CLKA. When data is read from memory 1008, the two bit words are alternately stored in the two bit latches 1017, 1018. Flip-flops 1019, 1020 and gates 1021, 1022, 1024, 1025 provide control for gating the data into the latches 1017, 1018. Gate 1023 in combination with the "C" output of counter 1016 provides for alternately selecting the latches 1017, 1018 for storing the read data. The selector circuit 1026 under control of flip-flop 1027 alternately gates the contents of latches 1017 and 1018 on line 1028. Tri-state buffer gates 1029 and 1030 controlled by gates 1031, 1032, 1033 are alternately enabled to alternately connect the two outputs of the selector 1026 to PCM line PCMA. Latches 1017, 1018, selector 1026 and gates 1029, 1030 operate as a parallel to serial converter.

The flip-flop 1055 clears the counters 1016 whenever the framing bit position during a frame on the PCM line PCMA occurs.

Tri-state buffer gate 1036 is enabled during the framing bit position to permit common channel signaling or framing information to be gated onto line PCMA.

The above described interlacing and demultiplexing operations are premised upon the use of 24 channel 1.544 mHz PCM lines PCMA, PCMB and the bus PCM4 having the format of FIG. 4. If, however, the PCM lines PCMA, PCMB are 30 channel 2.048 mHz lines then the PCM clock lines CLKA, CLKB would operate at 2.048 mHz and the format of FIG. 5 would be used for bus PCM4.

4.4 Phase-Locked Loop and Clock Circuit (FIGS. 2,8,11–20)

The rate converters require that the clock frequency of bus PCM4, i.e., be exactly 512/193 times the clock frequency of the PCM lines PCMA, PCMB. The phase difference between the two clocks must be controlled such that it falls within the limits required by the rate converter hardware.

The maximum phase difference between the internal line switch clock and the PCM line clocks that is tolerable to the rate converter is limitd only by the amount of memory storage in the rate converter. However, a large tolerance for phase variation requires a larger amount of memory storage and causes a larger nominal delay in the rate converter.

The rate converter inherently causes 20 microseconds of nominal delay interfacing the 4.096 mHz PCM to 1.544 mHz PCM. Additional delay is designed into the rate converter to tolerate the phase variation in the internal line switch clock relative to the PCM line clocks CLKA, CLKB. To design the rate converter for minimum delay requires the phase variance of the clocks be tightly controlled.

The rate converter requires a specific relationship between the two clocks. This relationship is a defined sequence which repeats every frame (125 microseconds). At frame boundaries, (Bit 193 of the PCM line clocks) the rising edges of both clocks are synchronous when they are in phase. Any deviation is considered a phase error of the line switch clock.

In the illustrative embodiment of FIG. 2 two 4.096 mHz buses PCM4 are driven by the same clock, i.e. one bus in each of the line switch modules 1a, 1b. Up to four external PCM lines, PCMA, PCMB in both line switch moduleos, whose phase relative to one another can vary, will interfere to the two buses PCM4. Since the 4.096 mHz clock will be phase-locked to an arbitrarily chosen PCM line, the rate converter must be capable of tolerating the phase difference relative to other PCM lines. Also, the failure of any one PCM line must not affect service on the other PCM lines. An extension of this philosophy requires that any single failure in the PLL circuitry not cause the loss of all four PCM liens. In summary, the PLL must have a phase error whose variance is minimized relative to the PCM lines;

The PLL must be capable of using any one of the PCM lines as a reference so that a failure of any PCM line doesn's affect service on the other PCM lines; and Two PLL circuits must exist that are independently selectable to ensure that a single failure in the PLL does not affect the PCM clock CLK4.

The signaling frame and frame clock generators 16a, 16b of FIG. 8 includes a divider circuit to derive an 8 kHz signal from the 1.544 mHz PCM line clock and the signaling frame clock. The divider circuit for generator 16a is shown in detail in FIG. 11. The circuit includes gate 1101 connected to the input of an eight bit counter 1102. Decoder gate 1103 coupled to the eight bit counter provides an output to the "D" input of flip-flop 1104. Flip-flop 1104 has its clock input CLK connected to CLKA and its Q output provides an 8 kHz framing signal FS8A. The outputs FS8A and FS8B of generators 16a, 16b are provided as inputs to the PLLL and control circuit 18 of FIG. 8. Additionally these FS8A and FS8B outputs are provided to the other line switch module in a line switch. Similarly, FS8A and FS8B outputs from the other line switch module are provided as inputs to the PLL and control circuit 18 of FIG. 8. Thus, the PLL and control circuit has clock inputs derived from each of the four PCM lines connected to a line switch, i.e., the signals derived from CLKA and CLKB of line switch module 1a and those derived from CLKA and CLKB of line switch module 1b of FIG. 2. Additionally, each of the circuits 16a, 16b of FIG. 8 generates a signaling frame signal SIGA, SIGB respectively. The signaling frame signals are also supplied to the PLL and control circuit 18 from the circuits 16a, and 16b in both line switch modules.

Figure 12A:
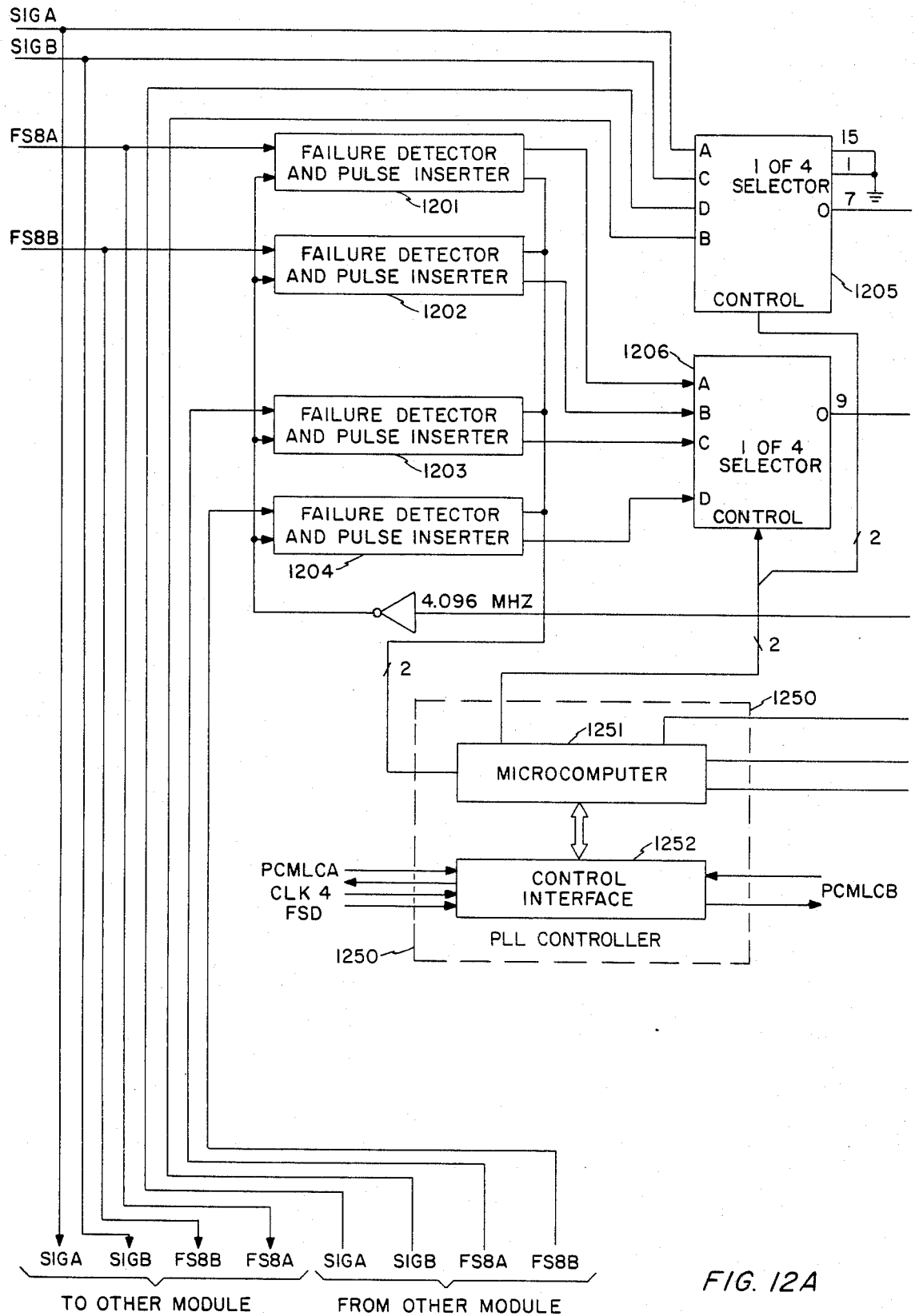
Figure 13:
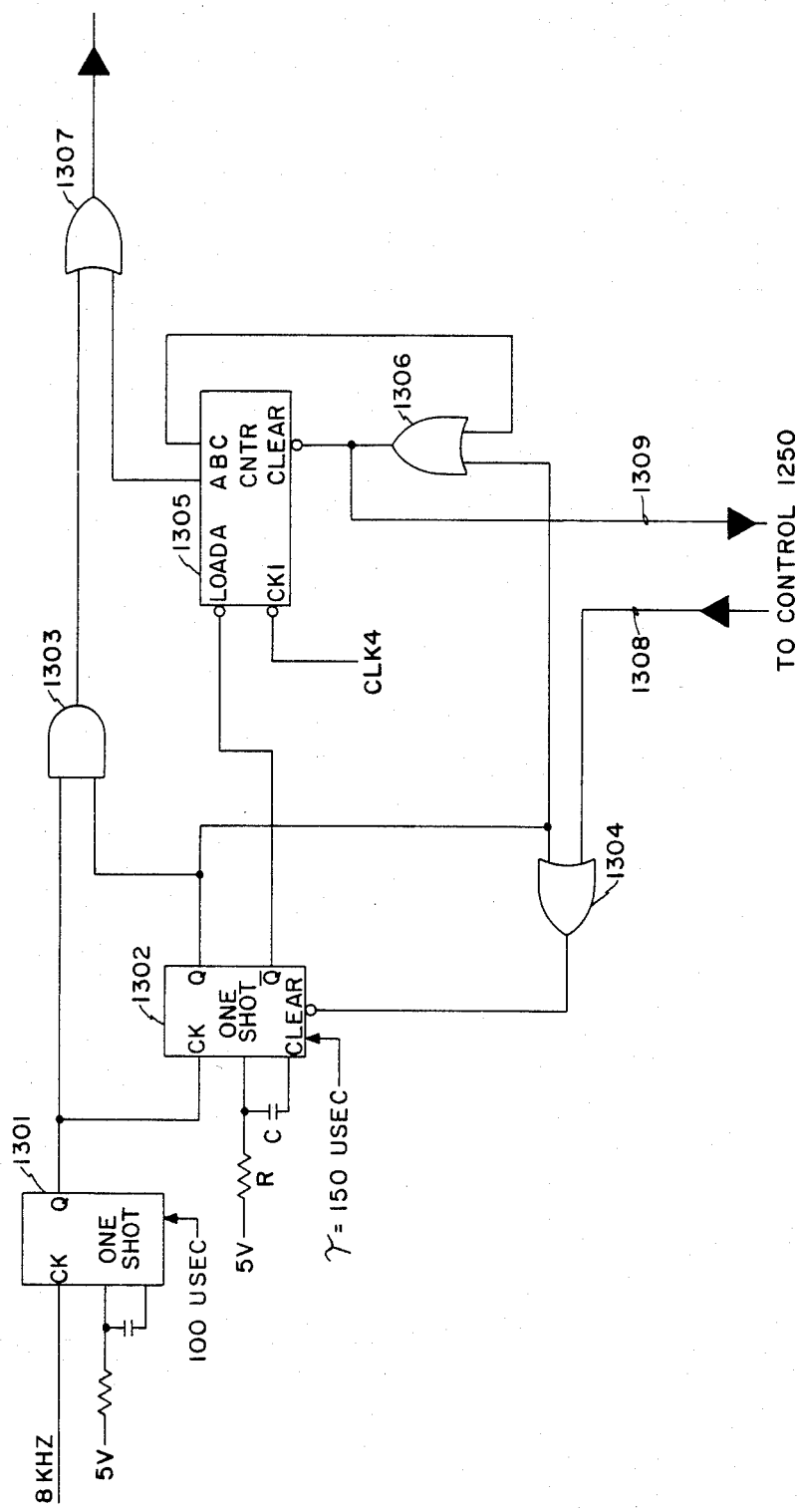
FIG. 13 illustrates in block diagram form failure detector 1201 of FIG. 12A.

Turning now to FIG. 12, the signaling frame signals SIGA and SIGB are coupled to a 1 of 4 selector 1205. Each of the four 8 kHz inputs FS8A, FS8B are individually connected to a failure detector circuit 1201, 1202, 1203, 1204. A 1 of 4 selector 1206 is to select one of the clock outputs from the failure detectors 1201, 1202, 1203, 1204 as the input FS8 to the phase-locked loop 1207. The selector 1206 as well as selector 1205 is controlled by the PLL controller 1250. The PLL 1207 is locked to the selected input. If a failure should occur in the PCM line from which the signal FS8 is derived, service to the other PCM lines would be interrupted if there was no capability of change from the PCM line to which it is phase-locked. The failure detectors 1201, 1202, 1203, 1204 detect failures in the PCM lines. FIG. 13 illustrates in detail the failure detector 1201. Normally, a clock pulse at the 8 kHz rate of FS8A arrives every 125 micorsec. If, however, the time between two pulses is less than a predetermine interval, i.e., 100 microsec., the one shot 1301 will prevent the fast pulse from being propagated. If the time interval between pulses is greater than 100 microseconds, (and less than a second predetermined interval as discussed below) the pulse will be transmitted through gates 1303 and 1307. If the time interval between pulses is greater than the second predetermined interval, i.e., 150 microseconds, the one shot 1302 will time out, its Q output will go low inhibiting gate 1303. Additionally, the PLL controller 1250 will maintain a logic low on lead 1308 with the result that the clear input to one shot 1302 is low. With the clear input low, the output Q is maintained low. Thus, the one shot 1302 is "latched" in the low state. When Q is low, $\bar{Q}$ is high. Three bit binary counter 1305 is arranged such that when Q is low, a binary 4 (ABC=001) is loaded and when Q goes high, the counter 1305 may begin counting. Counter 1305 has a clock input coupled to the 4.096 mHz clock CLK4. When the counter reaches binary count 6 (ABC=011) a signal is provided at the output of gate 1307. The output signal will persist through a binary count of 7 (ABC=111) and will terminate at the next binary count (ABC=000) i.e., a binary count of 0. When a binary count 0 is reached, the output signal at gate 1307 is terminated, a low is applied to the clear input of counter 1305 causing counter 1305 to "latch-up".

Additionally, a signal is provided to the PLL controller 1250 on line 1309 indicating that a failure has occurred. Thus, if a pulse is absent for more than 150 microsec. a "phantom" pulse is provided and the PLL controller 1250 is informed of the failure. The PLL controller 1250 will select a different one of the PCM lines to use as a reference for the PLL 1207. The phantom pulse is required to insure that the PLL 1207 does not miss a pulse. If no pulse were to occur, the PLL 1207 would function as though it were an entire frame out of phase and would slow down the 4.096 mHz clock CLK4 to correct for this. This would result in the rate converter losing several frames of PCM before frame resynchronization had occurred. Since the phantom pulse is out of phase with a normal pulse stream, it does cause an aberration in the operation of PLL 1207. However, the PLL 1207 has a narrow loop bandwidth such that its output will be within the limits of the rate converter tolerance. The aberration in the PLL is less than 100 nanosec. of phase change.

Figure 14:
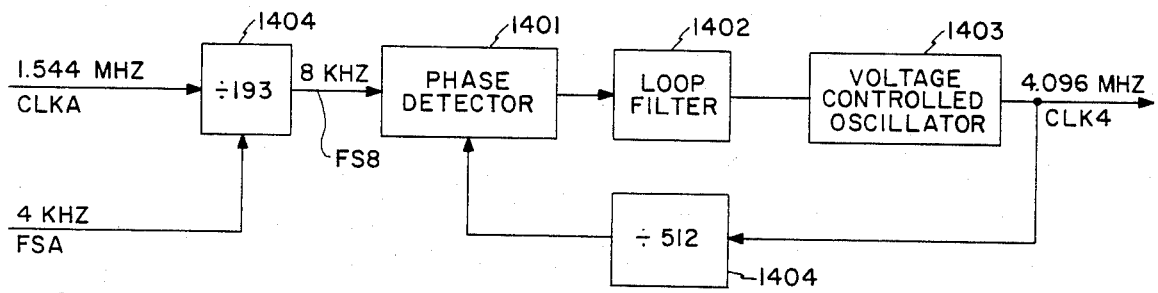
FIG. 14 is a block diagram of PLL 1207 of FIG. 12B.

A block diagram of the PLL 1207 is shown in FIG. 14.

The PLL 1207 comprises a clock input FS8 to which a voltage controlled oscillator (VCO) 1403 is slaved. This is accomplished by dividing both the output of the VCO and the input clock to get a common frequency, i.e. 8 kHz. The signaling frame and frame clock generator 16a of FIG. 8 divides the incoming 1.544 mHz PCM line clock CLKA to obtain an 8 kHz output FS8A which is in this example selected by selector 1206 of FIG. 12 to provide signals on FS8. The divider 1404 of FIG. 14 divides the 4.096 mHz output of VCO 1403 to also generate an 8 kHz signal. The phase detector 1401 generates an error current which is integrated by the loop filter 1402 to control VCO 1403. When CLK4 is phase-locked to FS8, the frequency of VCO 1403 is exactly 512/193 times CLKA.

Figure 15:
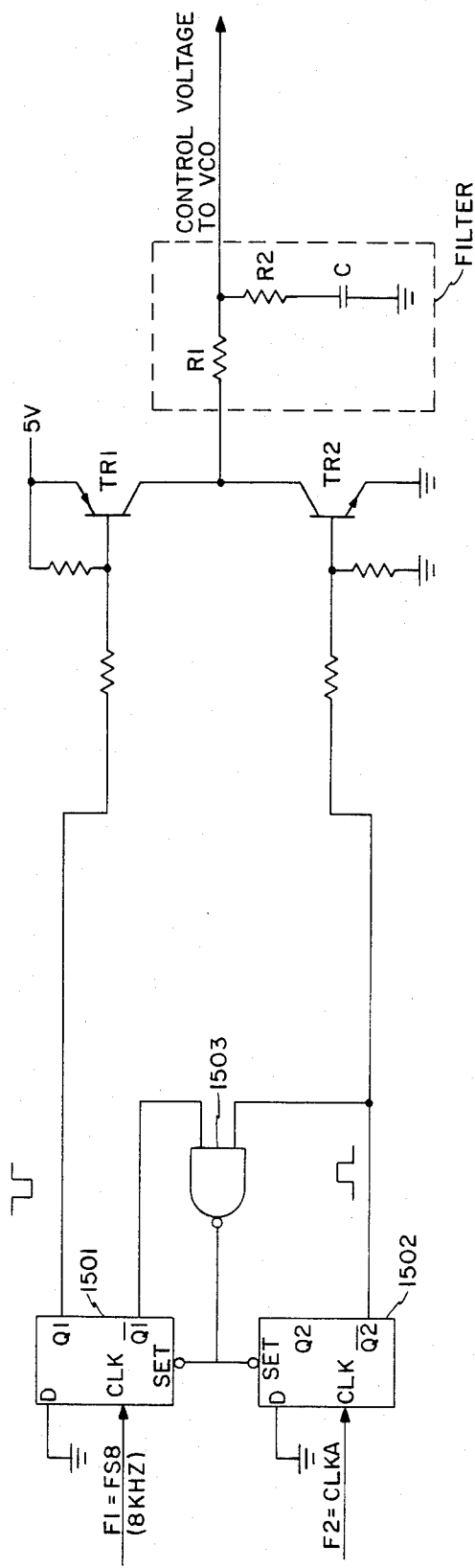
FIG. 15 illustrates in block diagram form the phase detector of FIG. 14.

In order to minimize the phase variance in the PLL 1207, a phase detector is provided that gives a phase error near zero under steady state conditions. A sample phase detector that meets this critical requirement is shown in FIG. 15.

This phase detector requires TTL compatible inputs and unlike a quadrature or an EXCLUSIVE-OR type of phase detector, it is not duty-cycle dependent on the inputs since it is strictly rising-edge sensitive which prevents phase lock from occurring on an integer mulitple (harmonic) of the desired VCO frequency. It similarly rejects subharmonic phase lock.

Figure 16:
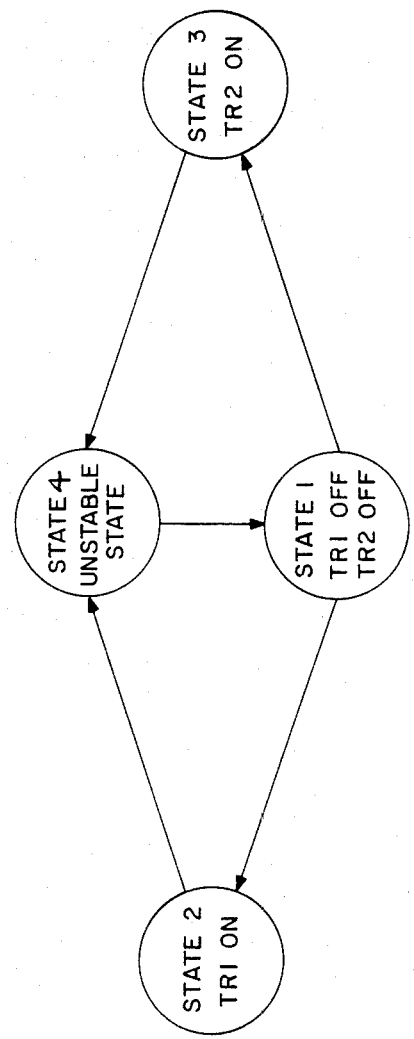
FIG. 16 is a state diagram for the phase detector of FIG. 14.

The outputs (Q1 and Q2) of flip-flops 1501, 1502 have the following four states:
State 1=Both Q1 and Q2 high
State 2=Q1 is low, Q2 is high
State 3=Q1 is high, Q2 is low
State 4=Both Q1 and Q2 low State 4 is an unstable condition since this causes a set pulse which returns the flip-flop pair to State 1. State 1 is the "off" state in that both transistor switches (TR1 and TR2) are turned off in that state. FIG. 16 shows the state diagram of the phase detector.

The phase detector cycles through the state diagram (FIG. 16) starting at State 1 progressing to either State 2 or 3, to State 4, and returns to State 1. It makes this cycle once every 125 microseconds staying in State 1 for a large duration of the cycle. If F2 lags F1 in phase, the detector cycles through State 2; if F2 leads F1, it cycles through State 3. The time it is in State 2 or 3 is equal to the phase difference between F1 and F2. Thus, the phase detector has a +360 degrees of phase error operating range. If the error exceeds 360 degrees in either direction or F2 is not equal to F1, the cycle time is not necessarily 125 microseconds (out of lock condition). However, the phase detector will always cycle through State 2 when F2 is less than F1 and through State 3 when F2 is grater than F1. Therefore, the phase detector will, in all cases, drive the control voltage toward a locked condition.

When in State 2 or 3, TR1 or TR2 is "on" causing current to be pumped into or out of the loop filter capacitor (C). When fed into an infinitely high impedance, the voltage on the capacitor represents the summation (or integral) of all past phase errors. This is extremely important, since different VCO's require different control voltages to oscillate at 4.096 mHz. The phase detector will operate at nearly zero phase error under steady state conditions independent of the DC voltage on the control voltage line. TR1 and TR2 need only to be turned on to correct for changes in PLL operating conditions and to replace the small amount of charge lost in the capacitor due to circuitry leakage during each 125 microsecond period. The phase error is independent of the vast majority of the PLL parameters including loop gain, supply voltage, loop filter values, and all VCO characteristics. In comparison, when using phase detectors in which the control line voltage is directly proportional to the phase error, the phase error is much mor difficult to control. With such phase detectors any required change in control voltage (due to part variance or temperature change) causes a proportional phase error change.

Figure 17:
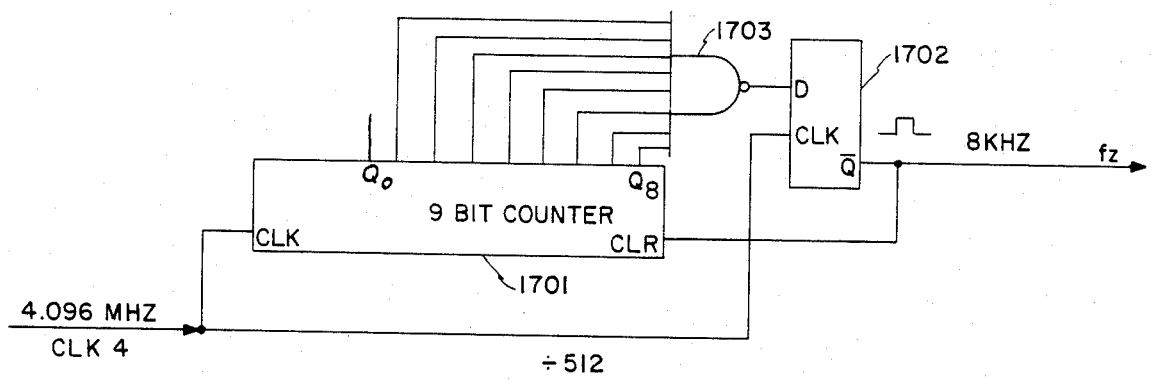
FIG. 17 is a block diagram of divider 1404 of FIG. 14.

Phase error between the VCO and its reference is dependent primarily on the propagation delay through the dividers (512 and 193) and the phase detector. The dividers were both designed with this consideration and have only one flip-flop delay from input to output. The ÷193 counter is that of FIG. 11 and the −512 counter is shown in FIG. 17. The phase detector uses two flip-flops that are inherently closely matched since they are in the same integrated circuit package.

The PLL has a measured nominal phase difference between F1 and F2 at the phase detector of 10 nanoseconds (less than 0.03 degrees). The total phase difference between CLK4 and CLKA or CLKB will be larger since there are additional circuit delay tolerances that affect the total phase difference. These include delay tolerances in the dividers, failure detector circuits, selectors and buffering circuits. The worst case phase difference between CLK4 and CLKA or CLKB is under 200 nanoseconds using LSI-TTL technology.

The phase/frequency discrimination attributes of the phase detector give the PLL a capture and lock range limited only by the frequency range of the VCO. This allows great flexibility in the design of the remaining portions of the PLL.

Figure 18:
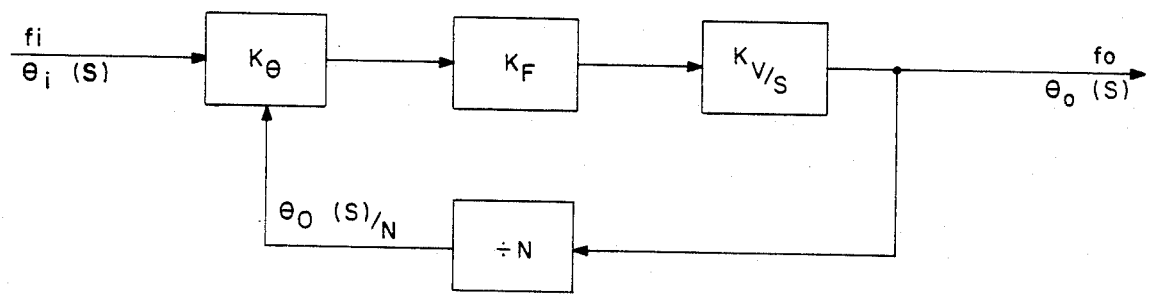
FIG. 18 is a block diagram of loop filter 1402 of FIG. 14.

The design of the loop filter 1402 of FIG. 14 involves several requirements. First, the loop must remain stable under all operating conditions. Secondly, the loop bandwidth must be selected such that the aberration in the 8 kHz reference caused by a PCM line failure, does not cause the VCO to shift in frequency excessively. A damping factor greater than 0.7 is desirable for stability. A damping factor under 0.7 is underdamped with zero being the limit before oscillations result. For stability analysis, the PLL can be modeled as shown in FIG. 18.

Figure 19A:
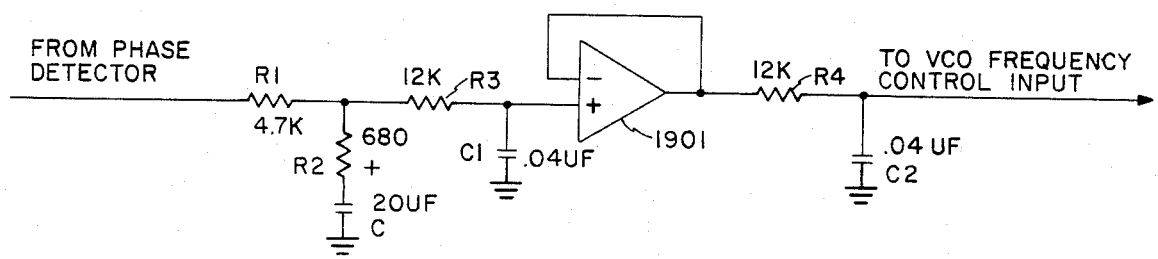
FIG. 19A is one embodiment of loop filter 1402 of FIG. 14.
Figure 19:
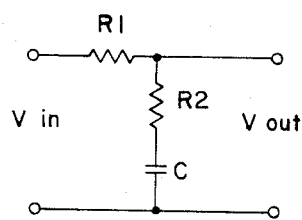
FIG. 19 is a basic loop filter circuit.

Using Laplace Transforms, it is possible to analyze the stability of the PLL. Using servo theory, $$\theta_o(s) = \frac{G(s)}{1 + G(s)H(s)} \theta_i(s)$$

where
$\theta_o(s)$ = Output phase
$\theta_i(s)$ = Input phase
$G(s)$ = Forward gain product = $K_0 \times K_F \times K_V/s$
$H(s)$ = Feedback gain product = $1/N$ Three of the gain blocks ($K_0$, $K_v$, and $N$) are fixed. The transfer function of the loop filter is selectable. The loop filter of FIG. 19 is chosen for its great flexibility in determining both loop natural frequency ($\omega_n$) and damping factor ($\zeta$).

$$\frac{V_{out}}{V_{in}} = \frac{sR_2C + 1}{s(R_1 + R_2)C + 1} \quad (2)$$

$$K_F = F_{(s)} = \frac{\tau_2 s + 1}{\tau_1 s + 1}$$

where
$\tau_2 = R_2 C$
$\tau_1 = (R_1 + R_2)C$

Referencing FIG. 18, forward gain and reverse gain products are entered into Equation 1 and reduced to Equation 4.

$$\frac{\theta_o(s)}{\theta_i(s)} = \frac{K_\theta K_v (\tau_2 s + 1)/\tau_1}{s^2 + 2\zeta\omega_n s + \omega_n^2}$$

where $\omega_n = \sqrt{K_\theta K_v / \tau_1 N}$ rad/sec. = natural frequency of PLL and $\zeta = \frac{1}{2}\left(\frac{1}{\tau_1 \omega_n} + \omega_n \tau_2\right)$ = damping factor of PLL Table 1 lists the values of the PLL parameters used to determine the loop damping factor ($\zeta$) and natural frequency ($\omega_n$).

TABLE 1

| PLL GAIN PARAMETERS |
| --- |
| $K_v = 550$ kHz/volt = $3.46 \times 10^6$ rad/volt-sec. |
| $K_0 = \frac{5v}{4\pi}$ volts/rad = 398 volts/rad. |
| $N = 512$ |
| $K_F = \frac{\tau_2 s + 1}{\tau_1 s + 1}$ $\tau_2 = 13.6$ msec; $\tau_1 = 107.6$ msec. |
| These are used in Equation 4 to obtain the following: $w_n = 158$ rad/sec. (25.1 Hz) $\zeta = 1.09$ |

This indicates a PLL with a narrow loop bandwidth and is very stable since it is overdamped.

Figure 20:
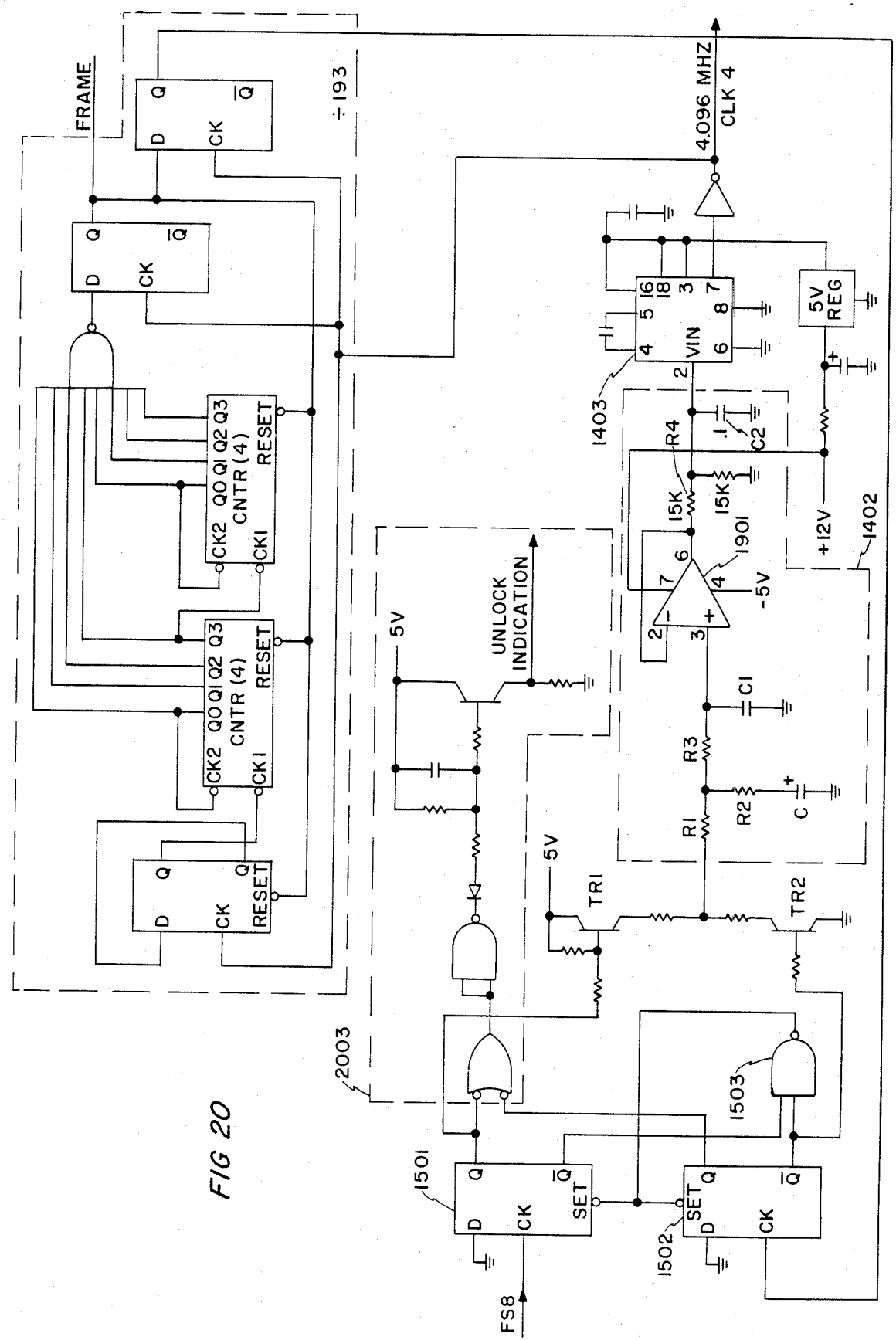
FIG. 20 is a schematic diagram partially in block form of the PLL 1207 of FIG. 12B.

Two low-pass sections were added to the basic loop filter shown in FIG. 19 in order to reduce the aberration caused by a PCM line failure. In addition, isolation is provided between the VCO and active loop filter circuitry at the VCO operating frequency of 4.096 mHz. Turning to FIG. 19A which illustrates the loop filter in simple form, the corner frequencies of the two low-pass filters R3, C1 and R4, C2 is more than an order of magnitude higher in frequency than the natural frequency of the PLL. Thus, the additional phase shift contributed by these filters is negligible and lowers the damping factor only slightly. A J-FET input op amp-1901 is used to provide the low leakage required since the VCO has an input impedance under 100K ohms. FIG. 20 illustrates in detail the complete phase-locked loop circuit combining the circuits of FIGS. 15, 17 and 19A. An unlock indication circuit 2003 provides a signal indicating if the phase-locked loop fails to maintain a locking.

The choice of the VCO is often the most important part of the design of a phase-locked loop. However, in this application, the PLL characteristics that the VCO determine are not critical. This includes phase noise, voltage to frequency conversion linearity, temperature sensitivity, frequency range and spectral purity. Three different VCO's were investigated. All were IC designs available from multiple sources and all met the requirements necessary for this application. The MC4024 and 74LS124 are TTL multivibrator designs using an RC network to determine frequency. These parts have very similar performance with approximately 4 nanoseconds of phase jitter at the phase detector. This correlates with the MC4024 specification of 120 Hz RMS (typical) frequency noise deviation at 4.096 mHz. The MC1648 VCO is an ECL IC oscillator design requiring an external varactor and coil. Because of the higher Q elements, it has superior phase noise and spectral purity. At 4.096 mHz, the RMS frequency deviation is specified at less than 20 Hz. This corresponds to a phase jitter at the phase detector of less than 1 nanosecond. With the test equipment available, no phase jitter could be detected.

Turning back to FIG. 12, the output of the PLL 1207 is coupled to a one shot 1209 which acts as a failure detector. If the PLL 1207 fails to be reset within 350 nanosec., it will set flip-flop 1210 and will provide a failure indication to the PLL controller 1250. Flip-flop 1210 will automatically operate the selector 1214 to switch to the phase-locked loop in the other line switch module, e.g., 1b of FIG. 2. The PLL controller 1250 must however switch the PCM line clock, e.g., CLKA, to the PLL 1207 in the other module without missing clock pulses. The 500 nanosec. delay 1208 permits switching to the other PLL without missing clock pulses since the delay 1208 provides clock pulses for 500 nanosec. after the first PLL 1207 has failed. The selectors 1212 and 1213 are also controlled by flip-flop 1210 to switch the source for SIG and FRAME to the other line switch module.

The PLL controller 1250 includes a microcomputer 1251 and an interface circuit 1252. The microcomputer 1251 in the illustrative embodiment is an Intel 8049 microcomputer. The interface comprises a protocol interface circuit (PIC) which will be described in greater detail in conjunction with the line group controller. The Intel 8049 microcomputer is described in Intel Component Catalog 1979, Intel Corporation, 1979, pp 8-27 to 8-30.

Th system controller 5 selects which PCM line clock is to be initially selected as the master clock to which the line switch clock circuits are to be synchronized. The system controller 5 informs the line switch controllers 7 in the line switch of the initial selection. The line switch controllers 7 then direct the respective microcomputers 1251 to the initial selection. If one of the line module microcomputers 1215 detects a failure in the clock circuits, it arbitrarily switches to another line clock to be used as a master. The failure detecting microcomputer will send information back to the system controller 5 via line switch controller 7 identifying the newly selected PCM line clock. The system controller 5 will then transmit command information to the other module microcomputer 1251 via the respective line switch control 7 directing the other modules microcomputer to select the same PCM line clock as master. Thus, all modules within the line switch utilize the same PCM line clock to derive the internal line switch clocks.

5.0 Line Switch Controller (FIGS. 9B, 9E to 9N, 10B 10C)

The line switch controller 7 communicates with the system controller 5 of FIG. 1 via the PCM lines PCMA, PCMB. The line switch controller 7 transmits and receives information over the common channeling signaling bits of the PCM lines PCMA, PCMB via the RX and TX rate converters. More specifically, turning to FIG. 9B, each time a common channel signaling bit appears on the PCM line, PCMA or PCMB, the associated clock lead FSA or FSB will provide a pulse. The clock pulse on the lead, e.g. FSA will cause the common channel signaling bit to be loaded into a buffer flip-flop 950A or 950B. The output of buffer flip-flop 950 or 950B is present to the line switch controller via lead CCRXA or CCRXB. Information from the line switch controller 7 is inserted into the common channel signaling bit portions on lines PCMA and PCMB under control of the clock leads FS8A, FS8B. Turning to FIG. 10B, common channel signaling information from the line switch controller 7 for PCM line PCMA is provided on lead CCTXA and for PCM line PCMB on lead CCTXB. Tri-state buffer gate 1086 is enabled by CLKA during the common channel signaling bit time and gates the data bit from line CCTXA into PCM line PCMA. Likewise, data from lead CCTXB is gated onto PCM line PCMB.

Figure 9E:
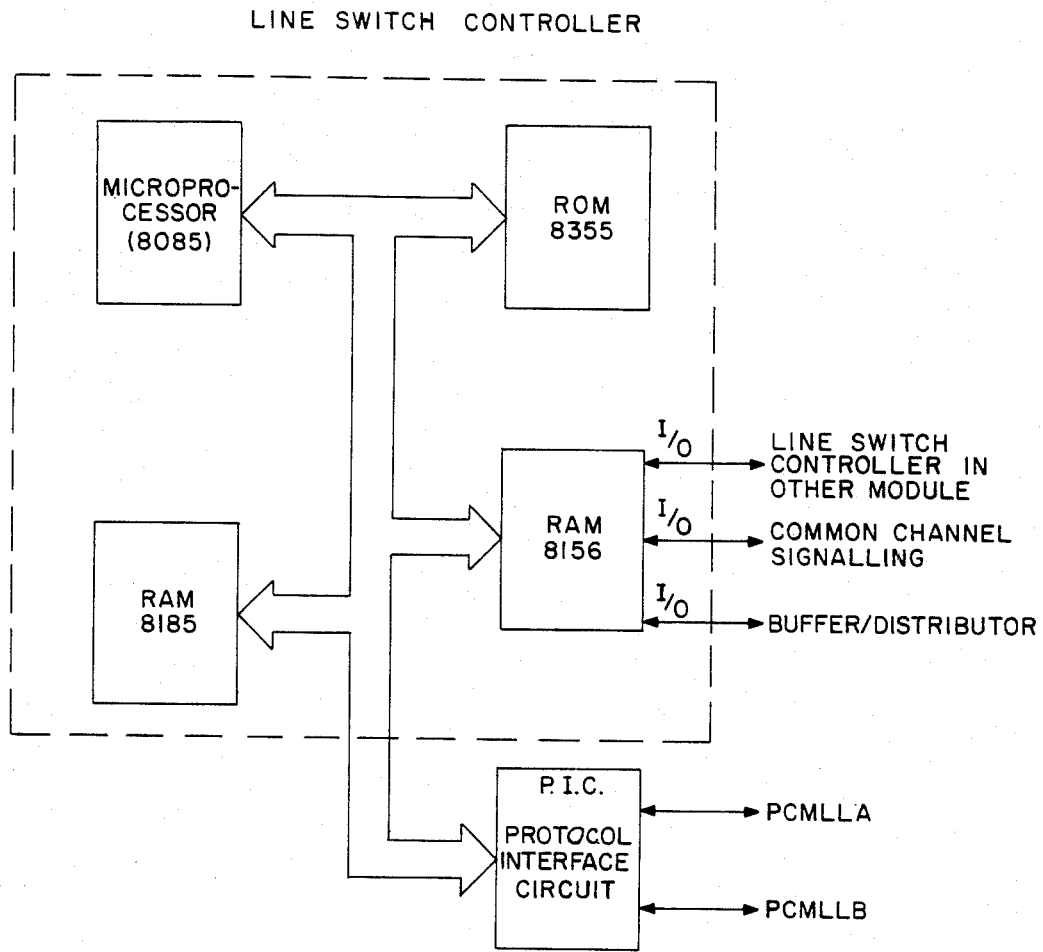
FIG. 9E illustrates in block diagram form the line switch controller of FIGS. 2 and 2A.

Turning now to FIG. 9E, the line switch controller is shown as comprising a Protocol interface circuit PIC and a microcomputer. The microcomputer utilized in the illustrative embodiment is the MCS-85 TM system available from INTEL CORPORATION which is described in Intel Component Data Catalog 1979, Intel Corporation, 1979, 9-79 to 9-139. More specifically, the microcomputer configuration may be that shown in FIG. 1 at page 9-78 of the aforementioned Intel reference. The 8085 microprocessor, the 8156 RAM with I/O ports and timer, the 8355 ROM and the 8185 RAM shown are all described in detail in the aforementioned Intel reference.

The protocol interface circuit PIC serve as a control data interface between the parallel data bus of the microcomputer and the high speed, bit serial PCM bus PCM4. The line swich controller 7 operates as the master in a master slave relationship with all other circuits connected to the PCM buses PCM4, PCMLCA, PCMLCB. More specifically, only the line switch controller 7 may transmit control word commands over the PCM buses. A circuit will transmit a control word response on the PCM buses ony after receiving a command addressing that ciruict. The convention established for the line switch control communication specifies that commands and responses must occur in pairs, only a line switch controller 6 can initiate a command, and the response to a command always occurs a fixed number of frames after the command.

Figure 9F:
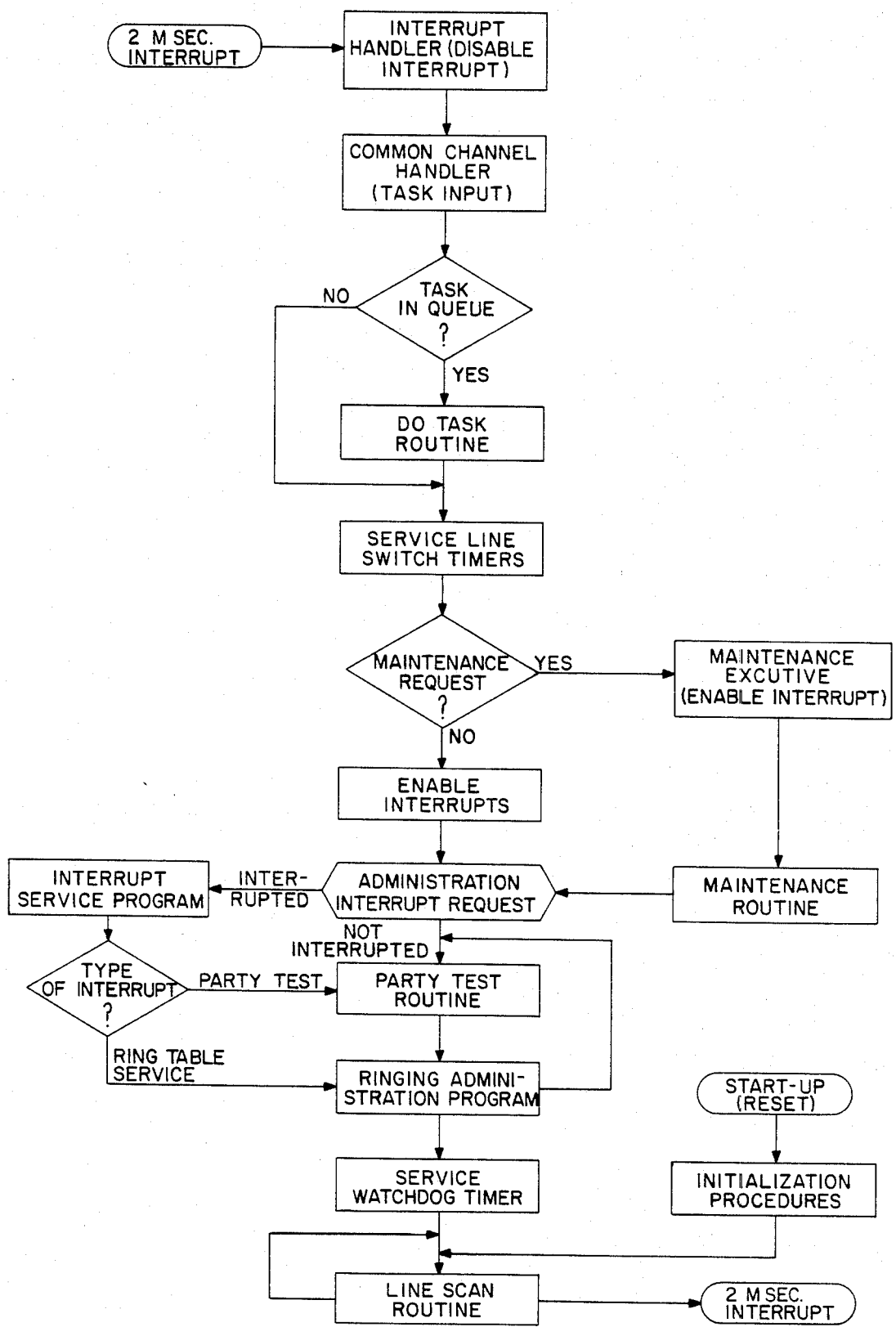

FIG. 9F is a flow chart of the general software architecture of the line switch controller 7. Commands from the system control 5 of FIG. 1 are transmitted over the PCM lines PCMA, PCMB arriving at a rate of one byte (8 bits) every 2 msec. The line switch controller includes a 2 Msec. interrupt timer and when a 2 msec. interrupt occurs, an interrupt handler program calls a common channel data handler to process the received data byte. If the received data byte completes a command (each command may have 5 to 10 bytes), the previously received bytes for the command will be retrieved from a queue and the command will be executed. If the received byte does not complete a command, it will be stored in the queue. Typical of the tasks which the line switch controller 7 will be commanded to execute are: calling and called party channel assignments, initiating ringing, disconecting ringing, call disconnect maintenance, test, alarm and administrative functions. FIGS. 9G to 9N illustrate in greater detail the flow charts of various programs identified in FIG. 9F.

Figure 9G:
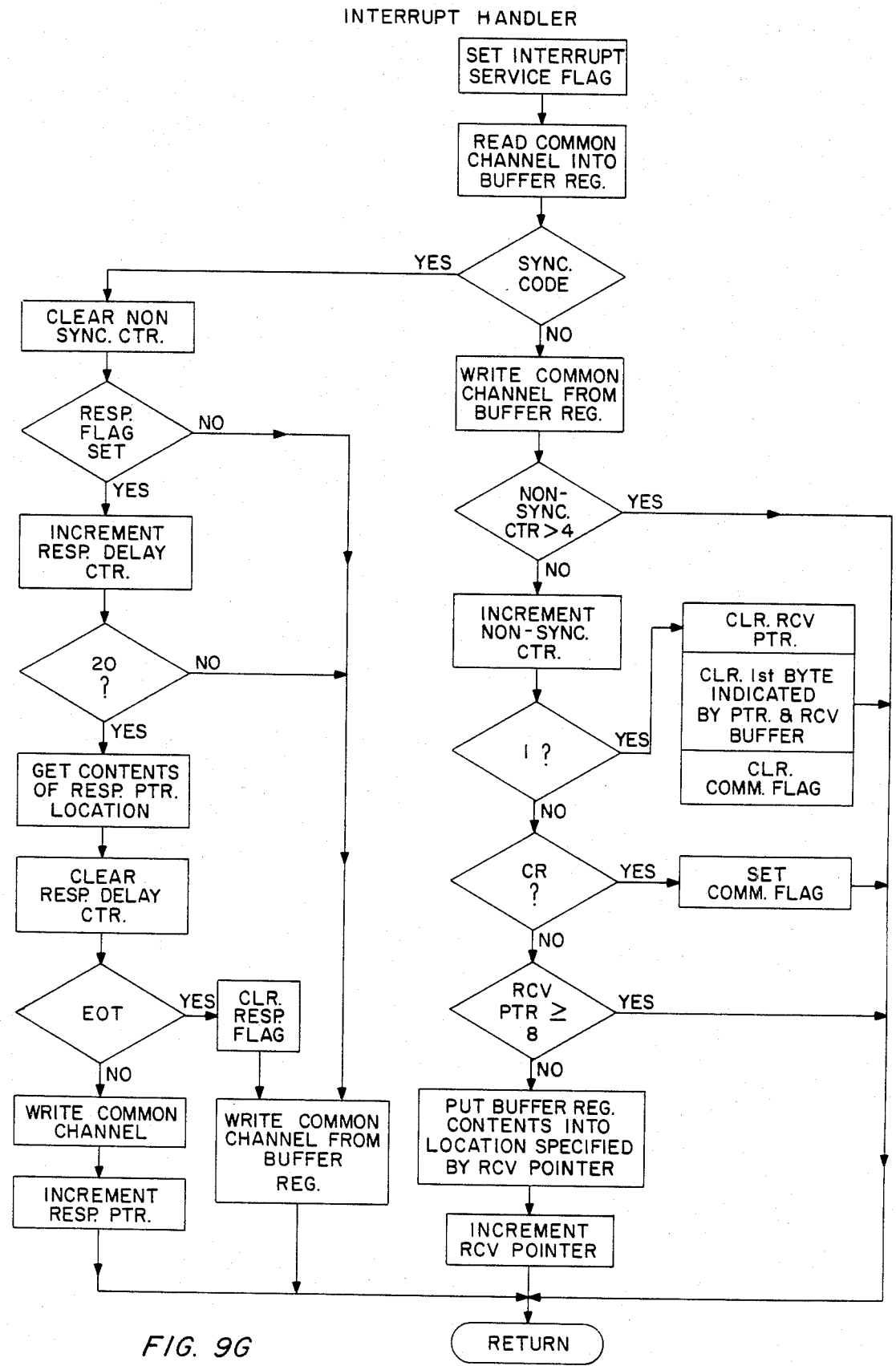
Figure 9H:
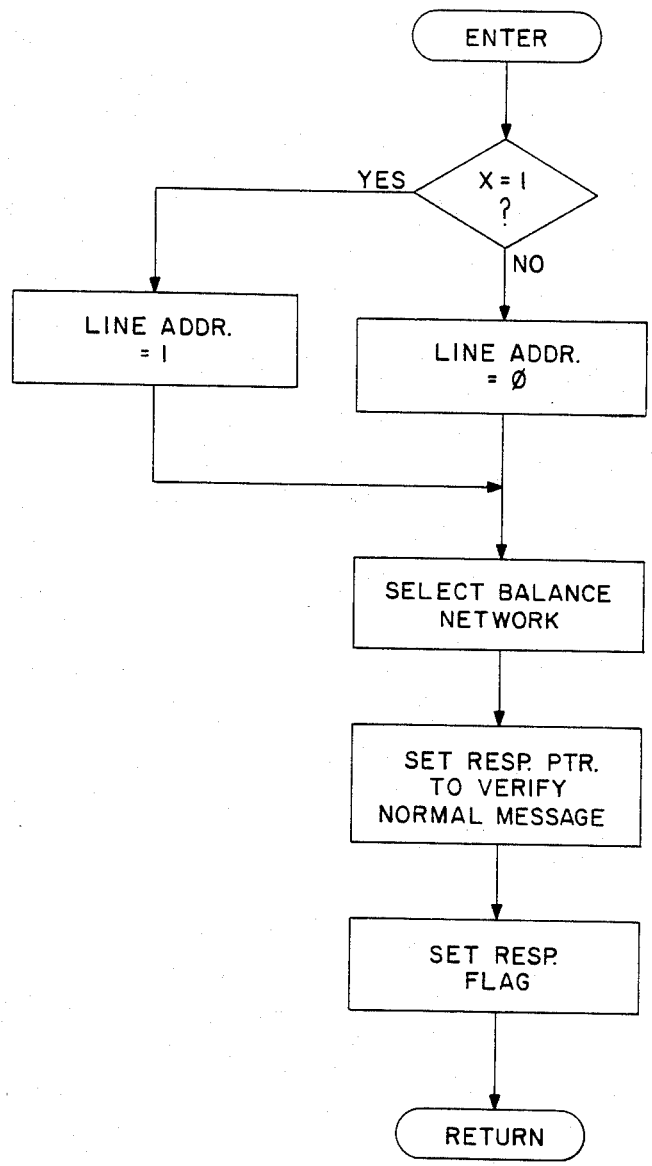
Figure 91:
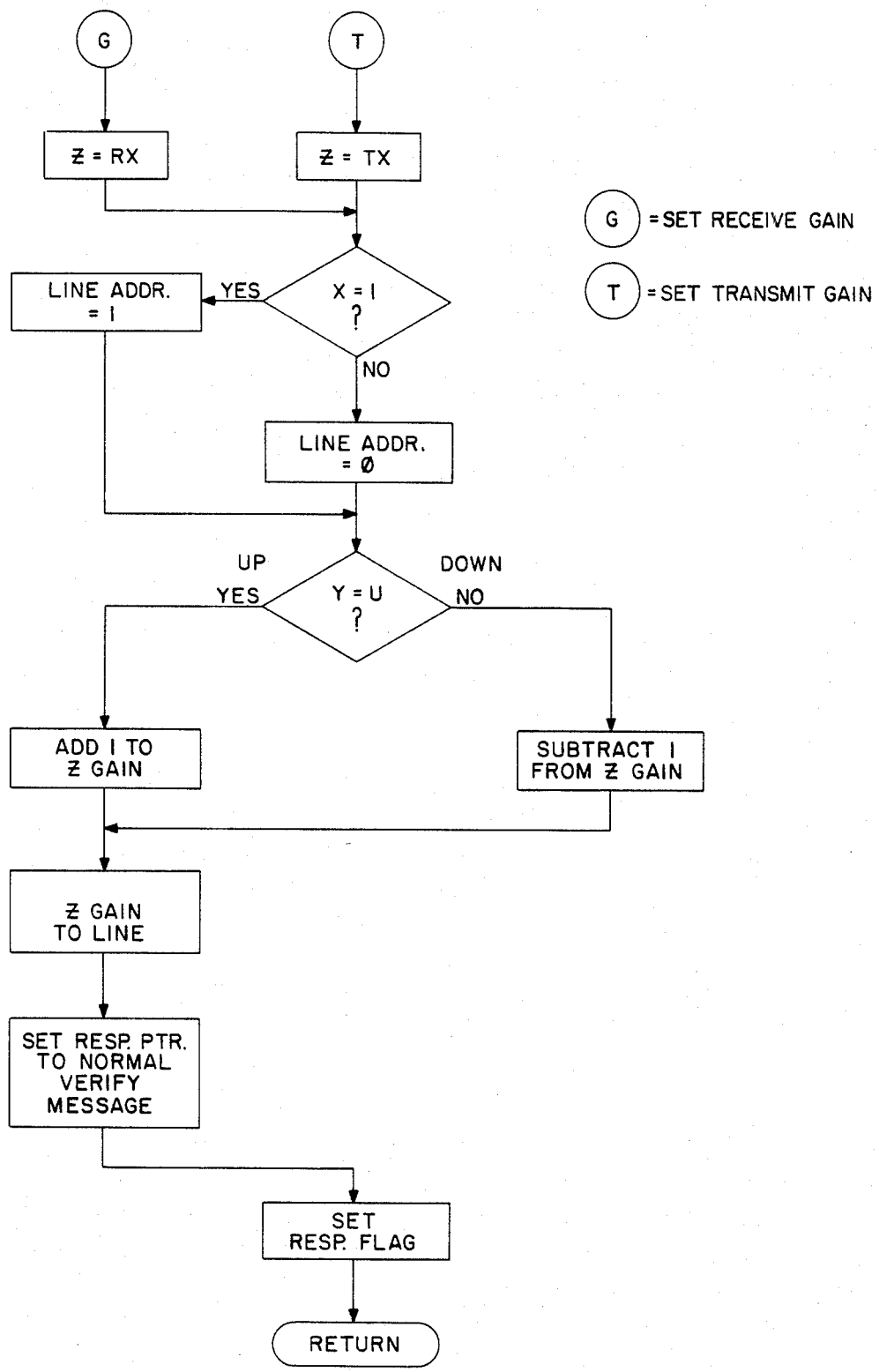
Figure 9J:
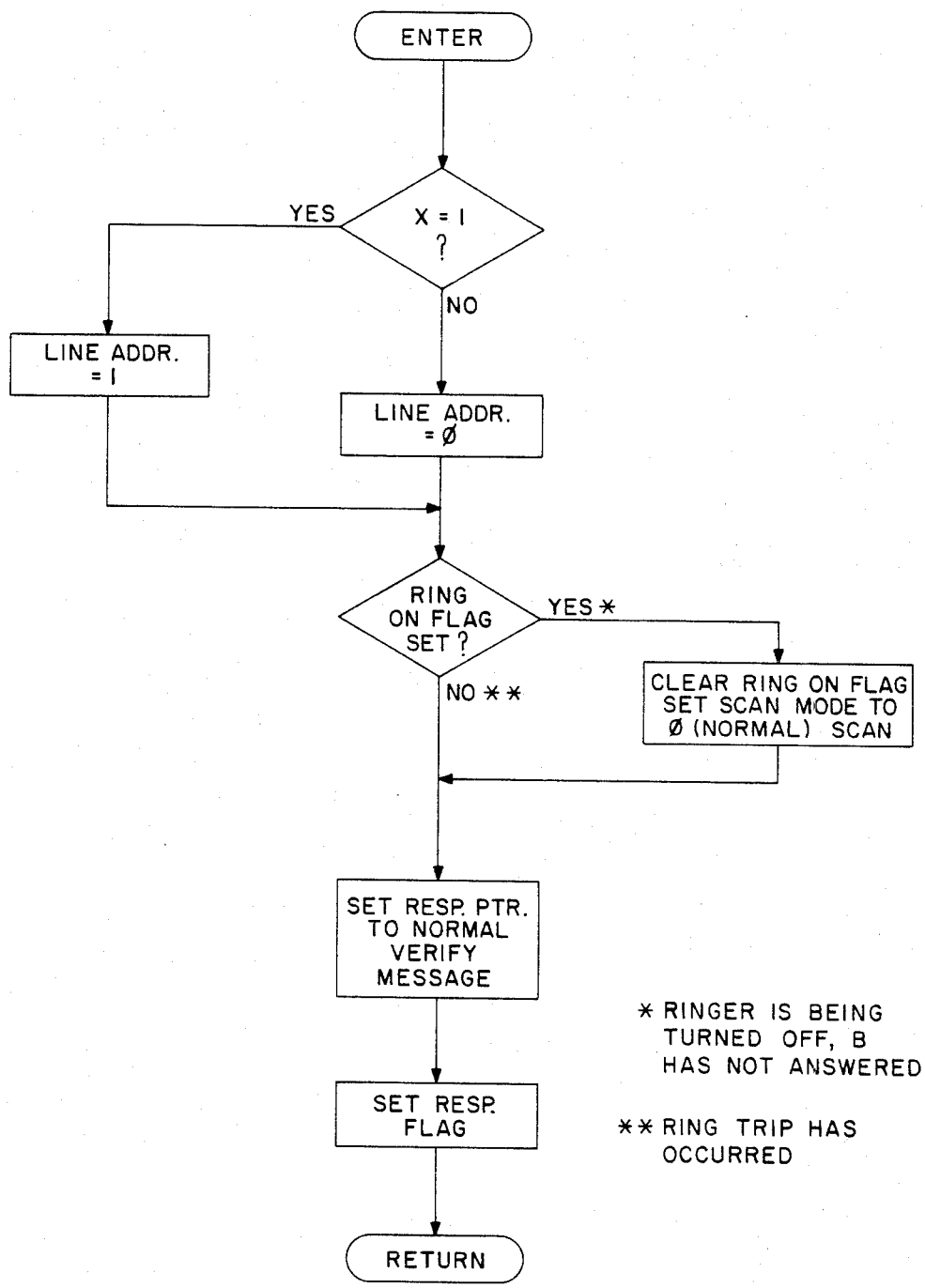
Figure 9K:
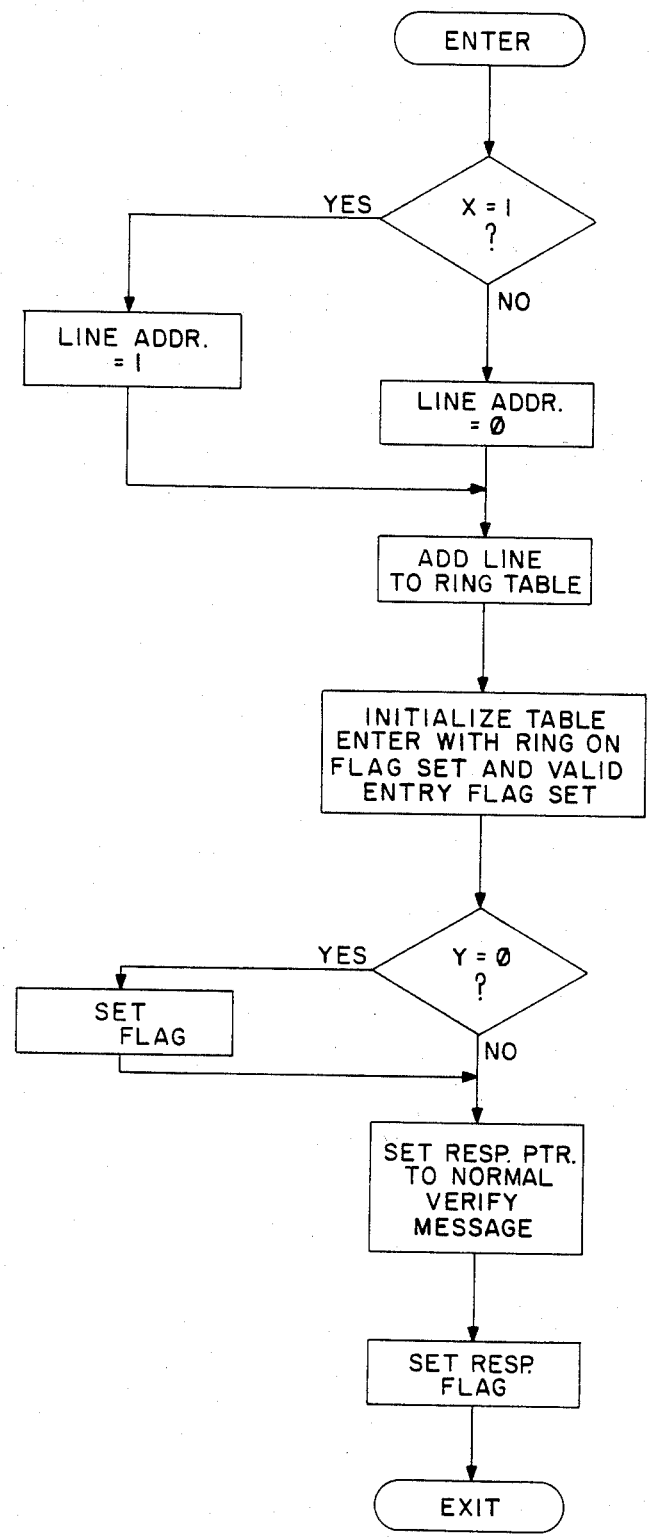
Figure 9L:
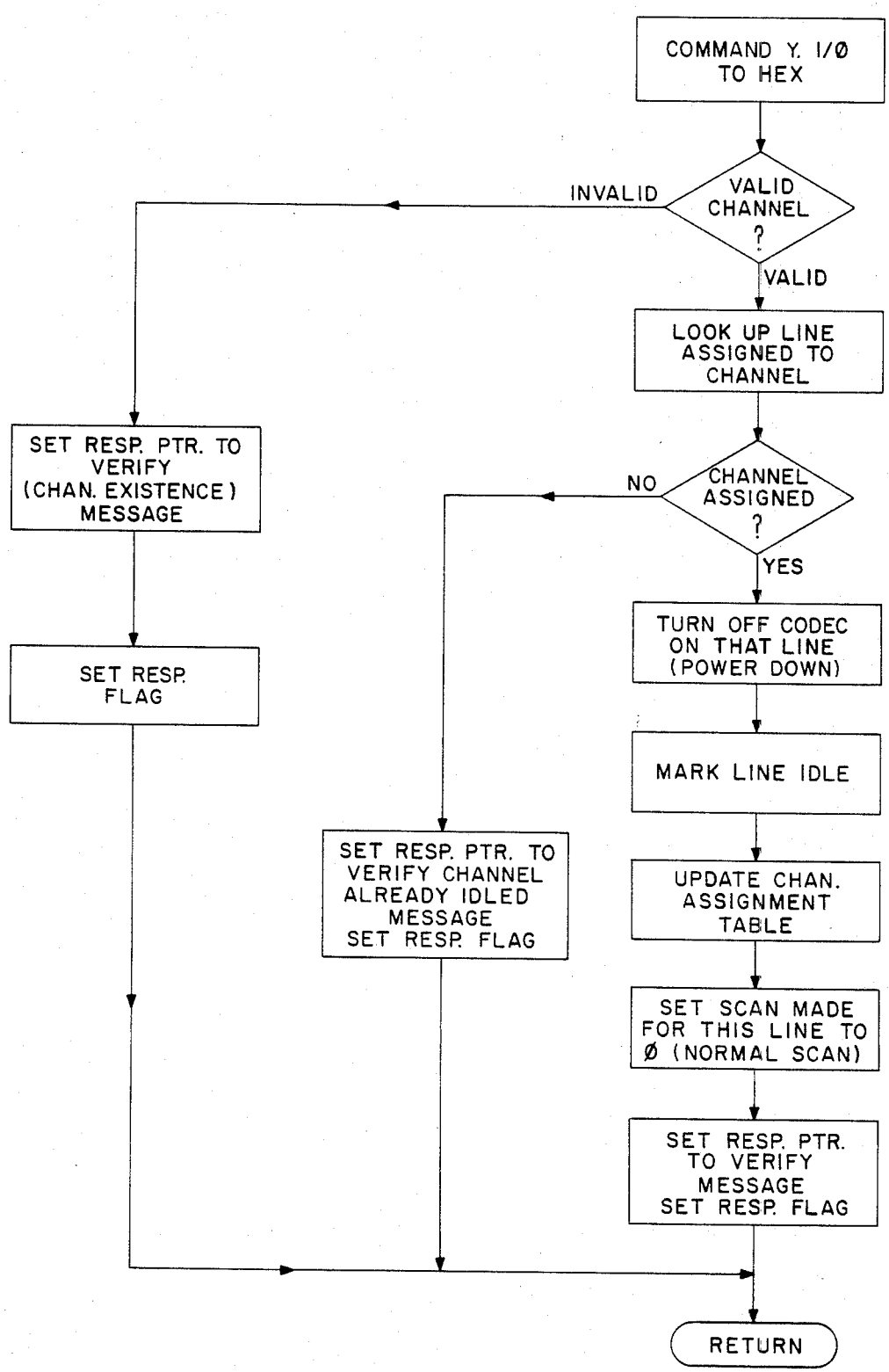

FIG. 9G illustrates the interrupt handler and common channel handle programs.

The following notes are appropriate to FIG. 9G.

EOT indicates end of test.

REV BUFF indicates receive buffer and is the first location of temporary storage for common channel commands.

RES PTR (response pointer) is set to the character in a command channel response or command.

RES Flag is set by the common channel routine when a response is to be sent.

RCU PTR is a receive pointer.

COMM FLAG indicates when a complete command has been received.

NON-SGAL CTR indicates when 5 consecutive non-signal codes have been received, this initializing resynchronization.

INT SERVFLAG indicates that a 2 millisec. interrupt has occurred.

RESP DLY CTR delays characters to 300 baud.

Figure 9M:
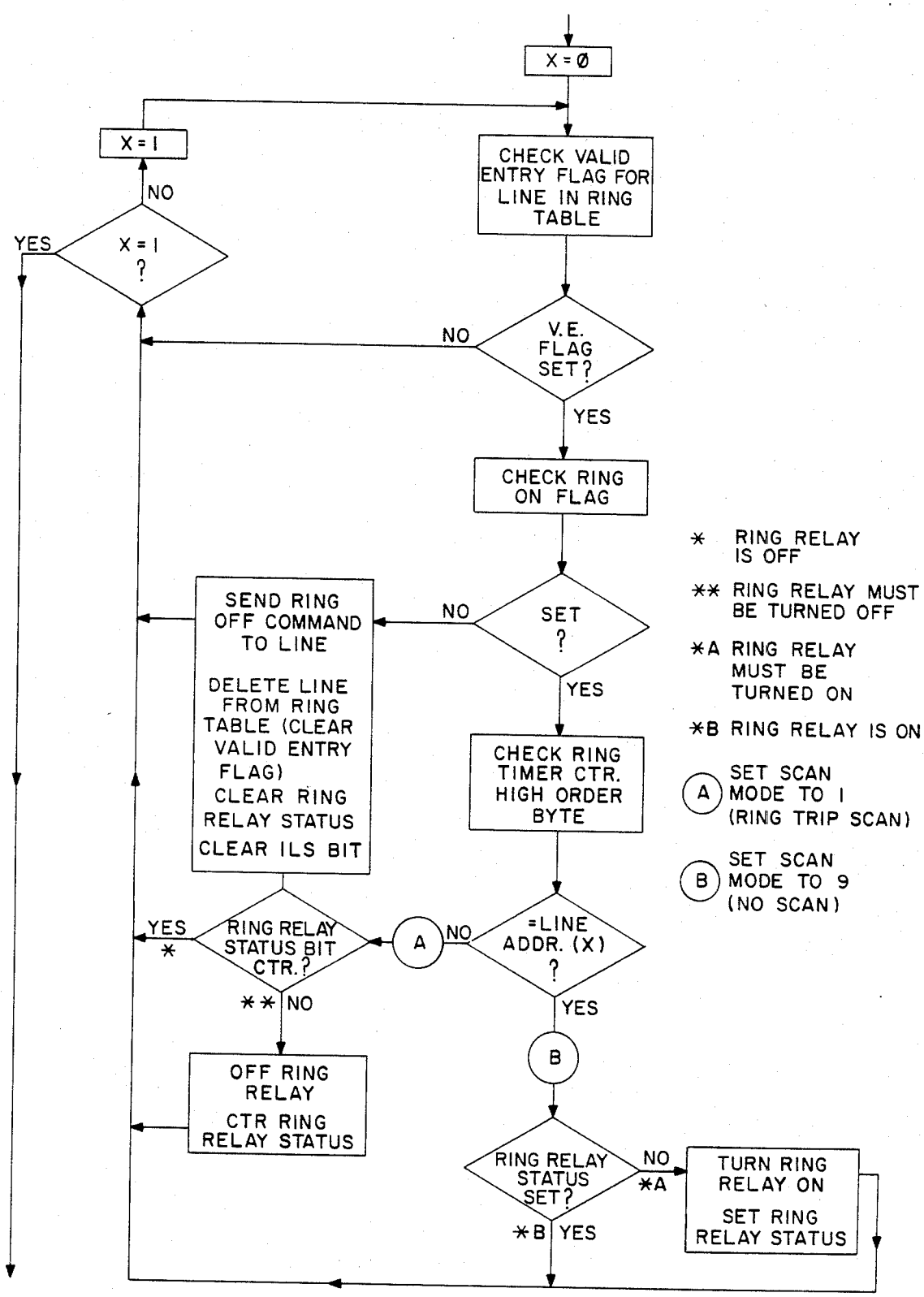
Figure 9N:
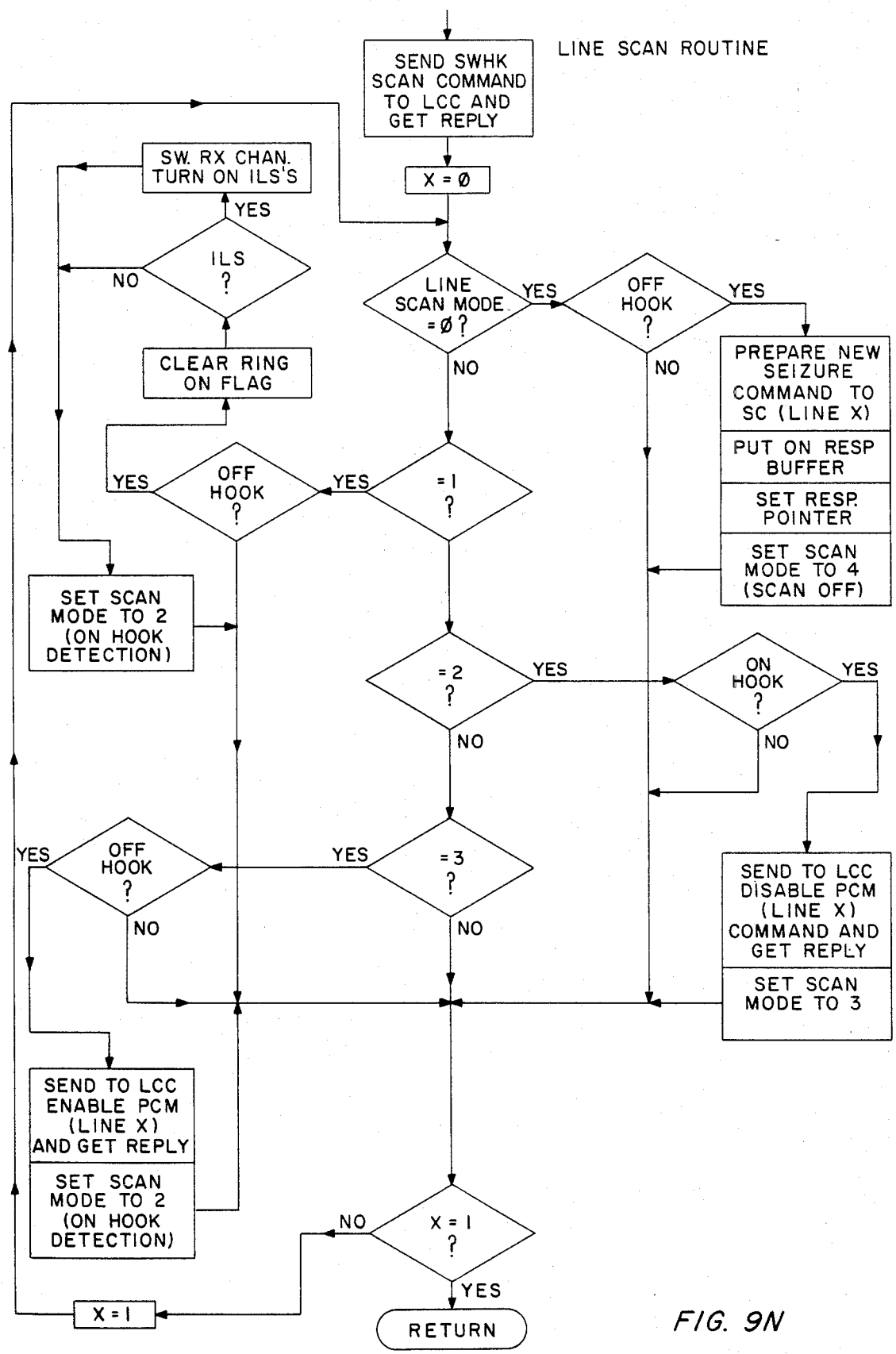

FIGS. 9H to 9L are flow charts for various task routines, FIG. 9M is a flow chart of the ringing administration program; FIG. 9N is a flow chart of the line scan routine.

Figure 21:
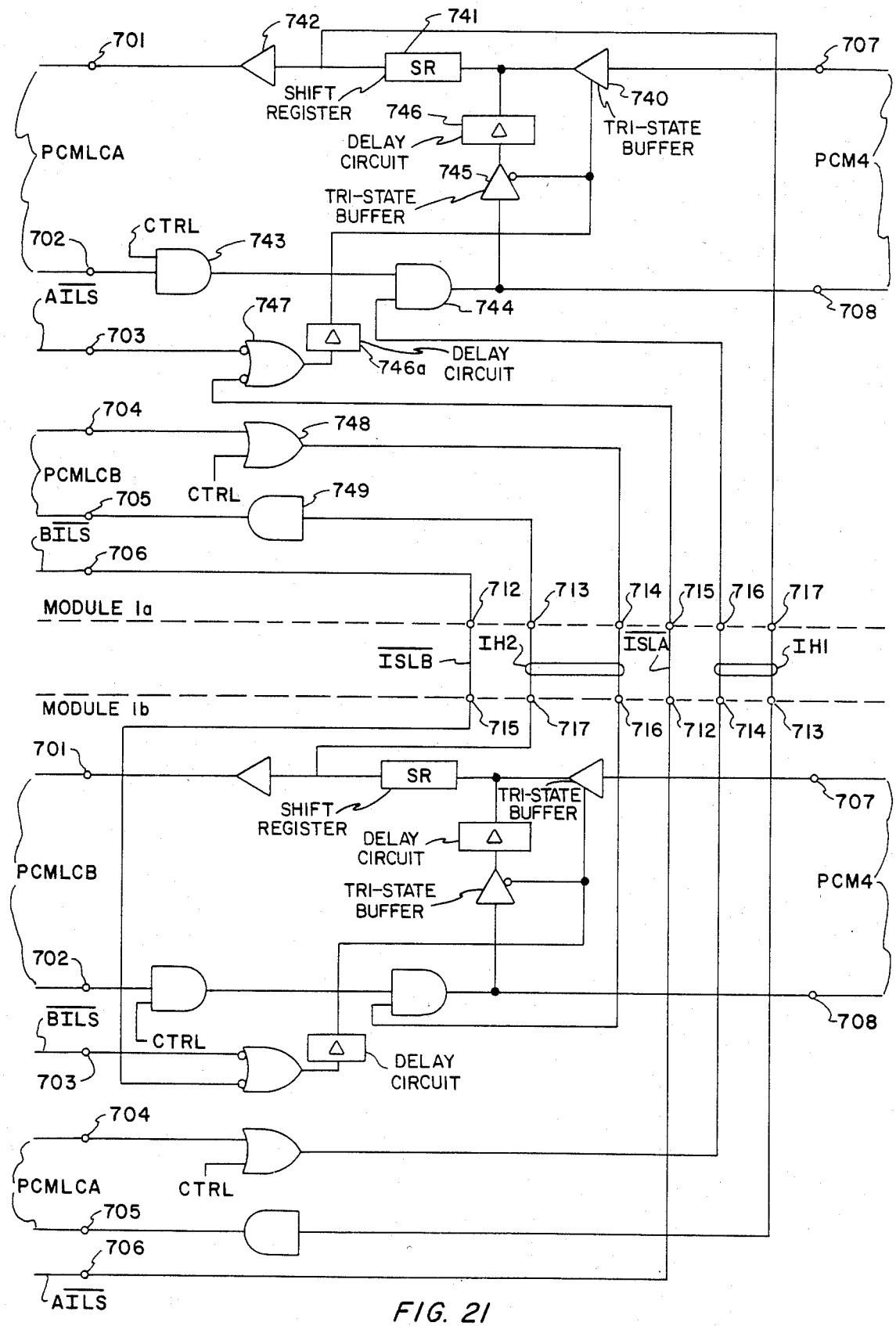
FIG. 21 illustrates in block diagram form one portion of the buffer and distributor 9 of FIGS. 2 and 2A.
Figure 22:
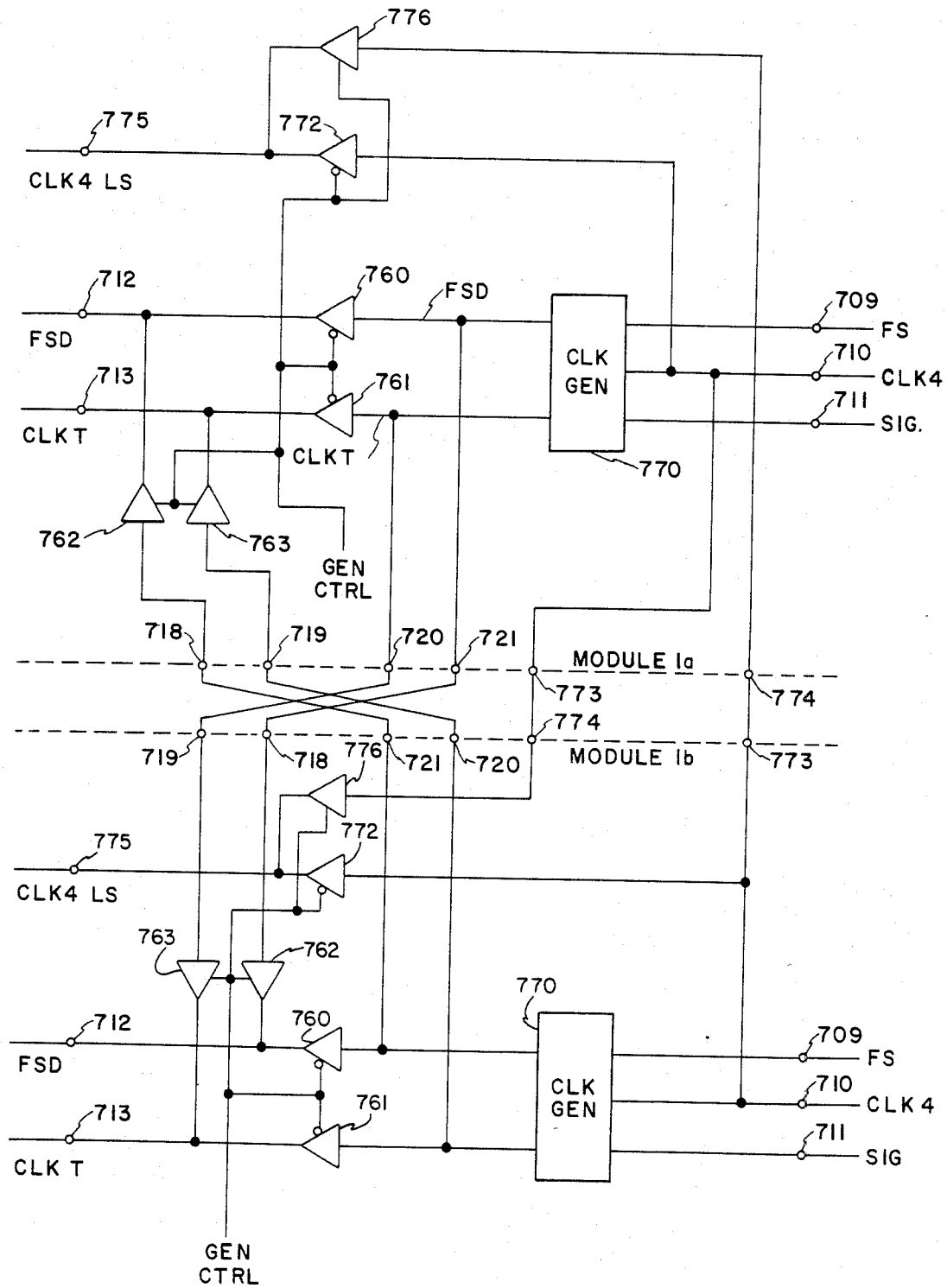
FIG. 22 illustrates in block diagram form another portion of the buffer and distributor 9 of FIGS. 2 and 2A.
Figure 23:
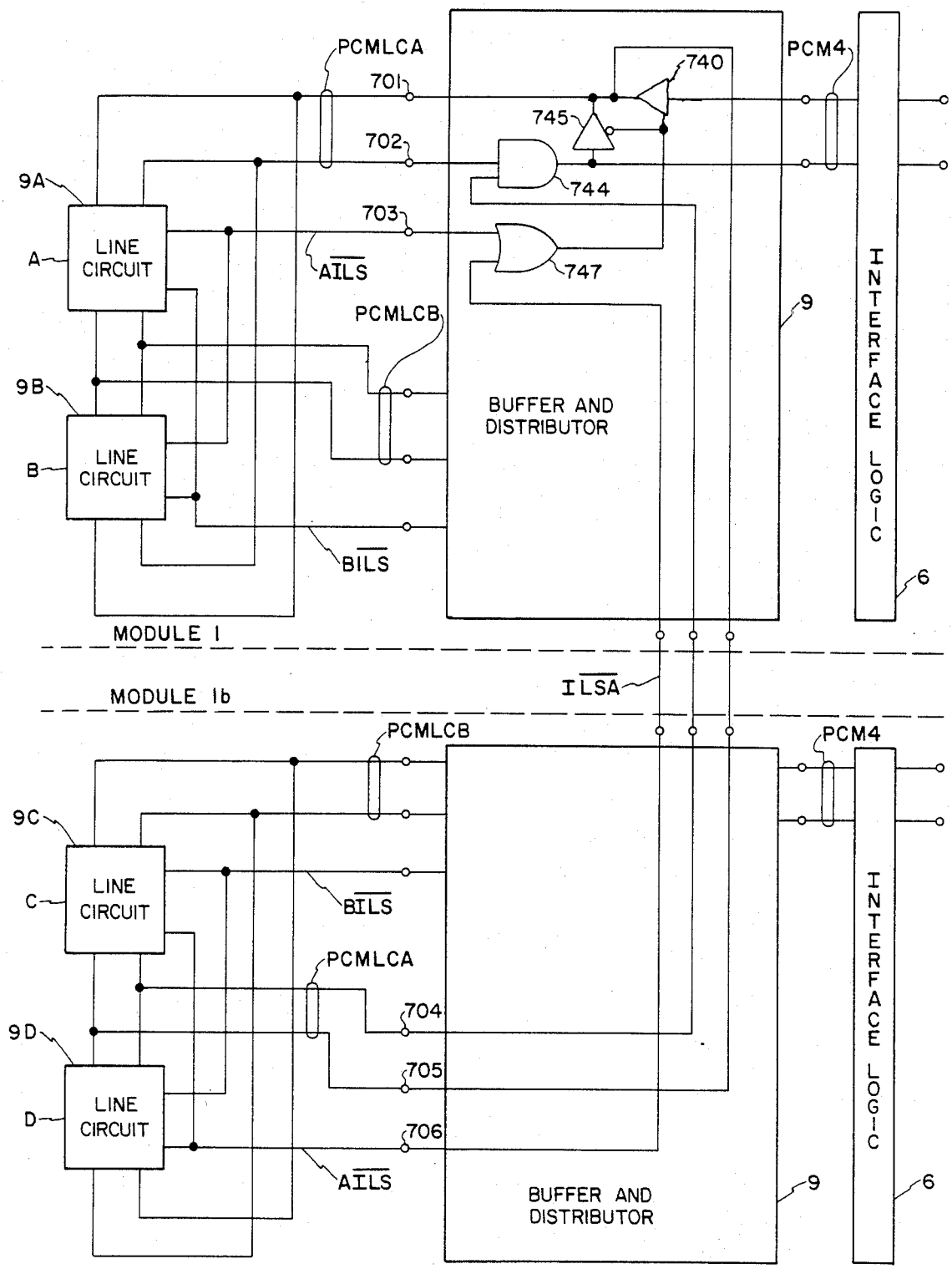
FIG. 23 is a block diagram illustrating the operation of the buffer and distributor 9 of FIGS. 2 and 2A.

6.0 Buffer and Distributor 9 (FIGS. 21, 22, 23)

FIGS. 21 and 22 illustrate the buffer and distributor circuits 9 of FIG. 2 in greater detail. For purposes of clarity, only one buffer and distributor 9 for each line switch module 1a, 1b is shown in FIGS. 21 and 22. If in accordance with the aforementioned security block concept each line switch module 1a, 1b includes more than one buffer and distributor 9, then one buffer and distributor 9 of each line switch module 1a, 1b will include both the circuitry of FIGS. 21 and 22 and the other buffer and distributor 9 of each line switch module 1a, 1b will include only the circuitry of FIG. 21. The circuitry of the buffer and distributor 9 for each of the line switch modules 1a, 1b shown in FIGS. 21 and 22 are identical and corresponding terminals of the buffer distributor cirucits have identical designations. FIG. 21 illustrates the circuitry associated with the PCM buses PCM4, PCMLCA, PCMLCB and FIG. 22 illustrates the clock distribution circuit.

6.1 Buffer (FIGS. 21 and 23)

Line switch module 1a of FIG. 21 has terminals 707 and 708 connected to PCM bus PCM4, terminals 701 and 702 conected to PCM bus PCMLCA and terminals 704 and 705 connected to bus PCMLCB. Interposed between terminals 707 and terminal 701 are gate 740, shift register 741 and buffer gate 742. Interposed between terminals 702 and 708 are gates 743 and 744. A path is provided between the output of gate 744 to the lead between gate 740 and shift register 741 via gate 745 and delay circuit 746. Gates 740 and 745 are controlled by gate 747 through delay circuit 746a. Gate 747 has one input connected to terminal 703 and another input connected to terminal 715. Gates 740 and 745 are arranged such that gate 740 is normally closed and gate 745 is normally open, but when an appropriate signal state is present at terminals 703 or 715 gate 740 is open and gate 745 is closed. Together gates 740 and 745 operate as a crosspoint switch which is utilized for intra-line switch calls as described below.

Terminals 704 and 705 are respectively coupled to terminals 714 and 713 via gates 748 and 749. Terminal 706 is connected directly to terminal 712.

The two line switch modules 1a, 1b are interconnected via intra-line switch highways 1H1 and 1H2 and leads $\overline{\text{ILSB}}$ and $\overline{\text{ILSA}}$. It should be noted that the gates 743 and 748 include an additional input CTRL which may be individually controlled in the event of a fault to inhibit PCM transmission.

When the system controller 5 (shown in FIG. 1) determines that a subscriber connected to a line circuit has requested a connection to another subscriber connected to a second line circuit within the same line switch, the system controller 5 forwards commands to line switch controller 7 shown in FIG. 2 indicating that an intra-line switch connection is required. The line switch controller 7, in turn, provides control signals to the line circuits of the originating and terminating parties thereby loading status bits in the respective line circuits. The status bits in turn provide gating of control signals AILS, BILS to the crosspoint switches 740, 745 of FIG. 21 associated with the originating and terminating line circuits. The respective AILS and BILS signals are active only during the time period when the transmit channels occur, which the line switch controller 7 has assigned to the originating and terminating line circuits.

Turning now to FIG. 23, the operation of switches 740, 745 is described. FIG. 23 shows the two line switch modules 1a, 1b each connected to the corresponding interface logic 6. In line module 1a, only two line circuits 9A and 9B are shown and in line module 6 only two line circuits 9C and 9D are shown. It should be understood that only two line circuits are shown in each line switch module 1a, 1b for purposes of clarity.

Two intra-line switch call operations will now be described, with reference to FIG. 23. First, assume that the subscriber A connected to line circuit 9A has requested a connection to a subscriber B connected to line circuit 9B, i.e., to a subscriber connected to the same line module. The system controller 5 of FIG. 1 provides control signals to line switch controller 7 of line switch module 1a, that an intra-line switch call between line circuits 9A and 9B has been requested. Line circuit controller 7 transmits commands to the line circuit groups containing line circuits 9A and 9B, indicating that an intra-line switch call connection is to be established, and that bus PCMLCA is to be used. The transmit and receive channels for the two subscribers A and B are also assigned. When the transmit channel for subscriber A occurs, line circuit 9A provides an active signal on lead $\overline{\text{AILS}}$ which closes switch 745 and opens switch 740. The transmit lead of PCM bus PCMLCA connected to terminal 702 is thus connected to the receive lead of PCM bus PCMLCA connected to terminal 701. Thus, a PCM sample from subscriber A transmitted by line circuit 9A on the transmit portion of bus PCMLCA is "looped back" to the receive portion of bus PCMLCA. The receive channel assigned to subscriber B line circuit 9B is assigned such that it corresponds to the transmit channel of subscriber A of line circuit 9A. Therefore line circuit 9B receives the PCM sample transmitted by the line circuit 9A. Likewise, when the transmit channel for line circuit 9B occurs, line circuit 9B will apply an active signal to line AILS. Switch 740 will again open and switch 745 will again close for the duration of the transmit channel. Thus, the PCM sample transmitted by line circuit 9B on the transmit portion of PCM bus PCMLCA is "looped back" to receive portion of PCM bus PCMLCA. The receive channel assigned to line circuit 9A corresponds to the transmit channel assigned to line circuit 9B. Therefore, line circuit 9A will receive the PCM sample transmitted by line circuit 9B.

Second, assume that the subscriber A connected to line ciruit 9A has requested a connection to a subscriber D connected to line circuit 9D, i.e., to a subscriber connected to a different line switch module within a line switch. The system control of FIG. 1 provides control signals to line switch controller 7 of FIG. 2 of the line switch module 1a that an intra-line switch call between line circuit 9A of line module 1a and line circuit 9D of line switch module has been requested and bus PCMLCA is to be used.

Line switch controller 7 of line switch module 1a assigns transmit and receive channels to line circuits 9A and 9D of FIG. 23. Again the assigned transmit channel of line circuit 9A will correspond to the receive channel of line circuit 9D and the assigned transmit channel of line circuit 9D will correspond to the receive channel of line circuit 9A. The crosspoint switches 740 and 745 are then operated in the same manner as described above, with the exception that line circuit 9D provides active signals to control the switches 740 and 745 instead of line circuit 9B.

Figures 24, 24B:
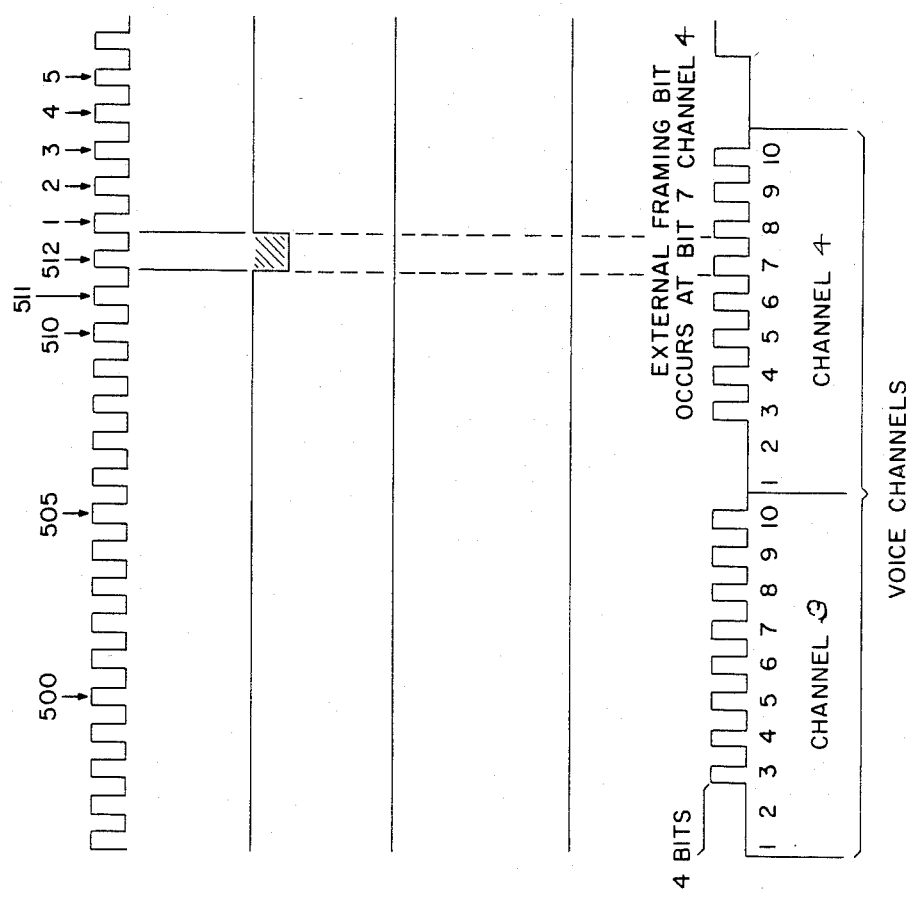
FIGS. 24A and 24B when arranged as shown in FIG. 24 are timing diagrams in the buffer and distributor 9 of FIG. 22.
Figure 24A:
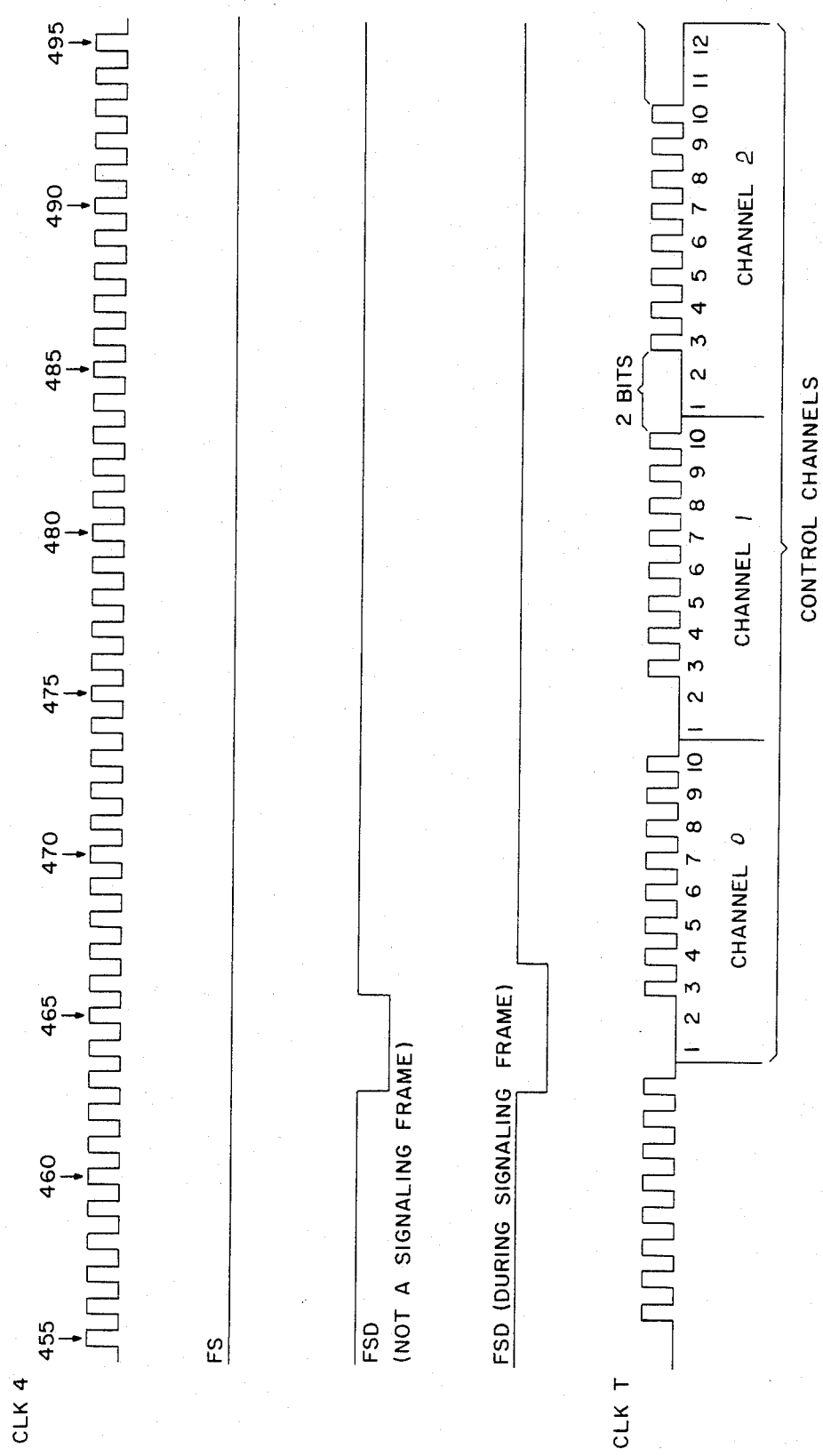

6.2 Distributor (FIGS. 22 and 24)

The clock distribution circuitry of the buffer and distributor circuits 9 for two line switch modules is shown in FIG. 22. Each buffer and distributor 9 has input terminals 709, 710, 711 connected to lines FS, CLK4, and SIG from a corresponding interface logic 6. A clock generator circuit 770 generates a CODEC clock signal CLKT and a frame clock signal FSD. The outputs FDS and CLKT are coupled to terminals 712 and 713 respectively via controlled switches 760 and 761 and are directly coupled to terminals 721 and 720. Input terminals 718 and 719 are coupled to terminals 712 and 713 respectively via controlled switches 762 and 763. Each of the switches 760, 761, 762, and 763 has a control input commony connected to lead GEN CTRL and operates such that when a signal having a first state is present on GEN CTRL, switches 760 and 761 are open and switches 762 and 763 are closed. When a signal having a second state is present on GEN CTRL switches 760 and 761 are closed and switches 762 and 763 are open. By means of the switches 760, 761, 762, 763, the FSD and CLKT signals for a line switch module may be supplied either by the clock generator 770 within the line switch module or by the clock generator in another line switch module. The GEN CTRL lead of a line switch module is connected to the line switch controller in the same line switch module.

Timing signal waveforms for the signals FS, CLK4, FSD and CLKT are shown in FIG. 24. A 9 stage counter within the clock generator 770 repetitively counts 512 4.096 mHz pulses before recycling.

The FS signal received from the interface logic 6 of FIG. 2 is a frame synchronization pulse which occurs every 125 microseconds. CLK4 is a 4.096 mHz clock signal from interface logic 6. SIG is likewise provided by interface logic 6 of FIG. 8 and indicates the occurrence of signaling frame, i.e., SIG is normally low and goes high the frame before a signaling frame. CLKT is CODEC clock which generally comprises bursts of eight pulses of a 4.096 mHz clock. The relationship of CLKT to the CODEC channels is shown. When a frame bit FSD occurs, the next 32 bits received over the PCM bus are control bits. More specifically, in a system with 10-bit channels, the next three channels are reserved for control data and channel three is extended by two bits. In a system with 8-bit channels, four channels are reserved for control.

FSD is a framing signal which will vary as shown depending on whether it occurs during a signaling frame or not.

Turning back to FIG. 22, the CLK4 lead coupled to terminal 710 is connected to output terminal 775 via switch gate 772 and is connected directly to output terminal 773. Input terminal 774 is coupled to output terminal 775 via switch gate 776. The terminal 774 is connected to terminal 773 of the other line module. The switch gates 772 and 776 operate in the same manner and under control of the same GEN CTRL signal as the aforementioned switch gates 760, 761, 762, 763 so that either CLK4 from line module 1a or 1b may be utilized as the source for 4.096 mHz clock signals on lead CLK4LS.

Figure 25A:
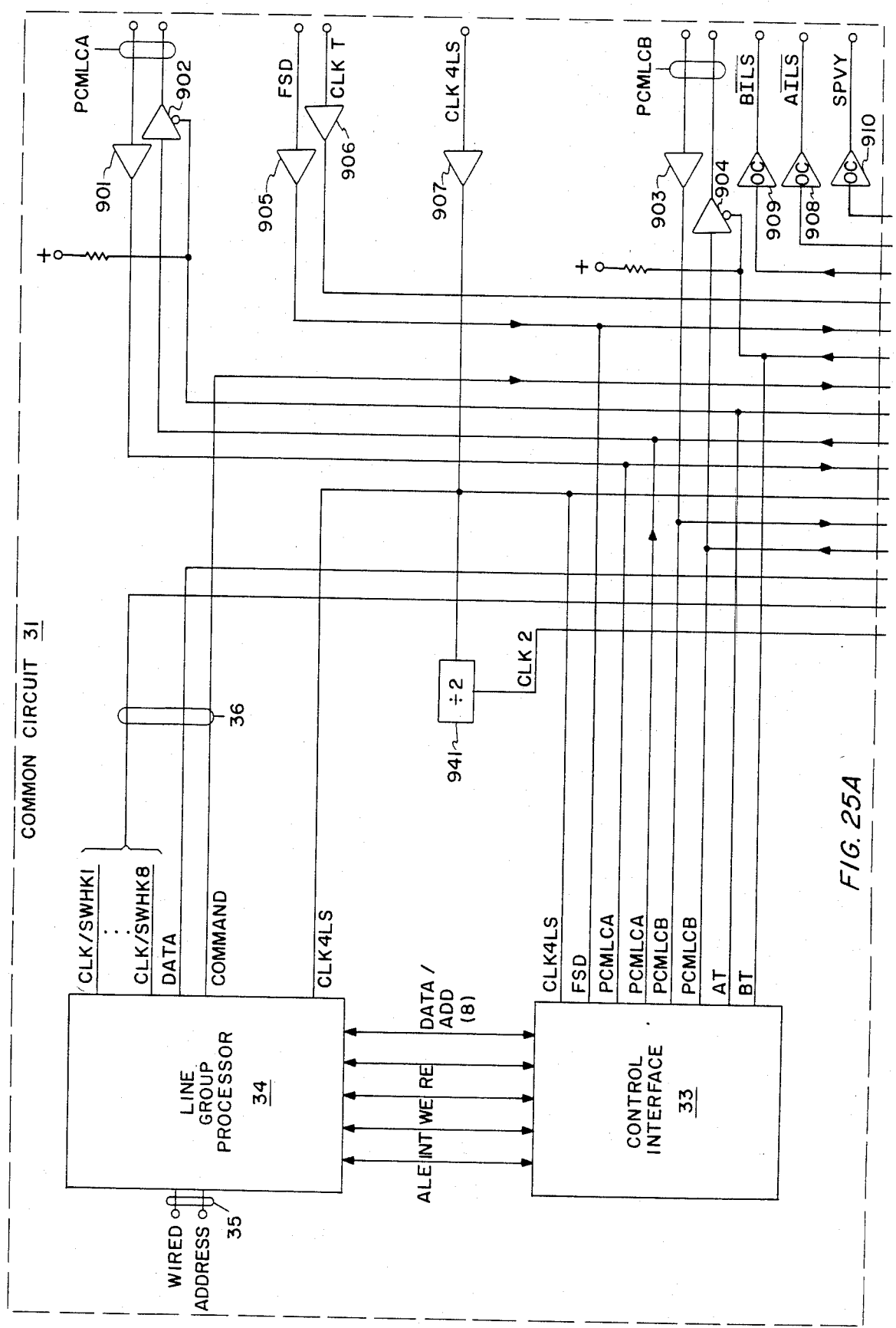

7.0 Line Card or Group (FIG. 25)

One of the line groups 11 of FIG. 2 is shown in detail in FIG. 25. Each line group includes a common circuit portion 31 and eight line circuits 32 in the illustrated embodiment. In other embodiments, the common circuit portion 31 may be on a separate circuit card and a line group may have more or less than eight line circuits. The common circuit portion includes a control interface 33 which is coupled to PCM bus PCMLCA via buffer 901 and switch gate 902, and to PCM bus PCMLCB via buffer 903 and switch gate 904. The control interface is also coupled to the FSD and CLKT leads via buffers 905 and 906, respectively. The interface 33 extracts and inserts control data bits which are transmitted and received over PCM buses PCMLCA and PCMLCB. Control data received over the buses are examined to determine if the address received matches the address of the line group. If the received address matches, an interrupt signal is sent via line INT to a line card processor 34 which may be a conventional microprocessor of a type well known in the art. It should be noted that the line group address, which the control interface 33 matches against is, in fact, supplied by the line group processor 34 and is strored by the control interface 33. The line group address is supplied to the processor 34 by leads 35 to provide a unique address to the line card.

Other control data are communicated between the processor 34 and the PCM buses PCMLCA, PCMLCB via the control interface 33, which acts as a data buffer. It should be noted that the control interface 33 is provided because the microprocessor 34 cannot operate at a high enough rate to handle 4.096 mbps serial rate on the PCM buses. In other applications, which do not utilize a high speed serial bus for control information, e.g., where control informatin is received in parallel, or at a slower rate, the control interface 33 may not be necessary. In other words, the microprocessor 34 may be directly coupled to the bus carrying the control information.

After the processor 34 determines that an operation is required within its associated line group, it will select the appropriate line circuit, as determined by portions of the control data received over PCM bus PCMLCA or PCMLCB.

The processor 34 is connected to the line circuits 32 via bus 36. Bus 36 includes ten separate leads, specifically, a separate clock lead CLK/SWHKn (n=1 to the number of circuits in a group) for each of the line circuits, a bidirectional data lead DATA, and an address latch enable lead COMMAND. Control and data information is transferred between the line group processor 34 and the per line control interfaces 44 over the common lead DATA. The information transfer is controlled by the COMMAND lead and the CLK/SWHKn leads.

Additional leads connected to the line group are CLK4LS, which is the 4.096 mHz clock signal, leads $\overline{AILS}$, $\overline{BILS}$, and SUPVY. The lead CLK4LS is distributed to the line circuits via a buffer gate 907. The per line control interface 44 of each of the eight line circuits 32 generates the signals $\overline{AILS}$, $\overline{BILS}$ and SUPVY. The $\overline{AILS}$ outputs of the line circuits are "wire-ored" to the input of buffer output gate 908. Likewise the $\overline{BILS}$ outputs are "wire-ored" to gate 909 and the SUPVY outputs are "wire-ored" to gate 910.

The 4.096 mHz clock ClK4LS is applied to a divide by two circuit 941 which provides a 2.048 mHz clock signal CLK2 for use by the line circuits.

Figure 27A:
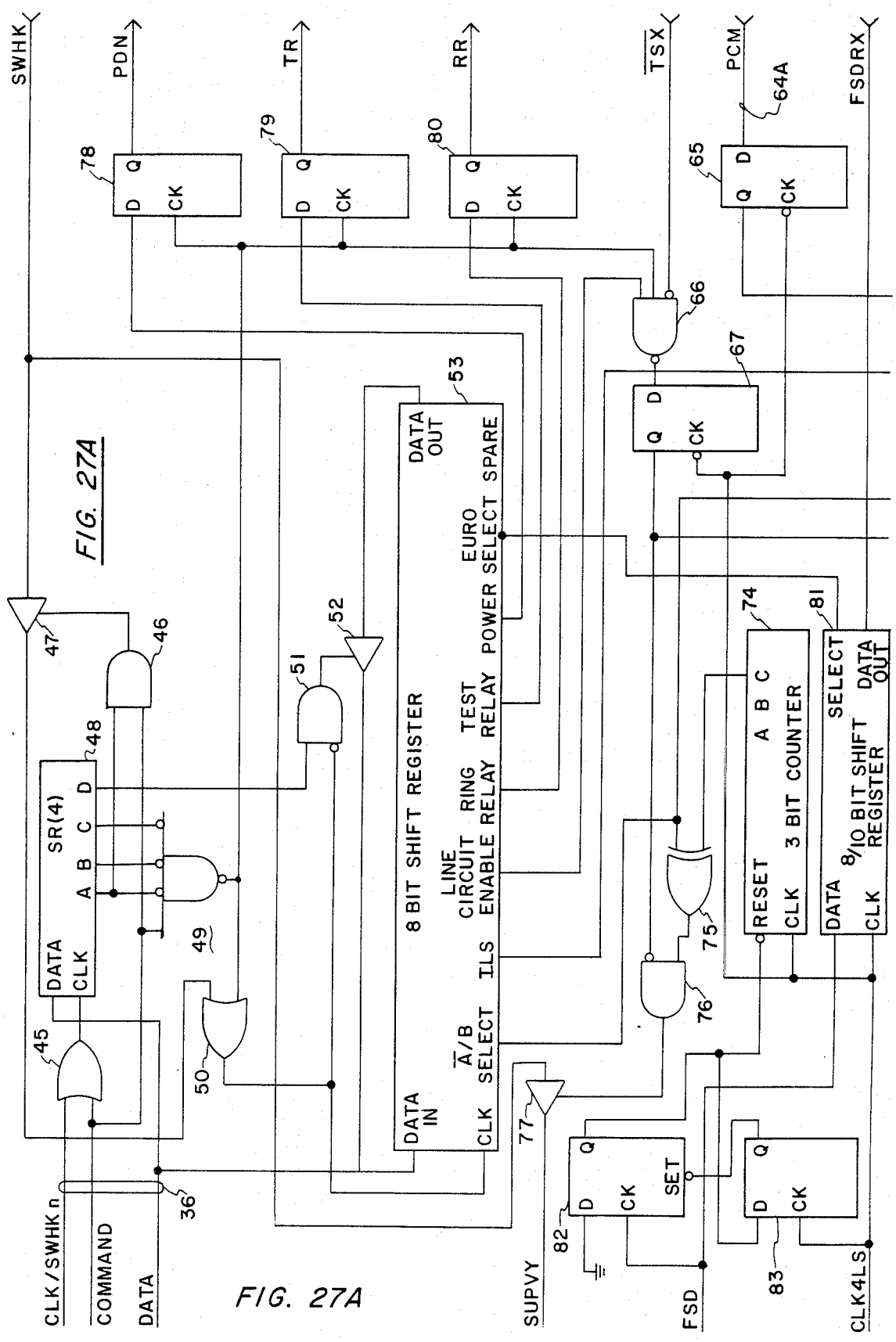

7.1 Line Circuit (FIGS. 25, 26, 27)

Each line circuit 32 includes conventional line circuit transmission components: test and ring relays 38 and 39, a subscriber line interface circuit 40, a filter circuit 42 and a codec 43. The CODEC 43 is of a known type which is operable in a so called "microprocessor controlled mode" of operation, wherein the channel assigned by a line switch or system controller to the associated line cirucit is stored by the CODEC and is used to determine when the CODEC will become active. The CODEC may be defined as "active" when the CODEC is transmitting or receiving over PCM buses. One such CODEC is commercially available from the Intel Corporation and is identified as type number 2910A.

Each line circuit 32 further includes a per line control interface 44 which interfaces between the common circuit 31 and the line circuit transmission components. Control of portions of the per line control interface 44 is achieved by the processor 34 transmitting control words over bus 36. Each of these control words is 12 bits in length and arranged in format as shown in FIG. 26. Bit 0 determines whether the control operation is a read or write; bits 1–3 are address bits for the per line conrol interface 44; bit 4 is unused; bit 5 is set according to whether the line card is in a system using 8 bit or 10 bit PCM words on its buses; bits 6, 7 and 8 are used to control external components such as power control, device test relay, and ring relay; bit 9 enables the line circuit; bit 10 is used to signify intraline switch calls; and bit 11 selects which of the two PCM buses PCMLCA or PCMLCB will be utilized by the line circuit.

One of the per line interfaces 44 of FIG. 25 is shown in greater detail in FIG. 27. The CLK/SWHKn lead is a dual function lead. More specifically, one function of this lead is that of a normal clock lead to clock data into or out of the line interface circuits 44. The other function of the CLK/SWHKn lead is to return switch hook status to the line group microprocessor 34 of FIG. 25. The selection as to which of the above two functions is provided is determined by the state of the COMMAND lead and register 48. When the COMMAND lead is high, and when bit 0 of the control word indicates a read, then gate 46 enables tri-state buffer 47 thereby coupling the lead SWHKn, which is connected to the SLIC 40 of FIG. 25 and indicates current switch hook status, to the line card processor 34 of FIG. 25 via CLK/SWHKn lead. When the COMMAND head is low, gate 45 is enabled and control bits from the DATA lead of bus 36 are shifted into shift register 48. After the four control bits 0–3 are loaded in register 48, the COMMAND lead goes high disabling gate 45 thereby holding the control bits in register 48. Gates 49 and 50 form a decoder circuit to gate clock pulses from the CLK/SWHKn lead to shift register 53. Similarly, gates 51 and 52 determine whether data will be stored in or read from register 53. If data is to be stored in register 53, the next eight bits, i.e., bits 4–11 of the control word are shifted into the register 53 from the Data lead. The $\overline{A}$/B select lead conrol gates 54, 55, 56, 58 to connect either bus PCMLCA, or PCMLCB to the coded PCM bus 64A, 64B. Flip-flop 65 provides buffer timing for the transmit PCM signal from bus 64A The $\overline{TSX}$ lead provides timing from the CODEC 43 of FIG. 25. Gate 66 controls gating of the $\overline{TSX}$ signal into buffer flip-flop 67. The Q output of flip-flop 67 is connected to gates 60 and 61 which are conrolled by the $\overline{A}$/B select bit to steer the TSX signal to leads $\overline{TSXA}$ or $\overline{TSXB}$. The Q output of flip-flop 67 is also coupled to gates 62 and 63 which are controlled by the $\overline{A}$/B select bit and the ILS bit. The outputs of gates 62 and 63 are coupled respectively to leads $\overline{AILS}$ and $\overline{BILS}$.

In some applications it may be desirable to return switch hook information at a rate fast enough to detect dial pulsing without utilizing the $\overline{A}$/B signaling bits of the PCM bus. To accomplish this, switch hook information from lead SWHK from the line circuit 32 is gated onto the supervisory lead SUPVY during one half of the channel time assigned to that circuit. The channel during which switch hook information is gated is determined by a signal on lead $\overline{TSX}$ from the CODEC 43 of FIG. 25.

A counter 74 divides each channel into two parts. Flip-flops 82, 83 provide synchronization for counter 74. The $\overline{A}$/B select bit controls gate 75 to detrmine in which of the two parts of a channel the switch hook information is to be gated. Gates 76 and 77 gate the switch hook information from flip-flop 67 to supervisory lead SUPVY. The line circuit enable bit controls gating of the lead $\overline{TXS}$ at gate 66 for maintenance purposes, i.e., if it is determined that CODEC 43 of FIG. 25 is defective, the line circuit enable bit is utilized to prevent the CODEC 43 from interfering with the operation of the remainder of the system. The ring relay, test relay and power control flip-flops 80, 79, 78, respectively control the application of ringing signals from bus 73 of FIG. 14 conrol connections to test bus and to apply power to the entire transmission circuit elements of FIG. 14. Register 81 delays the frame clock FSD from the buffer-distributor 9 of FIG. 22 by one channel time to provide a receive frame clock which is coupled to a CODEC 43 of FIG. 25 via lead FSDRX. The Euro Select bit, i.e., bit 5 of FIG. 26, determines whether the channel delay corresponds to 8 or 10 bits.

7.2 Gain/Balance (FIGS. 25, 28, 29, 30, 31)

Turning back to FIG. 25, the gain/balance control circuit 41 provides software selection of transmit gain, receive gain and balance for the line circuit. Control of the gain/balance circuit 41 is achieved by the line card processor 34 transmitting control words over the serial data bus 36 in a manner similar to that described with respect to the per line controller interface circuit 44 hereinabove. The control words are illustrated in FIGS. 28 and 29. As shown in FIG. 28, a control word for the gain/balance operations comprises 28 bits arranged as follows: a read/write bit, three address bits, a clock control bit, three unused bits, four bits for line balance network selection and eight bits each for transmit and receive gain selection. As shown in FIG. 29, a control word for CODEC control comprises 12 bits which includes a read/write bit, three address bits, two mode bits and six channel assignment bits.

Figure 30:
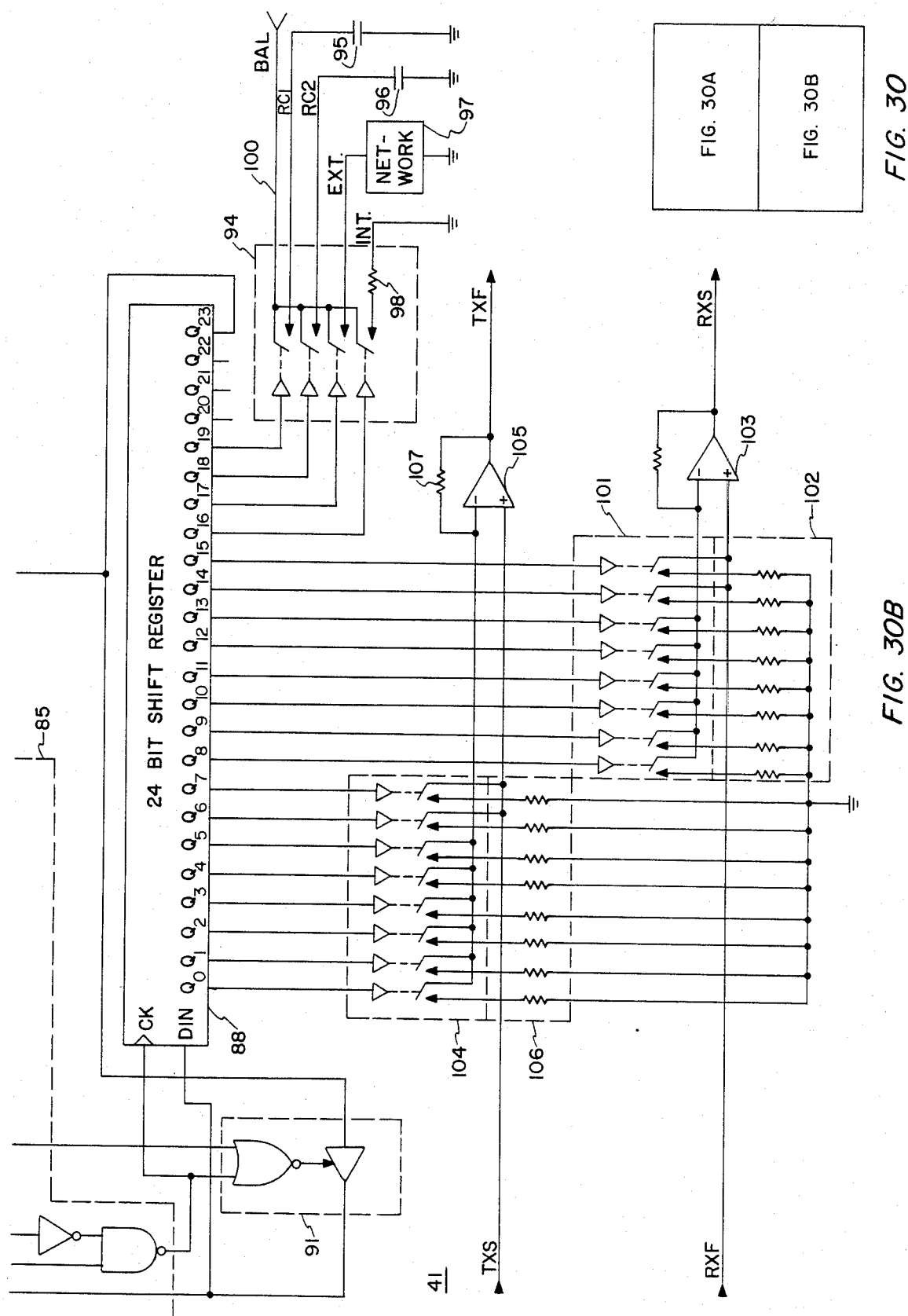
FIGS. 30A and 30B when arranged as shown in FIG. 30 show in block diagram form the gain/balance circuit 41 of FIG. 25B.
Figure 30A:
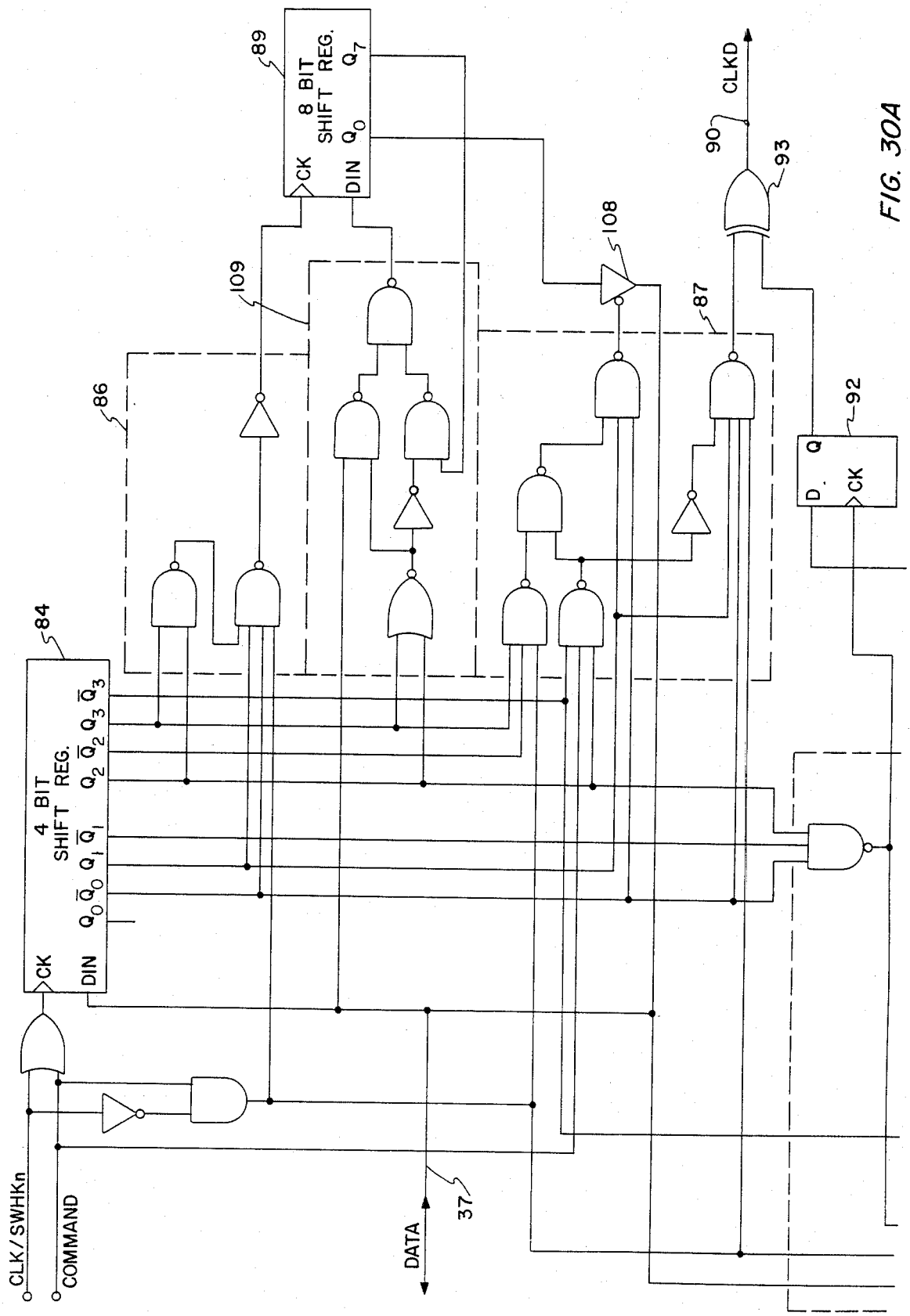

The gain/balance circuit 41 is shown in detail in FIG. 30. The first four bits of a control word are loaded into and stored by register 84 in the same manner as described for register 48 of FIG. 27. Address decoders 85, 86, 109 and 87 decode the contents of the register 84. Decoder 85 determines if the control word is to provide gain/balance settings to be stored in register 88. Decoder 86 permits loading of assigned channel information into a register 89. Decoder 87 controls the loading of channel assignment information from register 89 into the CODEC using data clock lead CLKD.

If the first four bits of the control word shown in FIG. 28 stored in register 84 as indicated above activate decoder 85, the next 24 bits are then stored in register 88. The clock control bit stored in bit Q23 of register 89 conrols the state of flip-flop 92 which in turn is connected to EXCLUSIVE-OR gate 93 to determined whether the clock signal on lead CLKD is inverted or not. The four line balance network selection bits of shift register 88 control analog solid state switches 94 to selectively connect capacitors 95 and 96, network 97 and 98, to the SLIC circuit via the balance selection lead BAL. It should be noted that the capacitors 95 and 96 and resistor 98 may be replaced with other network components or with entire networks.

Gain control amplifiers 103 and 105 are connected such that they are interposed in the transmission path between the SLIC 40 and Filter 42 as shown in FIG. 25. More specifically, receive amplifier 103 has one input connected to lead RXF connected to the receive filter and an output lead RXS connected to the receive path of the SLIC. Amplifier 105 has one input connected to SLIC transmit lead TXS and an output connected to transmit filter lead TXF.

The eight receive gain control bits stored in register 88 control analog solid state switches 101 to selectively connect resistors 102 to one input of amplifier 103. Likewise the eight transmit gain control bits stored in register 88 control analog switches 104 to selectively connect resistors 106 to one input of ampmlifier 105.

It is desirable to maintain closely controlled gain steps, e.g., less than 0.1 db, over a wide range of environmental conditions. Typically, gain circuits comprise a resistive ladder similar to that formed by resistors 106, each leg of the ladder having an analog switch connectd in series with a resistor. The ladder in turn forms a resistive divider with another resistor 107. The analog switches have a finite impedance which will vary from unit to unit and with environmental changes. Typically, analog solid state switches have impedances of nominally 50 to 150 ohms in the on-state. The variation of the on-state impedance would thus contribute a significant change to the ratio of the dividers previously used.

This problem is significantly reduced in the gain control circuits shown in FIG. 30. Specifically, an amplifier having an extremely high input impedance such as a FET differential input amplifier, e.g. 103 or 105, is connected in the divider network. The resistance values may then be made relatively high, for example, in the order of tens of thousands of ohms, and accordingly, the impedance variations in analog switches, which are on the order of a hundred ohms, will have a negligible effect on the gain through the circuit.

The gates 91 are controlled by the read/write bit of the control word to determine whether a portion of a conrol word is to be stored in register 88, or whether the contents of register 88 are to be read via the data bus 37.

A CODEC control word has two distinct addresses. One address (hereinafter first address) will result in either the register 89 being loaded or read by the line card processor 34, and the other address (hereinafter second address) will cause the contents of register 89 to be loaded into a CODEC 43. If the control word contains the first address and the read/write bit indicates a write operation, the mode and channel assignment portion of the control work is loaded into register 89 via decoder 86. If the control word contains the first address and the read/write bit indicated a read operation, the contents of register 89 are supplied to data bus 37 via gate 108, which is controlled by portion of the decoder 87. When the register 89 is read, the gates 109 will feed each bit, as read, back into the register such that after a read of the register 89, the contents of register 89 are unchanged.

If the control word contains the second address, the contents of register 89 are supplied to the CODEC over data bus 37 via gate 108. Gate 108 is controlled by portions of the decoder 87. Other portions of decoder 87, when enabled, supply clock pulses to a CODEC via gate 93 and line 90 to clock the data from bus 37 into the CODEC. The gates 109 will again operate to loop the data bits loaded into the CODEC from register 89 back into register 89.

Figure 31:
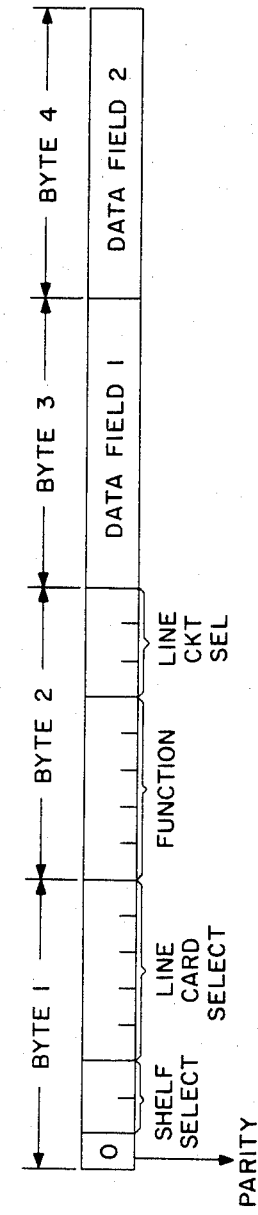
FIG. 31 illustrates the format of a control word transmitted over buses PCMLCA, PCMLCB.

As noted hereinabove the control words transmitted between the line groups and the line switch controller 7 of FIG. 2 over the buses PCMLCA and PCMLCB as shown in FIGS. 2 and 6 comprise 32 bits. FIG. 31 illustrates the format of these control words. Each control word transmitted from the line switch controller 7 of FIG. 2 comprises four eight bit bytes, indicated as Bytes 1-4. Byte 1 may include one parity bit which is calculated over the entire word, and includes seven address bits. Byte 2 includes five function bits which control the function that line card processor 34 is to perform, and three bits to designate which one of the eight line circuits on a line card is to be affected. Bytes 3 and 4 contain control data as required for the function specified by the function bits. After a control word is transmitted to the line card by the line switch controller 7, the processor 34 will respond by returning the same control word back to the line switch controller 7 if the control word indicates a write operation. If the control word indicates a read operation, the line card processor 34 will return bytes 1 and 2 as originally transmitted from the line switch controller 7 and will include respose data in Bytes 3 and 4.

Figures 32, 32A:
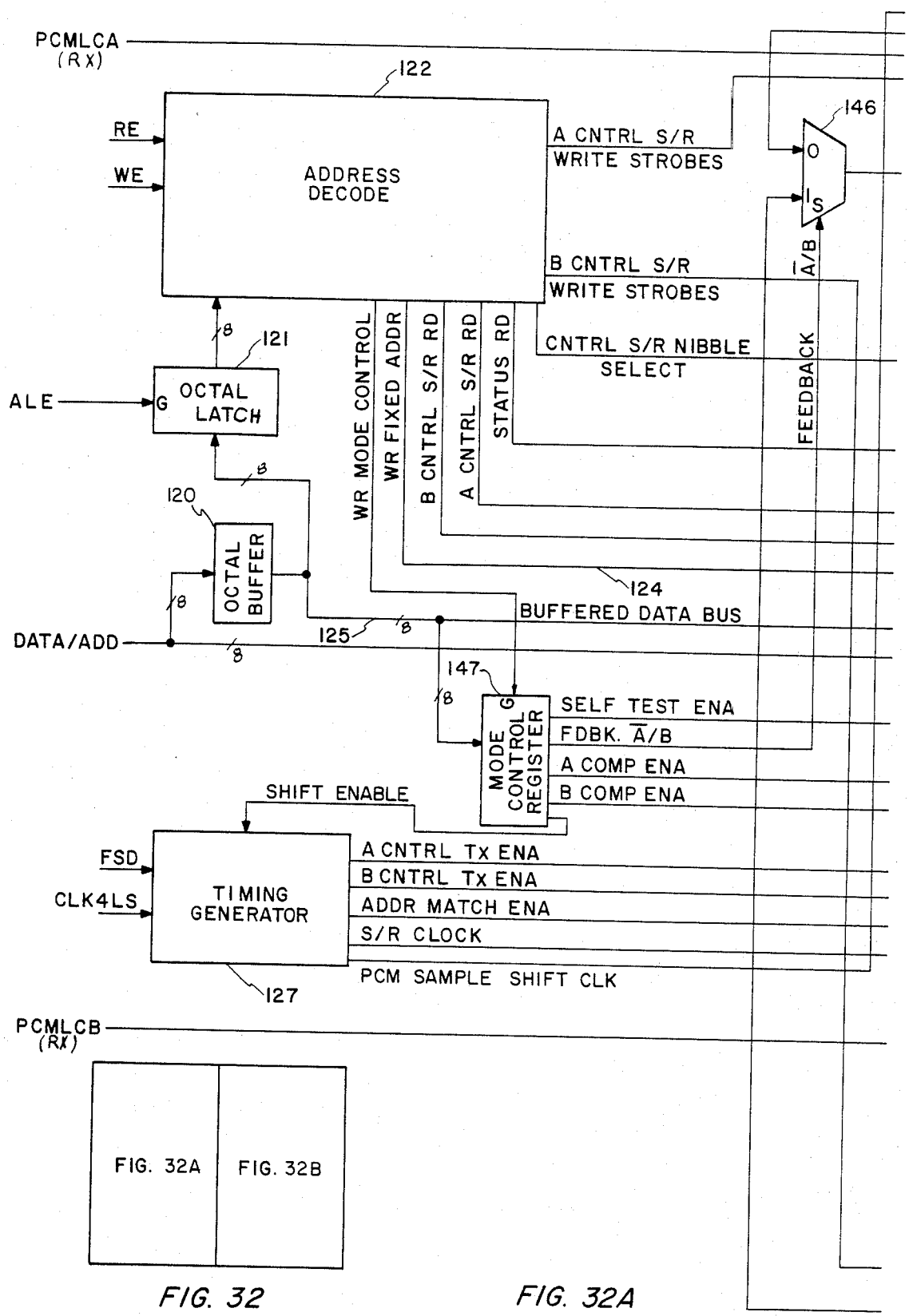
FIGS. 32A and 32B when arranged as shown in FIG. 32 illustrate in block diagram form the control interface 33 of FIG. 25A.
Figure 32B:
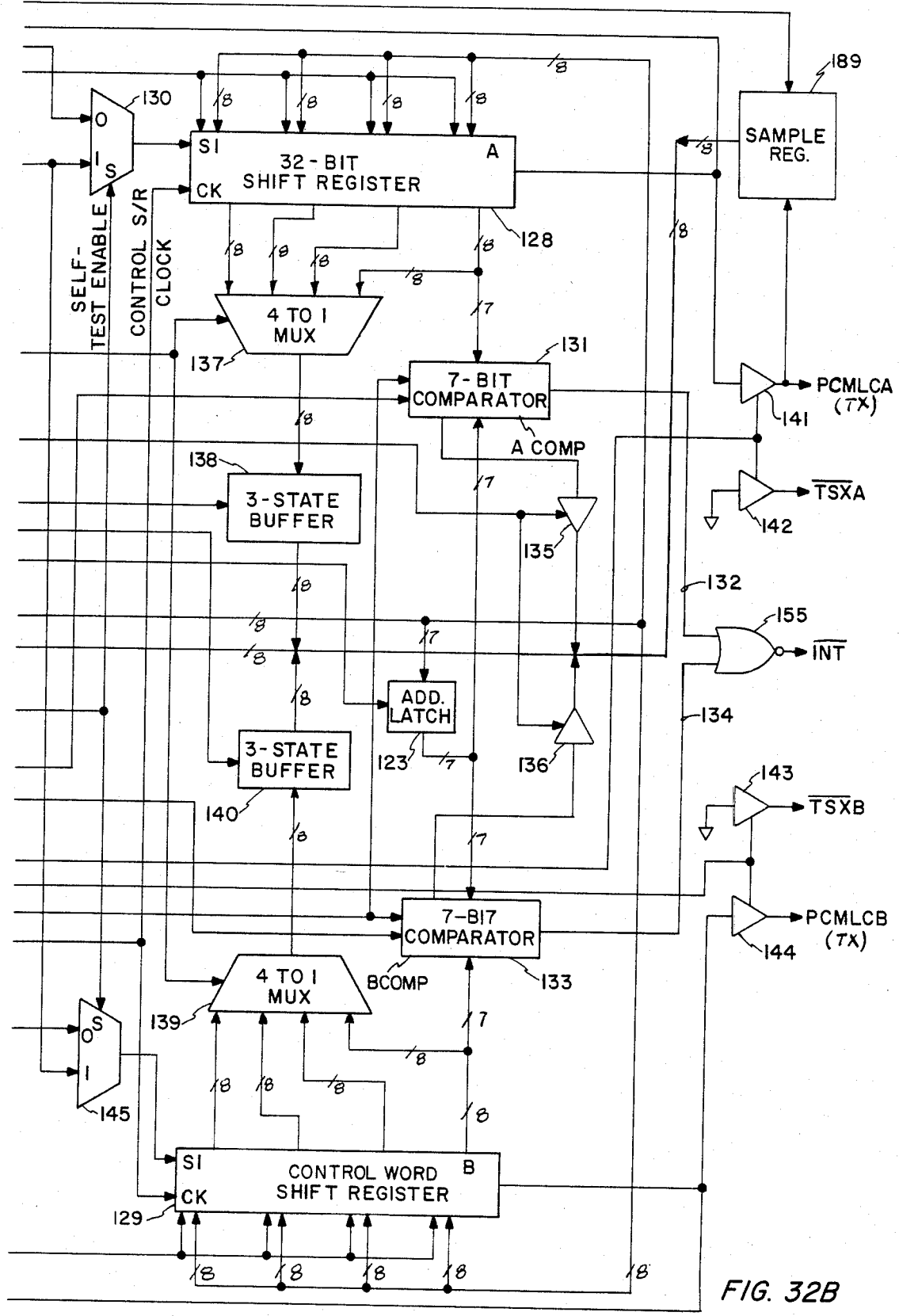

7.3 Protocol Interface Circuit/Control Interface 33 (FIGS. 25, 32)

The control interface 33 of FIG. 25 comprises the protocol interface circuit PIC and as shown in detail block diagram form in FIG. 32 is connectd to buses PCMLCA and PCMLCB. For purposes of clarity, single lines are used to represent multi-line buses and the number of lines in a bus is indicated at various points along the bus.

Initially, the line group processor 34 of FIG. 25 reads the line card address from leads 35 as shown in FIG. 25 and loads this address into the control interface latch 123 of FIG. 32 in the following manner. The processor 34 transmits the address to the latch 123 over the DATA/ADD lines to the control interface 33. This internal register address is buffered by buffer circuit 120 and is presented to the input of register 121. The line card processor 34 concurrently transmits a signal over the ALE lead which causes the internal register address to be stored in register 121. The internal register address decoder 122 decodes the address to apply an enable signal WR FIXED ADDR on lead 124. The line card processor 34 then transmits a data word which contains the line card wired address. The data word is applied to the input of register 123 via bus 125 and is gated therein via lead 124 by address decoder 122 upon receipt of a strobe signal from the processor on write enable lead WE. The register 123 then contains the wired address of the line card.

A timing generator circuit 127 receives the FSD and CLK4LS clock signals from the buffer distributor 9 of FIG. 21 and generates various timing signals for controlling the operation of the control interface 33. The FSD signal is used to control the timing of a clock signal on lead S/R clock. The clock signal on S/R clock controls the storing or transmitting of control words between bus PCMLCA and register 128 and between bus PCMLCB and register 129. Initially, a control word is received on one of the two buses e.g., PCMLCA. As the control word appears on bus PCMLCA in serial form it is gated via selector circuit 130 to shift register 128 using S/R clock. Registers 128 and 129 are 32 bit registers. After the proper number of clock pulses have been provided by S/R clock, a strobe signal is applied to the ADDR MATCH ENA lead thereby enabling a comparator 131 which compares the address portion of the control word in register 128 with the line group address stored in latch 123 and generates a signal on lead 132 if the addresses are the same. Similarly control word received on bus PCMLCB are stored in register 129 via selector 145 and the address portion thereof is compared to the line circuit address by comparator 133 which generates a signal on lead 134 if those addresses are the same. Gate 155 logically "or's" lead 132 and 134 and will provide a signal to the line group microprocessor 34 of FIG. 25 on its interrupt lead INT if an address match occurs for either bus PCMLCA or PCMLCB.

After the line group processor 34 is interrupted it will then obtain the control word by first transmitting an addres over the DATA/ADD bus. The address is stored in latch 121 and decoded by decorder 122 which, in turn activates the STATUS RD line. The STATUS RD line enables gates 135 and 136 which provide indications on the DATA/ADD bus as to which of the two comparators 131 or 133 detected the line card address.

The line group processor 34 will then, via a series of commands, obtain 24 bits of the control word from the appropriate one of the registers 128 or 129. If the control is obtained from register 128, then multiplexer 137 and buffer 138 are utilized. Similarly if the control word is to be obtained from register 129 then multiplexer 139 and buffer 140 are utilized.

Response data from the line group processor 34 may be returned to the line switch controller 7 via buses PCMLCA or PCMLCB.

Response data from the line group processor 34 is stored in a preselected one of the registers 128, 129 by a series of commands from the processor 34 which controls the gating of data through buffer 120 via bus 125 from register 128 or 129. The response data is written into register 128 or 129 as eight bit parallel bytes. The response data is transmitted from the registers 128, 129 over the buses PCMLCA, PCMLCB respectively by the S/R clock signals in the following manner.

After the last byte of data is stored in the selected register 128, 129, the timing generator 127 will generate an enable signal at a predetermined time over leads A CONTRL or B CONTRL respectively. The outputs of gates 141 and 144 are connected to buses PCMLCA and PCMLCB respectively. The outputs of gates 142 and 143 are "wire-ored" with the leads $\overline{TSXA}$ and $\overline{TSXB}$ respectively from the line circuits. The S/R clock is used to shift the response data onto PCMLCA or PCMLCB. More specifically, the S/R clock provides pulses at a 4.096 mHz rate, with 42 pulses being supplied in a burst during one frame. The first 32 clock pulses of the 42 pulse burst are used to clock the response data from the registers 128 or 129 onto bus PCMLCA or PCMLCB.

The last 32 clock pulses of the 42 pulse burst are used to clock the control data from the bus PCMLCA or PCMLCB into the register 128 or 129. During the time when the middle 22 pulses are provided, control data is being written into registers 128 or 129 while simultaneously response data is being read from the register 128 or 129. This arrangement is provided because system timing constraints require a 10 bit skew between the receive PCM data bus and the transmit PCM data bus.

Selector 146 is provided for maintenance purposes. The register 147 is also provided for maintenance purposes and permits the processor 34 to disable either or both of the comparators 131, 133 and to control selectors 130, 145 and 146.

7.4 Self Test (FIGS. 32, 33, 34, 35)

One feature of the control interface 33 is that it includes a self-test mode of operation in which the serial output of one of the shift registers 128 or 129 is selected as the serial input data source for both of the registers 128 and 129. Selectors 145, 146 and 130 provide feedback paths for the registers 128, 129 during the self-test mode. In this test mode, the shift registers 128 and 29 are loaded with test data by the microprocessor and allowed to shift for several frames. Proper operation of the shifting function of the registers 128, 129 and the address decoder circuit 122 can thus be verified without affecting the PCM buses PCMLCA, PCMLCB.

A self-test program routine is executed during power-on initialization of the line switch. This self-test routine exercises the circuitry of the control interface 33 and produces a go/no-go result.

The test initialized the control interface by loading a code in the mode control register 147 which provides a signal on the SELF TEST ENA line to operate selector 130 and a signal on the FDBK A/B line operates selector 146 such that a feedback path for register 128 is enabled. A signal is provided to the timing generator 127 which responds to preventing transmission over the buses PCMLCA, PCMLCB, and by inhibiting the shifting of the registers 128, 129. The A comparator 131 and B comparator 133 are enabled.

Next, A register 128 is loaded with the following test data (in hexadecimal): byte 1=63, byte 2=C1, byte 3=F8, byte 4=$\phi$F. The address latch 123 is loaded with F8, i.e., the same as byte 3 on register 128. After the A register and address latch 123 have been loaded, the A and B registers 128 and 129 are allowed to shift for eight PCM frames. FIG. 33 illustrates the contents of the A and B registers 128, 129 at the start of the self-test and after each frame of shifting. Note that the A and B registers 128 and 129 are clocked 42 times each frame as explained above. The A and B control registers are 32 bits long. Therefore, the test data in the A register 128 will be in effect rotated left (left being defined as toward the most significant bit position) a total of 10 (42 (modulo 32) places after each) 42 pulse clock burst. After eight frames of shifting the test data in the A and B registers 128 and 129 will have been rotated 16 (42×8 modulo 32) places left of the position of the test data at the start of the test. Since the address latch 123 contains F8 and the A and B address comparators 131 and 133 are enabled an address match should occur with both comparators only during the eighth frame of shifting. If both comparators 131 and 133 do not indicate a match condition during the eighth frame, a failure has occurred. If both comparators do indicate a match, the contents of both the A and B registers 120, 129 are compared with the following expected data: byte 1=F8, byte 2=OF, byte 3=63 and byte 4=C1. Any mismatch of the data in the A and B registers 128 and 129 with the expected data indicates a failure.

FIGS. 34 and 35 are a program listing in MCS—48 assembly language code implementing the self-test operation for a line group controller.

7.5 Automatic Gain Setting (FIGS. 25, 30, 32, 36, 37 A-C)

The control interface 33 of FIG. 32 includes a voice channel data sampling register 189 which permits the microprocessor to monitor channel data appearing on one of the PCM buses PCMLCA. This channel sampling feature allows the line group processor to measure and thus provide automatic gain setting of the line circuits. Register 189 is an 8 bit shift register that is serially loaded every frame with data appearing on a predetermined channel of bus PCMLCA. The PCM SAMPLE SHIFT clock from timing generator 127 clocks the serial data from PCMLCA into the register 189. Between the 8-pulse clock bursts, data in register 189 can be read by the microprocessor sending an appropriate command to the control interface. Note that for clarity, the connection from the address decoder 122 to the register 189 has not been shown.

The above described variable gain circuit of FIG. 30 permits adjustment of the gain of the amplifiers 103 and 105 to a predetermined value without costly hand selection of parts. The analog switches 101, 104 respectively control portions of a resistance divider 102, 106 to change the gain of amplifiers 103, 105, respectively.

In the embodiment shown, the predetermined value for amplifier 103 is set such that the overall loss in the receive path of the line circuit is −0.25 dB (decibel). The predetermined value for amplifier 105 is set such that the overall gain in the transmit path of the line circuit is 0 dB. The accuracy of these settings is made to within ±0.1 dB. The incremental difference between adjacent steps of PCM representations representing the peak required signal levels (of around 0 dBm (decibel relative to a milliwatt test tone)) is approximately 0.4 dB for mu-law encoding. As shown below, it is possible to use the PCM representations to measure analog signals peaks with an accuracy greater than that of the PCM steps.

The frequency for a reference signal used in measuring the gain of the transmission circuit is chosen as 1.024 kHz sampling rate. By chosing the frequency of the reference signal in this manner, the reference signal will be sampled at or near its peak amplitude a predictable number of times over a predetermined number of cycles.

For a 1.024 kHz signal sampled at an 8 kHz rate, 16 cycles are required before the PCM representations are repeated. During a 16 cycle period, 125 PCM representations are generated.

From mu-law tables it can be determined that the maximum linear level of a signal that can be encoded is 8159 linear units and, by definition, corresponds to the peak of a signal having an rms (root means square) level of +3.17 dBm. The peak value of the 0 dBm reference signal can be calculated by reducing 8159 by 3.17 dB. In this manner, the peak value of 0 dBm signal is determined to be 5664.1785 linear units. From mu-law tables it can be determined that 5664.1785 linear units lies between level 118 which represents 5599 linear units and level 119 which represents 5855 linear units. It can be calculated that levels 118 and 119 are approximately 0.4 dB apart.

If 125 successive PCM samples are monitored and at least one sample corresponds to level 119 or a higher level, the signal represented by that group of 125 samples is greater than 0 dBm by more than 0.278 dB.

If all samples in a group of 125 successive PCM samples are less than level 118 then the signal represented is less than 0 dBm by more than 0.1 dB. For a 0 dBm signal, the number of samples N out of 125 successive PCM sample that are at level 118 either positive and negative polarity is determined as follows:

The reference signal may be represented as A sin $\omega$t. If decision level 118 is represented by A′ then $$A' = A \sin (\pi/2 - Q) \tag{1}$$

where $\pi/2 - Q$ represents the angular displacement from zero degree where the reference signal reaches level 118.

Solving equation (1) for Q yields $$Q = (\pi/2) - \sin^{-1}(A'/A) \tag{2}$$

The probability that any one PCM sample in a group of 125 successive samples will be above level 118 is $$P = 4Q/2\pi = 2Q/\pi \qquad (3)$$

Substituting equation 2 in equation 3 yields $$P = \frac{2}{\pi}\left(\frac{\pi}{2} - \sin^{-1}\frac{A'}{A}\right) = 1 - \frac{2}{\pi}\sin^{-1}\frac{A'}{A} \qquad (4)$$

The number of PCM samples in a group of 125 successive samples which will be at level 118 for a 0 dBm signal is $$N = 125P \qquad (5)$$

For a 0 dBm signal $$A = 5664$$

$$A' = 5599$$

and N may be calculated as 12.08.

Equations 1–5 may be used to determine the signal levels corresponding to the number of occurrences N of level 118 samples in a successive group of 125 PCM samples yielding the results shown in the table below:

TABLE

| N | A(dBm) | N | A(dBm) | N | A(dBm) |
|---|--------|---|--------|---|--------|
| 1 | −.0998 | 9 | −.0447 | 16 | +.0762 |
| 2 | −.0978 | 10 | −.032 | 17 | +.0992 |
| 3 | −.0944 | 11 | −.0173 | 18 | +.1236 |
| 4 | −.0896 | 12 | −.0014 | 19 | +.1484 |
| 5 | −.0834 | 13 | +.0159 | 20 | +.1767 |
| 6 | −.0758 | 14 | +.0346 | 21 | +.2055 |
| 7 | −.0669 | 15 | +.0547 | 22 | +.2357 |
| 8 | −.0565 | | | | |

In the illustrative embodiment, if 9 to 16 level 118 samples occur during 125 successive PCM samples, it is assumed that the samples represent a signal of 0 dBm. From the above table it is seen that this sample range represents 0 dBm over a range of −0.0447 dBm to +0.0762 dBm.

Advantageous use of the variable gain circuitry is made to permit automatic adjustment of the gain setting. Each line circuit shown in FIG. 25 is connected via a test relay 38 to a test bus. The test bus is multiplied to all the test relays of a line group and may also be multiplied to all line groups in a line switch module. Alternatively, the serial test buses may be utilized within a line switch module, each test bus being multipled to one or more line groups. To set the TX gain of a line circuit, i.e., the gain of amplifier 105, the line switch controller will connect an analog milliwatt generator to the proper test bus.

Figure 36:
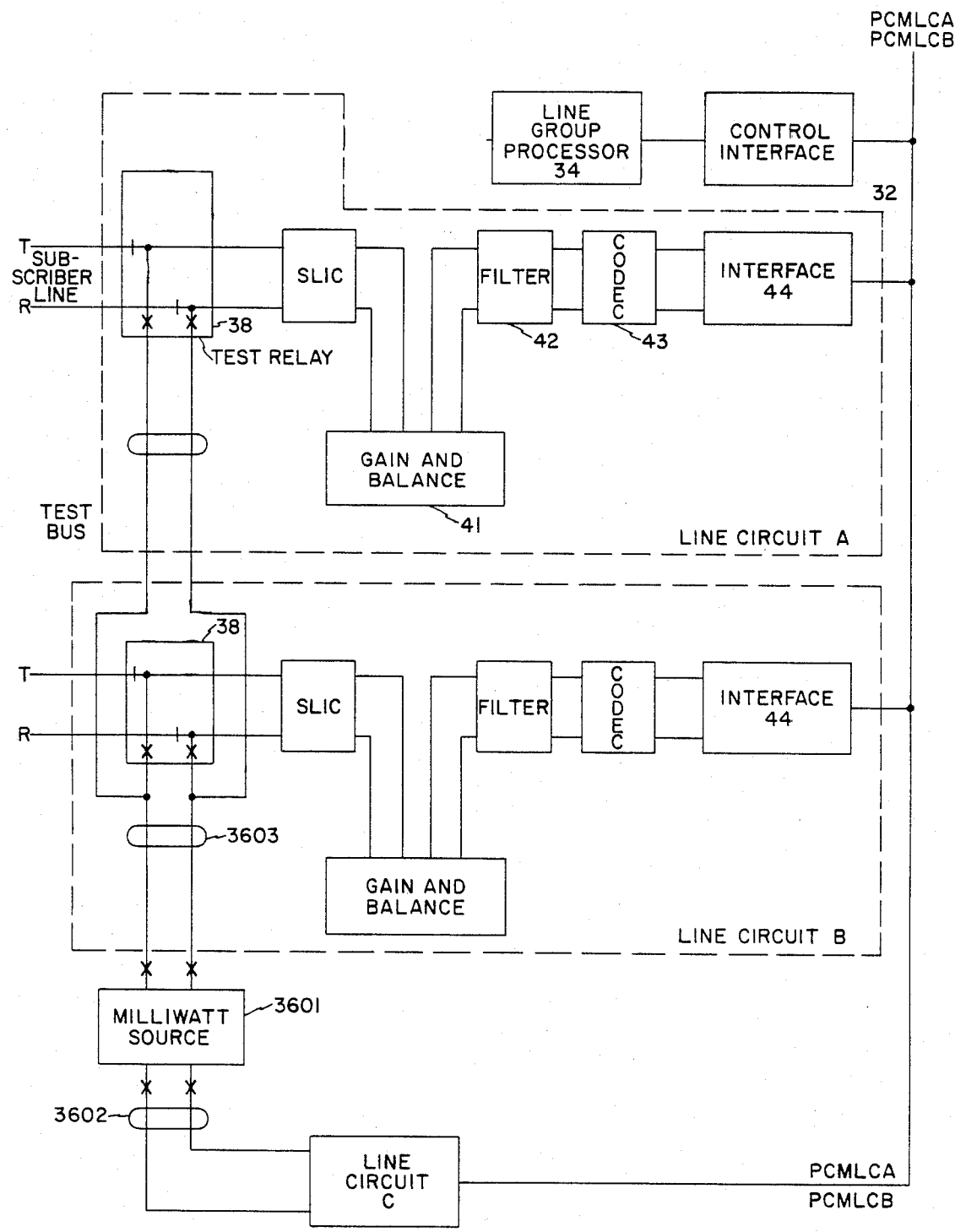
FIG. 36 illustrates in block diagram form an automatic gain setting feature in accordance with the principles of the present invention.

FIG. 36 illustrates the arrangement for setting the transmit gain in a line circuit, the line switch controller 7 will connect a milliwatt generator 3601 to the proper test bus. The line group processor 34 of the line circuit which is to have its transmit gain set will then actuate the test relay 38 of the line circuit. By means of the sample register 189 of the control interface 33 shown in FIG. 32, the line group processor will monitor the PCM output of the line circuit. The line group processor will then incrementally change the gain of the transmit amplifier 105 in FIG. 30 and balance circuit 41 by selectively actuating the analog switches 104 shown in FIG. 30. After each incremental change in the gain, the line group controller will monitor the PCM data. The iterative process will continue until the monitored PCM signals represent a signal of 0 dbm±0.1 dB. The line group processor 34 will then release the test relay 38 and signal the line switch controller 7 that the transmit gain has been set. The line switch controller 7 can then direct a line group processor 34 to set the transmit gain of other line circuits. To set the receive gain, i.e., that of amplifier 103 in FIG. 30, the line switch controller will cause a digital signal representing a signal 0.25 dB greater than 1 milliwatt to be applied on a PCM channel that can be used for testing. One way in which this may be done is for the line switch controller 7 to connect the milliwatt source 3601 providing a 0.25 dB signal to a test bus 3602 and direct the line group processor 34 to connect a line circuit, e.g., line C, which has had its transmit gain adjusted to the desired level connected to the test bus 3602. The line circuit C will then provide PCM signals representative of the milliwatt source on a predetermined channel of the PCM bus PCMLCA or PCMLCB. If it is assumed that line circuit A is to have its receive gain set, then line group processor 34 will actuate test relay 38 connecting the output of line circuit A to the test bus 3603. Another line circuit B which has previously had its transmit gain set will be connected to the same test bus 3603 by actuating its test relay 38. Thus, the analog output of line circuit A will be connected to the analog input of line circuit B. The line circuit B will be directed by the line group processor 34 to receive the PCM channels which is carrying the digital PCM tone signal from line circuit C.

The PCM output of the line circuit A will be monitored by its line group processor 34 again utilizing the sample register 189 of the control interface 33.

The line group processor will incrementally change the gain of the receive amplifier in line circuit A until the output is again 0 dBm±0.1 dB. Thus the transmit gain of any circuit can be set to 0±1 db and the receive gain of any circuit can be set to 0.25 dB±0.1 dB.

Figure 37A:
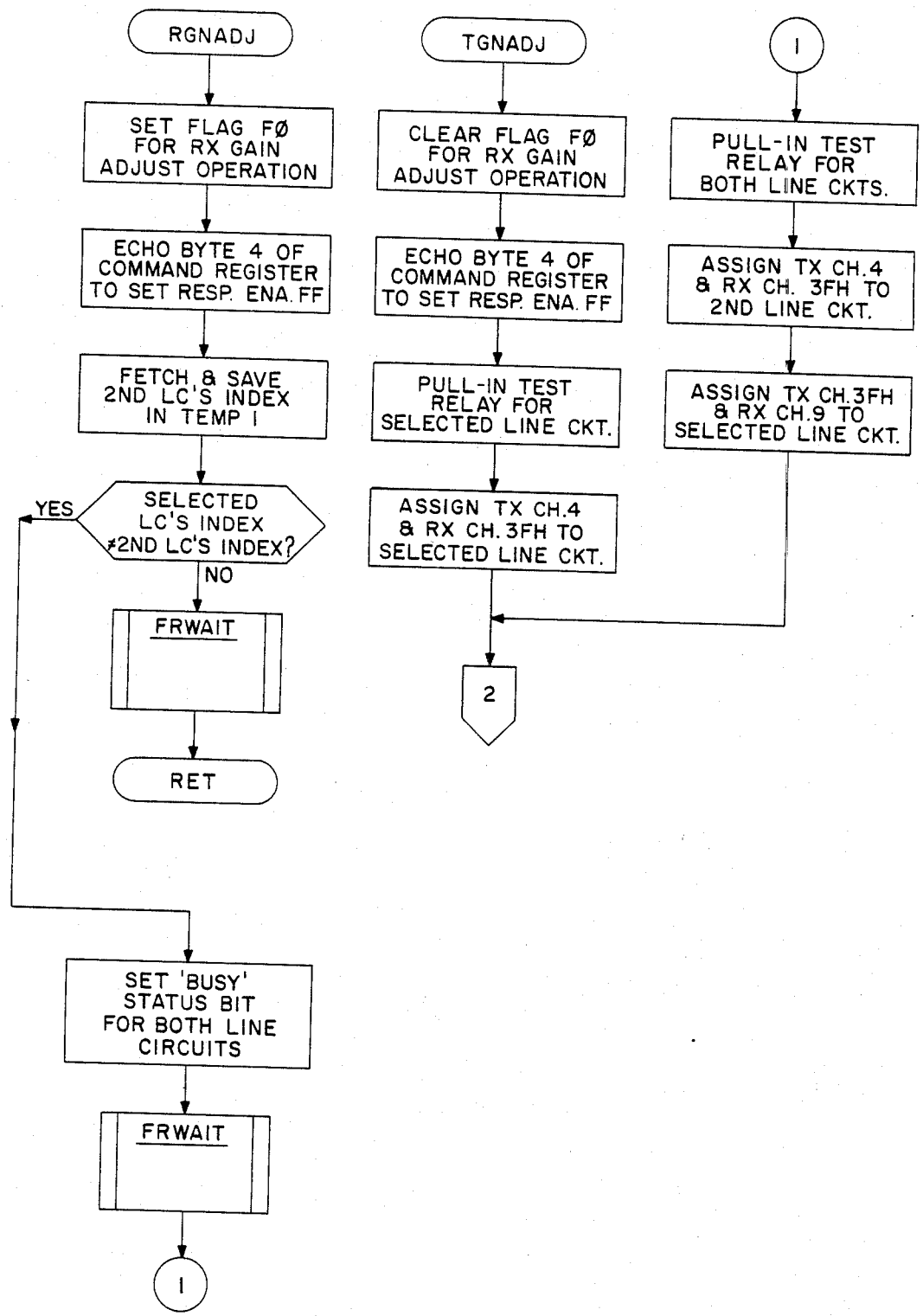
FIGS. 37A, 37B and 37C are flow charts of programs for automatic gain setting according to FIG. 36.
Figure 37B:
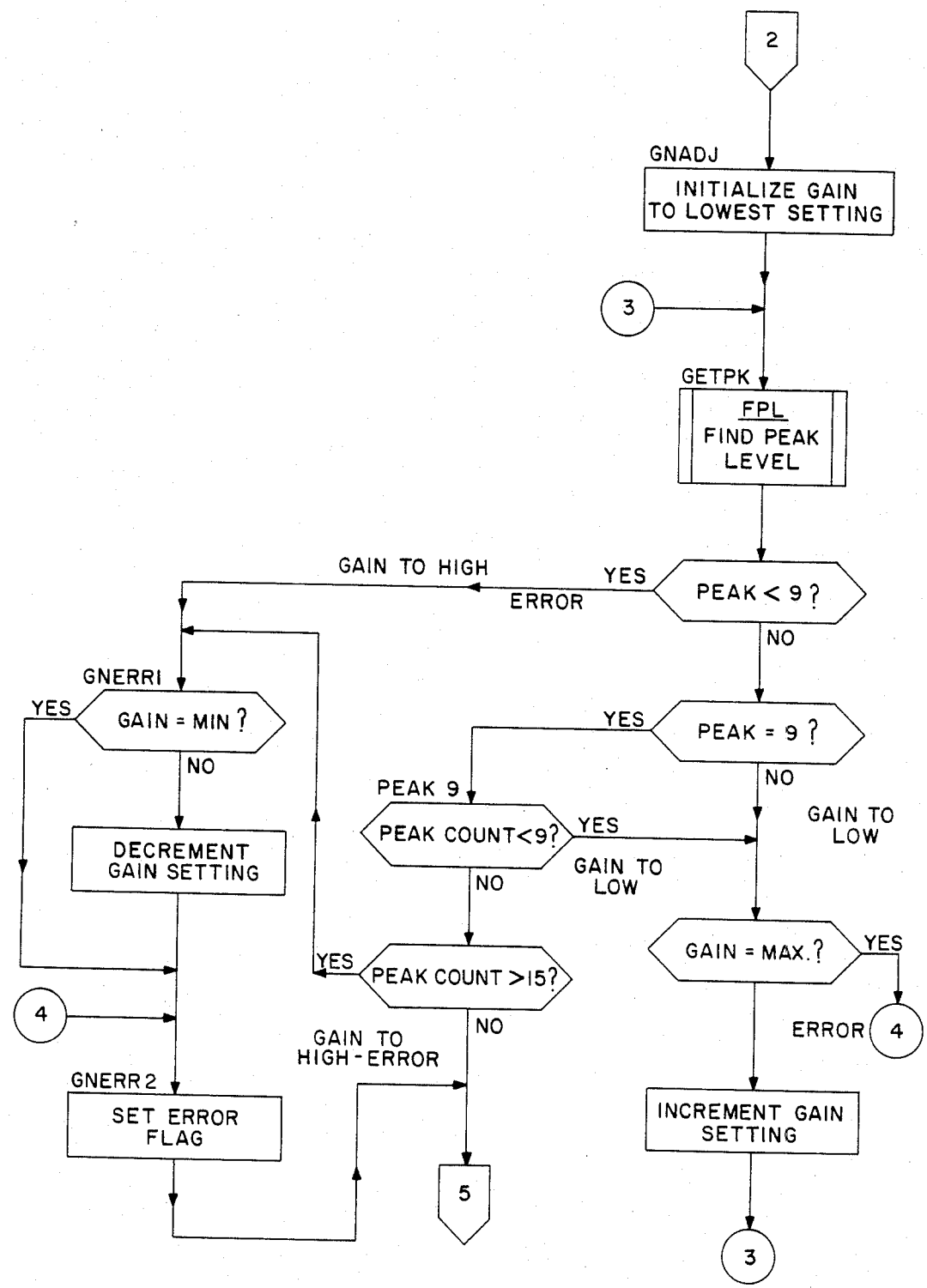
Figure 37C:
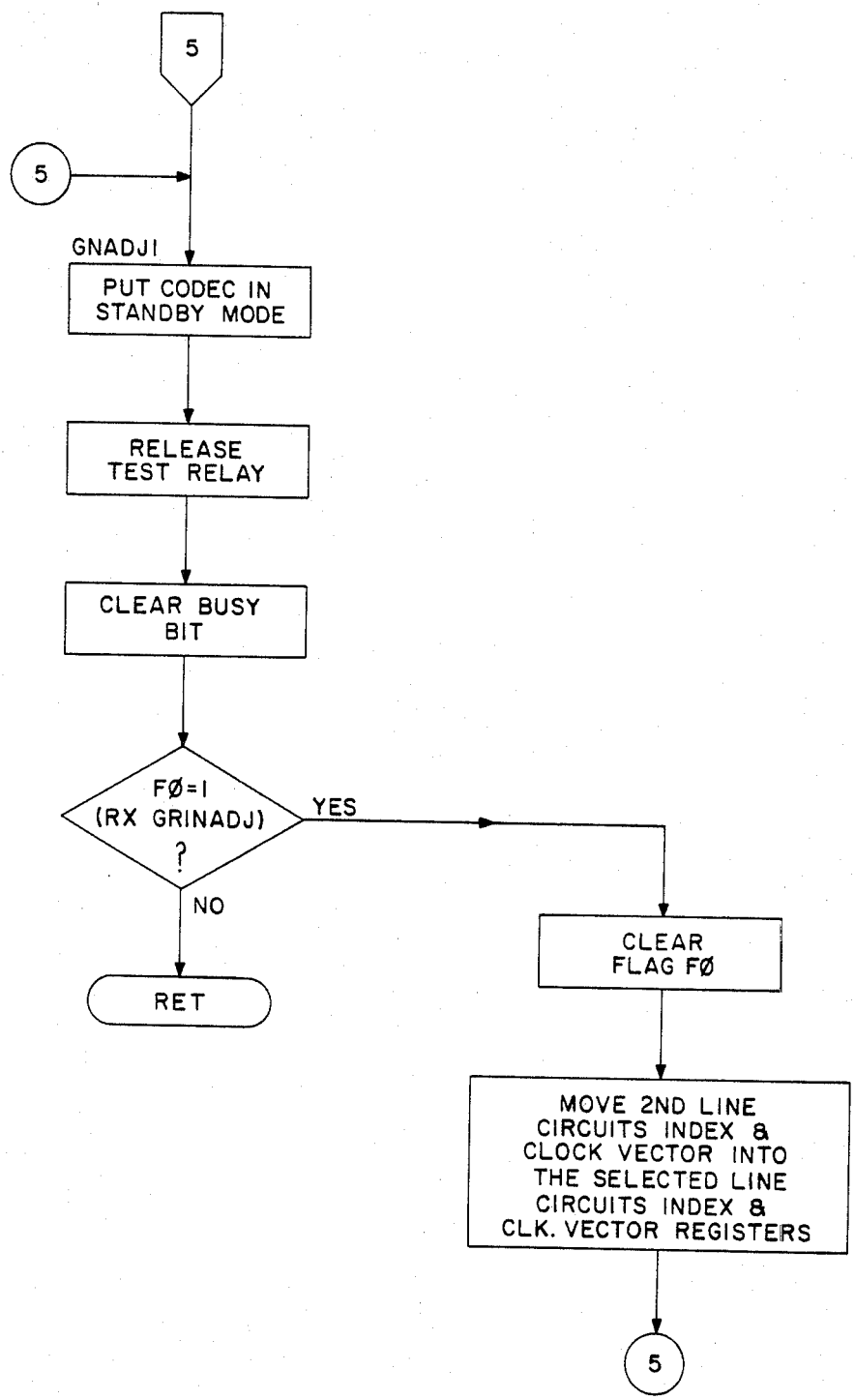

FIGS. 37 A, B and C illustrated in flow chart form the program for setting the transmit and receive gain.

8.0 Other Line Card Arrangements (FIGS. 25, 38, 39 and 40)

Figure 38:
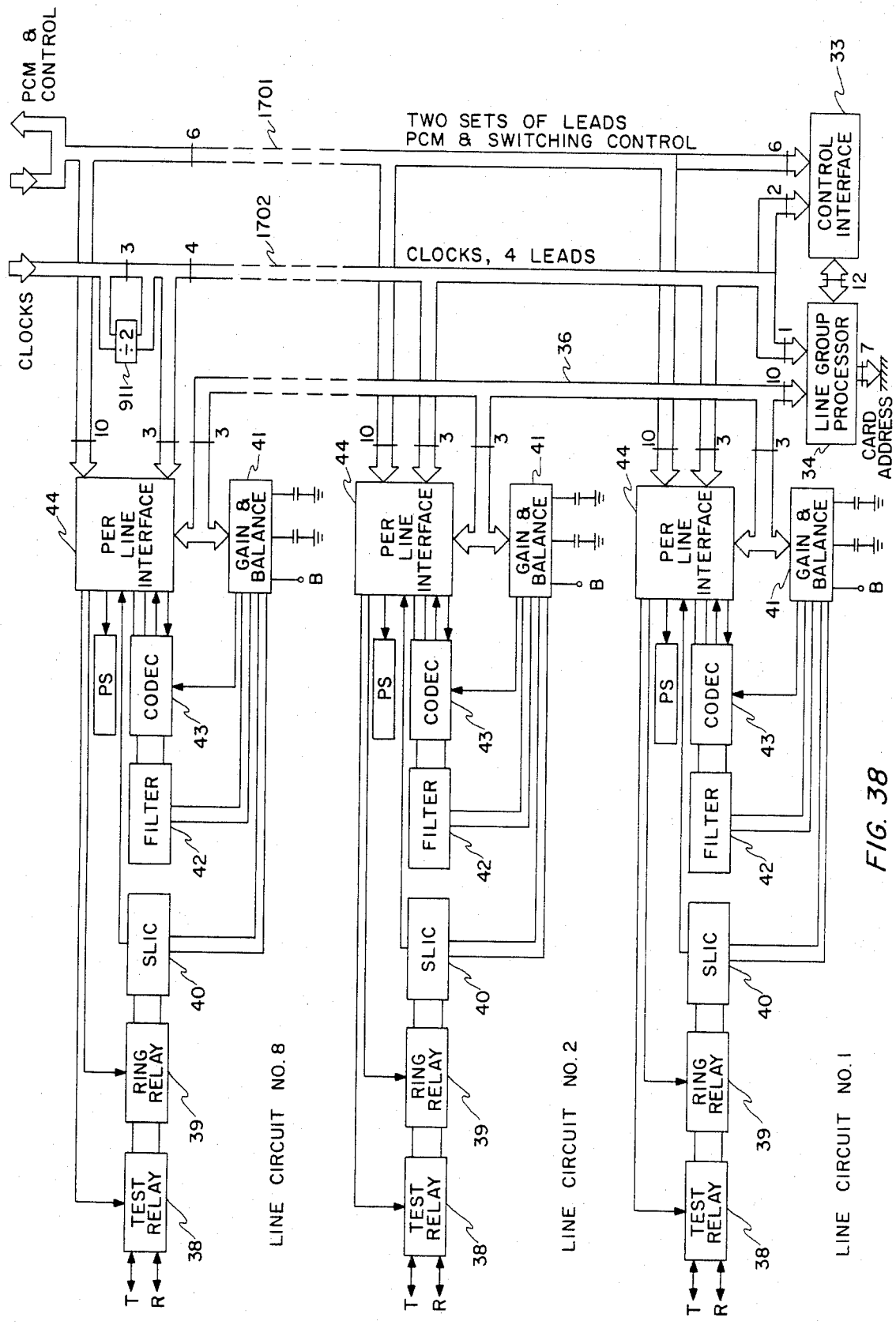
FIG. 38 is a general block diagram of the detailed drawing of FIG. 14.

The detailed drawing of FIG. 25 may be redrawn in general block diagram form with various leads grouped into buses as shown in FIG. 38. Bus 1701 includes PCMLCA, PCMLCB, $\overline{\text{AILS}}$, and $\overline{\text{BILS}}$. Bus 1702 includes CLK4LS, FSD, CLKT and CLK2.

The line card control interface 33 as described hereinabove interfaces between the line group processor 34 and the PCM buses PCMLCA and PCMLCB for the interchange of control information over the PCM buses.

Figure 39:
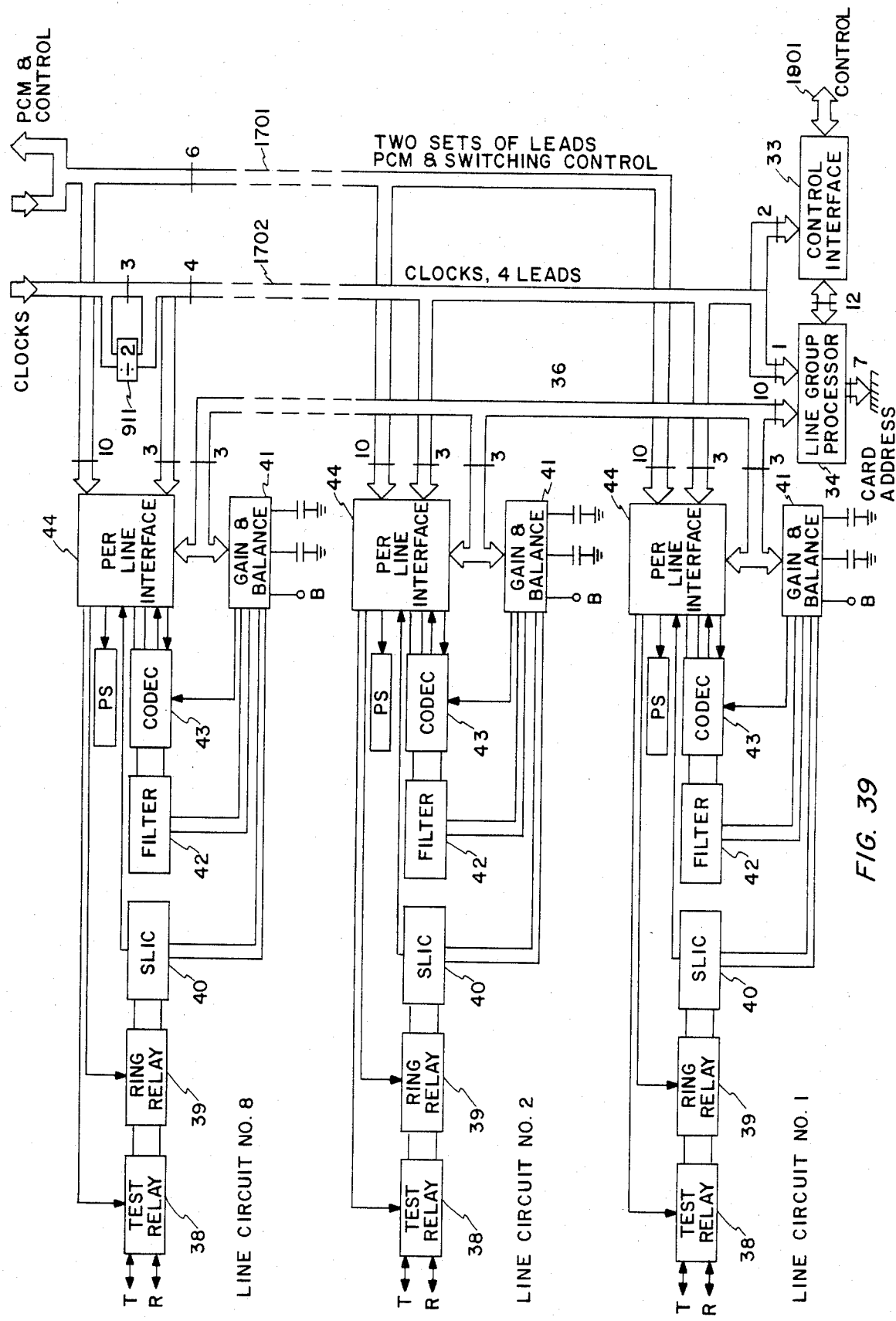
FIG. 39 is a general block diagram of another embodiment of FIG. 14.

In another embodiment of the invention shown in FIG. 39, a separate control bus 1801 is provided and the line group control interface 33 is not connected to the PCM bus 1701. In this arrangement, control information may be exchanged between the line card control interface 33 and a line switch control 7 in the system control 5 over a control bus 1801.

Figure 40:
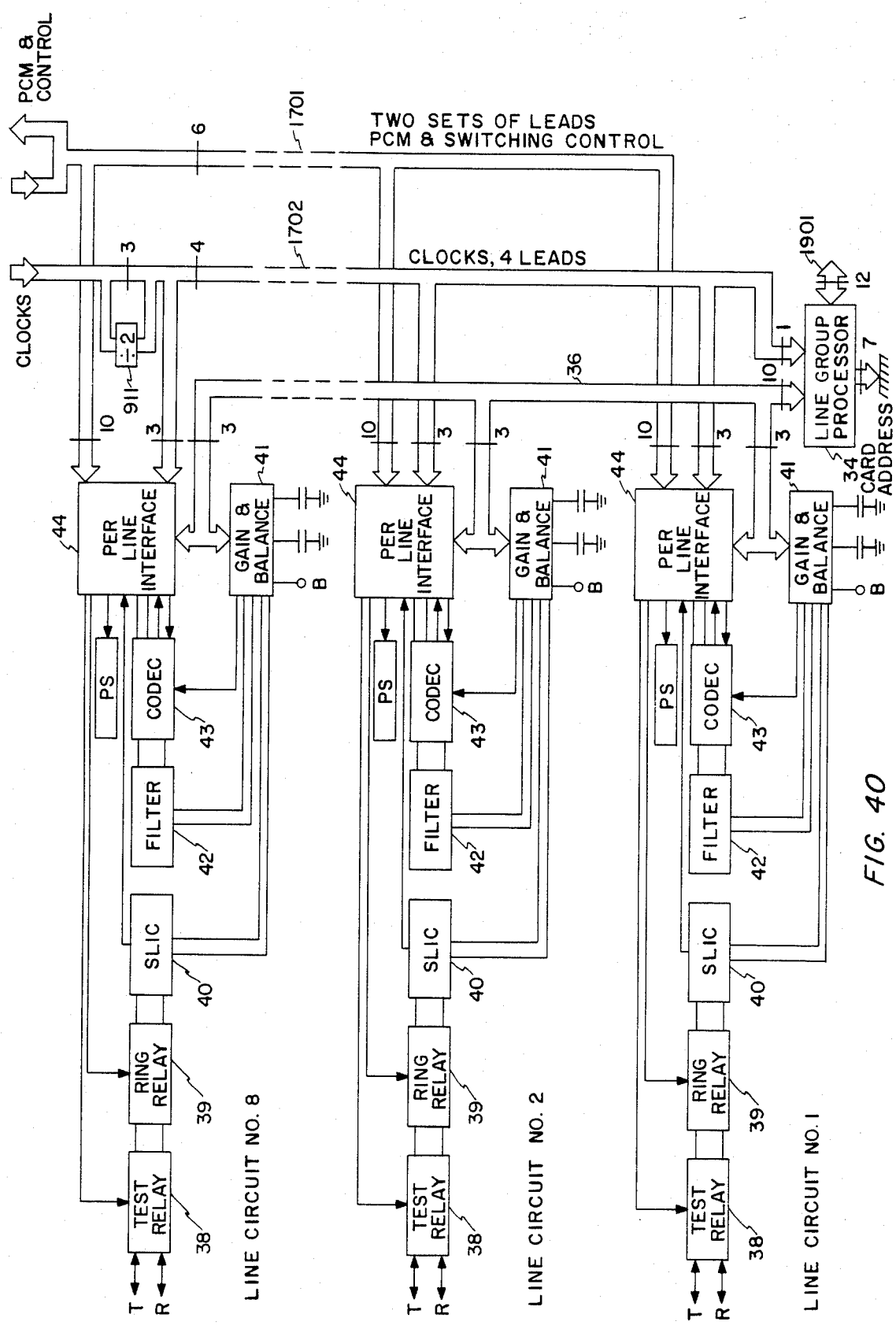
FIG. 40 is a general block diagram of a third embodiment of FIG. 14.

In yet another embodiment of the invention shown in FIG. 40, the line group processor 34 may directly communicate via bus 1901 with the line switch control 7 or the system control 5.

Figure 41:
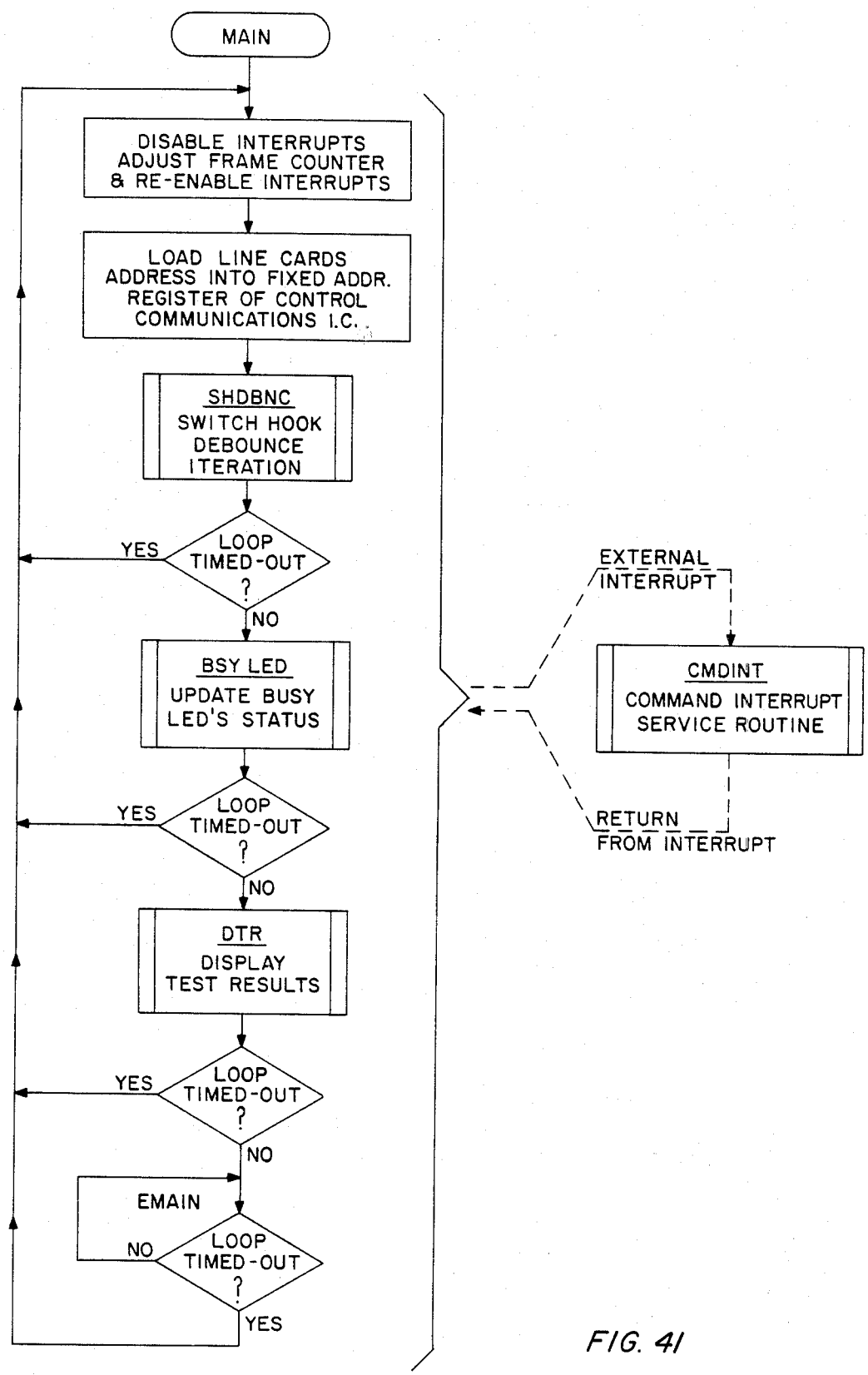
FIG. 41 is a flow chart of the software architecture of the line switch controller 7.
Figures 42, 42A, 42B:
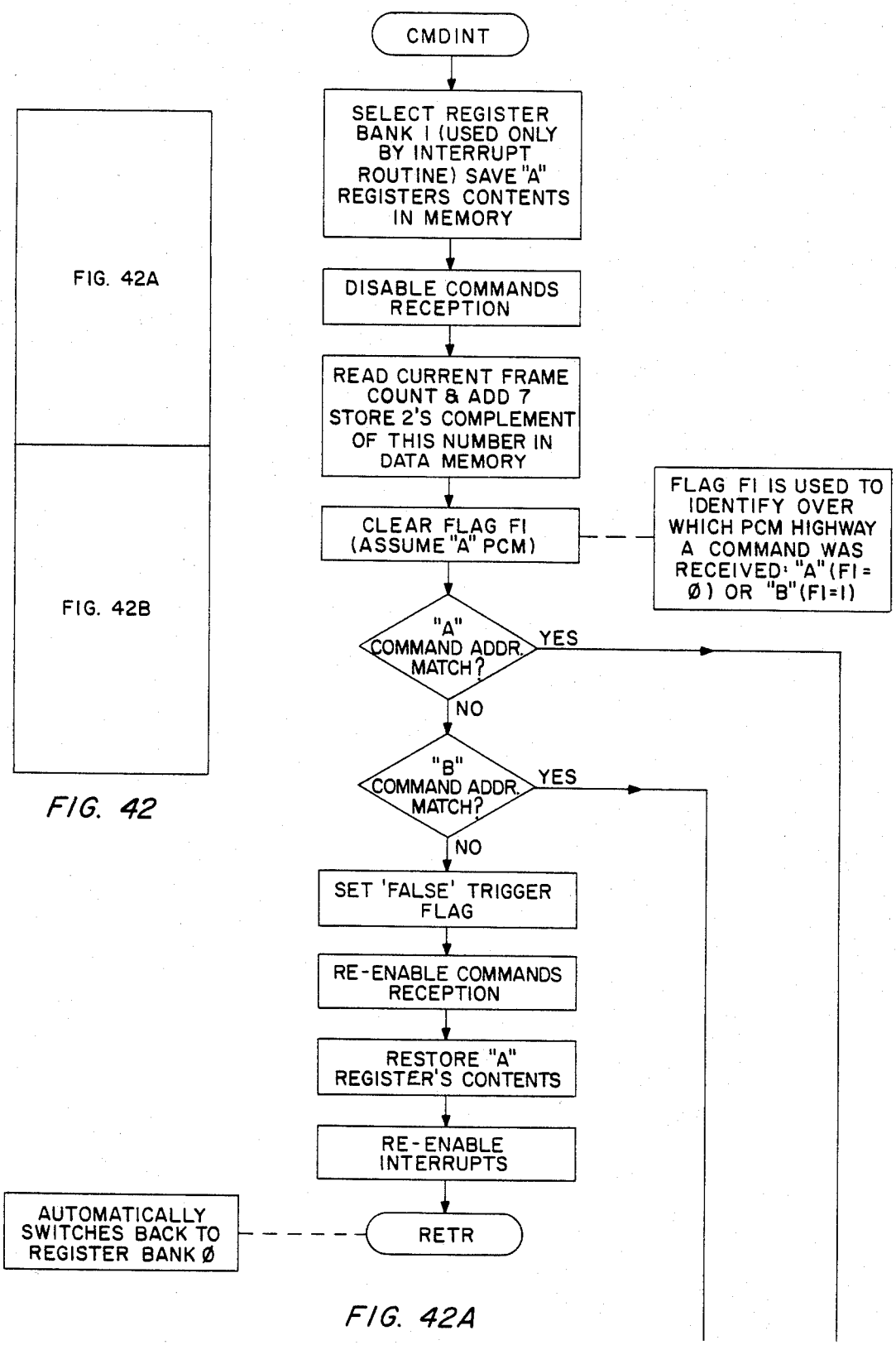
FIGS. 42a and 42B when arranged as shown in FIG. 42 and FIGS. 43A and 43B when arranged as shown in FIG. 43 are flow charts of programs for the line group processor 34.
Figure 42B:
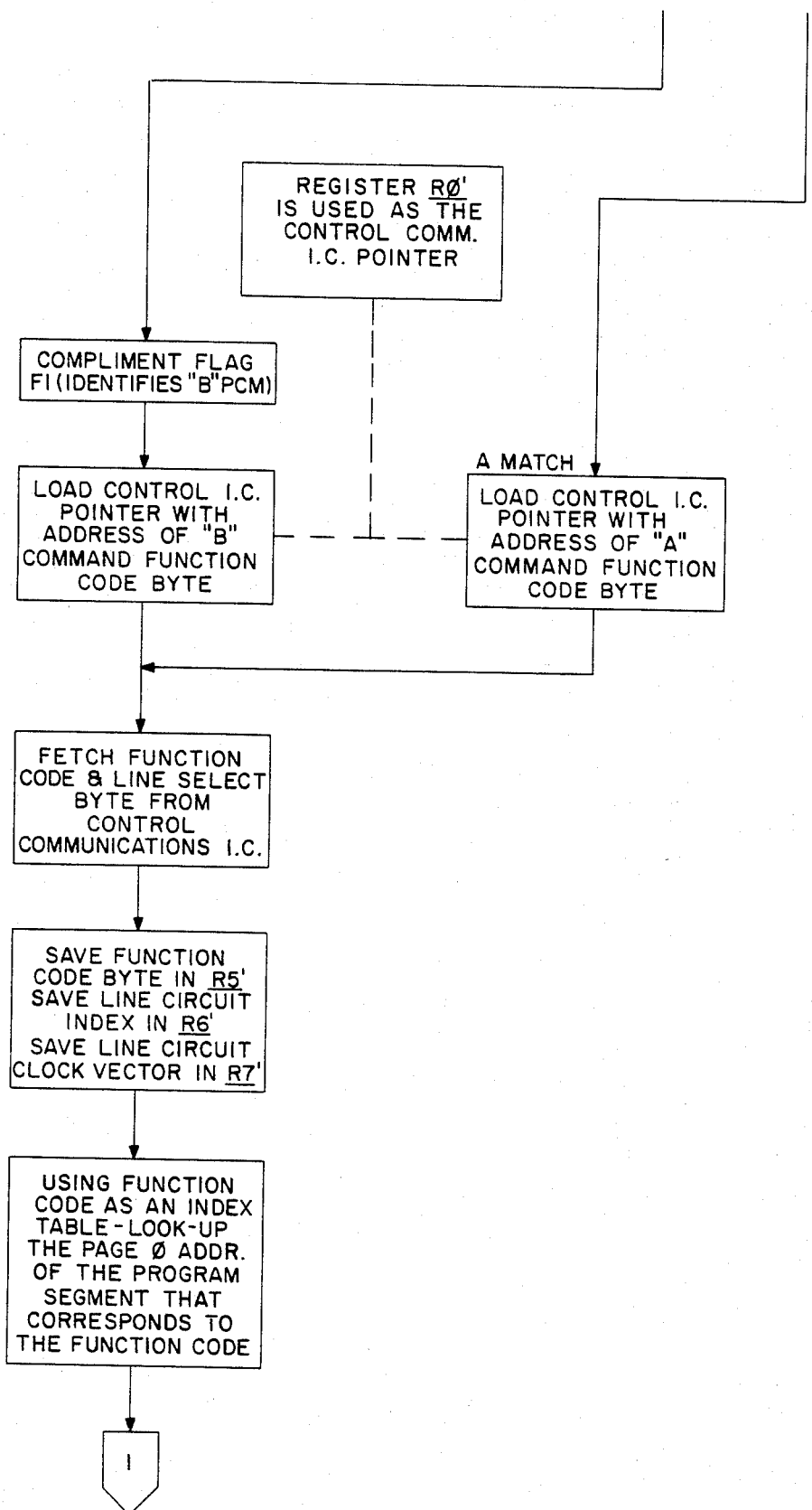
Figures 43, 43B:
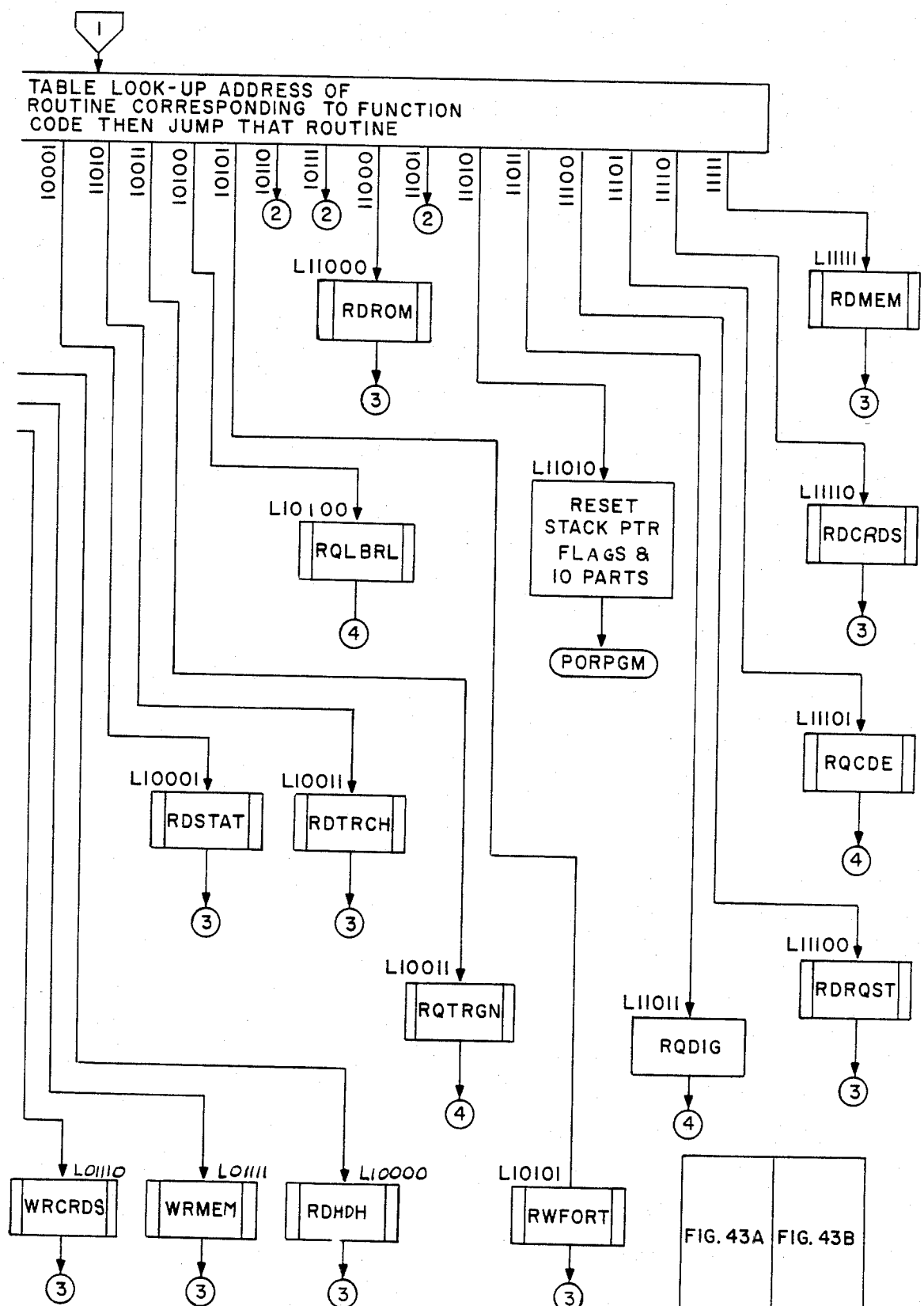
Figure 43A:
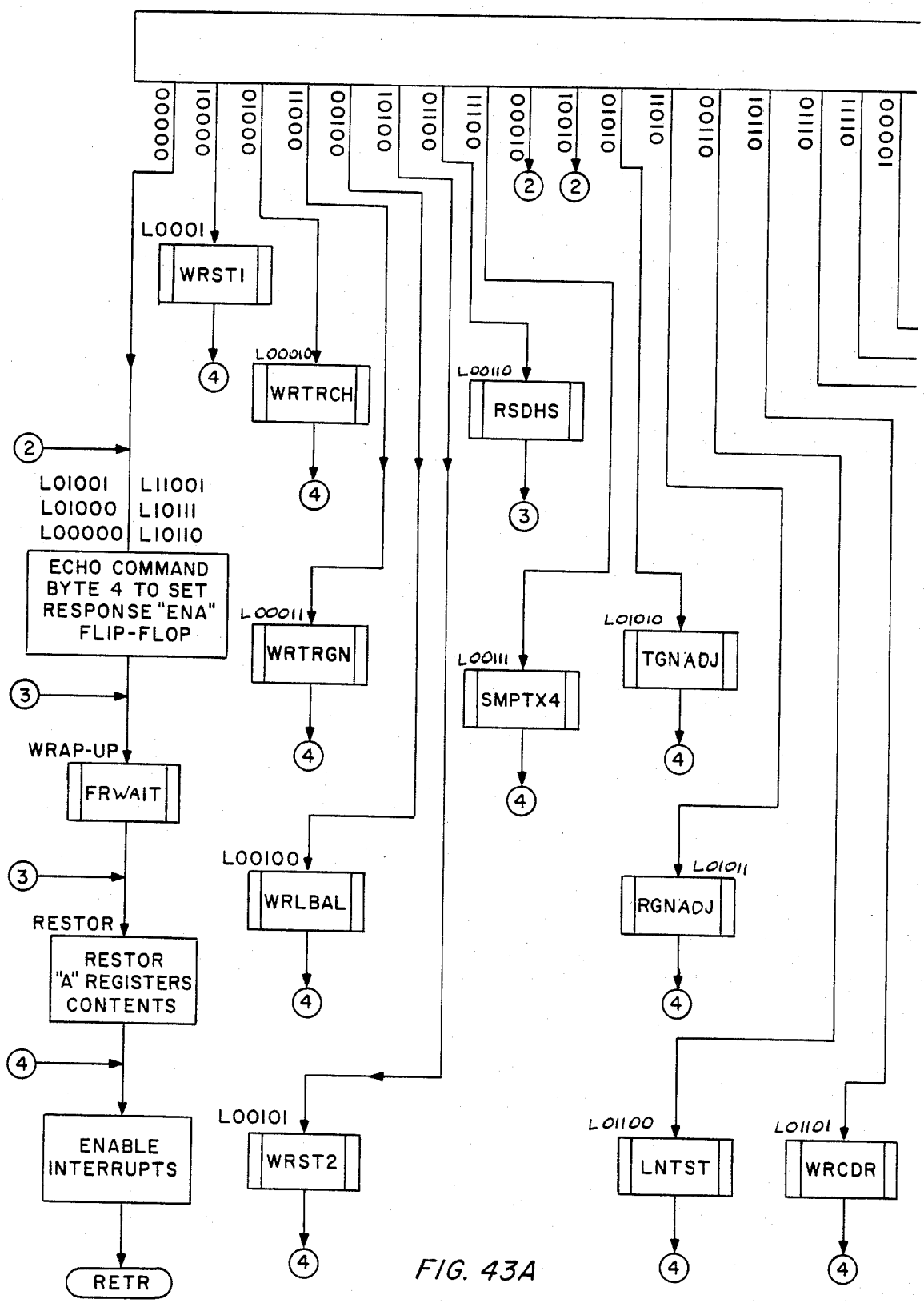

9.0 Line Group Processor 34 (FIGS. 41, 42 and 43)

The line group processor 34 in the illustrative embodiment comprises an Intel 8049 microprocessor which is described in the aforementioned Intel reference at pages 8-31 to 8-35. FIG. 41 illustrates in flow chart form the main program loop of the software utilized in the illustrative embodiment. FIG. 42 illustrates the interrupt service routine of FIG. 41 in greater detail. FIG. 43 illustrates in flow chart form the table look-up addresses of various routines called by the command interrupt service routine. Program listings for the line group processor program are shown in the attached appendix.

Call Set-Up (FIGS. 1, 2, 25)

When a subscriber line (A) goes off-hook, the line switch controller 7 of FIG. 2 transmits a common channel command to the system control 5 of FIG. 1 informing the system control 5 of a new sequence. The system control 5 responds by transmitting a common channel command to the line switch controller 7 assigning a PCM channel A and providing dial tone.

The line switch controller 7 transmits a channel assignment command (32 bit control word) to a line group processor 34 of FIG. 25. The line group processor 34 activates power to the line circuit for A, assigns transmit and receive channels at the CODEC for A, and updates the status of line circuit. The system control 5 will then monitor dial pulses from A.

When the system control 5 determines the called line (B), the system control 5 will transmit a common channel command to the line switch controller 7 of the line switch to which B is terminated. The line switch controller 7 will request the busy/idle status of B from the line group processor 34 associated with the group of lines including B. The line group processor 34 responds by transmitting B's busy/idle status to the line switch controller 7. If B is idle, the line switch controller 7 transmits the channel assignment to the line group processor 34. The line group processor 34 then enables power to B's line circuit, assigns the transmit and receive channels to B's CODEC, and updates the line circuit status.

9.1 Ringing and Call Connect (FIGS. 1, 2 and 25)

The system control 5 sends a common channel command to the second line switch controller 7 to connect ringing to B, and turns on a ring-back tone generator to provide ring-back tone to A. If A and B are both terminated at the same line switch, the system control 5 may also indicate an intra-line switch call. The second line switch controller 7 sends ring commands to a ring circuit B of FIG. 2 and to the line group processor 34 for B. The line group processor 34 begins a ringing routine.

When B answers, the system control 5 sends a stop ringing command to the line switch controller 7. The line switch controller 7 in turn sends ring terminate commands to the ring circuit 13 and line group processor 34. The line group processor 34 terminates the ring routine.

If the call is an intra-line switch call, the receive channels for A and B are switched upon commands from the line switch controller 7 to the line group processors 34.

9.2 Call Disconnect (FIGS. 1, 2 and 25)

When A and B go on-hook, the system control 5 sends a common channel command to one of the line switch controllers 7 to release the line. The line switch controller in turn sends a disconnect command to the line group processor 34. The line group processor 34 removes power from the line circuit and updates the line circuit status. This procedure is repeated for the other party.

While we have described above the principles of our invention in connection with specific apparatus, it is to be clearly understood that this description is made only by way of example and not as a limitation to the scope of our invention as set forth in the objects thereof and in the accompanying claims.

APPENDIX

```
ISIS-II MCS-48/UPI-41 MACRO ASSEMBLER, V3.0
MASTER---ALS OLC B/B FIRMWARE

LOC  OBJ        LINE        SOURCE STATEMENT

1 ;        NAME            MASTER
                    2
                    3 ;
                    4 ;
                    5 ;
                    6
                    7 ;   MASTER — SOFTWARE FOR THE ALS OCTAL LINE CARD CONTROLLER
                    8          o       '
                    9 $EJECT
```

```
LOC OBJ       LINE     SOURCE STATEMENT 10
              11 ;      NAME          MEMMAP
              12
              13 ;
              14 ;
              15 ;
              16
0020          17 LNCRDS   EQU    20H    ; ADDR. OF 'LINE CARD STATUS BYTE'
              18
0021          19 HSW      EQU    21H    ; ADDR. OF 'HOOK SWITCH STATUS BYTE'
0022          20 DLTAHS   EQU    22H    ; ADDR. OF 'DELTA HOOK SWITCH STATUS BYTE'
0023          21 TMPDHS   EQU    23H    ; ADDR. OF 'TEMP. DLTA HOOK SWITCH'
0024          22 HSCNT    EQU    24H    ; ADDR. OF 'SWITCH HOOK DEBOUNCE ITERATION COUNTER'
              23
0025          24 RQFNCD   EQU    25H
0026          25 RQBYT1   EQU    26H
0027          26 RQBYT2   EQU    27H
              27
0028          28 RSPCNT   EQU    28H    ; ADDR. OF 'RESPONSE FRAME COUNT' BYTE
0029          29 ASAVE    EQU    29H    ; ADDR. OF 'A REG. SAVE AREA'
              30
002A          31 TESTR    EQU    2AH    ; ADDR. OF 'TEST RESULTS' BYTE
002B          32 TESTRC   EQU    2BH    ; ADDR. OF 'CDR TEST RESULTS'
002C          33 TESTRD   EQU    2CH    ; ADDR. OF 'DIGITAL I.C. TEST RESULTS'
002D          34 TESTRA   EQU    2DH    ; ADDR. OF 'ANALOG I.C. TEST RESULTS'
002E          35 GDCNT    EQU    2EH    ; ADDR. OF 'GOOD BOARD LED BLINK COUNTER'
002F          36 BLINKC   EQU    2FH    ; ADDR. OF 'LED BLINK COUNTER'
              37
0030          38 LCST1    EQU    30H    ; BASE ADDR. OF 'LINE CKT STATUS 1' BYTES
0038          39 LCST2    EQU    38H    ; BASE ADDR. OF 'LINE CKT STATUS 2' BYTES
0040          40 TXCH     EQU    40H    ; BASE ADDR. OF 'TX CHAN. ASSIGNMENTS'
0048          41 RXCH     EQU    48H    ; BASE ADDR. OF 'RX CHAN. ASSIGNMENTS'
0050          42 GNBAL    EQU    50H    ; BASE ADDR. OF GAIN & BALANCE SETTINGS
              43
0068          44 RELAYD   EQU    68H
0069          45 GNDEL    EQU    69H
006A          46 SHDCNT   EQU    6AH
006B          47 TEMP1    EQU    6BH
              48
              49 $EJECT
              50 ;************************************************
              51 ;  CONTROL COMMUNICATIONS I.C. INTERNAL REGISTERS
              52 ;************************************************
0001          53 ACRB2    EQU    01H    ; 'A PCM' CONTROL SHIFT REG. BYTE 2 ADDRESS
0005          54 BCRB2    EQU    05H    ; 'B PCM' CONTROL SHIFT REG. BYTE 2 ADDRESS
0008          55 CFXADD   EQU    08H    ; ADDR. OF 'FIXED ADDRESS' REGISTER
000C          56 CSTS     EQU    0CH    ; ADDR. OF CONTROL COMM. I.C.'S STATUS REG.
000D          57 CMODE    EQU    0DH    ; ADDR. OF CONTROL COMM. I.C.'S MODE REG.
000E          58 CRP      EQU    0EH    ; ADDR. OF 'CONTROL REG. POINTER'
000F          59 ATCRP    EQU    0FH    ; ADDR. OF CONTROL S/R BYTE POINTED TO BY 'CRP'
              60
              61 ;************************************************
              62 ;  LINE CIRCUIT COMMAND CODES (4-BIT CODE----BITS 7-4)
              63 ;************************************************
```

| LOC OBJ | LINE | SOURCE STATEMENT | | | |
|---|---|---|---|---|---|
| 0000 | 64 | WRDIG | EQU | 00H | ; 'WRITE TO DIGITAL I.C. REG.' CODE (BITS 7-4) |
| 0020 | 65 | WRCDRC | EQU | 20H | ; 'WRITE TO CODEC DATA REG.' CODE |
| 0040 | 66 | WRANA | EQU | 40H | ; 'WRITE TO ANALOG I.C. REG.' CODE |
| 0060 | 67 | LDCODC | EQU | 60H | ; 'LOAD CODEC' CODE |
| 0080 | 68 | RDDIG | EQU | 80H | ; 'READ DIG. I.C. REG.' CODE |
| 00A0 | 69 | RDCDR | EQU | 0A0H | ; 'READ CODEC DATA REG.' CODE |
| 00C0 | 70 | RDANA | EQU | 0C0H | ; 'READ ANALOG I.C. REG.' CODE |
|  | 71 | | | | |
|  | 72 | ;************************************ | | | |
|  | 73 | ; | ; INITIALIZATION VALUES | | |
|  | 74 | ;************************************ | | | |
| 0018 | 75 | IDIG | EQU | 18H | |
| 00FF | 76 | ICODEC | EQU | 0FFH | |
| 0084 | 77 | IANA1 | EQU | 84H | |
| 0000 | 78 | IANA2 | EQU | 00H | |
| 0000 | 79 | IANA3 | EQU | 00H | |
|  | 80 | | | | |
|  | 81 | ;************************************************ | | | |
|  | 82 | ; ADDRESS OF LAST BYTE OF 8049'S DATA MEMORY | | | |
|  | 83 | ;************************************************ | | | |
| 007F | 84 | LSTBYT | EQU | 7FH | |
|  | 85 | | | | |
|  | 86 | ;**************** | | | |
|  | 87 | ; RESPONSE DELAY | | | |
|  | 88 | ;**************** | | | |
| 0008 | 89 | RSPNCD | EQU | 8 | ; NUMBER OF FRAMES DELAY THAT RESPONSE |
|  | 90 | | | | ;   FOLLOWS COMMAND. |
|  | 91 | | | | |
|  | 92 | $EJECT | | | |
|  | 93 | | | | |
|  | 94 | ; | NAME | PORPGM | |
|  | 95 | | | | |
|  | 96 | ; | | | |
|  | 97 | ; | | | |
|  | 98 | ; | | | |
|  | 99 | | | | |
|  | 100 | ; PORPGM — POWER-ON RESET PROGRAM | | | |
|  | 101 | | | | |
|  | 102 | ; ENTERED AFTER A POWER-ON OR MANUAL RESET | | | |
|  | 103 | | | | |
| 0000 | 104 | | ORG | 0 | |
|  | 105 | RESET: | | | |
| 0000 C5 | 106 | | SEL | RB0 | ; REG. BANK 0 IS USED EVERYWHERE EXCEPT IN |
| 0001 6400 | 107 | | JMP | PORPGM | ;   INTERRUPT SERVICE ROUTINES. |
|  | 108 | | | | |
| 0300 | 109 | | ORG | 300H | |
|  | 110 | PORPGM: | | | |
| 0300 15 | 111 | | DIS | I | |
|  | 112 | ; INITIALIZE ALL LINE CIRCUITS | | | |
| 0301 54A6 | 113 | | CALL | LINERS | |
|  | 114 | | | | |
|  | 115 | ; IS SELF-TEST TO BE SKIPPED (P23=0)? | | | |
| 0303 0A | 116 | | IN | A,P2 | |
| 0304 7211 | 117 | | JB3 | POR1 | |

| LOC OBJ | LINE | SOURCE STATEMENT | | |
|---|---|---|---|---|
| | 118 | | | |
| | 119 | ; SKIPPING SELF-TEST--------CLEAR TEST RESULTS BYTES | | |
| 0306 B82D | 120 | MOV | R0,#TESTR+3 | |
| 0308 B904 | 121 | MOV | R1,#4 | |
| 030A B000 | 122 | MOV | @R0,#0 | |
| 030C C8 | 123 | DEC | R0 | |
| 030D E90A | 124 | DJNZ | R1,$-3 | |
| 030F 6413 | 125 | JMP | STRET | ; RETURN TO PORPGM |
| | 126 | | | |
| | 127 POR1: | | | |
| | 128 ; PERFORM SELF-TEST OF LINE CARD HARDWARE | | | |
| 0311 C400 | 129 | JMP | SLFTST | |
| | 130 STRET: | ; SELF-TEST ROUTINE'S RETURN ADDRESS | | |
| | 131 | | | |
| | 132 ; INITIALIZE DATA RAM | | | |
| 0313 7445 | 133 | CALL | RAMRS | |
| | 134 | | | |
| | 135 ; ENABLE RECEPTION OF COMMANDS FROM ALS CONTROLLER | | | |
| 0315 748F | 136 | CALL | CNTLRS | |
| 0317 14D4 | 137 | CALL | CNTLEN | |
| | 138 | | | |
| | 139 ; INITIALIZE FRAME COUNTER BEFORE ENTERING 'MAIN' | | | |
| 0319 2318 | 140 | MOV | A,#18H | |
| 031B 65 | 141 | STOP | TCNT | |
| 031C 62 | 142 | MOV | T,A | |
| | 143 ; ENTER MAIN LOOP | | | |
| | 144 | | | |
| | 145 ;*** END OF PORPGM *** | | | |
| | 146 $EJECT | | | |
| | 147 | | | |
| | 148 ; NAME MAIN | | | |
| | 149 | | | |
| | 150 ; | | | |
| | 151 ; | | | |
| | 152 ; | | | |
| | 153 | | | |
| | 154 MAIN: | | | |
| 031D C5 | 155 | SEL | RB0 | |
| | 156 | | | |
| | 157 ;############################################################### | | | |
| 031E 15 | 158 | DIS | I | ; DISABLE INTERRUPT WHILE FRAME COUNTER |
| 031F 65 | 159 | STOP | TCNT | ; IS STOPPED |
| 0320 42 | 160 | MOV | A,T | ; READ CURRENT COUNTER VALUE AND SUBTRACT |
| | 161 | | | ; 16 (DECIMAL) IN ORDER TO RESET THE |
| | 162 | | | ; COUNTER FOR THE 2 MILLISEC MAIN LOOP |
| | 163 | | | ; DELAY. (EQUIV. TO ADDING 0F0H MOD 256) |
| 0321 03F0 | 164 | ADD | A,#0F0H | ; (ADDING 0F0H IS EQUIV. TO SUBTRACTING 10H |
| | 165 | | | ; IN MODULO 256 ARITHMETIC) |
| 0323 62 | 166 | MOV | T,A | ; LOAD NEW VALUE INTO COUNTER |
| | 167 ;############################################################### | | | |
| | 168 | | | |
| 0324 05 | 169 | EN | I | ; RE-ENABLE INTERRUPTS NOW THAT COUNTER HAS |
| | 170 | | | ; BEEN RESTARTED. |
| 0325 45 | 171 | STRT | CNT | ; RESTART COUNTER |

```
LOC  OBJ        LINE     SOURCE STATEMENT 172
                173 ; RE-LOAD LINE CARD'S FIXED ADDRESS INTO CONTROL COMM. I.C.
0326 9490       174         CALL    LDFXAD
                175
                176 ; PERFORM S/H DEBOUNCE ITERATION
0328 7498       177         CALL    SHDBNC
032A 7439       178         CALL    LOOPCK  ; CHECK FOR LOOP TIME-OUT
                179
                180 ; UPDATE LINE CARD 'BUSY INDICATION LED'
032C 7404       181         CALL    BSYLED
032E 7439       182         CALL    LOOPCK  ; CHECK FOR LOOP TIME-OUT
                183
                184 ; SCAN TEST RESULTS REGISTERS FOR HARDWARE MALFUNCTION
                185 ;    AND BLINK LED IF BOARD IS BAD.
0330 9454       186         CALL    DTR     ; DISPLAY TEST RESULTS SUBROUTINE
0332 7439       187         CALL    LOOPCK  ; CHECK FOR LOOP TIME-OUT
                188
                189 $EJECT
                190
                191
                192 ;       OTHER MAIN LOOP SUBROUTINES WILL BE INSERTED HERE
                193
                194 ; END OF MAIN LOOP
                195 ; WAIT UNTIL 2 MS HAS ELAPSED BEFORE RESTARTING MAIN LOOP
                196 EMAIN:
0334 45         197         STRT    CNT
0335 7439       198         CALL    LOOPCK  ; CHECK FOR LOOP TIME-OUT
                199
0337 6434       200         JMP     EMAIN
                201
                202 ; SUBROUTINE LOOPCK ****************************
                203 LOOPCK:
0339 42         204         MOV     A,T     ; READ FRAME COUNT
033A 03E8       205         ADD     A,#0E8H ; HAS FRAME COUNT EXCEEDED 18H (LOOP TIME-OUT VALUE)?
033C F63F       206         JC      $+3     ; IF CARRY OCCURRED, THEN LOOP HAS TIMED-OUT.
033E 83         207         RET             ; LOOP HAS NOT TIMED OUT----PERFORM NEXT OPERATION
                208
                209 ; LOOP HAS TIMED OUT-----RESET STACK POINTER & RESTART MAIN LOOP
033F C7         210         MOV     A,PSW
0340 53F8       211         ANL     A,#0F8H ; CLEAR 'SP' BITS
0342 D7         212         MOV     PSW,A
0343 641D       213         JMP     MAIN
                214
                215 ; END OFF SUBROUTINE LOOPCK *********************
                216
                217 ;*** END OF MAIN ***
                218 $EJECT
                219
                220 ;       NAME            RAMRS
                221
                222 ;
                223 ;
                224 ;
                225
```

```
LOC  OBJ        LINE    SOURCE STATEMENT

226 ;   RAMRS -- INITIALIZES CONTENTS OF DATA RAM
                227
                228 RAMRS:
                229 ; INITIALIZE UNUSED PORTION OF RAM TO ZERO
0345 B87F       230         MOV    R0,#LSTBYT  ; ADDR. OF LAST BYTE OF DATA RAM
0347 B918       231         MOV    R1,#18H     ; (24 BYTES)
0349 B000       232         MOV    @R0,#0
034B C8         233         DEC    R0
034C E949       234         DJNZ   R1,$-3      ; REPEAT LAST 3 INSTRUCTIONS UNTIL R1=0
                235
                236 ; INITIALIZE GAIN & BALANCE SETTINGS BYTES
034E B908       237         MOV    R1,#8
                238
0350 2304       239 RAMRS3: MOV    A,#IANA1
0352 A0         240         MOV    @R0,A
0353 C8         241         DEC    R0
0354 2300       242         MOV    A,#IANA2
0356 A0         243         MOV    @R0,A
0357 C8         244         DEC    R0
0358 2300       245         MOV    A,#IANA3
035A A0         246         MOV    @R0,A
035B C8         247         DEC    R0
035C E950       248         DJNZ   R1,RAMRS3
                249
                250 ; INITIALIZE CHANNEL ASSIGNMENT BYTES
035E B910       251         MOV    R1,#10H
0360 B03F       252 RAMRS4: MOV    @R0,#3FH
0362 C8         253         DEC    R0
0363 E960       254         DJNZ   R1,RAMRS4   ; REPEAT LAST 3 INSTRUCTIONS UNTIL R1=0
                255
                256 ; INITIALIZE 'LC STATUS 2' BYTES TO 00000000B
0365 B908       257         MOV    R1,#8
                258
0367 B000       259 RAMRS5: MOV    @R0,#0
0369 C8         260         DEC    R0
036A E967       261         DJNZ   R1,RAMRS5
                262
                263 $EJECT
                264 ; INITIALIZE 'LC STATUS 1' BYTES TO 00011000B
036C B908       265         MOV    R1,#8
                266
036E B018       267 RAMRS6: MOV    @R0,#IDIG
0370 C8         268         DEC    R0
0371 E96E       269         DJNZ   R1,RAMRS6
                270
                271 ; INITIALIZE 'GOOD BOARD LED BLINK COUNTER'
0373 B82E       272         MOV    R0,#GDCNT
0375 B002       273         MOV    @R0,#2
0377 B82F       274         MOV    R0,#BLINKC
0379 B000       275         MOV    @R0,#0
                276
                277 ; RESET 'LNCRDS', 'HSH', 'DLTAHS', ... , 'ASAYE' (20H-29H)
037B B829       278         MOV    R0,#29H
037D B90A       279         MOV    R1,#10
```

```
LOC  OBJ       LINE     SOURCE STATEMENT 280
037F B000       281 RAMRS7: MOV    @R0,#0
0381 C8         282        DEC    R0
0382 E97F       283        DJNZ   R1,RAMRS7
                284
                285 ; INITIALIZE RELAY DEBOUNCE DELAY & GAIN SET DELAY BYTES
0384 B068       286        MOV    R0,#RELAYD
0386 B032       287        MOV    @R0,#50 ; 50 MILLISEC DEFAULT RELAY DEBOUNCE DELAY
0388 18         288        INC    R0
0389 B005       289        MOV    @R0,#5  ; 5 MILLISEC DEFAULT GAIN ADJ. DELAY
                290
                291 ; INITIALIZE S/H DEBOUNCE CYCLE ITERATION COUNT
038B 18         292        INC    R0
038C B014       293        MOV    @R0,#20 ; DEFAULTS TO 20 ITERATIONS
                294
038E 83         295        RET
                296
                297 ;*** END OF RAMRS ***
                298 $EJECT
                299
                300 ;      NAME           CNTLRS
                301
                302 ;
                303 ;
                304 ;
                305
                306
                307 ; CNTLRS -- CONTROL PROTOCOL I.C. INITIALIZATION ROUTINE
                308
                309 ; INITIALIZES MODE REG., CRP, & FIXED ADDR.
                310
                311 CNTLRS:
                312 ;  INITIALIZE MODE REGISTER
038F B980       313        MOV    R0,#CMODE ; ADDR. OF MODE REG.
0391 2303       314        MOV    A,#03H ; 'B COMP ENA' & 'A COMP ENA' = 1
0393 90         315        MOVX   @R0,A
                316
                317 ; CLEAR CRP (CONTROL REGISTER POINTER)
0394 B98E       318        MOV    R0,#CRP ; ADDR. OF 'CNTRL REG POINTER'
0396 27         319        CLR    A
0397 90         320        MOVX   @R0,A
                321
                322 ; LOAD FIXED ADDRESS
0398 9480       323        CALL   LDFXAD
                324
039A 83         325        RET
                326
                327 ;*** END OF CNTLRS ***
                328 $EJECT
                329
                330 ;      NAME           SHDBNC
                331
                332 ;
                333 ;
```

```
LOC  OBJ        LINE      SOURCE STATEMENT

334 ;
                335
                336 ;  SHDBNC -- SWITCH-HOOK DEBOUNCE SUBROUTINE
                337
                338 SHDBNC:
                339 ; READ CURRENT S/H DEBOUNCE ITERATION COUNTER TO SEE IF
                340 ;   DEBOUNCING IS CURRENTLY IN PROGRESS.
039B B824       341       MOV    R0,#HSCNT
039D F0         342       MOV    A,@R0          ; READ 'HOOK STATUS COUNTER'
039E 96AF       343       JNZ    SHLOOP
                344
                345 ; TEST FOR ANY CHANGES OF S/H VALUES (COMPARED TO THE CURRENT
                346 ;   STORED VALUES OF 'HOOK SWITCH STATUS')
03A0 B921       347       MOV    R1,#HSW
03A2 09         348       IN     A,P1           ; READ S/H VECTOR FROM PORT 1
03A3 D1         349       XRL    A,@R1          ; 'TMPDHS'=S/H VECTOR 'XOR' HOOK STATUS
03A4 B923       350       MOV    R1,#TMPDHS
03A6 A1         351       MOV    @R1,A          ; STORE  TMPDHS
03A7 96AA       352       JNZ    SHNEW
03A9 93         353       RETR
                354
                355 SHNEW:
                356 ; AT LEAST ONE S/H LINE HAS CHANGED STATUS----START DEBOUNCING ITERATIONS
                357 ; INITIALIZE ITERATION COUNTER
03AA B96A       358       MOV    R1,#SHDCNT
03AC F1         359       MOV    A,@R1
03AD A0         360       MOV    @R0,A
03AE 93         361       RETR
                362
                363 SHLOOP:
                364 ; NORMAL S/H DEBOUNCE ITERATION SEQUENCE
03AF B921       365       MOV    R1,#HSW
03B1 09         366       IN     A,P1
03B2 D1         367       XRL    A,@R1          ; 'TMPDHS'=S/H VECTOR 'XOR' HOOK STATUS
                368
                369 ; 'AND' THE CURRENT VALUE OF 'TMPDHS' WITH THE LAST VALUE OF 'TMPDHS'
                370 ;   IF THE RESULT IS ZERO THEN ABORT THE DEBOUNCING
03B3 B923       371       MOV    R1,#TMPDHS
03B5 51         372       ANL    A,@R1
03B6 A1         373       MOV    @R1,A
03B7 AA         374       MOV    R2,A           ; SAVE 'TMPDHS' VALUE IN R2
03B8 C6C0       375       JZ     ABORT
                376
                377 $EJECT
                378 ; HAVE ALL ITERATIONS BEEN PERFORMED?
03BA F0         379       MOV    A,@R0
03BB 07         380       DEC    A              ; DECREMENT ITERATION COUNTER & TEST FOR ZERO
03BC A0         381       MOV    @R0,A
03BD C6C3       382       JZ     DONE
03BF 93         383       RETR
                384
                385 ABORT:
                386 ; RESET S/H DEBOUNCE ITERATION COUNTER
03C0 B000       387       MOV    @R0,#0         ; RESET 'HSCNT' TO ZERO
```

| LOC | OBJ | LINE | SOURCE STATEMENT | | |
|---|---|---|---|---|---|
| 03C2 | 93 | 388 | | RETR | |
| | | 389 | | | |
| | | 390 | DONE: | | |
| | | 391 | ; UPDATE CURRENT VALUES OF 'HOOK SWITCH STATUS' & 'DELTA HOOK STATUS' | | |
| 03C3 | FA | 392 | | MOV | A,R2 ; FETCH 'TMPDHS' VALUE |
| 03C4 | B921 | 393 | | MOV | R1,#HSW |
| 03C6 | D1 | 394 | | XRL | A,@R1 ; UPDATE & |
| 03C7 | A1 | 395 | | MOV | @R1,A ; SAVE HOOKSW |
| 03C8 | B922 | 396 | | MOV | R1,#DLTAHS |
| 03CA | FA | 397 | | MOV | A,R2 |
| 03CB | 41 | 398 | | ORL | A,@R1 ; UPDATE & |
| 03CC | A1 | 399 | | MOV | @R1,A ; SAVE DLTAHS |
| 03CD | B920 | 400 | | MOV | R1,#LNCRDS |
| 03CF | F1 | 401 | | MOV | A,@R1 |
| 03D0 | 4301 | 402 | | ORL | A,#01H ; SET "OR'D DELTA H/S" BIT OF 'LNCRDS' |
| 03D2 | A1 | 403 | | MOV | @R1,A |
| | | 404 | | | |
| 03D3 | 93 | 405 | | RETR | |
| | | 406 | | | |
| | | 407 | ;*** END OF SHDENC *** | | |
| | | 408 | $EJECT | | |
| | | 409 | | | |
| | | 410 | ; | NAME | BSYLED |
| | | 411 | | | |
| | | 412 | ; | | |
| | | 413 | ; | | |
| | | 414 | ; | | |
| | | 415 | | | |
| | | 416 | ; BSYLED — LINE CARD 'BUSY INDICATE LED' UPDATE ROUTINE | | |
| | | 417 | | | |
| | | 418 | BSYLED: | | |
| 03D4 | B838 | 419 | | MOV | R0,#LCST2 ; ADDR. OF 'LC STATUS 2' BYTE |
| 03D6 | BA08 | 420 | | MOV | R2,#8 |
| | | 421 | | | |
| | | 422 | ; IF ANY OF THE LINE CIRCUITS ARE BUSY TURN-ON 'BUSY LED' | | |
| | | 423 | | | |
| | | 424 | BLED1: | | |
| 03D8 | F0 | 425 | | MOV | A,@R0 |
| 03D9 | F2E1 | 426 | | JB7 | BLED2 |
| 03DB | 18 | 427 | | INC | R0 |
| 03DC | EAD8 | 428 | | DJNZ | R2,BLED1 ; IF COUNT#0, CHECK NEXT LINE CKT BUSY STATUS |
| | | 429 | | | |
| | | 430 | ; NO LINES BUSY —— TURN-OFF 'BUSY LED' | | |
| | | 431 | | | |
| 03DE | 9AEF | 432 | | ANL | P2,#0EFH ; TURN-OFF 'BUSY INDICATE LED' (P24) |
| | | 433 | | | ; & RETURN TO MAIN LOOP |
| 03E0 | 93 | 434 | | RETR | |
| | | 435 | | | |
| | | 436 | BLED2: | | |
| | | 437 | | | |
| | | 438 | ; AT LEAST ONE LINE IS BUSY —— TURN-ON 'BUSY LED' | | |
| | | 439 | | | |
| 03E1 | 8A10 | 440 | | ORL | P2,#10H ; TURN-ON 'BUSY INDICATE LED' (P24) |
| | | 441 | | | ; & RETURN TO MAIN LOOP |

```
LOC  OBJ      LINE      SOURCE STATEMENT
              442  ;
03E3 93       443       RETR
              444
              445 ;*** END OF ESYLED ***
              446 $EJECT
              447
              448 ;     NAME           RTNSH
              449
              450 ;
              451 ;
              452 ;
              453
              454
              455 ;     RTNSH — RETURN SWITCH HOOK: SENDS RETURN S/H COMMAND
              456 ;                    TO ALL LINE CIRCUITS ON THE CARD.
              457
              458 RTNSH:
03E4 8A40     459       ORL    P2,#40H       ; SET 'DATA' LINE TO 1
03E6 9A7F     460       ANL    P2,#07FH      ; SET 'CMD ENA BAR' TO 0
03E8 9900     461       ANL    P1,#0         ; PULSE CLOCK LINES LOW
03EA 89FF     462       ORL    P1,#0FFH      ;    THEN HIGH.
03EC 8A80     463       ORL    P2,#80H ; SET 'CMD ENA BAR' TO 1 TO RETURN S/H
              464 ;                           ON CLK/SH<7:0>
              465
03EE 83       466       RET
              467
              468 ;*** END OF RTNSH ***
              469 $EJECT
              470
              471 ;     NAME           CLKVCT
              472
              473 ; CLKVCT — CLOCK VECTOR LOOK-UP TABLE
              474
              475 CLKVCT:
03EF FE       476       DB     11111110B
03F0 FD       477       DB     11111101B
03F1 FB       478       DB     11111011B
03F2 F7       479       DB     11110111B
03F3 EF       480       DB     11101111B
03F4 DF       481       DB     11011111B
03F5 BF       482       DB     10111111B
03F6 7F       483       DB     01111111B
              484
              485
              486 ;*** END OF CLKVCT ***
              487 $EJECT
              488
              489 ;     NAME           TIMINT
              490
              491 ; TIMINT — TIMER INTERRUPT SERVICE ROUTINE
              492
0007          493       ORG    7
              494 TIMINT:
0007 93       495       RETR
```

| LOC OBJ | LINE | SOURCE STATEMENT | | |
|---|---|---|---|---|
| 0008 00 | 496 | | NOP | |
| | 497 | | | |
| | 498 | ;*** END OF TIMINT *** | | |
| | 499 | $EJECT | | |
| | 500 | | | |
| | 501 | ; NAME | | CMDINT |
| | 502 | | | |
| | 503 | ; | | |
| | 504 | ; | | |
| | 505 | ; | | |
| | 506 | | | |
| | 507 | ; CMDINT — COMMAND INTERRUPT SERVICE ROUTINE | | |
| | 508 | | | |
| 0003 | 509 | | ORG | 3 |
| | 510 | CMDINT: | | |
| 0003 D5 | 511 | | SEL | RB1 |
| 0004 45 | 512 | | STRT | CNT |
| 0005 0409 | 513 | | JMP | ICONT ; SKIP OVER 'TIMER INTERRUPT' VECTOR LOCATION (7-8) |
| | 514 | | | |
| 0009 | 515 | | ORG | 9 |
| | 516 | ICONT: | | |
| | 517 | ; SAVE 'A' REGISTER'S CONTENTS | | |
| 0009 B929 | 518 | | MOV | R1,#ASAVE |
| 000B A1 | 519 | | MOV | @R1,A ; SAVE CONTENTS OF 'A' REG. |
| | 520 | | | |
| | 521 | ; DISABLE COMMANDS RECEPTION | | |
| 000C B880 | 522 | | MOV | R0,#CMODE |
| 000E 2303 | 523 | | MOV | A,#03H |
| 0010 90 | 524 | | MOVX | @R0,A ; DISABLE COMMANDS RECEPTION CIRCUITRY |
| | 525 | | | |
| | 526 | ; CALCULATE AND SAVE 2'S COMPLEMENT OF RESPONSE FRAME COUNT. | | |
| 0011 42 | 527 | | MOV | A,T |
| 0012 0307 | 528 | | ADD | A,#(RSPNCD-1) |
| 0014 37 | 529 | | CPL | A |
| 0015 17 | 530 | | INC | A ; 2'S COMP. IN A REG. |
| 0016 C9 | 531 | | DEC | R1 ; R1 NOW POINTS TO 'RESPONSE COUNT' SAVE AREA |
| 0017 A1 | 532 | | MOV | @R1,A |
| | 533 | | | |
| | 534 | ; CLEAR FLAG F1 (ASSUME COMMAND RECEIVED OVER "A" PCM HIGHWAY) | | |
| | 535 | ; (F1 = A BAR/B) | | |
| 0018 A5 | 536 | | CLR | F1 |
| | 537 | | | |
| 0019 C8 | 538 | | DEC | R0 ; R0 POINTS TO CNTRL STATUS BYTE |
| 001A 80 | 539 | | MOVX | A,@R0 ; FETCH STATUS INFO. |
| 001B 1228 | 540 | | JB0 | AMATCH |
| 001D 3223 | 541 | | JB1 | BMATCH |
| | 542 | | | |
| | 543 | ; NEITHER ADDRESS COMPARATOR FLAG — | | |
| | 544 | ; **** CONTROL COMMUNICATONS I.C. HARDWARE ERROR **** | | |
| 001F D4C7 | 545 | | CALL | CFAIL |
| 0021 04AF | 546 | | JMP | RESTOR |
| | 547 | | | |
| | 548 | $EJECT | | |
| | 549 | BMATCH: | | |

```
LOC  OBJ      LINE      SOURCE STATEMENT

550 ; SET FLAG F1 (IDENTIFY "B" PCM HIGHWAY AS SOURCE OF COMMAND)
0023 B5         551         CPL     F1
0024 B885       552         MOV     R0,#BCRB2  ; LOAD R0 WITH ADDR. OFF "B" COMMAND BYTE 2
0026 042A       553         JMP     $+4        ; SKIP OVER NEXT INSTRUCTION
                554
0028 B801       555 AMATCH: MOV     R0,#ACRB2  ; LOAD R0 WITH ADDR. OF "A" COMMAND BYTE 2
                556
                557 ; FETCH FUNCTION CODE & LINE SELECT BYTE FROM COMMAND REG.
                558 ; AND SAVE IN R5.
002A 80         559         MOVX    A,@R0      ; FETCH FUNCTION CODE BYTE
002B AD         560         MOV     R5,A       ;  & SAVE IN R5
                561
                562 ; SAVE LINE CIRCUIT INDEX IN R6.
002C 5307       563         ANL     A,#07H     ; MASK OFF FUNCTIN BITS
002E AE         564         MOV     R6,A       ;  & SAVE 'LINE CKT. INDEX' IN R6
                565
                566 ; CALCULATE LINE CIRCUIT'S CLOCK VECTOR AND SAVE IN R7.
                567 ;    ('CLOCK VECTOR' LOOK-UP TABLE RESIDES IN PROG. MEM. PAGE 3)
002F 03EF       568         ADD     A,#(LOW CLKVCT)
0031 E3         569         MOVP3   A,@A       ; TABLE LOOK-UP 'CLOCK VECTOR' &
0032 AF         570         MOV     R7,A       ;   SAVE 'CLOCK VECTOR' IN R7
                571
                572 ; INCREMENT POINTER TO POINT AT COMMAND/RESPONSE DATA BYTE 1
0033 18         573         INC     R0
                574
                575
                576 ; DECODE 'FUNCTION CODE' BY USING 'FUNCTION CODE' AS AN INDEX TO
                577 ;   THE 'FUNCTION CODE' JUMP TABLE
                578
0034 FD         579         MOV     A,R5
0035 77         580         RR      A
0036 77         581         RR      A
0037 77         582         RR      A          ; FUNCTION CODE BITS IN LSB POSITIONS
0038 531F       583         ANL     A,#1FH     ; MASK OFF LINE CKT. SELECT BITS
003A 0384       584         ADD     A,#FNCODE  ; ADD FUNCTION CODE JUMP TABLE BASE ADDR.
003C B3         585         JMPP    @A         ; JUMP TO FUNCTION CODE'S SERVICE ROUTINE
                586
                587 ; ASSIGNMENT OF WORKING REGISTERS AT THIS POINT IS:
                588 ;    R0      POINTS TO BYTE 3 OF THE COMMAND/RESPONSE S/R
                589 ;    R1      GEN. PURPOSE POINTER
                590 ;    R2      GEN. PURPOSE
                591 ;    R3      GEN. PURPOSE
                592 ;    R4      GEN. PURPOSE
                593 ;    R5      CONTAINS COMMAND FUNCTION CODE
                594 ;    R6      CONTAINS LINE CKT. INDEX
                595 ;    R7      CONTAINS LINE CKT. 'CLOCK VECTOR'
                596 ;ZZZZZZZZZZZZZZZZZZZZZZZZZZZZZZZZZZZZZZZZZZZZZZZZZZZZ
                597 $EJECT
003D 3400       598 L00001: CALL    WRST1      ; 'WRITE LINE CIRCUIT STATUS 1'
003F 04AF       599         JMP     RESTOR
                600
0041 343B       601 L00010: CALL    WRTRCH     ; 'WRITE TX & RX CHAN. ASSIGNMENTS'
0043 04AF       602         JMP     RESTOR
                603
```

```
LOC  OBJ        LINE       SOURCE STATEMENT 0045 3486       684 L00011: CALL    WRTRGN  ; 'WRITE TX & RX GAIN SETTINGS'
0047 04AF       685         JMP     RESTOR
                686
0049 34AA       687 L00100: CALL    WRLBAL  ; 'WRITE LINE BALANCE SETTING BYTE'
004B 04AF       688         JMP     RESTOR
                689
004D 3485       610 L00101: CALL    WRST2   ; 'WRITE LINE CIRCUIT STATUS 2'
004F 04AF       611         JMP     RESTOR
                612
0051 94AC       613 L00110: CALL    RSDHS   ; RESET 'DELTA HOOK STATUS' BIT
0053 04AD       614         JMP     WRAPUP
                615
0055 94BD       616 L00111: CALL    SMPTX4  ; SAMPLE TX CH. 4
0057 04AF       617         JMP     RESTOR
                618
0059 B442       619 L01010: CALL    TGNADJ  ; TX GAIN AUTOMATIC ADJUSTMENT
005B 04AF       620         JMP     RESTOR
                621
005D B400       622 L01011: CALL    RGNADJ  ; RX GAIN AUTOMATIC ADJUSTMENT
005F 04AF       623         JMP     RESTOR
                624
0061 9495       625 L01100: CALL    LNTST   ; TEST SPECIFIED LINE CKT.
0063 04AF       626         JMP     RESTOR
                627
0065 5400       628 L01101: CALL    WRCDR   ; 'WRITE BYTE INTO CODEC CONTROL REG.'
0067 04AF       629         JMP     RESTOR
                630
0069 5418       631 L01110: CALL    WRCRDS  ; 'UPDATE SPECIFIED BITS OF LINE CARD STATUS'
006B 04AD       632         JMP     WRAPUP
                633
006D 5406       634 L01111: CALL    WRMEM   ; 'WRITE BYTE INTO DATA MEMORY'
006F 04AD       635         JMP     WRAPUP
                636
0071 542A       637 L10000: CALL    RDHDHS  ; 'READ "HOOK STATUS" & "DELTA HOOK STATUS"'
0073 04AD       638         JMP     WRAPUP
                639
0075 34EE       640 L10001: CALL    RDSTAT  ; 'READ LINE CIRCUIT STATUS BYTE'
0077 04AD       641         JMP     WRAPUP
                642
0079 5433       643 L10010: CALL    RDTRCH  ; 'READ TX & RX CHANNEL ASSIGNMENTS'
007B 04AD       644         JMP     WRAPUP  ;  (AS STORED IN DATA MEMORY)
                645
007D 5441       646 L10011: CALL    RQTRGN  ; 'REQUEST TX & RX GAIN SETTINGS DATA'
007F 04AF       647         JMP     RESTOR
                648
                649 $EJECT
0081 5458       650 L10100: CALL    RQLBAL  ; 'REQUEST LINE BALANCE SETTING DATA'
0083 04AF       651         JMP     RESTOR
                652
0085 54E8       653 L10101: CALL    RWPORT  ; READ/WRITE I/O PORTS 1 & 2
0087 04AD       654         JMP     WRAPUP
                655
0089 94CF       656 L11000: CALL    RDROM   ; 'READ BYTE OF PROGRAM MEMORY'
008B 04AD       657         JMP     WRAPUP
```

```
LOC  OBJ       LINE      SOURCE STATEMENT
                658
008D 27         659 L11010: CLR    A          ; 'COMMAND RESET'----RESTARTS OLC CTR SOFTWARE
008E D7         660         MOV    PSW,A      ; RESET FLAGS & STACK POINTER
008F 65         661         STOP   TCNT
0090 E5         662         SEL    MB0
0091 37         663         CPL    A
0092 39         664         OUTL   P1,A
0093 3A         665         OUTL   P2,A
0094 0400       666         JMP    RESET
                667
0096 546E       668 L11011: CALL   RQDIG      ; 'REQUEST DIGITAL PER-LINE CHIP CONTENTS'
0098 04AF       669         JMP    RESTOR
                670
009A 5488       671 L11100: CALL   RDRQST     ; 'READ REQUESTED DATA'
009C 04AD       672         JMP    WRAPUP
                673
009E 548C       674 L11101: CALL   RQCDR      ; 'REQUEST CODEC DATA REG.' ROUTINE
00A0 04AF       675         JMP    RESTOR
                676
00A2 549E       677 L11110: CALL   RDCRDS     ; 'READ CARD STATUS' ROUTINE
00A4 04AD       678         JMP    WRAPUP
                679
00A6 5400       680 L11111: CALL   RDMEM      ; 'READ BYTE OF DATA MEMORY' ROUTINE
00A8 04AD       681         JMP    WRAPUP
                682 ;////////////////////////////////////////////////
                683 L00000:                   ; 'NO OPERATION COMMAND'
                684
                685 ; UNDEFINED FUNCTION CODES-----TREATED AS NO-OPS
                686 L01000:
                687 L01001:
                688 L10110:
                689 L10111:
                690 L11001:
00AA 18         691         INC    R0         ; FUNCTION CODE IS UNDEFINED----ECHO BYTE 4
00AB 89         692         MOVX   A,@R0      ;   TO SET 'RESPONSE ENA' FLIP-FLOP
00AC 90         693         MOVX   @R0,A
                694
                695 $EJECT
                696
                697 WRAPUP:
                698 ; WAIT FOR FRAME COUNT TO REACH RESPONSE FRAME COUNT-1
00AD 14E4       699         CALL   FRWAIT
                700 RESTOR:
                701 ; RESTORE 'A' REGISTER'S CONTENTS
00AF B929       702         MOV    R1,#ASAVE
00B1 F1         703         MOV    A,@R1      ; RESTORE 'A' REG. CONTENTS
                704
                705 ; RE-ENABLE INTERRUPTS
00B2 05         706         EN     I
                707
                708 ; RETURN TO INTERRUPTED ROUTINE AT THE POINT WHERE
                709 ; INTERRUPTED AFTER RESTORING STATUS (CARRY FLAG, AUX. CARRY,
                710 ; FLAG F0, REG. BANK SELECT)
00B3 93         711         RETR
```

```
LOC  OBJ         LINE         SOURCE STATEMENT 712
                 713 ;* END OF CMDINT *
                 714 $EJECT
                 715
                 716 ;        NAME           FNCODE
                 717
                 718 ; FNCODE -- FUNCTION CODE SERVICE ROUTINE ADDRESS LOOK-UP TABLE
                 719
                 720 FNCODE:
00B4 AA          721         DB      L00000, L00001, L00010, L00011
00B5 3D
00B6 41
00B7 45
00B8 49          722         DB      L00100, L00101, L00110, L00111
00B9 4D
00BA 51
00BB 55
00BC AA          723         DB      L01000, L01001, L01010, L01011
00BD AA
00BE 59
00BF 5D
00C0 61          724         DB      L01100, L01101, L01110, L01111
00C1 65
00C2 69
00C3 6D
00C4 71          725         DB      L10000, L10001, L10010, L10011
00C5 75
00C6 79
00C7 7D
00C8 81          726         DB      L10100, L10101, L10110, L10111
00C9 85
00CA AA
00CB AA
00CC 89          727         DB      L11000, L11001, L11010, L11011
00CD AA
00CE 8D
00CF 96
00D0 9A          728         DB      L11100, L11101, L11110, L11111
00D1 9E
00D2 A2
00D3 A6

729
                 730 ;*** END OF FNCODE ***
                 731 $EJECT
                 732
                 733 ;        NAME           CNTLEN
                 734
                 735 ;
                 736 ;
                 737 ;
                 738
                 739 ; CNTLEN -- ENABLE CUSTOM CONTROL COMM. I.C. FOR COMMANDS RECEPTION
                 740
                 741 CNTLEN:
```

```
LOC  OBJ.         LINE       SOURCE STATEMENT

742 ; WAIT UNTIL 'CONTROL WINDOW' HAS PASSED
0804 45           743        STRT   CNT        ; START FRAME COUNTER
0805 42           744        MOV    A,T
0806 37           745        CPL    A
0807 07           746        DEC    A          ; 2'S COMPLEMENT OF STARTING FRAME COUNT
0808 A9           747        MOV    R1,A
                  748
0809 42           749 CNTLE1: MOV   A,T
080A 69           750        ADD    A,R1
080B 9609         751        JNZ    CNTLE1     ; LOOP UNTIL STARTING FRAME BEGINS
                  752
                  753 ; ENABLE COMMANDS RECEPTION
080D B900         754        MOV    R1,#CMODE
080F 81           755        MOVX   A,@R1
08E0 4304         756        ORL    A,#04H     ; SET 'CNTRL RX ENA'
08E2 91           757        MOVX   @R1,A
08E3 83           758        RET
                  759
                  760 FRWAIT:
                  761 ; CHECK TO SEE IF FRAME COUNT HAS REACHED OR EXCEEDED THE
                  762 ; RESPONSE FRAME COUNT.
08E4 B928         763        MOV    R1,#RSPCNT
08E6 F1           764        MOV    A,@R1      ; FETCH RESPONSE COUNT REFERENCE BYTE
08E7 A9           765        MOV    R1,A       ;   & PUT IN R1
08E8 42           766        MOV    A,T
08E9 69           767        ADD    A,R1
08EA F6EE         768        JC     TOOLAT
08EC 0409         769        JMP    CNTLE1
                  770
                  771 TOOLAT:
                  772 ; RESET 'RESPONSE ENABLE FLIP-FLOP' IN CONTROL COMM. I.C.
08EE B900         773        MOV    R1,#CMODE
08F0 81           774        MOVX   A,@R1
08F1 4308         775        ORL    A,#08H     ; PULSE 'RESP. ENA FLIP-FLOP RESET' HIGH
08F3 91           776        MOVX   @R1,A
08F4 53F7         777        ANL    A,#0F7H    ;    THEN LOW AGAIN.
08F6 91           778        MOVX   @R1,A
08F7 0404         779        JMP    CNTLEN     ; RE-ENABLE COMMANDS RECEPTION
                  780
                  781 ;*** END OF CNTLEN ***
                  782 $EJECT
                  783
                  784 ;      NAME         WRST1
                  785
                  786 ;
                  787 ;
                  788 ;
                  789
                  790 ; WRST1 -- WRITE LINE CIRCUIT STATUS 1 (SELECTED BITS)
                  791 ;          COMMAND DATA BYTE 1 CONTAINS 'NEW STATUS DATA'
                  792 ;          COMMAND DATA BYTE 2 CONTAINS 'CHANGE MASK'
                  793
0100              794        ORG    100H
                  795 WRST1:
```

```
LOC  OBJ       LINE      SOURCE STATEMENT 0100 80        796       MOVX    A,@R0   ; FETCH NEW STATUS BYTE
0101 AA        797       MOV     R2,A    ; AND SAVE IN R2
               798
0102 85        799       CLR     F0
0103 E206      800       JB5     $+3     ; SKIP NEXT INSTRUCTION IF 'PWR' BIT=1
0105 95        801       CPL     F0      ; SET F0 IF 'PWR' BIT = 0 (F0='PWR BAR')
               802
               803 ; F0 = 'PWR BAR'
0106 2330      804       MOV     A,#LCST1
0108 6E        805       ADD     A,R6    ; ADD 'LC INDEX' TO 'LINE CKT STAT' BASE ADDR.
0109 A9        806       MOV     R1,A
               807
010A 18        808       INC     R0
010B 80        809       MOVX    A,@R0   ; FETCH STATUS WRITE MASK
               810
010C E20F      811       JB5     $+3     ; SKIP NEXT INSTR  IF 'PWR MASK' = 1
010E 85        812       CLR     F0
               813
               814 ; F0 = ('PWR BAR' AND 'PWR MASK')
010F 2A        815       XCH     A,R2    ; EXCHANGE PLACES WITH 'NEW STATUS' BYTE
0110 5A        816       ANL     A,R2    ; CLR 'NEW STATUS' BYTE BIT POSITIONS NOT CHANGING
0111 2A        817       XCH     A,R2
0112 37        818       CPL     A       ; COMPLEMENT STATUS WRITE MASK
0113 51        819       ANL     A,@R1   ; CLEAR BIT POSITIONS WHICH ARE TO BE MODIFIED
0114 4A        820       ORL     A,R2    ; NEW STATUS BYTE
0115 A1        821       MOV     @R1,A
0116 C8        822       DEC     R0
0117 90        823       MOVX    @R0,A   ; PUT UPDATED STATUS BYTE IN RESPONSE REG.
0118 AA        824       MOV     R2,A    ; & SAVE IN R2
               825
0119 18        826       INC     R0
011A 34F5      827       CALL    RDST2   ; PUT CURRENT 'STATUS 2' BYTE IN RESPONSE REG.
               828
               829 ; ENABLE RESPONSE TRANSMISSION
011C 14E4      830       CALL    FRWAIT
               831
               832 $EJECT
               833 ; CHECK TO SEE IF LINE CIRCUIT IS BEING POWERED-DOWN
011E 95        834       CPL     F0
011F B631      835       JF0     NOPDWN
               836
               837 PDWN:
               838 ; LINE CIRCUIT IS BEING POWERED-DOWN---PUT CODEC IN 'STAND-BY' MODE
0121 23FF      839       MOV     A,#0FFH
0123 942F      840       CALL    CODEC
0125 2340      841       MOV     A,#TXCH
0127 6E        842       ADD     A,R6
0128 A9        843       MOV     R1,A
0129 B13F      844       MOV     @R1,#3FH    ; RESET TX CHAN. ASSIGN. BYTE IN DATA MEM.
012B 2348      845       MOV     A,#RXCH
012D 6E        846       ADD     A,R6
012E A9        847       MOV     R1,A
012F B13F      848       MOV     @R1,#3FH    ; RESET RX CHAN. ASSIGN. BYTE IN DATA MEM.
               849
```

| LOC OBJ | LINE | SOURCE STATEMENT | | |
|---|---|---|---|---|
| | 850 | NOPDWN: | | |
| | 851 | ; TRANSMIT MODIFIED STATUS TO DIGITAL PER-LINE CUSTOM I.C. | | |
| 0131 2390 | 852 LDDIG: | MOV | A,#WRDIG | |
| 0133 9400 | 853 | CALL | XMIT4 | |
| 0135 FA | 854 | MOV | A,R2 | ; UPDATED STATUS IN 'A' REG. |
| 0136 9406 | 855 | CALL | XMIT8 | ; SEND MODIFIED STATUS TO LINE CKT. |
| | 856 | | | |
| | 857 ; RETURN S/H VECTOR ON PORT 1 INPUTS | | | |
| 0138 74E4 | 858 | CALL | RTNSH | |
| | 859 | | | |
| 013A 83 | 860 | RET | | |
| | 861 | | | |
| | 862 ;*** END OF WRST1 *** | | | |
| | 863 $EJECT | | | |
| | 864 | | | |
| | 865 ; NAME WRTRCH | | | |
| | 866 | | | |
| | 867 ; | | | |
| | 868 ; | | | |
| | 869 ; | | | |
| | 870 | | | |
| | 871 ; WRTRCH — WRITE TX & RX CHANNEL ASSIGNMENTS INTO DATA MEMORY | | | |
| | 872 ; AND TO THE CODEC. | | | |
| | 873 | | | |
| | 874 WRTRCH: | | | |
| | 875 ; READ TX CHANNEL ASSIGNMENT AND STORE IN DATA MEMORY. | | | |
| 013B 2340 | 876 | MOV | A,#TXCH | |
| 013D 6E | 877 | ADD | A,R6 | ; ADD LC INDEX TO TX CHAN. BASE ADDR. |
| 013E A9 | 878 | MOV | R1,A | |
| | 879 | | | |
| 013F 80 | 880 | MOVX | A,@R0 | ; FETCH NEW TX CHANNEL ASSIGNMENT |
| 0140 A1 | 881 | MOV | @R1,A | ; STORE NEW TX CHAN. ASSIGNMENT IN RAM |
| 0141 533F | 882 | ANL | A,#3FH | ; MASK OFF 2 MSB'S |
| | 883 | | | |
| | 884 ; FORMAT TX CHANNEL ASSIGNMENT FOR CODEC | | | |
| 0143 85 | 885 | CLR | F0 | |
| 0144 95 | 886 | CPL | F0 | ; SET F0 (ASSUME ODD CHAN.) |
| 0145 97 | 887 | CLR | C | |
| 0146 67 | 888 | RRC | A | ; ROTATE LSB INTO CARRY FLAG |
| 0147 F64B | 889 | JC | WTRCH1 | ; SKIP NEXT TWO INSTRUCTIONS IF ODD |
| | 890 | | | |
| 0149 85 | 891 | CLR | F0 | ; CLEAR F0 & DECREMENT ACCUMULATOR TWICE |
| 014A 07 | 892 | DEC | A | ; IF EVEN TX CHAN. |
| | 893 | | | |
| 014B 07 | 894 WTRCH1: | DEC | A | |
| 014C 4340 | 895 | ORL | A,#40H | ; APPEND '01' PREFIX TO 'TX CHAN.' |
| 014E AC | 896 | MOV | R4,A | ; & SAVE IN R4 |
| | 897 | | | |
| | 898 ; READ RX CHANNEL ASSIGNMENT AND STORE IN DATA MEMORY. | | | |
| 014F 2348 | 899 | MOV | A,#RXCH | |
| 0151 6E | 900 | ADD | A,R6 | |
| 0152 A9 | 901 | MOV | R1,A | |
| 0153 18 | 902 | INC | R0 | ; R0 NOW POINTS TO COMMAND REG. BYTE 4 |
| | 903 | | | |

| LOC OBJ | LINE | SOURCE STATEMENT | | |
|---|---|---|---|---|
| 0154 80 | 904 | MOVX | A,@R0 | ; FETCH NEW RX CHAN. ASSIGNMENT |
| 0155 90 | 905 | MOVX | @R0,A | ; ECHO BYTE 4 TO SET RESPONSE ENA FF |
| 0156 A1 | 906 | MOV | @R1,A | ; STORE NEW RX CHAN. ASSIGNMENT IN RAM |
| 0157 533F | 907 | ANL | A,#3FH | ; MASK OFF 2 MSB'S |
| | 908 | | | |
| | 909 | ; FORMAT RX CHANNEL ASSIGNMENT FOR CODEC | | |
| 0159 4380 | 910 | ORL | A,#80H | ; PREFIX CHAN WITH '10' CODEC FUNCTION BITS |
| 015B AD | 911 | MOV | R5,A | ; & SAVE IN R5 |
| | 912 | | | |
| | 913 | $EJECT | | |
| | 914 | ; UPDATE LINE STATUS 'EVEN BAR/ODD', 'POWER', & 'LC ENA' BITS | | |
| 015C 2338 | 915 | MOV | A,#LCST1 | |
| 015E 6E | 916 | ADD | A,R6 | |
| 015F A8 | 917 | MOV | R0,A | |
| | 918 | | | |
| 0160 F0 | 919 | MOV | A,@R0 | ; FETCH 'LINE CIRCUIT STATUS' BYTE |
| 0161 43A4 | 920 | ORL | A,#0A4H | ; SET 'EVEN BAR/ODD', 'POWER', & 'LC ENA' BITS |
| 0163 B667 | 921 | JF0 | $+4 | ; SKIP NEXT INSTRUCTION IF ODD |
| | 922 | | | |
| 0165 537F | 923 | ANL | A,#7FH | ; CLEAR 'EVEN BAR/ODD' BIT IF EVEN |
| | 924 | | | |
| 0167 A0 | 925 | MOV | @R0,A | ; STORE UPDATED 'LINE CKT STATUS' BYTE |
| | 926 | | | |
| | 927 | ; SET LINE CIRCUIT'S 'BUSY' BIT | | |
| 0168 2338 | 928 | MOV | A,#LCST2 | |
| 016A 6E | 929 | ADD | A,R6 | |
| 016B A9 | 930 | MOV | R1,A | ; ADD 'LC INDEX' TO 'HW STATUS' BASE ADDR. |
| | 931 | | | |
| 016C F1 | 932 | MOV | A,@R1 | |
| 016D 4380 | 933 | ORL | A,#20H | ; SET 'BUSY' BIT |
| 016F A1 | 934 | MOV | @R1,A | |
| | 935 | | | |
| | 936 | ; CLEAR 'DELTA HOOK STATUS' BIT FOR THIS LINE CKT. | | |
| 0170 94AC | 937 | CALL | RSDHS | |
| | 938 | | | |
| | 939 | ; ENABLE RESPONSE TRANSMISSION. THEN CONTINUE WRITING CHANNEL | | |
| | 940 | ; ASSIGNMENTS TO CODEC. | | |
| 0172 14E4 | 941 | CALL | FRWAIT | |
| | 942 | | | |
| | 943 | ; SEND NEW 'LC STATUS 2' DATA TO PER-LINE DIG. CUSTOM I.C. | | |
| 0174 2300 | 944 | MOV | A,#WRDIG | |
| 0176 9400 | 945 | CALL | XMIT4 | ; PUT DIGITAL CUSTOM I.C. IN WRITE MODE |
| 0178 2338 | 946 | MOV | A,#LCST1 | |
| 017A 6E | 947 | ADD | A,R6 | |
| 017B A9 | 948 | MOV | R1,A | |
| 017C F1 | 949 | MOV | A,@R1 | ; FETCH 'LCST1' BYTE |
| 017D 9406 | 950 | CALL | XMIT8 | |
| | 951 | | | |
| | 952 | ; SEND TX CHANNEL ASSIGNMENT TO CODEC | | |
| 017F FC | 953 | MOV | A,R4 | |
| 0180 942F | 954 | CALL | CODEC | |
| | 955 | | | |
| | 956 | ; SEND RX CHANNEL ASSIGNMENT TO CODEC | | |
| 0182 FD | 957 | MOV | A,R5 | |

```
LOC  OBJ         LINE       SOURCE STATEMENT 0183 942F        958            CALL    CODEC
                 959
0185 83          960            RET
                 961
                 962 ;*** END OFF WRTRCH ***
                 963 $EJECT
                 964
                 965 ;       NAME            WRTRGN
                 966
                 967 ;
                 968 ;
                 969 ;
                 970
                 971 ; WRTRGN -- WRITE NEW TX & RX GAIN SETTINGS INTO SELECTED
                 972 ;           LINE CKT'S CUSTOM ANALOG I.C.
                 973
                 974 WRTRGN:
                 975 ; SET UP R1 AS THE DATA MEMORY POINTER FOR GAIN & BAL. SETTINGS
0186 54E1        976            CALL    RGNADD
0188 C9          977            DEC     R1      ; R1 POINTS TO TX GAIN SETTING BYTE
                 978
                 979 ; FETCH & SAVE NEW TX GAIN SETTING
0189 80          980            MOVX    A,@R0
018A A1          981            MOV     @R1,A
018B 18          982            INC     R0
                 983
                 984 ; FETCH & SAVE NEW RX GAIN SETTING
018C 19          985            INC     R1      ; R1 POINTS TO RX GAIN SETTING BYTE
018D 80          986            MOVX    A,@R0
018E 90          987            MOVX    @R0,A   ; ECHO BYTE 4 TO SET 'RESPONSE ENA' FF
018F A1          988            MOV     @R1,A
                 989
                 990 ; ENABLE RESPONSE TRANSMISSION, THEN CONTINUE WRITING GAIN SETTINGS.
0190 14E4        991            CALL    FRWAIT
                 992
                 993 ; WRITE GAIN & BALANCE SETTINGS INTO ANALOG CUSTOM I.C.
0192 2340        994 LDGAIN: MOV  A,#WRANA
0194 9400        995            CALL    XMIT4
                 996
0196 54E1        997            CALL    RGNADD
0198 19          998            INC     R1      ; R1 POINTS TO CURRENT LINE BAL. BYTE
0199 F1          999            MOV     A,@R1
019A 9406        1000           CALL    XMIT8   ; RE-WRITE CURRENT LINE BAL. INTO I.C.
                 1001
019C 54E1        1002           CALL    RGNADD  ; R1 POINTS TO RX GAIN BYTE
019E F1          1003           MOV     A,@R1
019F 9406        1004           CALL    XMIT8   ; WRITE NEW RX GAIN SETTING
                 1005
01A1 54E1        1006           CALL    RGNADD
01A3 C9          1007           DEC     R1      ; R1 POINTS TO TX GAIN BYTE
01A4 F1          1008           MOV     A,@R1
01A5 9406        1009           CALL    XMIT8   ; WRITE NEW TX GAIN SETTING
                 1010
                 1011 ; RETURN S/H VECTOR ON PORT 1 INPUTS
```

```
LOC  OBJ          LINE       SOURCE STATEMENT

01A7 74E4         1012           CALL    RTNSH
                  1013
01A9 83           1014           RET
                  1015 ;*** END OF WRTRGN ***
                  1016 $EJECT
                  1017
                  1018 ;      NAME         WRLBAL
                  1019
                  1020 ;
                  1021 ;
                  1022 ;
                  1023
                  1024 ; WRLBAL -- WRITE NEW LINE BALANCE SETTING INTO THE SELECTED
                  1025 ;          LINE CKT'S CUSTOM ANALOG I.C.
                  1026
                  1027 WRLBAL:
                  1028 ; SET UP R1 TO POINT TO LINE BAL. DATA MEMORY BYTE
01AA 54E1         1029           CALL    RGNADD
01AC 19           1030           INC     R1    ; R1 POINTS TO LINE BAL. BYTE
                  1031
                  1032 ; READ & ECHO NEW LINE BALANCE SETTING
01AD 18           1033           INC     R0    ; R0 POINTS TO BYTE 4 OF COMMAND REG.
01AE 80           1034           MOVX    A,@R0
01AF 90           1035           MOVX    @R0,A
01B0 A1           1036           MOV     @R1,A ; SAVE NEW LINE BAL. SETTING IN RAM
                  1037
                  1038 ; ENABLE RESPONSE TRANSMISSION, THEN CONTINUE WRITING LINE BALANCE
01B1 14E4         1039           CALL    FRWAIT
                  1040
                  1041 ; WRITE NEW LINE BALANCE SETTING INTO BYTE 1 OF ANALOG I.C.'S
                  1042 ;   24-BIT CONTROL REGISTER
01B3 2492         1043           JMP     LDGAIN ; (LDGAIN IS LOCATED IN WRTRGN)
                  1044
                  1045 ;*** END OF WRLBAL ***
                  1046 $EJECT
                  1047
                  1048 ;      NAME         WRST2
                  1049
                  1050 ;
                  1051 ;
                  1052 ;
                  1053
                  1054 ; WRST2 -- WRITE STATUS 2 TO THE SELECTED LINE CKT.
                  1055
                  1056 ; BIT POSITION ASSIGNMENTS
                  1057 ;     BIT 7 = 'BUSY'  (LINE BUSY)
                  1058 ;     BIT 6 = 'LK'    (LOCKOUT)
                  1059 ;     BIT 5 = 'RV'    (REVERTIVE CALL)
                  1060 ;     BIT 4 = N/A     (NOT ASSIGNED)
                  1061 ;     BIT 3 = N/A
                  1062 ;     BIT 2 = N/A
                  1063 ;     BIT 1 = N/A
                  1064 ;     BIT 0 = N/A
                  1065
```

```
LOC  OBJ      LINE     SOURCE STATEMENT
              1066 ;   COMMAND WORD DATA BYTE 1 = 'NEW STATUS DATA'
              1067 ;   COMMAND WORD DATA BYTE 2 = 'CHANGE MASK'
              1068
              1069 ;   ONLY THE BITS INDICATED BY '1' IN THE 'CHANGE MASK' ARE
              1070 ;   TO BE AFFECTED BY THIS COMMAND.
              1071
              1072 ;   LINE CIRCUIT IS POWERED-DOWN IF 'BUSY' STATUS IS CLEARED.
              1073
              1074 WRST2:
01B5 80       1075     MOVX    A,@R0    ; FETCH NEW STATUS BYTE
01B6 AA       1076     MOV     R2,A     ;  & SAVE IN R2
              1077
01B7 85       1078     CLR     F0
01B8 F2BB     1079     JB7     $+3      ; SET FLAG F0 TO 'BUSY BAR'
01BA 95       1080     CPL     F0
              1081
              1082 ; F0 = 'BUSY BAR'
01BB 23BB     1083     MOV     A,#LCST2
01BD 6E       1084     ADD     A,R6
01BE A9       1085     MOV     R1,A     ; R1 NOW POINTS TO 'LC STATUS 2' BYTE
              1086
01BF 18       1087     INC     R0
01C0 80       1088     MOVX    A,@R0    ; FETCH 'LINE STATUS 2' WRITE MASK
              1089
01C1 F2C4     1090     JB7     $+3
01C3 85       1091     CLR     F0       ; CLEAR F0 IF 'BUSY MASK' = 0
              1092
              1093 $EJECT
              1094 ; F0 = ('BUSY BAR' AND 'BUSY MASK')
01C4 2A       1095     XCH     A,R2     ; EXCHANGE PLACES WITH 'NEW STATUS' BYTE
01C5 5A       1096     ANL     A,R2     ; CLEAR BIT POSITIONS WHICH ARE NOT BEING CHANGED
01C6 2A       1097     XCH     A,R2
01C7 37       1098     CPL     A        ; COMPLEMENT WRITE MASK
01C8 51       1099     ANL     A,@R1    ; CLEAR BIT POSITIONS WHICH ARE TO BE CHANGED
01C9 4A       1100     ORL     A,R2     ; NEW STATUS BYTE
01CA A1       1101     MOV     @R1,A
              1102
01CB C8       1103     DEC     R0
01CC 34EE     1104     CALL    RDSTAT
              1105
              1106 ; WAIT FOR RESPONSE FRAME
01CE 14E4     1107     CALL    FRWAIT
              1108
01D0 B6D3     1109     JF0     PDWN2
              1110
01D2 83       1111 NOPD2:  RET
              1112
01D3 23FF     1113 PDWN2:  MOV     A,#0FFH
01D5 942F     1114     CALL    CODEC    ; PUT CODEC IN STANDBY MODE
01D7 2340     1115     MOV     A,#TXCH
01D9 6E       1116     ADD     A,R6
01DA A9       1117     MOV     R1,A
01DB B13F     1118     MOV     @R1,#3FH ; RESET TX CHAN. BYTE
01DD 2348     1119     MOV     A,#RXCH
```

```
LOC  OBJ       LINE     SOURCE STATEMENT

01DF 6E        1120          ADD     A,R6
01E0 A9        1121          MOV     R1,A
01E1 B13F      1122          MOV     @R1,#3FH    ; RESET RX CHAN. BYTE
01E3 2338      1123          MOV     A,#LCST1
01E5 6E        1124          ADD     A,R6
01E6 A9        1125          MOV     R1,A
01E7 2318      1126          MOV     A,#IDIG
01E9 A1        1127          MOV     @R1,A       ; RESET 'LC STATUS 1' BYTE
01EA AA        1128          MOV     R2,A        ;         AND
01EB 3431      1129          CALL    LDDIG       ; DIGITAL PER-LINE CUSTOM I.C.
               1130
01ED 83        1131          RET
               1132
               1133 ;*** END OF WRST2 ***
               1134 $EJECT
               1135
               1136 ;        NAME         RDSTAT
               1137
               1138 ;
               1139 ;
               1140 ;
               1141
               1142 ; RDSTAT — READ LINE CIRCUIT STATUS WORD
               1143
               1144 RDSTAT:
01EE 2338      1145          MOV     A,#LCST1    ; ADDR. OF 'LC STATUS 1'
01F0 6E        1146          ADD     A,R6        ; ADD LINE CIRCUIT INDEX
01F1 A9        1147          MOV     R1,A        ;  TO LINE CKT. INDEX AND PUT IN R1
               1148
01F2 F1        1149          MOV     A,@R1       ; FETCH 'LC STATUS 1' BYTE
01F3 90        1150          MOVX    @R0,A
01F4 18        1151          INC     R0
               1152
               1153
               1154 ; RDHWS — READ 'HW STATUS'
               1155
               1156 RDST2:
01F5 2338      1157          MOV     A,#LCST2
01F7 6E        1158          ADD     A,R6
01F8 A9        1159          MOV     R1,A
               1160
01F9 F1        1161          MOV     A,@R1       ; FETCH 'LC STATUS 2' BYTE
01FA 90        1162          MOVX    @R0,A       ; PUT 'LC STATUS 2' IN RESPONSE REG.
               1163
01FB 83        1164          RET
               1165
               1166 ;*** END OF RDSTAT ***
               1167 $EJECT
               1168
               1169 ;        NAME         RDMEM
               1170
               1171 ;
               1172 ;
               1173 ;
```

```
LOC  OBJ        LINE        SOURCE STATEMENT 1174
                1175 ;   RDMEM — READ ONE BYTE OF DATA MEMORY
                1176
                1177 ;       R0 POINTS TO ADDRESS BYTE (BYTE 3)
                1178
0200            1179        ORG     200H
                1180 RDMEM:
0200 80         1181        MOVX    A,@R0       ; FETCH ADDRESS
0201 18         1182        INC     R0
0202 A9         1183        MOV     R1,A
0203 F1         1184        MOV     A,@R1       ; DATA IN 'A' REG
0204 90         1185        MOVX    @R0,A       ; WRITE DATA INTO CONTROL REG. BYTE 3
                1186
0205 83         1187        RET
                1188
                1189 ;*** END OF RDMEM ***
                1190 $EJECT
                1191
                1192 ;       NAME        WRMEM
                1193
                1194 ;
                1195 ;
                1196 ;
                1197
                1198 ; WRMEM — WRITE ONE BYTE INTO DATA MEMORY
                1199
                1200 ;       R0 POINTS TO ADDRESS BYTE (BYTE 3)
                1201 ;       BYTE 4 CONTAINS DATA TO BE WRITTEN INTO DATA MEMORY
                1202
                1203 WRMEM:
0206 80         1204        MOVX    A,@R0       ; FETCH ADDRESS
0207 18         1205        INC     R0
0208 A9         1206        MOV     R1,A
0209 80         1207        MOVX    A,@R0       ; FETCH DATA
020A A1         1208        MOV     @R1,A       ;   AND WRITE INTO DATA MEMORY
020B 90         1209        MOVX    @R0,A       ; SET RESPONSE ENABLE FLIP-FLOP BY
                1210                            ;   WRITING INTO CONTROL REG. BYTE 4
020C 83         1211        RET
                1212
                1213 ;*** END OF WRMEM ***
                1214 $EJECT
                1215
                1216 ;       NAME        WRCDR
                1217
                1218 ;
                1219 ;
                1220 ;
                1221
                1222 ; WRCDR — WRITE CONTROL DATA INTO CODEC
                1223
                1224 WRCDR:
                1225 ; FETCH CODEC CONTROL BYTE FROM COMMAND REG. BYTE 3
020D 80         1226        MOVX    A,@R0
020E AC         1227        MOV     R4,A
```

```
LOC  OBJ        LINE        SOURCE STATEMENT 1228
                1229 ; ECHO COMMAND REG BYTE 4 TO SET 'RESPONSE ENABLE' FLIP-FLOP
020F 18         1230        INC     R0
0210 80         1231        MOVX    A,@R0
0211 90         1232        MOVX    @R0,A
                1233
                1234 ; WAIT FOR RESPONSE FRAME
0212 14E4       1235        CALL    FRWAIT
                1236
                1237 ; SEND CONTROL BYTE TO CODEC
0214 FC         1238        MOV     A,R4
0215 942F       1239        CALL    CODEC
                1240
0217 83         1241        RET
                1242
                1243 ;*** END OF WRCDR ***
                1244 $EJECT
                1245
                1246 ;      NAME            WRCRDS
                1247
                1248 ;
                1249 ;
                1250 ;
                1251
                1252 ; WRCRDS -- WRITE NEW DATA INTO LINE CARD STATUS BYTE FROM
                1253 ;            LINE SWITCH CONTROLLER.  THE FIRST COMMAND
                1254 ;            WORD DATA BYTE CONTAINS THE NEW DATA;  THE
                1255 ;            SECOND COMMAND DATA BYTE CONTAINS THE CHANGE
                1256 ;            MASK IN WHICH A '1' INDICATES THAT THAT BIT
                1257 ;            POSITION(S) IN THE CURRENTLY STORED LINE CARD
                1258 ;            STATUS BYTE IS(ARE) TO BE UPDATED TO THE VALUES
                1259 ;            IN THE FIRST COMMAND DATA BYTE.
                1260
                1261 ;            NOTE THAT IF ALL BITS OF THE 'CHANGE MASK' ARE
                1262 ;            '0' THEN THE COMMAND IS EQUIVALENT TO A READ
                1263 ;            OF THE CURRENT LINE CARD STATUS BYTE.
                1264
                1265 WRCRDS:
0218 80         1266        MOVX    A,@R0   ; FETCH NEW DATA WORD &
0219 AB         1267        MOV     R3,A    ;   SAVE IN R3
021A 18         1268        INC     R0
021B 80         1269        MOVX    A,@R0   ; FETCH DATA CHANGE MASK
021C AA         1270        MOV     R2,A    ;   & SAVE IN R2
021D 5B         1271        ANL     A,R3    ; 'AND' MASK WITH NEW DATA BYTE &
021E AB         1272        MOV     R3,A    ;   SAVE 'MASKED NEW DATA BITS' IN R3
                1273
021F B920       1274        MOV     R1,#LNCRDS
0221 FA         1275        MOV     A,R2
0222 37         1276        CPL     A       ; COMPLEMENT 'CHANGE MASK' (ONE'S IN BIT
                1277                        ;   POSITIONS NOT TO BE UPDATED)
0223 51         1278        ANL     A,@R1   ; ZERO BIT POSITIONS OF CURRENT CARD STATUS
                1279                        ;   BYTE WHICH ARE NOT TO CHANGE
0224 4B         1280        ORL     A,R3    ; UPDATED LINE CARD STATUS BYTE
0225 A1         1281        MOV     @R1,A
```

```
LOC  OBJ      LINE        SOURCE STATEMENT 1282
              1283 ; LOAD 'CARD STATUS' & 'S/H VECTOR' INTO RESPONSE REGISTER
0226 C8       1284        DEC     R0
0227 549E     1285        CALL    RDCRDS
              1286
0229 83       1287        RET
              1288
              1289 ;*** END OF WRCRDS ***
              1290 $EJECT
              1291
              1292 ;        NAME          RDHDHS
              1293
              1294 ;
              1295 ;
              1296 ;
              1297
              1298 ;  RDHDHS -- READ 'HOOK STATUS VECTOR' & 'DELTA HOOK STATUS VECTOR'
              1299 ;              THEN RESET 'DELTA HOOK STATUS VECTOR' & "OR'D DLTA HS"
              1300
              1301 RDHDHS:
022A B921     1302        MOV     R1,#HSW ; ADDR. OF 'HOOK SWITCH STATUS VECTOR'
022C F1       1303        MOV     A,@R1
022D 90       1304        MOVX    @R0,A   ; WRITE 'HOOK STATUS VECTOR' INTO BYTE 3
022E 18       1305        INC     R0
022F 19       1306        INC     R1
0230 F1       1307        MOV     A,@R1
0231 90       1308        MOVX    @R0,A   ; WRITE 'DELTA HS VECTOR' INTO BYTE 4
              1309
0232 83       1310        RET
              1311
              1312 ;*** END OF RDHDHS ***
              1313 $EJECT
              1314
              1315 ;        NAME          RDTRCH
              1316
              1317 ;
              1318 ;
              1319 ;
              1320
              1321 ;  RDTRCH -- READ MOST RECENT TX & RX CHANNEL ASSIGNMENTS
              1322 ;              FOR THE SPECIFIED LINE CIRCUIT.
              1323
              1324 RDTRCH:
0233 2340     1325        MOV     A,#TXCH
0235 6E       1326        ADD     A,R6    ; ADD LC INDEX TO TX CHAN. BASE ADDR.
0236 F9       1327        MOV     R1,A    ;    AND MOVE INTO POINTER REG. R1
              1328
0237 F1       1329        MOV     A,@R1   ; FETCH STORED TX CHANNEL ASSIGNMENT
0238 90       1330        MOVX    @R0,A   ;    AND MOVE TX CHAN. INTO CNTRL. S/R BYTE 3
0239 18       1331        INC     R0
              1332
023A 2348     1333        MOV     A,#RXCH
023C 6E       1334        ADD     A,R6    ; ADD LC INDEX TO RX CHAN. BASE ADDR.
023D A9       1335        MOV     R1,A
```

```
LOC  OBJ       LINE       SOURCE STATEMENT 1336
023E F1        1337            MOV     A,@R1      ; FETCH STORED RX CHANNEL ASSIGNMENT
023F 90        1338            MOVX    @R0,A      ;   AND MOVE RX CHAN. INTO CNTRL S/R BYTE 4
               1339                               ;   (WHICH ALSO SETS RESPONSE ENA FLIP-FLOP)
               1340
0240 83        1341            RET
               1342
               1343 ;*** END OF RDTRCH ***
               1344 $EJECT
               1345
               1346 ;      NAME            RQTRGN
               1347
               1348 ;
               1349 ;
               1350 ;
               1351
               1352 ; RQTRGN -- REQUEST CURRENT TX & RX GAIN SETTINGS FOR THE
               1353 ;              SELECTED LINE CIRCUIT.
               1354
               1355 RQTRGN:
0241 9440      1356            CALL    RQST    ; 'REQUEST' COMMAND PRELIMINARY TASKS
               1357
0243 2308      1358            MOV     A,#RDANA
0245 9408      1359            CALL    XMIT4
               1360
               1361 ; ENABLE RESPONSE TRANSMISSION, THEN FETCH REQUESTED DATA.
0247 14E4      1362            CALL    FRWAIT
               1363
               1364 ; SKIP OVER LINE BALANCE BYTE IN ANALOG PER-LINE I.C.
0249 54C7      1365            CALL    CKBRST
               1366
               1367 ; FETCH RX GAIN SETTING
024B 941C      1368            CALL    RCV8
024D B927      1369            MOV     R1,#RQBYT2
024F A1        1370            MOV     @R1,A   ; 'RQBYT2' = RX GAIN SETTING
               1371
               1372 ; FETCH TX GAIN SETTING
0250 941C      1373            CALL    RCV8
0252 B926      1374            MOV     R1,#RQBYT1
0254 A1        1375            MOV     @R1,A   ; 'RQBYT1' = TX GAIN SETTING
               1376
               1377 ; RETURN S/H VECTOR ON PORT 1 INPUTS
0255 74E4      1378            CALL    RTNSH
               1379
0257 83        1380            RET
               1381
               1382 ;*** END OFF RQTRGN ***
               1383 $EJECT
               1384
               1385 ;      NAME            RQLBAL
               1386
               1387 ;
               1388 ;
               1389 ;
```

```
LOC  OBJ        LINE       SOURCE STATEMENT
                1390
                1391 ; RQLBAL -- REQUEST CURRENT LINE BALANCE SETTING
                1392
                1393 RQLBAL:
                1394 ; 'REQUEST' COMMAND PRELIMINARY OPERATIONS
0258 9440       1395        CALL    RQST
                1396
025A 2309       1397        MOV     A,#RDANA ; SET ANALOG CHIP FOR READ MODE
025C 9400       1398        CALL    XMIT4
                1399
                1400 ; ENABLE RESPONSE TRANSMISSION, THEN CONTINUE TO FETCH REQUESTED DATA
025E 14E4       1401        CALL    FRWAIT
                1402
                1403 ; FETCH LINE BALANCE SETTING BYTE FROM ANALOG PER-LINE I.C.
0260 941C       1404        CALL    RCV8
0262 B926       1405        MOV     R1,#RQBYT1
0264 A1         1406        MOV     @R1,A    ; 'RQBYT1' = 'LINE BALANCE BYTE'
                1407
0265 19         1408        INC     R1
0266 A1         1409        MOV     @R1,A    ; 'RQBYT2' = 'RQBYT1'
                1410
                1411 ; SKIP OVER RX & TX GAIN SETTINGS
0267 54C7       1412        CALL    CKBRST
0269 54C7       1413        CALL    CKBRST
                1414
                1415 ; RETURN S/H VECTOR ON PORT 1 INPUTS
026B 74E4       1416        CALL    RTNSH
                1417
026D 83         1418        RET
                1419
                1420 ;*** END OF RQLBAL ***
                1421 $EJECT
                1422
                1423 ;       NAME            RQDIG
                1424
                1425 ;
                1426 ;
                1427 ;
                1428
                1429 ; RQDIG -- REQUEST DIGITAL PER-LINE CUSTOM I.C.'S CONTENTS
                1430
                1431 RQDIG:
                1432 ; 'REQUEST' COMMAND PRELIMINARY OPERATIONS
026E 9440       1433        CALL    RQST
                1434
                1435 ; SEND 'READ DIGITAL I.C.' COMMAND TO LINE CIRCUITS
0270 2358       1436        MOV     A,#RDDIG
0272 9400       1437        CALL    XMIT4
                1438
                1439 ; ENABLE RESPONSE TRANSMISSION, THEN CONTINUE TO FETCH REQUESTED DATA
0274 14E4       1440        CALL    FRWAIT
                1441
                1442 ; FETCH CONTENTS OF DIGITAL PER-LINE I.C.
0276 941C       1443        CALL    RCV8
```

```
LOC  OBJ       LINE         SOURCE STATEMENT

0278 B926      1444             MOV    R1,#RQBYT1
027A A1        1445             MOV    @R1,A   ; 'RQBYT1' = DIGITAL I.C.'S CONTENTS
               1446
027B 19        1447             INC    R1
027C A1        1448             MOV    @R1,A   ; 'RQBYT2' = 'RQBYT1'
               1449
               1450 ;  RETURN S/H VECTOR ON PORT 1 INPUTS
027D 74E4      1451             CALL   RTNSH
               1452
027F 83        1453             RET
               1454
               1455 ;*** END OF RQDIG ***
               1456 $EJECT
               1457
               1458 ;     NAME           RDRQST
               1459
               1460 ;
               1461 ;
               1462 ;
               1463
               1464 ; RDRQST -- READ DATA CURRENTLY IN THE 'REQUESTED DATA'
               1465 ;          LOCATIONS OF DATA MEMORY.  ONE BYTE RETURNED
               1466 ;          WILL BE THE FUNCTION CODE BYTE WHICH LAST
               1467 ;          REQUESTED DATA AND THE REMAINING TWO BYTES
               1468 ;          ARE THE ACTUAL REQUESTED DATA BYTES.
               1469
               1470 RDRQST:
0280 C8        1471             DEC    R0
0281 B925      1472             MOV    R1,#RQFNCD ; LOCATION WHERE 'RQST FUNCTION CODE'
               1473                                ; IS STORED.
0283 BA03      1474             MOV    R2,#3      ; 3 BYTES TO BE MOVED
0285 F1        1475 RQNEXT: MOV  A,@R1
0286 90        1476             MOVX   @R0,A
0287 18        1477             INC    R0
0288 19        1478             INC    R1
0289 EA85      1479             DJNZ   R2,RQNEXT
               1480
028B 83        1481             RET
               1482
               1483 ;*** END OF RDRQST ***
               1484 $EJECT
               1485
               1486 ;     NAME           RQCDR
               1487
               1488 ;
               1489 ;
               1490 ;
               1491
               1492 ; RQCDR -- REQUEST CODEC DATA REGISTER CONTENTS
               1493
               1494
               1495 RQCDR:
               1496 ; 'REQUEST' COMMAND PRELIMINARY OPERATIONS
028C 9440      1497             CALL   RQST
```

```
LOC  OBJ        LINE        SOURCE STATEMENT 1498
                1499 ; SEND 'READ CODEC DATA REG.' COMMAND TO PER-LINE I.C.'S
028E 23A0       1500        MOV     A,#RDCDR
0290 9400       1501        CALL    XMIT4
                1502
                1503 ; ENABLE RESPONSE TRANSMISSION, THEN CONTINUE TO FETCH REQUESTED DATA
0292 14E4       1504        CALL    FRWAIT
                1505
                1506 ; FETCH CODEC DATA REGISTER CONTENTS
0294 941C       1507        CALL    RCV8
0296 B926       1508        MOV     R1,#RQBYT1  ; RQBYT1='CODEC DATA REG.' CONTENTS
0298 A1         1509        MOV     @R1,A
0299 19         1510        INC     R1
029A A1         1511        MOV     @R1,A       ; 'RQBYT2' = 'RQBYT1'
                1512
                1513 ; RETURN S/H VECTOR ON PORT 1 INPUTS
029B 74E4       1514        CALL    RTNSH
                1515
029D 83         1516        RET
                1517
                1518 ;*** END OF RDCDR ***
                1519 $EJECT
                1520
                1521 ;       NAME            RDCRDS
                1522
                1523 ;
                1524 ;
                1525 ;
                1526
                1527 ; RDCRDS -- READ LINE CARD STATUS
                1528
                1529 RDCRDS:
                1530 ; FETCH CURRENT LINE CARD STATUS BYTE FROM DATA MEMORY
                1531 ; AND MOVE INTO RESPONSE REG. BYTE 3
                1532
029E B920       1533        MOV     R1,#LNCRDS
02A0 F1         1534        MOV     A,@R1
02A1 90         1535        MOVX    @R0,A
                1536
                1537 ; PUT S/H VECTOR INTO RESPONSE REG. BYTE 4
                1538
02A2 18         1539        INC     R0
02A3 09         1540        IN      A,P1        ; READ S/H VECTOR
02A4 90         1541        MOVX    @R0,A
                1542
02A5 83         1543        RET
                1544
                1545 ;*** END OF RDCRDS ***
                1546 $EJECT
                1547
                1548 ;       NAME            LINERS
                1549
                1550 ;
                1551 ;
```

```
LOC  OBJ       LINE      SOURCE STATEMENT

1552 ;
               1553
               1554 ;  LINE -- RESET ALL LINE CIRCUITS ON LINE CARD
               1555
               1556 ; DIGITAL PER-LINE CUSTOM I.C.'S INITIALIZATION VALUES
               1557 ; BIT 7  EVEN BAR/ODD=   0 (EVEN 4 MHZ CHAN.)
               1558 ; BIT 6  EURO SEL=       0 (NON-EUROPEAN FORMAT)
               1559 ; BIT 5  POWER=          0 (LINE CKT. POWERED DOWN)
               1560 ; BIT 4  TR=             1 (TEST RELAY OPEN)
               1561 ; BIT 3  RR=             1 (RING RELAY OPEN)
               1562 ; BIT 2  LC EN=          0 (LINE CKT'S PCM DRIVERS IN HI-Z STATE)
               1563 ; BIT 1  ILS=            0 (ILS NOT SELECTED)
               1564 ; BIT 0  A BAR/B SEL=    0 (DEFAULTS TO 'A' PCM)
               1565
               1566 ;  CODEC IS PUT IN 'STANDBY' MODE
               1567
               1568 ; ANALOG PER-LINE CUSTOM I.C.'S INITIALIZATION VALUES
               1569 ;       'CLKC +BAR/-'   IS SET TO 1
               1570 ;       'LINE BAL'      IS SET TO 'STD BAL SETTING' (4H)
               1571 ;       'RX GAIN'       IS SET TO 'STD RX GN SETTING' (20H)
               1572 ;       'TX GAIN'       IS SET TO 'STD TX GAIN SETTING' (20H)
               1573
               1574 LINERS:
               1575 ;  WRITE TO DIGITAL PER-LINE CHIPS
02A6 BF00      1576          MOV    R7,#0    ; CLOCK VECTOR FOR ALL LINE CKTS
02A8 2300      1577          MOV    A,#WRDIG ; 'WRITE TO DIGITAL CHIP' CODE
02AA 9400      1578          CALL   XMIT4
02AC 2318      1579          MOV    A,#IDIG  ; INIT. DIG. CHIP CONTENTS TO 00011000B
02AE 9406      1580          CALL   XMIT8
               1581
               1582 ; WRITE TO CODECS
02B0 23FF      1583          MOV    A,#ICODEC
02B2 942F      1584          CALL   CODEC    ; PUT CODECS IN 'STANDBY' MODE
               1585
               1586 ; WRITE TO ANALOG PER-LINE CHIP
02B4 2340      1587          MOV    A,#WRANA ; 'WRITE TO ANALOG CHIP' CODE
02B6 9400      1588          CALL   XMIT4
02B8 2384      1589          MOV    A,#IANA1 ; INITIAL 'CLKC' & 'LINE BAL' SETTINGS
02BA 9406      1590          CALL   XMIT8
02BC 2300      1591          MOV    A,#IANA2 ; INITIAL 'RX GAIN SETTING'
02BE 9406      1592          CALL   XMIT8
02C0 2300      1593          MOV    A,#IANA3 ; INITIAL 'TX GAIN SETTING'
02C2 9406      1594          CALL   XMIT8
               1595
               1596 ; RETURN S/H ON PORT 1
02C4 74E4      1597          CALL   RTNSH
02C6 83        1598          RET
               1599 ;*** END OF LINERS ***
               1600 $EJECT
               1601
               1602 ;       NAME            CKBRST
               1603
               1604 ;
               1605 ;
```

| LOC OBJ | LINE | SOURCE STATEMENT | | |
|---|---|---|---|---|
| | 1606 ; | | | |
| | 1607 | | | |
| | 1608 | | | |
| | 1609 ; | CKBRST — PULSES CLOCK LINE 8 TIMES AT MAX. RATE | | |
| | 1610 | | | |
| | 1611 ; | R7 CONTAINS CLOCK VECTOR UPON ENTRY | | |
| | 1612 ; | | | |
| | 1613 | | | |
| | 1614 CKBRST: | | | |
| 02C7 FF | 1615 | MOV | A, R7 | ; MOVE CLOCK VECTOR INTO A |
| 02C8 39 | 1616 | OUTL | P1, A | |
| 02C9 89FF | 1617 | ORL | P1, #0FFH | |
| 02CB 39 | 1618 | OUTL | P1, A | |
| 02CC 89FF | 1619 | ORL | P1, #0FFH | |
| 02CE 39 | 1620 | OUTL | P1, A | |
| 02CF 89FF | 1621 | ORL | P1, #0FFH | |
| 02D1 39 | 1622 | OUTL | P1, A | |
| 02D2 89FF | 1623 | ORL | P1, #0FFH | |
| 02D4 39 | 1624 | OUTL | P1, A | |
| 02D5 89FF | 1625 | ORL | P1, #0FFH | |
| 02D7 39 | 1626 | OUTL | P1, A | |
| 02D8 89FF | 1627 | ORL | P1, #0FFH | |
| 02DA 39 | 1628 | OUTL | P1, A | |
| 02DB 89FF | 1629 | ORL | P1, #0FFH | |
| 02DD 39 | 1630 | OUTL | P1, A | |
| 02DE 89FF | 1631 | ORL | P1, #0FFH | |
| | 1632 | | | |
| 02E0 83 | 1633 | RET | | |
| | 1634 | | | |
| | 1635 ;*** END OF CKBRST *** | | | |
| | 1636 $EJECT | | | |
| | 1637 | | | |
| | 1638 ; | NAME | RGNADD | |
| | 1639 | | | |
| | 1640 ; | | | |
| | 1641 ; | | | |
| | 1642 ; | | | |
| | 1643 | | | |
| | 1644 ; | RGNADD — LOADS REG. R1 WITH THE ADDRESS OF THE RX GAIN SETTING | | |
| | 1645 ; | BYTE FOR THE SELECTED LINE CKT. | | |
| | 1646 | | | |
| | 1647 RGNADD: | | | |
| 02E1 FE | 1648 | MOV | A, R6 | |
| 02E2 E7 | 1649 | RL | A | |
| 02E3 6E | 1650 | ADD | A, R6 | ; 3 * 'LC INDEX' |
| 02E4 0351 | 1651 | ADD | A, #(GNBAL+1) | ; ADD BASE ADDR. OF RX GAIN SETTING BYTE |
| 02E6 A9 | 1652 | MOV | R1, A | |
| | 1653 | | | |
| 02E7 83 | 1654 | RET | | |
| | 1655 | | | |
| | 1656 ;*** END OF RGNADD *** | | | |
| | 1657 $EJECT | | | |
| | 1658 | | | |
| | 1659 ; | NAME | RWPORT | |

```
LOC  OBJ        LINE        SOURCE STATEMENT 1660
                1661 ;
                1662 ;
                1663 ;
                1664
                1665 ; RWPORT — READ/WRITE DATA FROM/TO I/O PORTS 1 & 2
                1666
                1667 ; BIT 1 OF FUNCTION CODE BYTE (COMMAND BYTE 2) = R/W BAR PORT 1
                1668 ;  "  2  "     "     "    "   (    "      "   ") = R/W BAR PORT 2
                1669
                1670 RWPORT:
                1671 ; TEST IF READ OR WRITE OPERATION ON PORT 1
82E8 FD         1672        MOV    A,R5     ; FETCH FUNCTION CODE BYTE
82E9 32ED       1673        JB1    $+4      ; SKIP NEXT TWO INSTRUCTIONS IF READ COMMAND
82EB 80         1674        MOVX   A,@R0    ; FETCH NEW PORT 1 DATA
82EC 39         1675        OUTL   P1,A     ;   & WRITE INTO PORT 1
82ED 09         1676        IN     A,P1     ; READ PORT 1
82EE 90         1677        MOVX   @R0,A    ;   & RETURN IN RESPONSE BYTE 3
                1678
                1679 ; TEST IF READ OR WRITE OPERATION ON PORT 2
82EF 18         1680        INC    R0
82F0 FD         1681        MOV    A,R5
82F1 12F5       1682        JB0    $+4      ; SKIP NEXT TWO INSTRUCTIONS IF READ COMMAND
82F3 80         1683        MOVX   A,@R0    ; FETCH NEW PORT 2 DATA
82F4 3A         1684        OUTL   P2,A     ;   & WRITE INTO PORT 2
82F5 0A         1685        IN     A,P2     ; READ PORT 2
82F6 90         1686        MOVX   @R0,A    ;   & RETURN IN RESPONSE BYTE 4
                1687
82F7 83         1688        RET
                1689
                1690 ;*** END OF RWPORT ***
                1691 $EJECT
                1692
                1693 ;     NAME          XMIT
                1694
                1695 ;
                1696 ;
                1697 ;
                1698
                1699 ;     XMIT — TRANSMIT DATA TO LINE CIRCUIT
                1700
                1701 ;     ASSUMED CONTENTS OF REGISTERS UPON ENTRY:
                1702 ;             R7    CLOCK VECTOR(I.E. BIT CORRESPONDING
                1703 ;                       TO SELECTED LINE CKT IS A LOGIC
                1704 ;                       '0', ALL OTHER BITS MUST BE '1')
                1705 ;             A     DATA TO SENT TO LINE CKT. (MSB 1ST)
                1706 ;             R1    BIT COUNTER: NUMBER OF BITS TO BE SENT
                1707 ;                       (NORMALLY 1-8)
                1708
                1709 ;             R3    HOLDS INTERMEDIATE RESULTS
                1710 ;             P26   DATA LINE TO LINE CIRCUITS
                1711 ;             P27   'CMD ENA BAR' LINE TO LINE CIRCUITS
                1712 ;             P1    PORT 1 IS THE CLOCK/SH VECTOR INTERFACE
                1713 ;                       TO THE LINE CIRCUITS(BIT 0 GOES
```

| LOC OBJ | LINE | SOURCE STATEMENT | | |
|---|---|---|---|---|
| | 1714 ; | | TO LC #1, BIT 1 TO LC #2, ETC.) | |
| | 1715 | | | |
| | 1716 | | | |
| 0400 | 1717 | ORG | 400H | |
| | 1718 XMIT4: | | | |
| 0400 B904 | 1719 | MOV | R1,#4 | |
| 0402 9A7F | 1720 | ANL | P2,#7FH ; 'CMD ENA BAR' = 0 | |
| 0404 8408 | 1721 | JMP | XMIT | |
| | 1722 | | | |
| 0406 B908 | 1723 XMIT8: | MOV | R1,#8 | |
| | 1724 | | | |
| | 1725 XMIT: | | | |
| 0408 AB | 1726 | MOV | R3,A | |
| 0409 F20F | 1727 | JB7 | XMIT1 ; IS '0' OR '1' TO BE SENT NEXT? | |
| 040B 9ABF | 1728 XMIT0: | ANL | P2,#0BFH ; SET DATA LINE TO 0 | |
| 040D 8411 | 1729 | JMP | CKPSL | |
| | 1730 | | | |
| 040F 8A40 | 1731 XMIT1: | ORL | P2,#40H ; SET DATA LINE TO 1 | |
| 0411 FF | 1732 CKPSL: | MOV | A,R7 ; LOAD CLOCK VECTOR INTO A | |
| 0412 39 | 1733 | OUTL | P1,A ; PULSE CLOCK LINE LOW | |
| 0413 89FF | 1734 | ORL | P1,#0FFH ; THEN HIGH | |
| | 1735 | | | |
| 0415 FB | 1736 | MOV | A,R3 ; HAVE ALL BITS BEEN TRANSMITTED? | |
| 0416 E7 | 1737 | RL | A | |
| 0417 E908 | 1738 | DJNZ | R1,XMIT | |
| | 1739 | | | |
| 0419 8AC0 | 1740 | ORL | P2,#0C0H ; SET 'CMD ENA BAR' AND 'DATA' TO 1 | |
| 041B 83 | 1741 | RET | | |
| | 1742 | | | |
| | 1743 ;*** END OF XMIT *** | | | |
| | 1744 $EJECT | | | |
| | 1745 | | | |
| | 1746 ; NAME RCV | | | |
| | 1747 | | | |
| | 1748 ; | | | |
| | 1749 ; | | | |
| | 1750 ; | | | |
| | 1751 | | | |
| | 1752 ; RCV -- RECEIVE 1 TO 8 BITS OF DATA FROM THE LINE CIRCUIT | | | |
| | 1753 ; SPECIFIED BY THE CLOCK VECTOR STORED IN R2 UPON ENTRY. | | | |
| | 1754 | | | |
| | 1755 ; ENTRY POINT 'RCV8' RECEIVES 8 BITS OF DATA RETURNED IN 'A' REG | | | |
| | 1756 | | | |
| | 1757 RCV8: | | | |
| 041C B908 | 1758 | MOV | R1,#8 | |
| | 1759 RCV: | | | |
| 041E FF | 1760 | MOV | A,R7 ; MOVE CLOCK VECTOR INTO A | |
| 041F 39 | 1761 | OUTL | P1,A ; 'CLOCK LINE' = 0 | |
| 0420 0A | 1762 | IN | A,P2 ; READ IN NEXT BIT OF DATA | |
| 0421 89FF | 1763 | ORL | P1,#0FFH ; 'CLOCK LINE' = 1 | |
| 0423 97 | 1764 | CLR | C ; CLEAR CARRY FLAG (ASSUME DATA = 0) | |
| 0424 37 | 1765 | CPL | A | |
| 0425 0228 | 1766 | JB6 | RD0 ; SKIP NEXT INSTR. IF 'DATA' = 0 | |
| 0427 A7 | 1767 RD1: | CPL | C ; SET CARRY FLAG (SINCE DATA = 1) | |

```
LOC  OBJ      LINE      SOURCE STATEMENT

0428 FB       1768 RD0:    MOV    A,R3
0429 F7       1769         RLC    A         ; MOVE NEXT DATA BIT INTO LSB
042A AB       1770         MOV    R3,A      ;  POSITION OF R3
              1771
042B E91E     1772         DJNZ   R1,RCV    ; HAVE ALL BITS BEEN RECEIVED?
              1773
042D FB       1774         MOV    A,R3      ; LOAD 'A' WITH RECEIVED DATA AND RETURN
              1775                          ;   TO CALLING ROUTINE
042E 83       1776         RET
              1777
              1778 ;*** END OF RCV ***
              1779 $EJECT
              1780
              1781 ;     NAME        CODEC
              1782
              1783 ;
              1784 ;
              1785 ;
              1786
              1787 ; CODEC -- THE DATA CONTAINED IN THE 'A' REG. UPON ENTRY
              1788 ;          IS TRANSMITTED TO THE SELECTED LINE CIRCUIT'S
              1789 ;          CODEC.
              1790
              1791 ; ASSUMED REG. CONTENTS UPON ENTRY:
              1792 ;     R7=CLOCK VECTOR
              1793 ;      A=CODEC CONTROL DATA
              1794
              1795 CODEC:
042F AC       1796         MOV    R4,A      ; SAVE CODEC CONTROL DATA
0430 2320     1797         MOV    A,#WRCDRC
0432 9400     1798         CALL   XMIT4     ; PUT ANALOG CUSTOM I.C. IN 'WRITE TO CDR' MODE
0434 FC       1799         MOV    A,R4
0435 9406     1800         CALL   XMIT8     ; LOAD DATA INTO CODEC DATA REG.
              1801
0437 2360     1802         MOV    A,#LDCODC
0439 9400     1803         CALL   XMIT4     ; PUT DIG. I.C. IN 'LOAD CODEC' MODE
043B 54C7     1804         CALL   CKBRST    ; LOAD DATA INTO CODEC
              1805
043D 74E4     1806         CALL   RTNSH     ; PUT CUSTOM I.C. IN 'RETURN S/H' MODE
              1807
043F 83       1808         RET
              1809
              1810 ;*** END OF CODEC ***
              1811 $EJECT
              1812
              1813 ;     NAME        RQST
              1814
              1815 ;
              1816 ;
              1817 ;
              1818
              1819 ; RQST -- PERFORM THE PRELIMINARY STUFF THAT'S COMMON TO
              1820 ;         ALL 'RQXXXX' SUBROUTINES.
              1821
```

```
LOC  OBJ      LINE       SOURCE STATEMENT

1822 RQST:
              1823 ; ECHO COMMAND BYTE 4 TO SET 'RESPONSE ENABLE' FLIP-FLOP
0440 18       1824            INC      R0
0441 80       1825            MOVX     A,@R0
0442 90       1826            MOVX     @R0,A
              1827
              1828 ; MOVE FUNCTION CODE BYTE OF REQUEST COMMAND INTO 'RQFNCD'
0443 B925     1829            MOV      R1,#RQFNCD
0445 FD       1830            MOV      A,R5
0446 A1       1831            MOV      @R1,A
              1832
              1833 ; SET 'RQST A BAR/B' TO THE VALUE OF FLAG F1
0447 B920     1834            MOV      R1,#LNCRDS    ; ADDR. OF LINE CARD STATUS BYTE
0449 F1       1835            MOV      A,@R1
044A 7650     1836            JF1      $+6           ; SKIP NEXT 3 INSTRUCTIONS IF 'F1' = 1
              1837
              1838 ; REQUEST COMMAND WAS RECEIVED OVER 'A' PCM HIGHWAY
044C 53FB     1839            ANL      A,#0FBH ; CLEAR 'RQST A BAR/B' (BIT 2)
044E A1       1840            MOV      @R1,A
044F 83       1841            RET
              1842
              1843 ; REQUEST COMMAND WAS RECEIVED OVER 'B' PCM HIGHWAY
0450 4304     1844            ORL      A,#04H ; SET 'RQST A BAR/B' (BIT 2)
0452 A1       1845            MOV      @R1,A
0453 83       1846            RET
              1847
              1848 ;*** END OF RQST ***
              1849 $EJECT
              1850
              1851 ;      NAME           DTR
              1852
              1853 ;
              1854 ;
              1855 ;
              1856
              1857 ; DTR -- DISPLAY SELF-TEST RESULTS AND FLASH THE 'BUSY INDICATE'
              1858 ;              LED IF A HARDWARE FAILURE WAS DETECTED
              1859
0454 BA04     1860 DTR:      MOV      R2,#4
0456 B82A     1861            MOV      R0,#TESTR
0458 27       1862            CLR      A
0459 40       1863 DTR2:     ORL      A,@R0  ; READ NEXT 'TEST RESULTS' BYTE
045A 9671     1864            JNZ      BADB   ; JUMP TO BADB IF ANY ERROR WAS DETECTED
045C 18       1865            INC      R0
045D EA59     1866            DJNZ     R2,DTR2 ; REPEAT FOR ALL TEST RESULTS BYTES
              1867
              1868 ; BOARD GOOD -- NO ERRORS WERE DETECTED BY SELF-TEST SOFTWARE
045F F0       1869            MOV      A,@R0  ; READ 'GOOD BOARD' DOWN COUNTER
0460 9663     1870            JNZ      $+3    ; SKIP NEXT INSTR. IF DOWN COUNT NON ZERO
0462 93       1871            RETR
0463 18       1872            INC      R0     ; ADDR. OF 'BLINK COUNTER'
0464 10       1873            INC      @R0    ; INCREMENT 'BLINK COUNTER'
0465 F0       1874            MOV      A,@R0
0466 C66C     1875            JZ       DTR3
```

```
LOC  OBJ        LINE       SOURCE STATEMENT

0468 F27D       1876            JB7     BLNK1   ; SLOW BLINK FOR A GOOD BOARD
046A 947A       1877            JMP     BLNK0
                1878 DTR3:
                1879 ; IF 'BLINK COUNTER' = 0, THEN DECREMENT 'GOOD BOARD' DOWN COUNTER
046C C8         1880            DEC     R0
046D F0         1881            MOV     A,@R0
046E 07         1882            DEC     A
046F A0         1883            MOV     @R0,A
0470 93         1884            RETR
                1885
                1886 BADB:
                1887 ; BOARD BAD -- SELF-TEST SOFTWARE DETECTED A HARDWARE MALFUNCTION
0471 B82F       1888            MOV     R0,#BLINKC
0473 10         1889            INC     @R0     ; INCREMENT 'BLINK COUNTER'
0474 F0         1890            MOV     A,@R0
0475 F278       1891            JB7     BLNKX   ; BLINK ONLY HALF THE TIME, DISPLAY 'BUSY' STATUS
0477 93         1892            RETR            ;   THE OTHER HALF.
0478 927D       1893 BLNKX:     JB4     BLNK1   ; FAST BLINK FOR BAD BOARD
                1894
047A 9AEF       1895 BLNK0:     ANL     P2,#0EFH ; TURN-OFF LED
047C 93         1896            RETR
                1897
047D 8A10       1898 BLNK1:     ORL     P2,#10H  ; TURN-ON LED
047F 93         1899            RETR
                1900 ;*** END OF DTR ***
                1901 $EJECT
                1902
                1903 ;       NAME            LDFXAD
                1904
                1905 ;
                1906 ;
                1907 ;
                1908
                1909 ; LDFXAD -- LOAD LINE CARD'S FIXED ADDRESS INTO CONTROL COMM. I.C.'S
                1910 ;               EXPECTED ADDRESS REG.
                1911
                1912 LDFXAD:
                1913 ; CLEAR 'LOAD BAR' & 'CLK' INPUTS OF 'FIXED ADDRESS' SHIFT REG
0480 9ADE       1914            ANL     P2,#0DEH
                1915
                1916 ; SET 'LOAD BAR' INPUT OF 'FIXED ADDR.' S/R
0482 8A01       1917            ORL     P2,#01H
                1918
                1919 ; INITIALIZE BIT COUNTER
0484 B808       1920            MOV     R0,#8
                1921
0486 97         1922 LFA1:      CLR     C       ; CLEAR C FLAG
0487 269A       1923            JNT0    $+3
0489 A7         1924            CPL     C       ; SET C IF NEXT BIT=1
                1925
                1926 ; C = NEXT BIT OF FIXED ADDR.
048A F7         1927            RLC     A       ; MOVE NEXT BIT INTO LSB OF ACCUMULATOR
                1928
                1929 ; PULSE CLOCK LINE
```

```
LOC  OBJ        LINE      SOURCE STATEMENT 048B 8A20       1930          ORL    P2,#20H
048D 9ADF       1931          ANL    P2,#0DFH
                1932
048F E886       1933          DJNZ   R0,LFA1
                1934
0491 B88D       1935          MOV    R0,#CFXADD
0493 90         1936          MOVX   @R0,A   ; LOAD 'FIXED ADDRESS' INTO CONTROL COMM. I.C.
                1937
0494 83         1938          RET
                1939
                1940 ;*** END OF LDFXAD ***
                1941 $EJECT
                1942
                1943 ;       NAME           LNTST
                1944
                1945 ;
                1946 ;
                1947 ;
                1948
                1949 ; LNTST -- LINE TEST ROUTINE
                1950
                1951 LNTST:
0495 18         1952          INC    R0
0496 80         1953          MOVX   A,@R0
0497 90         1954          MOVX   @R0,A
0498 14E4       1955          CALL   FRWAIT ; ECHO COMMAND AS RESPONSE
                1956
                1957 ; TEST DIGITAL PER-LINE CUSTOM I.C.
049A F400       1958          CALL   DIGICT
                1959
                1960 ; TEST ANALOG PER-LINE CUSTOM I.C.
049C F44D       1961          CALL   ANAICT
                1962
                1963 ; PERFORM CHECKSUM TEST OF PROGRAM MEMORY
049E 94D8       1964          CALL   ROMT
                1965
                1966 ; RETURN S/H DATA ON PORT 1 INPUTS
04A0 74E4       1967          CALL   RTNSH
                1968
04A2 83         1969          RET
                1970
                1971 ;*** END OF LNTST ***
                1972 $EJECT
                1973
                1974 ;       NAME           DELAY
                1975
                1976 ;
                1977 ;
                1978 ;
                1979
                1980 ; DELAY -- DELAY SUBROUTINE, THE CONTENTS OF THE 'A' REG. AT ENTRY
                1981 ;              IS THE DELAY IN MILLISECONDS.
                1982
                1983 DELAY:
```

```
LOC  OBJ      LINE      SOURCE STATEMENT

04A3 AA       1984           MOV    R2,A
04A4 235A     1985           MOV    A,#90    ; 90 @ 4.096 MHZ, 132 @ 6 MHZ,
              1986                           ; 180 @ 8.192 MHZ, 242 @ 11 MHZ
04A6 07       1987           DEC    A
04A7 96A6     1988           JNZ    $-1
04A9 EAA4     1989           DJNZ   R2,$-5
04AB 83       1990           RET
              1991
              1992 ;*** END OF DELAY ***
              1993 $EJECT
              1994
              1995 ;      NAME      RSDHS
              1996
              1997 ;
              1998 ;
              1999 ;
              2000
              2001 ; RSDHS — RESET 'DELTA HOOK STATUS' BIT OF THE SPECIFIED LINE CKT.
              2002
              2003 RSDHS:
              2004 ; ECHO COMMAND BYTE 4 TO SET 'RESPONSE ENA' FF
04AC 18       2005           INC    R0
04AD 80       2006           MOVX   A,@R0
04AE 90       2007           MOVX   @R0,A
              2008
              2009 ; CLEAR SELECTED LINE CIRCUIT'S 'DELTA H/S' BIT
04AF B922     2010           MOV    R1,#DLTAHS
04B1 F1       2011           MOV    A,@R1
04B2 5F       2012           ANL    A,R7     ; CLEAR BIT OF 'DLTAHS' CORRESPONDING TO
04B3 A1       2013           MOV    @R1,A    ;   SPECIFIED LINE CKT.
04B4 96BC     2014           JNZ    RSDHS1
              2015
              2016 ; ALL 'DLTAHS' BITS ARE ZERO, CLEAR "OR'D DELTA H/S" BIT OF 'LNCRDS'
04B6 B920     2017           MOV    R1,#LNCRDS
04B8 F1       2018           MOV    A,@R1
04B9 53FE     2019           ANL    A,#0FEH
04BB A1       2020           MOV    @R1,A
              2021
04BC 83       2022 RSDHS1:  RET
              2023
              2024 ;*** END OF RSDHS ***
              2025 $EJECT
              2026
              2027 ;      NAME      SMPTX4
              2028
              2029 ;
              2030 ;
              2031 ;
              2032
              2033 ; SMPTX4 — SAMPLES TX PCM CHANNEL 4 AND COUNTS THE NUMBER OF OCCURRANCES
              2034 ;          OF THE PCM VALUE CORRESPONDING TO THE ABSOLUTE PEAK AMPLITUDE
              2035 ;          OF THE SIGNAL ON CHAN. 4.  THE NUMBER OF SAMPLES TAKEN IS
              2036 ;          SPECIFIED IN COMMAND BYTE 3 (THE MIN. NUMBER OF SAMPLES IS 1,
              2037 ;          THE MAX. IS 256 (0).)
```

```
LOC  OBJ         LINE      SOURCE STATEMENT 2038
                 2039 SMPTX4:
04BD 9440        2040           CALL    RQST
04BF C8          2041           DEC     R0
04C0 80          2042           MOVX    A,@R0    ; FETCH NO. OF SAMPLES TO BE EXAMINED
04C1 AA          2043           MOV     R2,A
                 2044
                 2045 ; WAIT FOR RESPONSE FRAME, RETURN RESPONSE, THEN CONTINUE
04C2 14E4        2046           CALL    FRWAIT
                 2047
                 2048 ; SAMPLE TX CHAN. 4 (R2) TIMES
04C4 B4C7        2049           CALL    FPL      ; TAKE THE NUMBER OF SAMPLES SPECIFIED IN R2
                 2050                            ; (ABSOLUTE PEAK PCM VALUE RETURNED IN R4,
                 2051                            ; NUMBER OF OCCURANCES IS RETURNED IN R3)
                 2052
                 2053 ; PUT PEAK VALUE & NO. OF OCCURANCES IN REQUESTED DATA BYTES
04C6 B926        2054           MOV     R1,#RQBYT1
04C8 FC          2055           MOV     A,R4
04C9 A1          2056           MOV     @R1,A    ; FETCH PEAK VALUE AND PUT IN 'RQBYT1'
04CA 19          2057           INC     R1
04CB FB          2058           MOV     A,R3
04CC A1          2059           MOV     @R1,A    ; FETCH NO. OF OCCURANCES AND PUT IN 'RQBYT2'
                 2060
                 2061 ; JUMP INTO GNADJ SUBROUTINE TO FINISH UP
04CD A4B2        2062           JMP     ENDADJ
                 2063
                 2064 ;*** END OF SMPTX4 ***
                 2065 $EJECT
                 2066
                 2067 ;       NAME            RDROM
                 2068
                 2069 ;
                 2070 ;
                 2071 ;
                 2072
                 2073 ; RDROM — READ BYTE OF PROGRAM MEMORY SPECIFIED BY BITS (2-0) OF FUNCTION
                 2074 ;        CODE BYTE AND BITS (7-0) OF COMMAND BYTE 3 TO FORM AN
                 2075 ;        ELEVEN-BIT ADDRESS (FUNCTION CODE BITS (2-0) ARE MOST SIGNIFICANT)
                 2076
                 2077 RDROM:
04CF FE          2078           MOV     A,R6
04D0 AA          2079           MOV     R2,A     ; PAGE SELECT
04D1 80          2080           MOVX    A,@R0
04D2 AB          2081           MOV     R3,A     ; BYTE SELECT
04D3 18          2082           INC     R0
04D4 F4DD        2083           CALL    GETROM
04D6 90          2084           MOVX    @R0,A    ; PUT FETCHED DATA IN RESPONSE REG. BYTE 4
04D7 83          2085           RET
                 2086
                 2087 ;*** END OF RDROM ***
                 2088 $EJECT
                 2089
                 2090 ;       NAME            RDMT
                 2091
```

```
LOC  OBJ        LINE      SOURCE STATEMENT
                2092 ;
                2093 ;
                2094 ;
                2095
                2096 ; ROMT -- CHECKSUM TEST OF PROGRAM MEMORY
                2097
                2098 ROMT:
                2099 ; CLEAR 'ROM TEST FAILED' FLAG
04D8 B92A       2100       MOV    R1,#TESTR
04DA F1         2101       MOV    A,@R1
04DB 53FD       2102       ANL    A,#0FDH
04DD A1         2103       MOV    @R1,A
                2104
                2105 ; INITIALIZE CHECKSUM BYTE AND ADDRESS POINTERS
04DE BC00       2106       MOV    R4,#0   ; CHECKSUM BYTE
04E0 BB00       2107       MOV    R3,#0   ; BYTE POINTER
04E2 BA08       2108       MOV    R2,#8   ; PAGE POINTER
                2109
                2110 ; SUM ALL BYTES OF PROGRAM MEMORY
04E4 F4DD       2111       CALL   GETROM
04E6 6C         2112       ADD    A,R4
04E7 AC         2113       MOV    R4,A
04E8 EBE4       2114       DJNZ   R3,$-4  ; HAVE ALL BYTES OF THIS PAGE BEEN SUMMED?
04EA EAE4       2115       DJNZ   R2,$-6  ; HAVE ALL PAGES BEEN SUMMED?
                2116
                2117 ; TEST CHECK SUM FOR ZERO
04EC 96EF       2118       JNZ    ROMF    ; TEST FAILS IF CHECKSUM NOT ZERO
04EE 83         2119       RET
                2120
                2121 ROMF:
                2122 ; CHECKSUM NOT ZERO---SET 'ROM TEST FAILED' FLAG
04EF F1         2123       MOV    A,@R1
04F0 4302       2124       ORL    A,#2
04F2 A1         2125       MOV    @R1,A
04F3 83         2126       RET
                2127
                2128 ;*** END OF ROMT ***
                2129 $EJECT
                2130
                2131 ;     NAME        RGNADJ
                2132
                2133 ;
                2134 ;
                2135 ;
                2136
                2137 ; RGNADJ -- RX GAIN AUTO-ADJUST ROUTINE
                2138
0500            2139       ORG    500H
                2140 RGNADJ:
                2141 ; SET FLAG F0 (RX GAIN ADJ. OPERATION)
0500 85         2142       CLR    F0
0501 95         2143       CPL    F0
                2144
                2145 ; SAVE 2ND LINE CIRCUIT'S 'INDEX' IN TEMP1
```

| LOC OBJ | LINE | SOURCE STATEMENT | | |
|---|---|---|---|---|
| 0502 B96B | 2146 | | MOV | R1,#TEMP1 |
| 0504 80 | 2147 | | MOVX | A,@R0 |
| 0505 5307 | 2148 | | ANL | A,#7 |
| 0507 A1 | 2149 | | MOV | @R1,A |
| | 2150 | | | |
| | 2151 | ; ECHO COMMAND BYTE 4 TO SET 'RESPONSE ENA' FF | | |
| 0508 18 | 2152 | | INC | R0 |
| 0509 80 | 2153 | | MOVX | A,@R0 |
| 050A 90 | 2154 | | MOVX | @R0,A |
| | 2155 | | | |
| | 2156 | ; WAIT FOR RESPONSE FRAME | | |
| 050B 14E4 | 2157 | | CALL | FRWAIT |
| | 2158 | | | |
| | 2159 | ; ARE 2ND LINE CKT'S 'INDEX' & SELECTED LINT CKT'S 'INDEX' EQUAL? | | |
| 050D B96B | 2160 | | MOV | R1,#TEMP1 |
| 050F F1 | 2161 | | MOV | A,@R1 |
| 0510 DE | 2162 | | XRL | A,R6 |
| 0511 9614 | 2163 | | JNZ | RGA1 |
| | 2164 | | | |
| | 2165 | ; INDICES ARE EQUAL——TEST CANNOT BE PERFORMED | | |
| 0513 83 | 2166 | | RET | |
| | 2167 | | | |
| | 2168 | RGA1: | | |
| | 2169 | ; PULL-IN 'TEST RELAY', ETC. FOR SELECTED LINE CKT. | | |
| | 2170 | ; EVEN BAR/ODD = 1, EURO SEL = 0, POWER = 1, TR BAR = 0, | | |
| | 2171 | ; RR BAR = 1, LC ENA = 0, ILS = 0, A BAR/B PCM SEL = 0 | | |
| 0514 BAA8 | 2172 | | MOV | R2,#0A8H |
| 0516 3431 | 2173 | | CALL | LDDIG   ; LOAD DIGITAL I.C. & RETURN WITH LINE CKT. IN |
| | 2174 | | | ;          'RETURN S/H' MODE |
| | 2175 | | | |
| | 2176 | $EJECT | | |
| | 2177 | ; PULL-IN 'TEST RELAY', ETC. FOR 2ND LINE CKT. | | |
| 0518 B96B | 2178 | | MOV | R1,#TEMP1 |
| 051A 2E | 2179 | | XCH | A,R6 |
| 051B 21 | 2180 | | XCH | A,@R1 |
| 051C AE | 2181 | | MOV | R6,A |
| 051D 23EF | 2182 | | MOV | A,#(CLKVCT-(100H*(CLKVCT/100H))) |
| 051F 6E | 2183 | | ADD | A,R6 |
| 0520 E3 | 2184 | | MOVP3 | A,@A     ; TABLE LOOK-UP 2ND LINE CKT'S 'CLK VECTOR' |
| 0521 AF | 2185 | | MOV | R7,A |
| | 2186 | | | |
| | 2187 | ; EVEN BAR/ODD = 0, EURO SEL = 0, POWER = 1, TR BAR = 0, RR BAR = 1, | | |
| | 2188 | ; LC ENA = 1, ILS = 0, A BAR/B PCM SEL = 0 | | |
| 0522 BA2C | 2189 | | MOV | R2,#2CH |
| 0524 3431 | 2190 | | CALL | LDDIG   ; LOAD DIGITAL I.C. & RETURN WITH LINE CIRCUIT |
| | 2191 | | | ;          IN 'RETURN S/H' MODE |
| | 2192 | | | |
| | 2193 | ; ASSIGN 2ND LINE CKT'S TX & RX CHANNELS | | |
| 0526 2340 | 2194 | | MOV | A,#40H  ; TX PCM CH. 4 ===> CODEC TX CH. 0 |
| 0528 942F | 2195 | | CALL | CODEC |
| 052A 238A | 2196 | | MOV | A,#0SAH ; RX PCM NOT USED ===> CODEC RX CH. 0AH |
| 052C 942F | 2197 | | CALL | CODEC   ; CODEC SUBROUTINE RETURNS WITH LINE CKT. |
| | 2198 | | | ;          IN 'RETURN S/H' MODE |
| | 2199 | | | |

```
LOC  OBJ         LINE      SOURCE STATEMENT

2200 ; ASSIGN SELECTED LINE CKT'S TX & RX CHANNELS
052E B96B        2201      MOV    R1,#TEMP1
0530 2E          2202      XCH    A,R6
0531 21          2203      XCH    A,@R1
0532 AE          2204      MOV    R6,A
0533 23EF        2205      MOV    A,#(CLKVCT-(100H*(CLKVCT/100H)))
0535 6E          2206      ADD    A,R6
0536 E3          2207      MOVP3  A,@A      ; TABLE LOOK-UP SELECTED LINE CKT'S 'CLK VECT'
0537 AF          2208      MOV    R7,A
                 2209
0538 2340        2210      MOV    A,#40H    ; NOT INTERESTED IN SELECTED LINE CKT'S TX PCM
053A 942F        2211      CALL   CODEC
053C 2389        2212      MOV    A,#89H    ; RECEIVE 'DIGITAL MILLIWATT' ON RX PCM CH. 9
053E 942F        2213      CALL   CODEC
                 2214
0540 A454        2215      JMP    GNADJ
                 2216
                 2217 ;*** END OF RGNADJ ***
                 2218 $EJECT
                 2219
                 2220 ;     NAME            TGNADJ
                 2221
                 2222 ;
                 2223 ;
                 2224 ;
                 2225
                 2226 ; TGNADJ -- TX GAIN AUTO-ADJUST ROUTINE
                 2227
                 2228 TGNADJ:
                 2229 ; CLEAR FLAG F0 (TX GAIN ADJ. OPERATION)
0542 85          2230      CLR    F0
                 2231
                 2232 ; ECHO COMMAND BYTE 4 TO SET 'RESPONSE ENA' FF
0543 18          2233      INC    R0
0544 80          2234      MOVX   A,@R0
0545 90          2235      MOVX   @R0,A
                 2236
                 2237 ; WAIT FOR RESPONSE FRAME
0546 14E4        2238      CALL   FRWAIT
                 2239
                 2240 ; PULL-IN 'TEST RELAY', ETC.
                 2241 ; EVEN BAR/ODD = 0, EURO SEL = 0, POWER = 1, TR BAR = 0,
                 2242 ; RR BAR = 1, LC ENA = 1, ILS = 0, A BAR/B PCM SEL = 0
0548 BA2C        2243      MOV    R2,#2CH
054A 3431        2244      CALL   LDDIG
                 2245
                 2246 ; ASSIGN TX & RX CHANNELS
054C 2340        2247      MOV    A,#40H    ; TX PCM CH. 4 ==> CODEC TX CH. 0
054E 942F        2248      CALL   CODEC
0550 233A        2249      MOV    A,#0AH    ; RX PCM NOT NEEDED FOR TEST
0552 942F        2250      CALL   CODEC     ; CODEC SUBROUTINE RETURNS WITH LINE CIRCUIT
                 2251                       ;   IN 'RETURN S/H' MODE
                 2252
                 2253 ; ENTER 'GNADJ'
```

```
LOC  OBJ        LINE      SOURCE STATEMENT 2254
                2255 ;* END OF TGNADJ *
                2256 $EJECT
                2257
                2258 ;        NAME            GNADJ
                2259
                2260 ;
                2261 ;
                2262 ;
                2263
                2264 ; GNADJ -- GAIN AUTO-ADJUST ROUTINE (CONTINUATION OF RGNADJ & TGNADJ)
                2265
                2266 GNADJ:
                2267 ; WAIT FOR RELAY CONTACT BOUNCE TO STOP.
0554 B968       2268        MOV     R0,#RELAYD
0556 F0         2269        MOV     A,@R0   ; GET RELAY DEBOUNCE DELAY VALUE
0557 94A3       2270        CALL    DELAY
                2271
                2272 ; INITIALIZE SELECTED LINE CKT'S GAIN SETTING (TX GAIN IF F0=0,
                2273 ;    RX GAIN IF F0=1)
0559 54E1       2274        CALL    RGNADD
055B B65E       2275        JF0     $+3     ; SKIP NEXT INSTR. IF RX GAIN ADJ.
055D C9         2276        DEC     R1      ; ADJUST R1 TO POINT TO 'TX GAIN' BYTE
055E B100       2277        MOV     @R1,#0
0560 3492       2278        CALL    LDGAIN  ; LOAD GAIN SETTING INTO ANALOG I.C.
                2279
                2280 GETPK:
                2281 ; WAIT FOR TEST SIGNAL TO STABILIZE AFTER GAIN CHANGE
0562 B869       2282        MOV     R0,#GNDEL
0564 F0         2283        MOV     A,@R0   ; GET GAIN ADJUST DELAY VALUE
0565 94A3       2284        CALL    DELAY
                2285
                2286 ; FIND PEAK PCM LEVEL (RETURNS 'PEAK LEVEL' IN R4, 'PEAK COUNT' IN R3)
0567 84C7       2287        CALL    FPL
                2288
                2289 ; IS 'PEAK LEVEL' < 8 (GAIN TOO HIGH) ?
0569 FC         2290        MOV     A,R4
056A 03F8       2291        ADD     A,#0F8H ; ADD 2'S COMPLEMENT OF 8 TO 'PEAK LEVEL' VALUE
                2292                        ; CARRY FLAG WILL BE SET IF 'PEAK LEVEL')=8
056C E690       2293        JNC     GNERR1  ; GAIN TOO HIGH---HARDWARE ERROR
056E 9681       2294        JNZ     GNLO
                2295
                2296 ; 'PEAK LEVEL' VALUE = 8 OR 9
                2297 ; IS 'PEAK COUNT' < 9 (GAIN TOO LOW) ?
0570 FB         2298        MOV     A,R3
0571 03F7       2299        ADD     A,#0F7H ; ADD 2'S COMPLEMENT OF 9 TO 'PEAK COUNT'
                2300                        ; CARRY FLAG WILL BE SET IF 'PEAK COUNT'<9
0573 E681       2301        JNC     GNLO
                2302
                2303 ; IS 'PEAK COUNT' >= 16 (GAIN TOO HIGH) ?
0575 FB         2304        MOV     A,R3
0576 03F0       2305        ADD     A,#0F0H ; ADD 2'S COMPL. OF 16 TO 'PEAK COUNT'
0578 F690       2306        JC      GNERR1  ; IF CARRY FLAG SET, 'PEAK COUNT')=16 WHICH
                2307                        ; MEANS THAT GAIN CANNOT BE ADJUSTED WITHIN
```

```
LOC  OBJ      LINE       SOURCE STATEMENT

2308                   ;     THE REQUIRED BAND----HARDWARE ERROR
              2309
              2310 $EJECT
              2311 ; GAIN IS SET WITHIN TOLERANCE----CLEAR 'ANALOG I.C. FAILED' BIT OF 'TESTRA'
057A B92D     2312          MOV      R1,#TESTRA
057C F1       2313          MOV      A,@R1
057D 5F       2314          ANL      A,R7
057E A1       2315          MOV      @R1,A
057F A4A2     2316          JMP      GNADJ1
              2317
              2318 GNLO:
              2319 ; GAIN SETTING TOO LOW----INCREMENT PRESENT SETTING BY ONE
0581 54E1     2320          CALL     RGNADD
0583 B686     2321          JF0      $+3      ; SKIP NEXT INSTR. IF RX GAIN ADJ.
0585 C9       2322          DEC      R1
0586 F1       2323          MOV      A,@R1
0587 D31F     2324          XRL      A,#1FH   ; IS GAIN ALREADY AT MAX. VALUE?
0589 C69C     2325          JZ       GNERR2   ; IF ALREADY AT MAX. GAIN SETTING, THEN
              2326 ;                              MAX. GAIN TOO LOW----HARDWARE ERROR
058B 11       2327          INC      @R1      ; INCREMENT 'GAIN' BYTE IN MEMORY
058C 3492     2328          CALL     LDGAIN   ; LOAD NEW GAIN SETTING INTO ANALOG I.C.
058E A462     2329          JMP      GETPK
              2330
              2331 GNERR1:
              2332 ; DECREMENT GAIN SETTING BY ONE (IF NOT AT MIN.)
0590 54E1     2333          CALL     RGNADD
0592 B695     2334          JF0      $+3      ; SKIP NEXT INSTR. IF RX GAIN ADJ.
0594 C9       2335          DEC      R1
0595 F1       2336          MOV      A,@R1
0596 C69C     2337          JZ       GNERR2   ; CHECK IF ALREADY ZERO
0598 07       2338          DEC      A
0599 A1       2339          MOV      @R1,A
059A 3492     2340          CALL     LDGAIN
              2341
              2342 GNERR2:
              2343 ; SET 'FAILED TEST' BIT OF 'TESTRA' FOR SELECTED LINE CKT.
059C B92D     2344          MOV      R1,#TESTRA
059E FF       2345          MOV      A,R7
059F 37       2346          CPL      A
05A0 41       2347          ORL      A,@R1
05A1 A1       2348          MOV      @R1,A
              2349
              2350 GNADJ1:
              2351 ; PUT CODEC IN 'STANDBY' MODE
05A2 23FF     2352          MOV      A,#0FFH
05A4 942F     2353          CALL     CODEC
              2354
              2355 ; RELEASE 'TEST RELAY', ETC.
05A6 2330     2356          MOV      A,#LCST1
05A8 6E       2357          ADD      A,R6
05A9 A9       2358          MOV      R1,A
05AA B118     2359          MOV      @R1,#IDIG
05AC BA18     2360          MOV      R2,#IDIG
05AE 3431     2361          CALL     LDDIG
              2362 $EJECT
```

```
LOC  OBJ        LINE        SOURCE STATEMENT

2363 ; REPEAT FOR 2ND LINE CKT. IF RX GAIN ADJ.
0580 B6BA       2364            JF0     GNADJ2
                2365
                2366 ENDADJ:
                2367 ; RESET FRAME COUNTER TO INITIALIZATION VALUE
0582 65         2368            STOP    TCNT
0583 2318       2369            MOV     A,#18H
0585 62         2370            MOV     T,A
0586 45         2371            STRT    CNT
0587 16BA       2372            JTF     $+3     ; RESET TIMER FLAG
0589 83         2373            RET
                2374
                2375 GNADJ2:
                2376 ; PUT 2ND LINE CKT'S 'INDEX' & 'CLOCK VECTOR' INTO THE SELECTED
                2377 ;   LINE CIRCUIT'S 'INDEX' & 'CLOCK VECTOR' REGISTERS.
058A 85         2378            CLR     F0
058B 896B       2379            MOV     R1,#TEMP1
058D 2E         2380            XCH     A,R6
058E 21         2381            XCH     A,@R1
058F AE         2382            MOV     R6,A    ; 2ND LINE CKT'S 'INDEX' IN R6
05C0 23EF       2383            MOV     A,#(CLKVCT-(100H*(CLKVCT/100H)))
05C2 6E         2384            ADD     A,R6
05C3 E3         2385            MOVP3   A,@A
05C4 AF         2386            MOV     R7,A    ; 2ND LINE CKT'S 'CLOCK VECTOR' IN R7
05C5 A4A2       2387            JMP     GNADJ1
                2388
                2389 ;*** END OF GNADJ ***
                2390 $EJECT
                2391
                2392 ;      NAME            FPL
                2393
                2394 ;
                2395 ;
                2396 ;
                2397
                2398 ; FPL -- FIND PEAK PCM LEVEL SUBROUTINE
                2399
                2400 FPL:
05C7 BA7D       2401            MOV     R2,#125 ; INITIALIZE SAMPLE COUNTER
05C9 B809       2402            MOV     R0,#9   ; ADDR. OF PCM SAMPLING REG.
05CB BB00       2403            MOV     R3,#0   ; INITIALIZE PEAK COUNTER
05CD BC7F       2404            MOV     R4,#7FH ; INITIALIZE PEAK LEVEL BYTE
                2405
05CF 45         2406            STRT    CNT
05D0 42         2407            MOV     A,T
05D1 37         2408            CPL     A
05D2 07         2409            DEC     A       ; 2'S COMPL. OF STARTING FRAME COUNT
05D3 A9         2410            MOV     R1,A
                2411
05D4 42         2412 NXTSMP:    MOV     A,T
05D5 69         2413            ADD     A,R1
05D6 96D4       2414            JNZ     NXTSMP  ; WAIT UNTIL NEXT SAMPLE'S FRAME BEGINS
05D8 00         2415            NOP
05D9 00         2416            NOP     ; WILL WORK AS-IS UP TO 8.192 MHZ
```

```
LOC  OBJ       LINE         SOURCE STATEMENT

05DA 00        2417              NOP       ; TWO MORE NO-OP'S ARE NEEDED FOR RELIABLE
               2418                        ;     OPERATION AT 11 MHZ
05DB 80        2419              MOVX      A,@R0   ; FETCH NEXT PCM SAMPLE
05DC C9        2420              DEC       R1
05DD 537E      2421              ANL       A,#7EH  ; MASK OFF SIGN BIT & LSB
05DF AD        2422              MOV       R5,A    ; TEMP. SAVE IN R5
               2423
05E0 37        2424              CPL       A
05E1 17        2425              INC       A       ; 2'S COMPL. OF SAMPLE
05E2 6C        2426              ADD       A,R4    ; CARRY SET IF SAMPLE <= CURRENT PEAK VALUE
05E3 E6E8      2427              JNC       NOPEAK
05E5 96EB      2428              JNZ       NEWPK
05E7 1B        2429              INC       R3      ; SAMPLE=CURRENT PEAK VALUE, INCREMENT PEAK CNT.
05E8 EAD4      2430 NOPEAK:      DJNZ      R2,NXTSMP ; ANY MORE SAMPLES?
05EA 83        2431              RET
               2432
05EB FD        2433 NEWPK:       MOV       A,R5
05EC AC        2434              MOV       R4,A    ; SAMPLE VALUE BECOMES NEW PEAK VALUE
05ED B801      2435              MOV       R3,#1   ; RESET PEAK COUNTER
05EF EAD4      2436              DJNZ      R2,NXTSMP ; ANY MORE SAMPLES?
05F1 83        2437              RET
               2438
               2439 ;*** END OF FPL ***
               2440 $EJECT
               2441
               2442 ;     NAME              SLFTST
               2443
               2444 ;
               2445 ;
               2446 ;
               2447
               2448 ;   SLFTST -- LINE CARD SELF-TEST ROUTINE
               2449
0600           2450              ORG       600H
               2451 SLFTST:
               2452 ; CHECK DATA MEMORY
0600 E48A      2453              JMP       RAMT
               2454 RAMRET:
               2455 ; INITIALIZE TEST RESULTS BYTES
0602 B82D      2456              MOV       R0,#TESTR+3
0604 B903      2457              MOV       R1,#3
0606 B000      2458              MOV       @R0,#0
0608 C8        2459              DEC       R0
0609 E906      2460              DJNZ      R1,$-3
               2461
               2462 ; CHECK PROGRAM MEMORY
060B 94D8      2463              CALL      ROMT
               2464
               2465 ; CHECK PER-CARD CUSTOM CONTROL COMMUNICATIONS I.C.
060D D424      2466              CALL      COMICT
               2467
               2468 ; CHECK DIGITAL & ANALOG PER-LINE CUSTOM I.C.'S
060F 7445      2469              CALL      RAMRS
```

```
LOC  OBJ        LINE      SOURCE STATEMENT

2470 ;################################################################
0611 BE02       2471           MOV     R6,#2      ;
0613 BFFD       2472           MOV     R7,#0FDH   ;
                2473 ;################################################################
0615 CE         2474 ST1:     DEC     R6          ; NEXT LINE CKT. TO BE TESTED
0616 F400       2475          CALL    DIGICT      ; TEST DIGITAL PER-LINE CUSTOM I.C.
0618 F44D       2476          CALL    ANAICT      ; TEST ANALOG PER-LINE CUSTOM I.C.
061A FF         2477          MOV     A,R7
061B 77         2478          RR      A
061C AF         2479          MOV     R7,A        ; NEXT LINE CKT'S CLOCK VECTOR
061D FE         2480          MOV     A,R6
061E 9615       2481          JNZ     ST1         ; HAVE ALL LINE CKTS. BEEN TESTED?
                2482
                2483 ; RETURN S/H ON PORT 1
0620 74E4       2484          CALL    RTNSH
                2485
                2486 ; RETURN TO POWER-ON RESET SEQUENCE
0622 6413       2487          JMP     STRET       ; SELF TEST ROUTINE'S RETURN ADDRESS
                2488
                2489 ;*** END OF SLFTST ***
                2490 $EJECT
                2491
                2492 ;       NAME            COMICT
                2493
                2494 ;
                2495 ;
                2496 ;
                2497
                2498 ; COMICT — TEST ROUTINE FOR THE PER-CARD CUSTOM CONTROL
                2499 ;              COMMUNICATIONS I.C.
                2500
                2501 COMICT:
0624 15         2502          DIS     I
                2503
                2504 ; RESET 'COM I.C. FAILED' BIT OF TESTR
0625 B92A       2505          MOV     R1,#TESTR
0627 F1         2506          MOV     A,@R1
0628 53FB       2507          ANL     A,#0FBH
062A A1         2508          MOV     @R1,A
                2509
                2510 ; CHECK OPERATION OF MODE REGISTER (WALKING 1/0 TEST)
                2511 ;   WALKING 1'S TEST
062B B90D       2512          MOV     R1,#CMODE
062D BC00       2513          MOV     R4,#0       ; INITIALIZE TEST DATA BYTE
062F BA08       2514          MOV     R2,#8       ; INITIALIZE TEST COUNTER
                2515 WALK1:
0631 FC         2516          MOV     A,R4
0632 91         2517          MOVX    @R1,A
0633 81         2518          MOVX    A,@R1       ; WRITE THEN READ BACK NEXT TEST BYTE
0634 DC         2519          XRL     A,R4        ; COMPARE WITH EXPECTED DATA
0635 96C7       2520          JNZ     CFAIL
0637 FC         2521          MOV     A,R4
0638 97         2522          CLR     C
0639 A7         2523          CPL     C           ; SET C
```

| LOC OBJ | LINE | SOURCE STATEMENT | | |
|---|---|---|---|---|
| 063A F7 | 2524 | RLC | A | |
| 063B AC | 2525 | MOV | R4,A | ; PUT NEXT TEST DATA BYTE INTO R4 |
| 063C EA31 | 2526 | DJNZ | R2,WALK1 | |
| | 2527 | | | |
| | 2528 | ; WALKING 0'S TEST | | |
| 063E BA08 | 2529 | MOV | R2,#8 | |
| | 2530 | WALK0: | | |
| 0640 FC | 2531 | MOV | A,R4 | |
| 0641 91 | 2532 | MOVX | @R1,A | |
| 0642 81 | 2533 | MOVX | A,@R1 | |
| 0643 DC | 2534 | XRL | A,R4 | ; COMPARE WITH EXPECTED DATA |
| 0644 96C7 | 2535 | JNZ | CFAIL | |
| 0646 FC | 2536 | MOV | A,R4 | |
| 0647 97 | 2537 | CLR | C | ; CLEAR C |
| 0648 F7 | 2538 | RLC | A | |
| 0649 AC | 2539 | MOV | R4,A | |
| 064A EA40 | 2540 | DJNZ | R2,WALK0 | |
| | 2541 | | | |
| | 2542 | $EJECT | | |
| | 2543 | | | |
| | 2544 | ; SET UP MODE CONTROL REG. FOR TEST | | |
| 064C 2383 | 2545 | MOV | A,#083H | ; 'A' SHIFT REG. FEEDBACK SELECTED |
| 064E 91 | 2546 | MOVX | @R1,A | |
| | 2547 | | | |
| | 2548 | ; SET UP TEST DATA IN REGS 2,3,4,&5 | | |
| 064F BD63 | 2549 | MOV | R5,#63H | ; BYTE 1 |
| 0651 BCC1 | 2550 | MOV | R4,#0C1H | ; BYTE 2 |
| 0653 BBF8 | 2551 | MOV | R3,#0F8H | ; BYTE 3 |
| 0655 BA0F | 2552 | MOV | R2,#0FH | ; BYTE 4 |
| | 2553 | | | |
| | 2554 | ; LOAD S/R'S WITH TEST DATA AND VERIFY | | |
| 0657 BE02 | 2555 | MOV | R6,#2 | |
| 0659 B80E | 2556 | MOV | R0,#0EH | |
| 065B 27 | 2557 | CLR | A | |
| 065C 90 | 2558 | COM00: MOVX | @R0,A | |
| 065D 18 | 2559 | INC | R0 | |
| 065E B905 | 2560 | MOV | R1,#5 | ; INIT. TEST DATA POINTER |
| 0660 BF04 | 2561 | MOV | R7,#4 | ; INIT. BYTE COUNTER |
| | 2562 | COM01: | | |
| 0662 F1 | 2563 | MOV | A,@R1 | |
| 0663 37 | 2564 | CPL | A | ; INVERT TEST DATA |
| 0664 90 | 2565 | MOVX | @R0,A | ; & WRITE INTO S/R |
| 0665 C9 | 2566 | DEC | R1 | |
| 0666 EF62 | 2567 | DJNZ | R7,COM01 | |
| | 2568 | | | |
| | 2569 | ; LOAD OTHER S/R WITH TEST DATA | | |
| 0668 B905 | 2570 | MOV | R1,#5 | |
| 066A BF04 | 2571 | MOV | R7,#4 | |
| | 2572 | COM02: | | |
| 066C F1 | 2573 | MOV | A,@R1 | |
| 066D 90 | 2574 | MOVX | @R0,A | ; WRITE TEST DATA INTO S/R |
| 066E C9 | 2575 | DEC | R1 | |
| 066F EF6C | 2576 | DJNZ | R7,COM02 | |
| | 2577 | | | |

| LOC  | OBJ  | LINE | SOURCE STATEMENT | | |
|------|------|------|------|------|------|
|      |      | 2578 | ; VERIFY INVERTED TEST DATA IN S/R | | |
| 0671 | B905 | 2579 |      | MOV  | R1,#5 |
| 0673 | BF04 | 2580 |      | MOV  | R7,#4 |
|      |      | 2581 | COM03: | | |
| 0675 | 80   | 2582 |      | MOVX | A,@R0  ; FETCH NEXT BYTE FROM S/R |
| 0676 | 37   | 2583 |      | CPL  | A  ; & INVERT |
| 0677 | D1   | 2584 |      | XRL  | A,@R1  ; COMPARE WITH EXPECTED DATA |
| 0678 | 96C7 | 2585 |      | JNZ  | CFAIL |
| 067A | C9   | 2586 |      | DEC  | R1 |
| 067B | EF75 | 2587 |      | DJNZ | R7,COM03 |
|      |      | 2588 |      |      |      |
|      |      | 2589 | $EJECT |      |      |
|      |      | 2590 | ; VERIFY DATA IN OTHER S/R | | |
| 067D | B905 | 2591 |      | MOV  | R1,#5 |
| 067F | BF04 | 2592 |      | MOV  | R7,#4 |
|      |      | 2593 | COM04: |  |  |
| 0681 | 80   | 2594 |      | MOVX | A,@R0  ; FETCH NEXT BYTE FROM S/R |
| 0682 | D1   | 2595 |      | XRL  | A,@R1  ;  & COMPARE WITH EXPECTED DATA |
| 0683 | 96C7 | 2596 |      | JNZ  | CFAIL |
| 0685 | C9   | 2597 |      | DEC  | R1 |
| 0686 | EF81 | 2598 |      | DJNZ | R7,COM04 |
|      |      | 2599 |      |      |      |
|      |      | 2600 | ; REPEAT ONLY INVERTING THE DATA WRITTEN EACH S/R | | |
| 0688 | B80E | 2601 |      | MOV  | R0,#0EH |
| 068A | 2304 | 2602 |      | MOV  | A,#4 |
| 068C | 90   | 2603 |      | MOVX | @R0,A |
| 068D | EE5C | 2604 |      | DJNZ | R6,COM00 |
|      |      | 2605 |      |      |      |
|      |      | 2606 | ; LOAD 'FIXED ADDRESS' REGISTER | | |
| 068F | B908 | 2607 |      | MOV  | R0,#CFXADD |
| 0691 | FB   | 2608 |      | MOV  | A,R3 |
| 0692 | 90   | 2609 |      | MOVX | @R0,A |
|      |      | 2610 |      |      |      |
|      |      | 2611 | ; INITIALIZE FRAME COUNTER FOR TEST | | |
| 0693 | 65   | 2612 |      | STOP | TCNT |
| 0694 | 23F6 | 2613 |      | MOV  | A,#0F6H ; (-10 DECIMAL) |
| 0696 | 62   | 2614 |      | MOV  | T,A |
| 0697 | 1699 | 2615 |      | JTF  | $+2  ; RESETS 'TIMER FLAG' |
| 0699 | B908 | 2616 |      | MOV  | R1,#8 |
| 069B | 45   | 2617 |      | STRT | CNT |
|      |      | 2618 |      |      |      |
|      |      | 2619 | ; BEGIN TEST OF THE DYNAMIC OPERATION OF THE I.C. | | |
| 069C | 14D9 | 2620 |      | CALL | CNTLE1 ; SYNCHRONIZES SOFTWARE TO FRAME CLOCK, THEN |
|      |      | 2621 |      |      | ; ENABLES CONTROL S/R SHIFTING |
| 069E | B80D | 2622 |      | MOV  | R0,#CMODE |
| 06A0 | B90C | 2623 |      | MOV  | R1,#CSTS |
|      |      | 2624 |      |      |      |
|      |      | 2625 | ; WAIT UNTIL FRAME COUNTER OVERFLOWS | | |
| 06A2 | 16A6 | 2626 | LC005: | JTF | CCNT  ; EXIT LOOP IF TERMINAL COUNT IS REACHED |
| 06A4 | C4A2 | 2627 |      | JMP  | LC005 ; REPEAT LOOP |
|      |      | 2628 |      |      |      |
| 06A6 | 81   | 2629 | CCNT: | MOVX | A,@R1 |
| 06A7 | 92A6 | 2630 |      | JB4  | CCNT  ; LOOP UNTIL 'CNTRL WINDOW' = 0 |
| 06A9 | 65   | 2631 |      | STOP | TCNT  ; HALT FRAME COUNTER |

```
LOC  OBJ        LINE    SOURCE STATEMENT

86AA 27         2632            CLR     A       ;       &
86AB 90         2633            MOVX    @R0,A   ;       SHIFTING
                2634
                2635    $EJECT
                2636    ; VERIFY THAT BOTH ADDR. MATCH FLAGS ARE SET AND THAT THE FRAME
                2637    ;   COUNT IS CORRECT.
86AC 81         2638            MOVX    A,@R1
86AD 37         2639            CPL     A
86AE 12C7       2640            JB0     CFAIL   ; TEST 'A' ADDR. MATCH FLAG
86B0 32C7       2641            JB1     CFAIL   ;      'B'  "    "    "
                2642
                2643    ; LOAD EXPECTED DATA INTO REGS. R5, R4, R3, & R2
86B2 BDF8       2644            MOV     R5,#0F8H
86B4 BC0F       2645            MOV     R4,#0FH
86B6 BB63       2646            MOV     R3,#63H
86B8 BAC1       2647            MOV     R2,#0C1H
                2648
                2649    ; VERIFY THE CONTENTS OF BOTH SHIFT REGISTERS
86BA D4D0       2650            CALL    DATCHK
86BC B804       2651            MOV     R0,#4
86BE D4D2       2652            CALL    DATCHK+2
86C0 748F       2653            CALL    CNTLRS  ; RESET COMM. I.C.
86C2 83         2654            RET
                2655
86C3 C7         2656    CFAIL1: MOV     A,PSW
86C4 0307       2657            ADD     A,#7    ; MODULO 8 DECREMENT OF STACK POINTER
86C6 D7         2658            MOV     PSW,A
86C7 B82A       2659    CFAIL:  MOV     R0,#TESTR
86C9 F0         2660            MOV     A,@R0
86CA 4304       2661            ORL     A,#04H  ; SET 'CTEST FAILED' FLAG
86CC A0         2662            MOV     @R0,A
86CD 748F       2663            CALL    CNTLRS  ; RESET COMM. I.C.
86CF 83         2664            RET
                2665
                2666    ; SUBROUTINE DATCHK ********************************************
86D0 B800       2667    DATCHK: MOV     R0,#0   ; R0 POINTS TO BYTE 1 OF 'A' S/R
86D2 BF04       2668            MOV     R7,#4   ; INIT. BYTE COUNTER
86D4 B905       2669            MOV     R1,#5   ; INIT. TEST DATA POINTER
                2670
86D6 80         2671    LC008:  MOVX    A,@R0   ; READ NEXT BYTE OUT OF S/R
86D7 D1         2672            XRL     A,@R1   ;   & COMPARE WITH THE EXPECTED VALUE
86D8 96C3       2673            JNZ     CFAIL1
86DA 18         2674            INC     R0      ; ADJUST R0 TO POINT TO NEXT BYTE
86DB C9         2675            DEC     R1      ; ADJUST R1 TO POINT TO NEXT EXPECTED BYTE
86DC EFD6       2676            DJNZ    R7,LC008 ; REPEAT UNTIL ALL 4 BYTES OF S/R ARE CHECKED
                2677
86DE 83         2678            RET
                2679    ; END OF DATCHK ************************************************
                2680
                2681
                2682    ;*** END OF COMICT ***
                2683    $EJECT
                2684
                2685    ;       NAME            DIGICT
```

| LOC OBJ | LINE | SOURCE STATEMENT | | |
|---|---|---|---|---|
| | 2686 | | | |
| | 2687 ; | | | |
| | 2688 ; | | | |
| | 2689 ; | | | |
| | 2690 | | | |
| | 2691 ; DIGICT -- CHECKS DIGITAL PER-LINE CUSTOM I.C.'S | | | |
| | 2692 | | | |
| 0700 | 2693 | ORG | 700H | |
| | 2694 DIGICT: | | | |
| | 2695 ; INITIALIZE 'TEST FAILED' BITS FOR DIGITAL PER-LINE CUSTOM I.C. | | | |
| 0700 B82C | 2696 | MOV | R0,#TESTRD | |
| 0702 F0 | 2697 | MOV | A,@R0 | |
| 0703 5F | 2698 | ANL | A,R7 | ; INITIALIZE LINE CKT'S 'TESTRD' BIT |
| 0704 A0 | 2699 | MOV | @R0,A | |
| | 2700 | | | |
| 0705 B82B | 2701 | MOV | R0,#TESTRC | |
| 0707 F0 | 2702 | MOV | A,@R0 | |
| 0708 5F | 2703 | ANL | A,R7 | ; INITIALIZE LINE CKT'S 'TESTRC' BIT |
| 0709 A0 | 2704 | MOV | @R0,A | |
| | 2705 | | | |
| | 2706 ; SET UP FOR DIGITAL I.C. STATUS REG. TEST | | | |
| 070A BC00 | 2707 | MOV | R4,#WRDIG | |
| 070C BD00 | 2708 | MOV | R5,#RDDIG | |
| 070E 85 | 2709 | CLR | F0 | ; DIG. TEST--F0=0, CDR TEST--F0=1 |
| | 2710 | | | |
| 070F BA02 | 2711 DIG1: | MOV | R2,#2 | ; INIT. TEST COUNTER |
| 0711 B84B | 2712 | MOV | R0,#(LOW DTDATA) ; INITIALIZE TEST DATA POINTER | |
| | 2713 | | | |
| | 2714 ; LOAD TEST DATA INTO CUSTOM I.C.'S REG. | | | |
| 0713 FC | 2715 DIG2: | MOV | A,R4 | |
| 0714 9400 | 2716 | CALL | XMIT4 | |
| 0716 F8 | 2717 | MOV | A,R0 | |
| 0717 A3 | 2718 | MOVP | A,@A | ; LOAD TEST DATA INTO CUSTOM I.C. REG |
| 0718 9406 | 2719 | CALL | XMIT8 | |
| | 2720 | | | |
| | 2721 ; VERIFY THAT DATA WERE WRITTEN CORRECTLY | | | |
| 071A FD | 2722 | MOV | A,R5 | |
| 071B 9400 | 2723 | CALL | XMIT4 | |
| 071D 941C | 2724 | CALL | RCV8 | |
| 071F A9 | 2725 | MOV | R1,A | |
| 0720 F8 | 2726 | MOV | A,R0 | |
| 0721 A3 | 2727 | MOVP | A,@A | |
| 0722 D9 | 2728 | XRL | A,R1 | ; COMPARE READ DATA WITH TEST DATA |
| 0723 C62F | 2729 | JZ | NXTDIG | |
| | 2730 | | | |
| | 2731 $EJECT | | | |
| | 2732 ; DATA DO NOT MATCH -- ERROR DETECTED | | | |
| 0725 B92B | 2733 | MOV | R1,#TESTRC | |
| 0727 B62B | 2734 | JF0 | CDRF | |
| 0729 B92C | 2735 | MOV | R1,#TESTRD | |
| 072B FF | 2736 CDRF: | MOV | A,R7 | |
| 072C 37 | 2737 | CPL | A | |
| 072D 41 | 2738 | ORL | A,@R1 | ; SET BIT CORRESPONDING TO THIS LINE CKT. |
| 072E A1 | 2739 | MOV | @R1,A | |

```
LOC  OBJ        LINE      SOURCE STATEMENT 2740
                2741 NXTDIG:
072F 18         2742           INC    R0         ; ADJUST TEST DATA POINTER FOR NEXT TEST ITER.
0730 EA13       2743           DJNZ   R2,DIG2
                2744
0732 FC         2745           MOV    A,R4
0733 9400       2746           CALL   XMIT4
0735 23FF       2747           MOV    A,#ICODEC
0737 B63E       2748           JF0    CINIT
0739 2330       2749           MOV    A,#LCST1
073B 6E         2750           ADD    A,R6
073C A9         2751           MOV    R1,A
073D F1         2752           MOV    A,@R1
                2753
073E 9406       2754 CINIT:    CALL   XMIT8      ; RESORE CONTENTS OF REGISTER
                2755
0740 B64A       2756           JF0    DIGEND     ; HAS CDR TEST BEEN PERFORMED?
                2757
                2758 ; SET UP FOR CDR TEST
0742 BC20       2759           MOV    R4,#WRCDRC
0744 BDA0       2760           MOV    R5,#RDCDR
0746 85         2761           CLR    F0
0747 95         2762           CPL    F0         ; SET F0 (INDICATES CDR TEST PHASE)
0748 E40F       2763           JMP    DIG1
                2764
                2765 ; DIGITAL I.C. TEST COMPLETED
074A 83         2766 DIGEND:   RET
                2767
                2768 ; DIGITAL I.C. TEST DATA
                2769 ;++++++++++++++++++++++++++++++++++++++++
074B 63         2770 DTDATA:   DB     063H       ; TEST DATA BYTE 1
074C 9C         2771           DB     09CH       ;  "    "    "  2
                2772 ;++++++++++++++++++++++++++++++++++++++++
                2773
                2774 ;*** END OF DIGICT ***
                2775 $EJECT
                2776
                2777 ;         NAME            ANAICT
                2778
                2779 ;
                2780 ;
                2781 ;
                2782
                2783 ; ANAICT -- CHECKS ANALOG PER-LINE CUSTOM I.C.'S
                2784
                2785 ANAICT:
                2786 ; RESET LINE CKT'S 'TESTRA' BIT
074D B82D       2787           MOV    R0,#TESTRA
074F F0         2788           MOV    A,@R0
0750 5F         2789           ANL    A,R7
0751 A0         2790           MOV    @R0,A
                2791
0752 B904       2792           MOV    R0,#(LOW ATDATA) ; INITIALIZE TEST DATA POINTER
0754 BA02       2793           MOV    R2,#2            ; INITIALIZE TEST DATA COUNTER
```

```
LOC  OBJ      LINE      SOURCE STATEMENT 2794
              2795 ; LOAD TEST DATA INTO ANALOG I.C.'S REG.
0756 2340     2796 ANA3:    MOV     A,#WRANA
0758 9400     2797          CALL    XMIT4
075A BC03     2798          MOV     R4,#3      ; INIT. BYTE COUNTER
              2799
075C F8       2800 ANA35:   MOV     A,R0
075D A3       2801          MOVP    A,@A       ; FETCH NEXT TEST DATA BYTE
075E 9406     2802          CALL    XMIT8      ; LOAD NEXT BYTE OF TEST DATA INTO ANA. REG.
0760 18       2803          INC     R0         ; INCREMENT TEST DATA POINTER
0761 EC5C     2804          DJNZ    R4,ANA35
              2805
              2806 ; VERIFY THAT DATA WERE WRITTEN CORRECTLY
0763 C8       2807          DEC     R0
0764 C8       2808          DEC     R0
0765 C8       2809          DEC     R0
0766 23C0     2810          MOV     A,#RDANA
0768 9400     2811          CALL    XMIT4
              2812
076A BC03     2813          MOV     R4,#3      ; INIT. BYTE COUNTER
              2814
076C 941C     2815 ANA4:    CALL    RCV8       ; VERIFY NEXT BYTE
076E A9       2816          MOV     R1,A
076F F8       2817          MOV     A,R0
0770 A3       2818          MOVP    A,@A
0771 D9       2819          XRL     A,R1
0772 18       2820          INC     R0
0773 967C     2821          JNZ     ANAF
0775 EC6C     2822          DJNZ    R4,ANA4
              2823
0777 EA56     2824          DJNZ    R2,ANA3
              2825
              2826 $EJECT
              2827 ANA5:
              2828 ; TEST COMPLETED----RELOAD ANALOG REG. WITH DATA STORED IN RAM
0779 3492     2829          CALL    LDGAIN
077B 83       2830          RET
              2831
              2832 ANAF:
              2833 ; ERROR WAS DETECTED
077C B82D     2834          MOV     R0,#TESTRA
077E FF       2835          MOV     A,R7
077F 37       2836          CPL     A
0780 40       2837          ORL     A,@R0      ; SET 'ANA I.C. FAILS' FLAG
0781 A0       2838          MOV     @R0,A
0782 E479     2839          JMP     ANA5
              2840
              2841 ; ANALOG I.C. TEST DATA
              2842 ;++++++++++++++++++++++++++++++++++++++++++++++++++++
0784 63       2843 ATDATA:  DB      063H, 0C1H, 0F8H   ; TEST DATA TRIPLET 1
0785 C1
0786 F8
0787 9C       2844          DB      09CH, 03EH, 007H   ; "  "   "   2
0788 3E
```

```
LOC  OBJ        LINE      SOURCE STATEMENT 0789 07
                2845 ;++++++++++++++++++++++++++++++++++++++++++++++++++++++++
                2846
                2847 ;*** END OF ANAICT ***
                2848 $EJECT
                2849
                2850 ;       NAME            RAMT
                2851
                2852 ;
                2853 ;
                2854 ;
                2855
                2856 ; RAMT — CHECKS 8049'S DATA MEMORY
                2857
                2858 RAMT:
                2859 ; LOAD DATA MEMORY WITH TEST PATTERN 1 (EVEN BYTES=55H, ODD BYTES=AAH)
078A B87F       2860            MOV    R0,#LSTBYT
078C 23AA       2861            MOV    A,#0AAH
078E A0         2862 RAMT1:     MOV    @R0,A
078F 37         2863            CPL    A
0790 E88E       2864            DJNZ   R0,RAMT1
                2865
                2866 ; VERIFY TEST PATTERN 1
0792 B87F       2867            MOV    R0,#LSTBYT      ; (7FH IN THE 8049)
0794 B93F       2868            MOV    R1,#(LSTBYT-1)/2 ; (3FH)
0796 F0         2869 RAMT2:     MOV    A,@R0
0797 D3AA       2870            XRL    A,#0AAH
0799 96C4       2871            JNZ    RAMF
079B C8         2872            DEC    R0
079C F0         2873            MOV    A,@R0
079D D355       2874            XRL    A,#55H
079F 96C4       2875            JNZ    RAMF
07A1 C8         2876            DEC    R0
07A2 E996       2877            DJNZ   R1,RAMT2
                2878
                2879 ; LOAD DATA MEMORY WITH TEST PATTERN 2 (EVEN BYTES=AAH, ODD BYTES=55H)
07A4 B87F       2880            MOV    R0,#LSTBYT
07A6 2355       2881            MOV    A,#55H
07A8 A0         2882 RAMT3:     MOV    @R0,A
07A9 37         2883            CPL    A
07AA E8A8       2884            DJNZ   R0,RAMT3
                2885
                2886 $EJECT
                2887 ; VERIFY TEST PATTERN 2
07AC B87F       2888            MOV    R0,#LSTBYT      ; (7FH)
07AE B93F       2889            MOV    R1,#(LSTBYT-1)/2 ; (3FH)
07B0 F0         2890 RAMT4:     MOV    A,@R0
07B1 D355       2891            XRL    A,#55H
07B3 96C4       2892            JNZ    RAMF
07B5 C8         2893            DEC    R0
07B6 F0         2894            MOV    A,@R0
07B7 D3AA       2895            XRL    A,#0AAH
07B9 96C4       2896            JNZ    RAMF
07BB C8         2897            DEC    R0
```

```
LOC  OBJ       LINE     SOURCE STATEMENT

07BC E9B0      2898           DJNZ    R1,RAMT4
               2899
               2900  ; RAM TEST PASSED----CLEAR 'RAM TEST FAILED' BIT OF 'TESTR'
07BE B82A      2901           MOV     R0,#TESTR
07C0 B000      2902           MOV     @R0,#0   ; RESET 'TEST RESULTS' BYTE
               2903
               2904  ; RETURN TO SLFTST
07C2 C402      2905           JMP     RAMRET   ; RAM TEST ROUTINE'S RETURN ADDRESS
               2906
               2907  RAMF:
               2908  ; RAM TEST FAILED----SET 'RAM TEST FAILED' BIT OF 'TESTR'
07C4 B82A      2909           MOV     R0,#TESTR
07C6 B001      2910           MOV     @R0,#01H        ; SET 'RAM TEST FAILED' BIT
               2911
               2912  ; RETURN TO SLFTST
07C8 C402      2913           JMP     RAMRET
               2914
               2915  ;*** END OF RAMT ***
               2916  $EJECT
               2917
               2918  ;     NAME            GETROM
               2919
               2920  ;
               2921  ;
               2922  ;
               2923
               2924  ; GETROM -- FETCH BYTE OF PROGRAM MEMORY
               2925
               2926  ;     R2 = PAGE ADDRESS (0 - 7)
               2927  ;     R3 = BYTE ADDRESS (0 TO 0FFH)
               2928
07D0           2929           ORG     7D0H
               2930  GETROM:
07DD FA        2931           MOV     A,R2     ; FETCH PAGE ADDRESS
07DE 5307      2932           ANL     A,#7
07E0 03E3      2933           ADD     A,#(LOW ROMTBL)
07E2 B3        2934           JMPP    @A
               2935
               2936  ROMTBL:
               2937  ; PROGRAM MEMORY PAGE JUMP TABLE
07E3 EB        2938           DB      (LOW ($+8))
07E4 ED        2939           DB      (LOW ($+9))
07E5 EF        2940           DB      (LOW ($+10))
07E6 F1        2941           DB      (LOW ($+11))
07E7 F3        2942           DB      (LOW ($+12))
07E8 F5        2943           DB      (LOW ($+13))
07E9 F7        2944           DB      (LOW ($+14))
07EA F9        2945           DB      (LOW RDPG7)
               2946
07EB 04FD      2947           JMP     RDPG0
07ED 24FD      2948           JMP     RDPG1
07EF 44FD      2949           JMP     RDPG2
07F1 64FD      2950           JMP     RDPG3
07F3 84FD      2951           JMP     RDPG4
```

```
LOC  OBJ       LINE         SOURCE STATEMENT

07F5 A4FD      2952              JMP    RDPG5
07F7 C4FD      2953              JMP    RDPG6
07F9 FB        2954 RDPG7:       MOV    A,R3      ; FETCH BYTE ADDRESS
07FA A3        2955              MOVP   A,@A      ; FETCH ROM DATA BYTE
07FB 83        2956              RET
               2957
               2958 ;++++++++++++++++++++++++++
               2959 ; ROM TEST CHECKSUM BYTE
07FC 00        2960              DB     0
               2961 ;++++++++++++++++++++++++++
               2962 $EJECT
               2963 ; ROMT----PAGE 0
00FD           2964              ORG    0FDH
00FD FB        2965 RDPG0:       MOV    A,R3      ; FETCH BYTE ADDRESS
00FE A3        2966              MOVP   A,@A      ; FETCH ROM DATA BYTE
00FF 83        2967              RET
               2968
               2969 ; ROMT----PAGE 1
01FD           2970              ORG    1FDH
01FD FB        2971 RDPG1:       MOV    A,R3
01FE A3        2972              MOVP   A,@A
01FF 83        2973              RET
               2974
               2975 ; ROMT----PAGE 2
02FD           2976              ORG    2FDH
02FD FB        2977 RDPG2:       MOV    A,R3
02FE A3        2978              MOVP   A,@A
02FF 83        2979              RET
               2980
               2981 ; ROMT----PAGE 3
03FD           2982              ORG    3FDH
03FD FB        2983 RDPG3:       MOV    A,R3
03FE A3        2984              MOVP   A,@A
03FF 83        2985              RET
               2986
               2987 ; ROMT----PAGE 4
04FD           2988              ORG    4FDH
04FD FB        2989 RDPG4:       MOV    A,R3
04FE A3        2990              MOVP   A,@A
04FF 83        2991              RET
               2992
               2993 ; ROMT----PAGE 5
05FD           2994              ORG    5FDH
05FD FB        2995 RDPG5:       MOV    A,R3
05FE A3        2996              MOVP   A,@A
05FF 83        2997              RET
               2998
               2999 ; ROMT----PAGE 6
06FD           3000              ORG    6FDH
06FD FB        3001 RDPG6:       MOV    A,R3
06FE A3        3002              MOVP   A,@A
06FF 83        3003              RET
               3004
               3005 ;*** END OF GETROM ***
               3006 $EJECT
```

What is claimed is:

1. A circuit arrangement responsive to an input signal of a first frequency at a first terminal for generating output signals of a second frequency and having a predetermined phase relationship to said input signals at a second terminal, said circuit arrangement comprising:
   a voltage controlled oscillator having an output coupled to said second terminal and having a control input, said voltage controlled oscillator generating a signal having a frequency dependent on the voltage level at said control input;
   means coupled to said voltage controlled oscillator output for supplying feedback signals; and
   first means responsive to said input signals and said feedback signals for supplying said voltage level, said first means comprising:
   a controlled voltage source for generating said voltage level in response to first and second control signals, said controlled voltage source being responsive to said first control signal to change said voltage level in a first direction and being responsive to said second control signal to change said voltage level in a second direction opposite said first direction; and
   detection means for generating said first and second control signals in response to said input signals and said feedback signals, said detection means having a first stable state whereby neither said first nor said second control signals are generated, a second stable state whereby only said first control signal is generated, and a third stable state whereby said second control signal is generated, said detection means normally being in said first stable state, said detection means assuming said second stable state each time said input signal occurs prior to said feedback signal and remaining in said second stable state for substantially the time difference between the occurrences of said input signal and said feedback signal, said detection means returning to said first stable state from said second stable state after the occurrence of said feedback signal, said detection means assuming said third stable state each time said feedback signal occurs prior to said input signal and remaining in said third stable state for substantially the time difference between the occurrence of said feedback signal and said input signal, said detector means returning to said first stable state from said second stable state after the occurrence of said input signal.

2. A circuit arrangement in accordance with claim 1, wherein said detection means comprises:
   first bistable means having first and second conductive states and being responsive to the occurrence of said input signal for switching from said first conductive state to said second conductive state, said first bistable means having an output for providing said first control signal when in said second conductive state;
   second bistable means having first and second conductive states and being responsive to the occurrence of said feedback signal for switching from said first conductive state to said second conductive state, said second bistable means having an output for providing said second control signal when in said second conductive state; and
   means responsive to said first and second bistable means concurrently having said second conductive state for resetting each of said first and second bistable means to said first conductive state.

3. A circuit arrangement in accordance with claim 1 or 2, wherein said voltage controlled source comprises:
   a voltage integrator having an output coupled to said control input, a first input for receiving said first control signal and a second input for receiving said second control signal.

4. A circuit arrangement in accordance with claim 3, wherein said voltage integrator comprises:
   capacitor means;
   first switch means responsive to one of said first and second control signals for supplying charging current to said capacitor means; and
   second switch means responsive to the other of said first and second control signals for discharging said capacitor means.

5. A circuit arrangement in accordance with claims 1 or 2, wherein said second frequency is higher than said first frequency;
   and said feedback means comprises frequency dividing means for frequency dividing said output signals by a predetermined factor to generate said feedback signals.

6. A circuit arrangement in accordance with claim 3, wherein said second frequency is higher than said first frequency;
   and said feedback means comprises frequency dividing means for frequency dividing said output signals by a predetermined factor to generate said feedback signals.

7. A circuit arrangement in accordance with claim 4, wherein said second frequency is higher than said first frequency;
   and said feedback means comprises frequency dividing means for frequency dividing said output signals by a predetermined factor to generate said feedback signals.

8. A circuit arrangement in accordance with claim 2, wherein said first and second bistable means each comprises an edge-triggered flip-flop.

9. A circuit arrangement responsive to input signals of a first frequency for generating at an output terminal output signals of a second frequency having a predetermined phase relationship to said input signals, said circuit arrangement comprising:
   a voltage controlled oscillator having a voltage control input and an output coupled to said output terminal;
   means coupled to said voltage controlled oscillator output for providing a feedback signal;
   a detection circuit comprising first bistable means having first and second conductive states and being responsive to the occurrence of said input signal for switching from said first conductive state to said second conductive state, and second bistable means having first and second conductive states and being responsive to the occurrence of said feedback signals for switching from said first conductive state to said second conductive state, and reset means for resetting said first and second bistable means to said first conductive state after said first and second bistable means are both switched to said second state; and
   voltage control means for generating a control voltage at said voltage control input, said voltage control means comprising first means for increasing the voltage level of said control voltage in response to one of said first and second bistable means having said second conductive state and for decreasing the voltage level of said control voltage in response to the other one of said first and second bistable means having said second conductive state.

10. A circuit arrangement in accordance with claim 9, wherein said voltage control means comprises capacitor means;
first electronic switch means; and second electronic switch means, said first electronic switch means being responsive to said one of said first and second bistable means having said second conductive state for supplying a charging current to said capacitor means, said second electronic switch means being responsive to said other one of said first and second bistable means having said second conductive state for discharging current from said capacitor means.

11. A circuit arrangement in accordance with claim 9 or 10, wherein said first and second bistable means each comprises an edge-triggered flip-flop.

12. A circuit arrangement in accordance with claim 10, wherein said capacitor means comprises a low-pass filter.

13. A circuit arrangement in accordance with claim 10, wherein said first electronic switch comprises a transistor having a control terminal coupled to said one of said first and second bistable means, a second terminal coupled to a first polarity voltage, and a third terminal coupled to said capacitor means; and
said second electronic switch comprises a transister having a control terminal coupled to said other one of said first and second bistable means, a first terminal coupled to a second polarity voltage, and a third terminal coupled to said capacitor means.

14. A circuit for receiving at an input terminal PCM framing clock pulses at one frequency and for generating at an output terminal second PCM bit clock pulses at a second frequency, said circuit comprising:
voltage controller oscillator means having an output coupled to said output terminal and a control input, said voltage controlled oscillator means generating said second PCM bit clock pulses at a frequency dependent on the voltage level at said control input;
feedback means coupled to said oscillator means output for dividing the frequency of said second PCM bit clock pulses by a predetermined factor to generate feedback clock pulses;
phase detector means for generating error current when said feedback clock pulses are out of phase with said framing clock pulses;
loop filter means for integrating said error currents to generate said voltage level; and
means for deriving said PCM framing clock pulses from first PCM bit clock pulses.

15. A circuit in accordance with claim 14, wherein said deriving means comprises a dividing circuit for dividing said first PCM bit clock pulse by a first predetermined factor to generate said PCM framing clock pulses.

16. A circuit in accordance with claim 15 wherein said dividing circuit is synchronized by signalling frame identification pulses.

17. A circuit in accordance with claims 14, 15, or 16, wherein said phase detector means has first, second and third stable states, said phase detector assuming said second stable state each time one pulse of said framing clock pulses precedes one corresponding pulse of said feedback clock pulses, said phase detector assumes said third stable state each time said corresponding pulse precedes said one pulse,
said phase detector assumes said first stable state after the occurrence of both said one pulse and said corresponding pulse,
said phase detector means generating a first error current when in said second stable state and generating a second error current when in said third stable state.

18. A circuit in accordance with claim 17, wherein said loop filter means is responsive to said first error current to change said voltage level in a first direction and responsive to said second error current to change said voltage level in a second direction.

19. A circuit in accordance with claim 17, wherein said phase detector comprises a first bistable element having an input adapted to receive said framing clock pulses and a second bistable element having an input adapted to receive said feedback clock pulses, said first bistable element assuming a first stable state when said one pulse precedes said corresponding pulse, said second bistable element assuming a first stable state when said corresponding pulse precedes said one pulse, said first bistable element switching to a second stable state and said second bistable element switching to a second stable state after the occurrence of both said one and said corresponding pulses.

20. A circuit in accordance with claim 19, wherein said first bistable element comprises a first edge-triggered flip-flop and said second bistable element comprises a second edge-triggered flip-flop; and
said phase detector comprises means for resetting said first and second flip-flops to said respective second stable states after the occurrence of said both said one and said corresponding pulses.

21. A circuit arrangement in accordance with claim 20, wherein said resetting means comprises gating means having a first input coupled to said first flip-flop, a second input coupled to said second flip-flop, and a reset output coupled to said first and second flip-flops.

* * * * *